(12) United States Patent
Seeker et al.

(10) Patent No.: US 8,491,858 B2
(45) Date of Patent: Jul. 23, 2013

(54) GAS STREAM MULTI-POLLUTANTS CONTROL SYSTEMS AND METHODS

(75) Inventors: William Randall Seeker, San Clemente, CA (US); Brent Constantz, Portola Valley, CA (US); Vinod Khosla, Menlo Park, CA (US)

(73) Assignee: Calera Corporation, Los Gatos, CA (US)

( * ) Notice: Subject to any disclaimer, the term of this patent is extended or adjusted under 35 U.S.C. 154(b) by 0 days.

(21) Appl. No.: 13/253,272

(22) Filed: Oct. 5, 2011

(65) Prior Publication Data

US 2012/0049114 A1 Mar. 1, 2012

Related U.S. Application Data

(63) Continuation of application No. 12/716,235, filed on Mar. 2, 2010.

(60) Provisional application No. 61/156,809, filed on Mar. 2, 2009, provisional application No. 61/161,369, filed on Mar. 18, 2009, provisional application No. 61/305,473, filed on Feb. 17, 2010, provisional application No. 61/309,812, filed on Mar. 2, 2010.

(51) Int. Cl.
| | |
|---|---|
| *C22B 43/00* | (2006.01) |
| *C22B 3/00* | (2006.01) |
| *C01G 13/00* | (2006.01) |
| *C09K 3/00* | (2006.01) |
| *B01D 53/62* | (2006.01) |

(52) U.S. Cl.
USPC .......... 423/105; 423/99; 423/106; 423/419.1; 423/420.2; 423/421; 423/427; 423/428; 423/430; 423/431; 423/594.18; 423/658.5; 436/81; 436/146; 422/261; 422/262; 95/36; 95/234; 95/236

(58) Field of Classification Search
USPC ............. 423/99, 105, 106, 419.1, 420.2, 421, 423/422, 427, 428, 430, 431, 594.18, 658.5; 436/81, 146; 422/261, 262; 95/36, 234, 236
See application file for complete search history.

(56) References Cited

U.S. PATENT DOCUMENTS

| | | |
|---|---|---|
| 1,169,766 A | 2/1916 | Brassert |
| 1,172,930 A | 2/1916 | Brassert et al. |

(Continued)

FOREIGN PATENT DOCUMENTS

| | | |
|---|---|---|
| AU | 2001213118 B2 | 12/2001 |
| AU | 2007100157 | 4/2007 |

(Continued)

OTHER PUBLICATIONS

Jones. 1996. Principles and Prevention of Corrosion. Second Edition. Lebanon, Indiana: Prentice Hall. pp. 50-52.

(Continued)

*Primary Examiner* — Joseph D Anthony
(74) *Attorney, Agent, or Firm* — Calera Corporation

(57) ABSTRACT

In some embodiments, the invention provides systems and methods for removing carbon dioxide and/or additional components of waste gas streams, comprising contacting the waste gas stream with an aqueous solution, removing carbon dioxide and/or additional components from the waste gas stream, and containing the carbon dioxide and/or additional components, in one form or another, in a composition. In some embodiments, the composition is a precipitation material comprising carbonates, bicarbonates, or carbonates and bicarbonates. In some embodiments, the composition further comprises carbonate and/or bicarbonate co-products resulting from co-processing SOx, NOx, particulate matter, and/or certain metals. Additional waste streams such as liquid, solid, or multiphasic waste streams may be processed as well.

12 Claims, 13 Drawing Sheets

U.S. PATENT DOCUMENTS

Figure 1B:
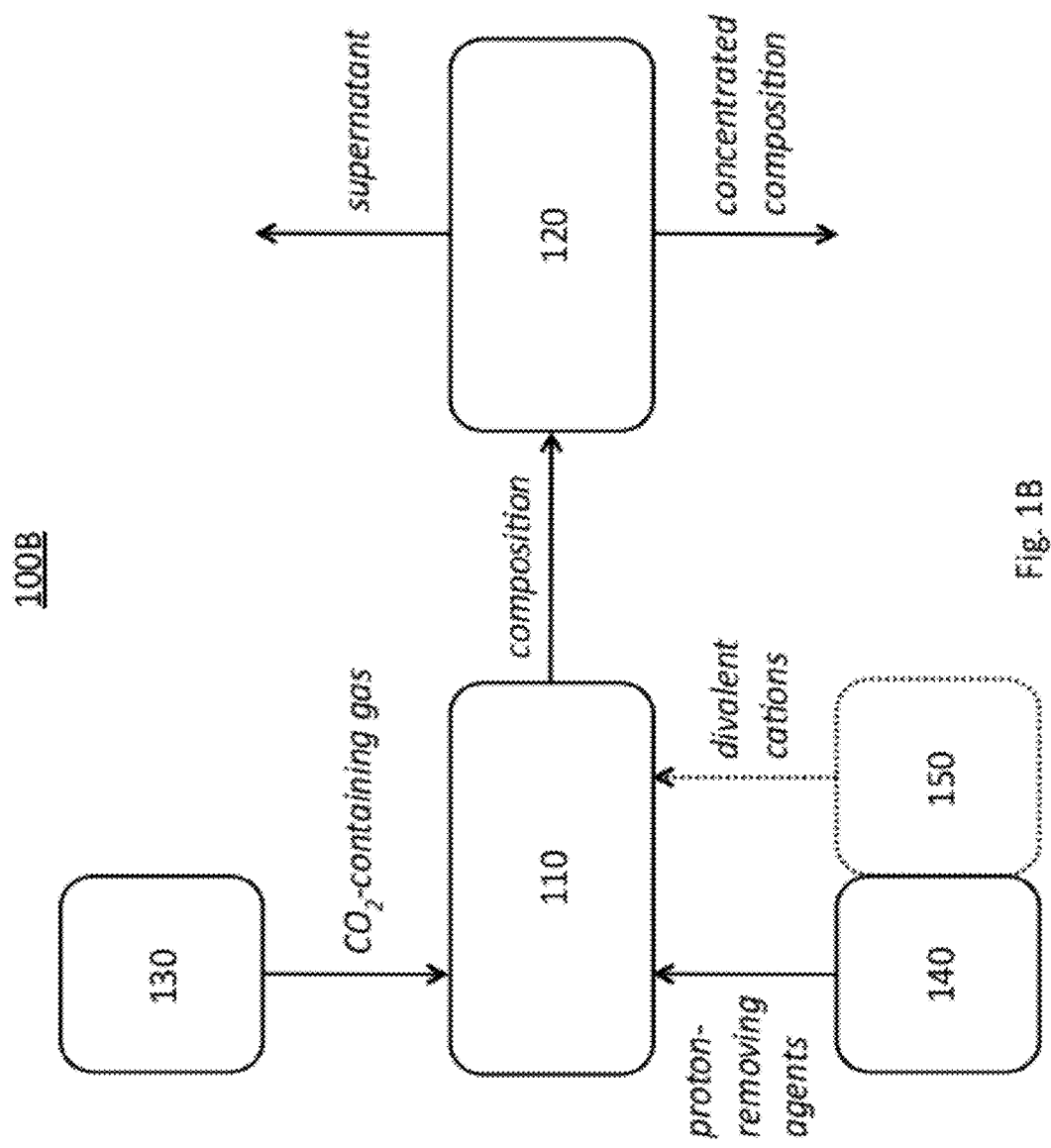

| | | |
|---|---|---|
| 1,176,747 A | 3/1916 | Ferguson |
| 1,493,579 A | 5/1924 | Walter |
| 1,543,942 A | 6/1925 | Mathesius |
| 1,655,171 A | 1/1928 | Wagner |
| 1,678,345 A | 7/1928 | Mattison |
| 1,759,361 A | 5/1930 | Miller |
| 1,785,365 A | 12/1930 | Seil |
| 1,823,269 A | 9/1931 | Grilli |
| 1,865,833 A | 7/1932 | Chesny |
| 1,897,725 A | 2/1933 | Gaus et al. |
| 1,924,503 A | 8/1933 | Lambert |
| 1,986,736 A | 1/1935 | Mauthe et al. |
| 2,006,295 A | 6/1935 | Chewning et al. |
| 2,054,315 A | 9/1936 | Ebner et al. |
| 2,082,101 A | 6/1937 | Dougherty |
| 2,204,771 A | 6/1940 | Rice et al. |
| 2,227,465 A | 1/1941 | Roche, Jr. et al. |
| 2,241,674 A | 5/1941 | Mohr, Jr. et al. |
| 2,242,294 A | 5/1941 | Fox et al. |
| 2,273,795 A | 2/1942 | Heise et al. |
| 2,304,391 A | 12/1942 | Zimmerman |
| 2,329,940 A | 9/1943 | Ponzer |
| 2,383,674 A | 8/1945 | Osborne |
| 2,458,039 A | 1/1949 | Wait |
| 2,474,381 A | 6/1949 | Sladick |
| 2,606,839 A | 8/1952 | Evans |
| 2,650,084 A | 8/1953 | White |
| 2,810,450 A | 10/1957 | Hartmann |
| 2,934,419 A | 4/1960 | Cook |
| 2,967,807 A | 1/1961 | Osborne et al. |
| 3,046,152 A | 7/1962 | Tsuneyoshi |
| 3,120,426 A | 2/1964 | Crawford, Jr. |
| 3,165,460 A | 1/1965 | Zang et al. |
| 3,179,579 A | 4/1965 | Gustave et al. |
| 3,196,092 A | 7/1965 | Beer |
| 3,202,522 A | 8/1965 | Chi-Sun Yang et al. |
| 3,222,267 A | 12/1965 | Tirrell et al. |
| 3,262,865 A | 7/1966 | Waters, Jr. |
| 3,264,125 A | 8/1966 | Bourlin et al. |
| 3,322,574 A | 5/1967 | Justi et al. |
| 3,340,003 A | 9/1967 | Judd |
| 3,350,292 A | 10/1967 | Weinberger et al. |
| 3,374,164 A | 3/1968 | Balej et al. |
| 3,420,775 A | 1/1969 | Cadwallader |
| 3,463,814 A | 8/1969 | Blanco et al. |
| 3,466,169 A | 9/1969 | Nowak et al. |
| 3,471,999 A | 10/1969 | Schon |
| 3,511,595 A | 5/1970 | Fuchs |
| 3,511,712 A | 5/1970 | Giner |
| 3,525,675 A | 8/1970 | Gaudin |
| 3,558,769 A | 1/1971 | Globus |
| 3,574,530 A | 4/1971 | Suriani et al. |
| 3,627,479 A | 12/1971 | Yee |
| 3,627,480 A | 12/1971 | Birchall |
| 3,630,762 A | 12/1971 | Olton et al. |
| 3,663,379 A | 5/1972 | Kendall |
| 3,686,372 A | 8/1972 | Hiatt et al. |
| 3,721,621 A | 3/1973 | Hough |
| 3,725,267 A | 4/1973 | Gelblum |
| 3,733,788 A | 5/1973 | Crowley |
| 3,816,592 A | 6/1974 | Rinaldi et al. |
| 3,834,129 A | 9/1974 | Darlinger et al. |
| 3,847,632 A | 11/1974 | Blengsli |
| 3,861,928 A | 1/1975 | Slater et al. |
| 3,864,236 A | 2/1975 | Lindstrom |
| 3,904,496 A | 9/1975 | Harke et al. |
| 3,907,526 A | 9/1975 | Saleem et al. |
| 3,912,801 A * | 10/1975 | Stephens ..................... 205/46 |
| 3,917,795 A | 11/1975 | Pelczarski et al. |
| 3,925,534 A | 12/1975 | Singleton et al. |
| 3,953,568 A | 4/1976 | Seko et al. |
| 3,959,419 A | 5/1976 | Kitterman |
| 3,963,592 A | 6/1976 | Lindstrom |
| 3,970,528 A | 7/1976 | Zirngiebl et al. |
| 3,975,503 A | 8/1976 | Hauschild et al. |
| 3,997,303 A | 12/1976 | Newton |
| 4,000,991 A | 1/1977 | Melin, Jr. et al. |
| 4,002,721 A | 1/1977 | Guffy et al. |
| 4,026,716 A | 5/1977 | Urschel, III et al. |
| 4,036,749 A | 7/1977 | Anderson |
| 4,040,852 A | 8/1977 | Jones |
| 4,045,524 A | 8/1977 | Bornert |
| 4,069,063 A | 1/1978 | Ball |
| 4,080,270 A | 3/1978 | O'Leary et al. |
| 4,106,296 A | 8/1978 | Leonard, Jr. et al. |
| 4,107,022 A | 8/1978 | Strempel et al. |
| 4,117,060 A | 9/1978 | Murray |
| 4,128,462 A | 12/1978 | Ghiringhelli et al. |
| 4,140,510 A | 2/1979 | Scholze et al. |
| 4,147,599 A | 4/1979 | O'Leary et al. |
| 4,157,250 A | 6/1979 | Regehr et al. |
| 4,164,537 A | 8/1979 | Drostholm et al. |
| 4,181,580 A | 1/1980 | Kitayama et al. |
| 4,188,291 A | 2/1980 | Anderson |
| 4,217,186 A | 8/1980 | McRae |
| 4,219,396 A | 8/1980 | Gancy et al. |
| 4,242,185 A | 12/1980 | McRae |
| 4,246,075 A | 1/1981 | Hilbertz |
| 4,253,922 A | 3/1981 | Welch |
| 4,263,021 A | 4/1981 | Downs et al. |
| 4,264,367 A | 4/1981 | Schutz |
| 4,303,549 A | 12/1981 | Boylan |
| 4,307,066 A | 12/1981 | Davidson |
| 4,308,298 A | 12/1981 | Chen |
| 4,312,646 A | 1/1982 | Fattinger et al. |
| 4,315,872 A | 2/1982 | Senjo et al. |
| 4,335,788 A | 6/1982 | Murphey et al. |
| 4,337,230 A | 6/1982 | Ellestad et al. |
| 4,340,572 A | 7/1982 | Ben-Shmuel et al. |
| 4,361,475 A | 11/1982 | Moeglich |
| 4,363,667 A | 12/1982 | Birchall |
| 4,370,307 A | 1/1983 | Judd |
| 4,376,101 A | 3/1983 | Sartori et al. |
| 4,377,554 A | 3/1983 | Johnson |
| 4,410,606 A | 10/1983 | Loutfy et al. |
| 4,432,175 A | 2/1984 | Smith |
| 4,440,611 A | 4/1984 | Dhar et al. |
| 4,450,009 A | 5/1984 | Childs et al. |
| 4,477,573 A | 10/1984 | Taufen |
| 4,508,545 A | 4/1985 | DeLoach |
| 4,561,945 A | 12/1985 | Coker et al. |
| 4,588,443 A | 5/1986 | Bache |
| 4,620,969 A | 11/1986 | Wilkinson |
| 4,634,533 A | 1/1987 | Somerville et al. |
| 4,670,234 A | 6/1987 | Holter et al. |
| 4,716,027 A | 12/1987 | Morrison |
| 4,738,695 A | 4/1988 | Carr et al. |
| 4,804,449 A | 2/1989 | Sweeney |
| 4,818,367 A | 4/1989 | Winkler |
| 4,838,941 A | 6/1989 | Hill |
| 4,852,344 A | 8/1989 | Warner |
| 4,876,097 A | 10/1989 | Autant et al. |
| 4,880,447 A | 11/1989 | Bloch |
| 4,899,544 A | 2/1990 | Boyd |
| 4,915,877 A | 4/1990 | Shepherd |
| 4,915,914 A | 4/1990 | Morrison |
| 4,931,264 A | 6/1990 | Rochelle et al. |
| 5,037,286 A | 8/1991 | Roberts |
| 5,100,633 A | 3/1992 | Morrison |
| 5,127,765 A | 7/1992 | Millgard et al. |
| 5,141,620 A | 8/1992 | Molter |
| 5,230,734 A | 7/1993 | Kumasaka et al. |
| 5,244,304 A | 9/1993 | Weill et al. |
| 5,246,551 A | 9/1993 | Pletcher et al. |
| 5,275,651 A | 1/1994 | Minayoshi et al. |
| 5,275,794 A | 1/1994 | Luna |
| 5,282,935 A | 2/1994 | Cawlfield et al. |
| 5,318,758 A | 6/1994 | Fujii et al. |
| 5,332,564 A | 7/1994 | Chapnerkar et al. |
| 5,348,712 A * | 9/1994 | Marquis et al. ................. 423/22 |
| 5,362,688 A | 11/1994 | Porta et al. |
| 5,364,611 A | 11/1994 | Iijima et al. |
| 5,366,513 A | 11/1994 | Goldmann et al. |
| 5,376,343 A | 12/1994 | Fouche |
| 5,378,279 A | 1/1995 | Conroy |
| 5,388,456 A | 2/1995 | Kettel |
| 5,427,608 A | 6/1995 | Auer et al. |

| | | | | | | |
|---|---|---|---|---|---|---|
| 5,439,509 A | 8/1995 | Spink et al. | | 6,468,074 B1 | 10/2002 | Wu |
| 5,455,013 A | 10/1995 | Shibata et al. | | 6,475,460 B1 | 11/2002 | Max |
| 5,470,671 A | 11/1995 | Fletcher et al. | | 6,495,013 B2 | 12/2002 | Mazur et al. |
| 5,520,898 A | 5/1996 | Pinnavaia et al. | | 6,500,319 B2 | 12/2002 | LaConti et al. |
| 5,527,387 A | 6/1996 | Anderson et al. | | 6,517,631 B1 | 2/2003 | Bland |
| 5,531,821 A | 7/1996 | Wu | | 6,518,217 B2 | 2/2003 | Xing et al. |
| 5,531,865 A | 7/1996 | Cole | | 6,537,456 B2 | 3/2003 | Mukhopadhyay |
| 5,536,310 A | 7/1996 | Brook et al. | | 6,602,630 B1 | 8/2003 | Gopal |
| 5,547,027 A | 8/1996 | Chan et al. | | 6,613,141 B2 | 9/2003 | Key, Jr. |
| 5,569,558 A | 10/1996 | Takeuchi et al. | | 6,620,856 B1 | 9/2003 | Mortimer et al. |
| 5,584,923 A | 12/1996 | Wu | | 6,623,555 B1 | 9/2003 | Haverinen et al. |
| 5,584,926 A | 12/1996 | Borgholm et al. | | 6,638,413 B1 | 10/2003 | Weinberg et al. |
| 5,595,641 A | 1/1997 | Traini et al. | | 6,648,949 B1 | 11/2003 | Der et al. |
| 5,614,078 A | 3/1997 | Lubin et al. | | 6,712,946 B2 | 3/2004 | Genders et al. |
| 5,618,392 A | 4/1997 | Furuya | | 6,755,905 B2 | 6/2004 | Oates et al. |
| 5,624,493 A | 4/1997 | Wagh et al. | | 6,776,972 B2 | 8/2004 | Vohra et al. |
| 5,643,415 A | 7/1997 | Wise et al. | | 6,786,963 B2 | 9/2004 | Matherly et al. |
| 5,690,729 A | 11/1997 | Jones, Jr. | | 6,841,512 B1 | 1/2005 | Fetcenko et al. |
| 5,702,585 A | 12/1997 | Hillrichs et al. | | 6,881,256 B2 | 4/2005 | Orange et al. |
| 5,749,930 A | 5/1998 | Wolf et al. | | 6,890,419 B2 | 5/2005 | Reichman et al. |
| 5,766,338 A | 6/1998 | Weber | | 6,890,497 B2 | 5/2005 | Rau et al. |
| 5,766,339 A | 6/1998 | Babu et al. | | 6,908,507 B2 | 6/2005 | Lalande et al. |
| 5,776,328 A | 7/1998 | Traini et al. | | 6,936,573 B2 | 8/2005 | Wertz et al. |
| 5,785,868 A | 7/1998 | Li et al. | | 6,938,425 B2 | 9/2005 | Simpson et al. |
| 5,792,440 A | 8/1998 | Huege | | 7,037,434 B2 | 5/2006 | Myers et al. |
| 5,803,894 A | 9/1998 | Kao et al. | | 7,040,400 B2 | 5/2006 | de Rouffignac et al. |
| 5,833,736 A | 11/1998 | Durham et al. | | 7,132,090 B2 | 11/2006 | Dziedzic et al. |
| 5,846,669 A | 12/1998 | Smotkin et al. | | 7,135,604 B2 | 11/2006 | Ding et al. |
| 5,849,075 A | 12/1998 | Hopkins et al. | | 7,147,692 B2 | 12/2006 | Fornai et al. |
| 5,853,686 A | 12/1998 | Doxsee | | 7,182,851 B2 | 2/2007 | Gomez |
| 5,855,666 A | 1/1999 | Kao et al. | | 7,198,722 B2 | 4/2007 | Hussain |
| 5,855,759 A | 1/1999 | Keating et al. | | 7,255,842 B1 | 8/2007 | Yeh et al. |
| 5,879,948 A * | 3/1999 | Van Pelt et al. ................. 436/81 | | 7,261,912 B2 | 8/2007 | Zeigler |
| 5,885,478 A | 3/1999 | Montgomery et al. | | 7,264,704 B2 | 9/2007 | Nevosi et al. |
| 5,897,704 A | 4/1999 | Baglin | | 7,273,540 B2 | 9/2007 | Sonoda et al. |
| 5,925,255 A | 7/1999 | Mukhopadhyay | | 7,282,189 B2 | 10/2007 | Zauderer |
| 5,958,353 A | 9/1999 | Eyal | | 7,285,166 B2 | 10/2007 | Luke et al. |
| 5,965,201 A | 10/1999 | Jones, Jr. | | 7,314,847 B1 | 1/2008 | Siriwardane |
| 5,994,838 A * | 11/1999 | Klinedinst et al. ............ 313/565 | | 7,347,896 B2 | 3/2008 | Harrison |
| 6,024,848 A | 2/2000 | Dufner et al. | | 7,390,444 B2 | 6/2008 | Ramme et al. |
| 6,059,974 A | 5/2000 | Scheurman, III | | 7,427,449 B2 | 9/2008 | Delaney et al. |
| 6,071,336 A | 6/2000 | Fairchild et al. | | 7,440,871 B2 | 10/2008 | McConnell et al. |
| 6,080,297 A | 6/2000 | Ayers | | 7,452,449 B2 | 11/2008 | Weinberg et al. |
| 6,080,320 A | 6/2000 | von Phul | | 7,455,854 B2 | 11/2008 | Gower et al. |
| 6,090,197 A | 7/2000 | Vivian et al. | | 7,459,134 B2 | 12/2008 | Cadours et al. |
| 6,129,832 A | 10/2000 | Fuhr et al. | | 7,541,011 B2 | 6/2009 | Hu |
| 6,139,605 A | 10/2000 | Carnell et al. | | 7,595,001 B2 | 9/2009 | Arakel et al. |
| 6,174,507 B1 | 1/2001 | Wallace et al. | | 7,597,747 B1 | 10/2009 | Nagel |
| 6,180,012 B1 | 1/2001 | Rongved | | 7,628,847 B2 | 12/2009 | Pope et al. |
| 6,180,074 B1 * | 1/2001 | Fourcot et al. ................. 423/210 | | 7,674,443 B1 | 3/2010 | Davis |
| 6,186,426 B1 | 2/2001 | Killer | | 7,699,909 B2 | 4/2010 | Lackner et al. |
| 6,190,301 B1 | 2/2001 | Murray et al. | | 7,704,369 B2 | 4/2010 | Olah et al. |
| 6,190,428 B1 | 2/2001 | Rolison et al. | | 7,704,370 B2 | 4/2010 | Coustry et al. |
| 6,200,381 B1 | 3/2001 | Rechichi | | 7,727,374 B2 | 6/2010 | Jones |
| 6,200,543 B1 | 3/2001 | Allebach et al. | | 7,735,274 B2 | 6/2010 | Constantz et al. |
| 6,217,728 B1 | 4/2001 | Lehmann et al. | | 7,736,430 B2 | 6/2010 | Barron et al. |
| 6,221,225 B1 | 4/2001 | Mani | | 7,744,761 B2 | 6/2010 | Constantz et al. |
| 6,228,145 B1 | 5/2001 | Falk-Pedersen et al. | | 7,749,476 B2 | 7/2010 | Constantz et al. |
| 6,235,186 B1 | 5/2001 | Tanaka et al. | | 7,753,618 B2 | 7/2010 | Constantz et al. |
| 6,248,166 B1 | 6/2001 | Solsvik | | 7,754,169 B2 | 7/2010 | Constantz et al. |
| 6,251,255 B1 | 6/2001 | Copping et al. | | 7,771,684 B2 | 8/2010 | Constantz et al. |
| 6,251,356 B1 | 6/2001 | Mathur | | 7,790,012 B2 | 9/2010 | Kirk et al. |
| 6,264,736 B1 | 7/2001 | Knopf et al. | | 7,815,880 B2 | 10/2010 | Constantz et al. |
| 6,264,740 B1 | 7/2001 | McNulty, Jr. | | 7,829,053 B2 | 11/2010 | Constantz et al. |
| 6,280,505 B1 | 8/2001 | Torkildsen et al. | | 7,842,264 B2 * | 11/2010 | Cooper et al. ................. 423/210 |
| 6,284,208 B1 * | 9/2001 | Thomassen ................... 423/210 | | 7,875,163 B2 | 1/2011 | Gilliam et al. |
| 6,293,731 B1 | 9/2001 | Studer | | 7,887,694 B2 | 2/2011 | Constantz et al. |
| 6,309,570 B1 | 10/2001 | Fellabaum | | 7,906,028 B2 | 3/2011 | Constantz et al. |
| 6,331,207 B1 | 12/2001 | Gebhardt | | 7,914,685 B2 | 3/2011 | Constantz et al. |
| 6,352,576 B1 | 3/2002 | Spencer et al. | | 7,919,064 B2 | 4/2011 | Kawatra et al. |
| 6,375,825 B1 | 4/2002 | Mauldin et al. | | 7,922,809 B1 | 4/2011 | Constantz et al. |
| 6,387,174 B2 | 5/2002 | Knopf et al. | | 7,931,809 B2 | 4/2011 | Constantz et al. |
| 6,387,212 B1 | 5/2002 | Christian | | 7,939,336 B2 | 5/2011 | Constantz et al. |
| 6,402,824 B1 | 6/2002 | Freeman et al. | | 7,966,250 B2 | 6/2011 | Constantz et al. |
| 6,402,831 B1 | 6/2002 | Sawara et al. | | 7,993,500 B2 | 8/2011 | Gilliam et al. |
| 6,416,574 B1 | 7/2002 | Steelhammer et al. | | 7,993,511 B2 | 8/2011 | Gilliam et al. |
| 6,428,767 B1 | 8/2002 | Burch et al. | | 8,006,446 B2 | 8/2011 | Constantz et al. |
| 6,444,107 B2 | 9/2002 | Hartel et al. | | 8,062,418 B2 | 11/2011 | Constantz et al. |
| 6,447,437 B1 | 9/2002 | Lee et al. | | 8,114,214 B2 | 2/2012 | Constantz et al. |

| | | |
|---|---|---|
| 8,137,444 B2 | 3/2012 | Farsad et al. |
| 2001/0022952 A1 | 9/2001 | Rau et al. |
| 2001/0023655 A1 | 9/2001 | Knopf et al. |
| 2001/0054253 A1 | 12/2001 | Takahashi et al. |
| 2002/0009410 A1 | 1/2002 | Mathur |
| 2002/0127474 A1 | 9/2002 | Fleischer et al. |
| 2002/0151017 A1 | 10/2002 | Stemmer et al. |
| 2002/0155103 A1 | 10/2002 | Crippen et al. |
| 2003/0017088 A1 | 1/2003 | Downs et al. |
| 2003/0027023 A1 | 2/2003 | Dutil et al. |
| 2003/0123930 A1 | 7/2003 | Jacobs et al. |
| 2003/0126899 A1 | 7/2003 | Wolken |
| 2003/0146163 A1 | 8/2003 | Sasowsky et al. |
| 2003/0170159 A1* | 9/2003 | Honjo et al. ............ 423/210 |
| 2003/0188668 A1 | 10/2003 | Bland |
| 2003/0213937 A1 | 11/2003 | Yaniv |
| 2003/0229572 A1 | 12/2003 | Raines et al. |
| 2004/0007476 A1 | 1/2004 | Tennakoon et al. |
| 2004/0014845 A1 | 1/2004 | Takamura et al. |
| 2004/0028963 A1 | 2/2004 | Kormann et al. |
| 2004/0040671 A1 | 3/2004 | Duesel, Jr. et al. |
| 2004/0040715 A1 | 3/2004 | Wellington et al. |
| 2004/0052865 A1 | 3/2004 | Gower et al. |
| 2004/0094279 A1 | 5/2004 | Myatt |
| 2004/0109927 A1 | 6/2004 | Ang et al. |
| 2004/0111968 A1 | 6/2004 | Day et al. |
| 2004/0126293 A1 | 7/2004 | Geerlings et al. |
| 2004/0139891 A1 | 7/2004 | Merkley et al. |
| 2004/0151957 A1 | 8/2004 | Brooks et al. |
| 2004/0213705 A1 | 10/2004 | Blencoe et al. |
| 2004/0219090 A1 | 11/2004 | Dziedzic et al. |
| 2004/0224214 A1 | 11/2004 | Vamos et al. |
| 2004/0228788 A1 | 11/2004 | Nagai et al. |
| 2004/0231568 A1 | 11/2004 | Morioka et al. |
| 2004/0234443 A1 | 11/2004 | Chen et al. |
| 2004/0259231 A1 | 12/2004 | Bhattacharya |
| 2004/0267077 A1 | 12/2004 | Ding et al. |
| 2005/0002847 A1 | 1/2005 | Maroto-Valer et al. |
| 2005/0011770 A1 | 1/2005 | Katsuyoshi et al. |
| 2005/0031515 A1 | 2/2005 | Charette |
| 2005/0031522 A1 | 2/2005 | Delaney et al. |
| 2005/0036932 A1 | 2/2005 | Takahashi et al. |
| 2005/0087496 A1 | 4/2005 | Borseth |
| 2005/0098499 A1 | 5/2005 | Hussain |
| 2005/0103234 A1 | 5/2005 | McNulty |
| 2005/0112044 A1* | 5/2005 | Kuma et al. ............ 423/210 |
| 2005/0118081 A1 | 6/2005 | Harris et al. |
| 2005/0129606 A1 | 6/2005 | Mitsuhashi et al. |
| 2005/0136310 A1 | 6/2005 | Luo et al. |
| 2005/0154669 A1 | 7/2005 | Streetman |
| 2005/0180910 A1 | 8/2005 | Park et al. |
| 2005/0232855 A1 | 10/2005 | Stevens et al. |
| 2005/0232856 A1 | 10/2005 | Stevens et al. |
| 2005/0238563 A1 | 10/2005 | Eighmy et al. |
| 2005/0252215 A1 | 11/2005 | Beaumont |
| 2005/0255174 A1 | 11/2005 | Shelley et al. |
| 2006/0039853 A1 | 2/2006 | Fan et al. |
| 2006/0048517 A1 | 3/2006 | Fradette et al. |
| 2006/0051274 A1 | 3/2006 | Wright et al. |
| 2006/0057036 A1 | 3/2006 | Ayala Hermosillo |
| 2006/0060532 A1 | 3/2006 | Davis |
| 2006/0093540 A1 | 5/2006 | Fan et al. |
| 2006/0105082 A1 | 5/2006 | Zeigler |
| 2006/0165583 A1 | 7/2006 | Makino et al. |
| 2006/0169177 A1 | 8/2006 | Jardine et al. |
| 2006/0169593 A1 | 8/2006 | Xu et al. |
| 2006/0173169 A1 | 8/2006 | Cheryan |
| 2006/0184445 A1 | 8/2006 | Sandor et al. |
| 2006/0185516 A1 | 8/2006 | Moriyama et al. |
| 2006/0185560 A1 | 8/2006 | Ramme et al. |
| 2006/0185985 A1* | 8/2006 | Jones ............ 205/508 |
| 2006/0186562 A1 | 8/2006 | Wright et al. |
| 2006/0189837 A1 | 8/2006 | Forrester |
| 2006/0194086 A1 | 8/2006 | Hsu |
| 2006/0195002 A1 | 8/2006 | Grandjean et al. |
| 2006/0196836 A1 | 9/2006 | Arakel et al. |
| 2006/0245993 A1* | 11/2006 | Magumbe et al. ............ 423/210 |
| 2006/0249380 A1 | 11/2006 | Gestermann et al. |
| 2006/0286011 A1 | 12/2006 | Anttila et al. |
| 2006/0288912 A1 | 12/2006 | Sun et al. |
| 2007/0045125 A1 | 3/2007 | Hartvigsen et al. |
| 2007/0056487 A1 | 3/2007 | Anthony et al. |
| 2007/0084344 A1 | 4/2007 | Moriya et al. |
| 2007/0092427 A1 | 4/2007 | Anthony et al. |
| 2007/0099038 A1 | 5/2007 | Galloway |
| 2007/0113500 A1 | 5/2007 | Zhao |
| 2007/0148509 A1 | 6/2007 | Colbow et al. |
| 2007/0163443 A1 | 7/2007 | Moriyama et al. |
| 2007/0184394 A1 | 8/2007 | Comrie |
| 2007/0186820 A1 | 8/2007 | O'Hearn |
| 2007/0187247 A1 | 8/2007 | Lackner et al. |
| 2007/0202032 A1 | 8/2007 | Geerlings et al. |
| 2007/0212584 A1 | 9/2007 | Chuang |
| 2007/0217981 A1 | 9/2007 | Van Essendelft |
| 2007/0233616 A1 | 10/2007 | Richards et al. |
| 2007/0240570 A1 | 10/2007 | Jadhav et al. |
| 2007/0251393 A1 | 11/2007 | Pope et al. |
| 2007/0261947 A1 | 11/2007 | Geerlings et al. |
| 2007/0266632 A1 | 11/2007 | Tsangaris et al. |
| 2008/0031801 A1 | 2/2008 | Lackner et al. |
| 2008/0035036 A1 | 2/2008 | Bassani et al. |
| 2008/0059206 A1 | 3/2008 | Jenkins |
| 2008/0099122 A1 | 5/2008 | Andersen et al. |
| 2008/0104858 A1 | 5/2008 | Carin et al. |
| 2008/0112868 A1 | 5/2008 | Blencoe et al. |
| 2008/0134891 A1 | 6/2008 | Jarvenpaa |
| 2008/0138265 A1 | 6/2008 | Lackner et al. |
| 2008/0171158 A1 | 7/2008 | Maddan |
| 2008/0178739 A1 | 7/2008 | Lewnard et al. |
| 2008/0213146 A1 | 9/2008 | Zauderer |
| 2008/0223727 A1 | 9/2008 | Oloman et al. |
| 2008/0233029 A1 | 9/2008 | Fan et al. |
| 2008/0236143 A1 | 10/2008 | Lo |
| 2008/0241337 A1 | 10/2008 | Durand et al. |
| 2008/0245274 A1 | 10/2008 | Ramme |
| 2008/0245660 A1 | 10/2008 | Little et al. |
| 2008/0245672 A1 | 10/2008 | Little et al. |
| 2008/0248350 A1 | 10/2008 | Little et al. |
| 2008/0270272 A1 | 10/2008 | Branscomb |
| 2008/0275149 A1 | 11/2008 | Ladely et al. |
| 2008/0276553 A1 | 11/2008 | Ingjaldsdottir et al. |
| 2008/0276803 A1 | 11/2008 | Molaison et al. |
| 2008/0277319 A1 | 11/2008 | Wyrsta |
| 2008/0289495 A1 | 11/2008 | Eisenberger et al. |
| 2009/0001020 A1 | 1/2009 | Constantz et al. |
| 2009/0010827 A1 | 1/2009 | Geerlings et al. |
| 2009/0020044 A1 | 1/2009 | Constantz et al. |
| 2009/0043687 A1 | 2/2009 | van Soestbergen et al. |
| 2009/0078162 A1 | 3/2009 | Clausi et al. |
| 2009/0081092 A1* | 3/2009 | Yang et al. ............ 423/210 |
| 2009/0081093 A1 | 3/2009 | Comrie |
| 2009/0081096 A1 | 3/2009 | Pellegrin |
| 2009/0081112 A1 | 3/2009 | Virtanen |
| 2009/0087890 A1 | 4/2009 | Pyle et al. |
| 2009/0090277 A1 | 4/2009 | Joshi et al. |
| 2009/0101008 A1 | 4/2009 | Lackner et al. |
| 2009/0107038 A1 | 4/2009 | Wan |
| 2009/0117019 A1* | 5/2009 | Comrie ............ 423/242.1 |
| 2009/0120288 A1 | 5/2009 | Lackner |
| 2009/0120644 A1 | 5/2009 | Roddy et al. |
| 2009/0143211 A1 | 6/2009 | Riman et al. |
| 2009/0148238 A1 | 6/2009 | Smith |
| 2009/0169452 A1* | 7/2009 | Constantz et al. ............ 423/230 |
| 2009/0186244 A1 | 7/2009 | Mayer |
| 2009/0202410 A1 | 8/2009 | Kawatra et al. |
| 2009/0214408 A1 | 8/2009 | Blake et al. |
| 2009/0232861 A1 | 9/2009 | Wright et al. |
| 2009/0263301 A1 | 10/2009 | Reddy et al. |
| 2009/0294366 A1 | 12/2009 | Wright et al. |
| 2009/0301352 A1 | 12/2009 | Constantz et al. |
| 2010/0000444 A1 | 1/2010 | Constantz et al. |
| 2010/0024686 A1* | 2/2010 | Constantz et al. ............ 106/817 |
| 2010/0037653 A1 | 2/2010 | Enis et al. |
| 2010/0051859 A1 | 3/2010 | House et al. |
| 2010/0063902 A1 | 3/2010 | Constantz et al. |
| 2010/0068109 A1 | 3/2010 | Comrie |
| 2010/0077691 A1 | 4/2010 | Constantz et al. |
| 2010/0077922 A1 | 4/2010 | Constantz et al. |

| | | | | | | |
|---|---|---|---|---|---|---|
| 2010/0083880 A1 | 4/2010 | Constantz et al. | CA | 2617325 A1 | 11/2007 | |
| 2010/0084280 A1 | 4/2010 | Gilliam et al. | CA | 2682952 A1 | 10/2008 | |
| 2010/0089142 A1 | 4/2010 | Sukhija et al. | CA | 2659447 A1 | 12/2008 | |
| 2010/0111810 A1 | 5/2010 | Constantz et al. | CN | 1185989 | 7/1998 | |
| 2010/0116683 A1 | 5/2010 | Gilliam | CN | 101219330 A | 7/2008 | |
| 2010/0132556 A1 | 6/2010 | Constantz et al. | CN | 101289200 A | 10/2008 | |
| 2010/0132591 A1 | 6/2010 | Constantz et al. | DE | 2653649 A1 | 6/1978 | |
| 2010/0135865 A1 | 6/2010 | Constantz et al. | DE | 3146326 A1 | 6/1983 | |
| 2010/0135882 A1 | 6/2010 | Constantz et al. | DE | 3638317 A1 | 6/1987 | |
| 2010/0140103 A1 | 6/2010 | Gilliam et al. | DE | 19523324 A1 | 9/1994 | |
| 2010/0144521 A1 | 6/2010 | Constantz et al. | DE | 19512163 A1 | 10/1995 | |
| 2010/0150802 A1 | 6/2010 | Gilliam et al. | DE | 19631794 A1 | 8/1997 | |
| 2010/0154679 A1 | 6/2010 | Constantz et al. | EP | 0522382 A1 | 1/1993 | |
| 2010/0155258 A1 | 6/2010 | Kirk et al. | EP | 0487102 B1 | 8/1995 | |
| 2010/0158786 A1 | 6/2010 | Constantz et al. | EP | 0591350 B1 | 11/1996 | |
| 2010/0196104 A1 | 8/2010 | Constantz et al. | EP | 0628339 B1 | 9/1999 | |
| 2010/0200419 A1 | 8/2010 | Gilliam et al. | EP | 0844905 B1 | 3/2000 | |
| 2010/0219373 A1 | 9/2010 | Seeker et al. | EP | 1379469 B1 | 3/2006 | |
| 2010/0224503 A1 | 9/2010 | Kirk et al. | EP | 1650162 A1 | 4/2006 | |
| 2010/0229725 A1 | 9/2010 | Farsad et al. | EP | 1716911 A1 | 11/2006 | |
| 2010/0230293 A1 | 9/2010 | Gilliam et al. | EP | 1554031 B1 | 12/2006 | |
| 2010/0230830 A1 | 9/2010 | Farsad et al. | EP | 1571105 B1 | 12/2007 | |
| 2010/0236242 A1 | 9/2010 | Farsad et al. | EP | 2253600 A1 | 11/2010 | |
| 2010/0239467 A1 | 9/2010 | Constantz et al. | GB | 911386 A | 11/1962 | |
| 2010/0239487 A1 | 9/2010 | Constantz et al. | GB | 1392907 | 5/1975 | |
| 2010/0247410 A1 | 9/2010 | Constantz et al. | GB | 2032441 | 5/1980 | |
| 2010/0258035 A1 | 10/2010 | Constantz et al. | GB | 2050325 A | 1/1981 | |
| 2010/0258506 A1 | 10/2010 | Berkowitz et al. | GB | 2208163 A | 3/1989 | |
| 2010/0276299 A1 | 11/2010 | Kelly et al. | GB | 2210035 A | 6/1989 | |
| 2010/0290967 A1 | 11/2010 | Detournay et al. | GB | 2371810 | 8/2002 | |
| 2010/0313793 A1 | 12/2010 | Constantz et al. | JP | 51102357 A1 | 9/1976 | |
| 2010/0313794 A1 | 12/2010 | Constantz et al. | JP | 59100280 | 6/1984 | |
| 2010/0319586 A1 | 12/2010 | Blount et al. | JP | 63-312988 | 12/1988 | |
| 2010/0326328 A1 | 12/2010 | Constantz et al. | JP | 03-020491 | 1/1991 | |
| 2011/0024361 A1 | 2/2011 | Schwartzel et al. | JP | 03-170363 A | 7/1991 | |
| 2011/0030586 A1 | 2/2011 | Constantz et al. | JP | 04-190829 | 7/1992 | |
| 2011/0030957 A1 | 2/2011 | Constantz et al. | JP | 04-317721 A | 11/1992 | |
| 2011/0033239 A1 | 2/2011 | Constantz et al. | JP | 7061842 A | 3/1995 | |
| 2011/0035154 A1 | 2/2011 | Kendall et al. | JP | 10287461 A | 10/1998 | |
| 2011/0036728 A1 | 2/2011 | Farsad | JP | 10305212 A | 11/1998 | |
| 2011/0042230 A1 | 2/2011 | Gilliam et al. | JP | 2000226402 A | 8/2000 | |
| 2011/0054084 A1 | 3/2011 | Constantz et al. | JP | 03184892 B2 | 7/2001 | |
| 2011/0059000 A1 | 3/2011 | Constantz et al. | JP | 2002-273163 A | 9/2002 | |
| 2011/0067600 A1 | 3/2011 | Constantz et al. | JP | 2003041388 | 2/2003 | |
| 2011/0067603 A1 | 3/2011 | Constantz et al. | JP | 2004-174370 | 6/2004 | |
| 2011/0067605 A1 | 3/2011 | Constantz et al. | JP | 2005-052762 | 3/2005 | |
| 2011/0071309 A1 | 3/2011 | Constantz et al. | JP | 2006-076825 | 3/2006 | |
| 2011/0079515 A1 | 4/2011 | Gilliam et al. | JP | 2009279530 A | 12/2009 | |
| 2011/0083968 A1 | 4/2011 | Gilliam et al. | NL | 7607470 A | 1/1978 | |
| 2011/0091366 A1 | 4/2011 | Kendall et al. | SU | 1819854 A1 | 6/1993 | |
| 2011/0091955 A1 | 4/2011 | Constantz et al. | WO | WO 93/16216 A1 | 8/1993 | |
| 2011/0132234 A1 | 6/2011 | Constantz et al. | WO | WO 94/18119 | 8/1994 | |
| 2011/0147227 A1 | 6/2011 | Gilliam et al. | WO | WO 96/34997 A1 | 11/1996 | |
| 2011/0203489 A1 | 8/2011 | Constantz et al. | WO | WO 99/13967 A1 | 3/1999 | |
| 2011/0226989 A9 | 9/2011 | Seeker et al. | WO | WO 01/07365 A1 | 2/2001 | |
| 2011/0240916 A1 | 10/2011 | Constantz et al. | WO | WO 01/96243 A1 | 12/2001 | |
| 2011/0247336 A9 | 10/2011 | Farsad et al. | WO | WO 02/00551 A2 | 1/2002 | |
| 2011/0277474 A1 | 11/2011 | Constantz et al. | WO | WO 02/085788 A1 | 10/2002 | |
| 2011/0277670 A1 | 11/2011 | Self et al. | WO | WO 03/008071 A1 | 1/2003 | |
| 2011/0290156 A1 | 12/2011 | Constantz et al. | WO | WO 03/054508 A2 | 7/2003 | |
| 2011/0303551 A1 | 12/2011 | Gilliam et al. | WO | WO 03/068685 A1 | 8/2003 | |
| 2011/0308964 A1 | 12/2011 | Gilliam et al. | WO | WO 2004/041731 A1 | 5/2004 | |
| 2012/0082839 A1 | 4/2012 | Ha et al. | WO | WO 2004/094043 A2 | 11/2004 | |
| 2012/0111236 A1 | 5/2012 | Constantz et al. | WO | WO 2004/098740 A2 | 11/2004 | |
| 2012/0312697 A1 | 12/2012 | Gilliam et al. | WO | WO 2005/028379 A1 | 3/2005 | |
| 2013/0036945 A1 | 2/2013 | Constantz et al. | WO | WO 2005/078836 A2 | 8/2005 | |
| | | | WO | WO 2005/086843 A2 | 9/2005 | |

FOREIGN PATENT DOCUMENTS

| | | | | | |
|---|---|---|---|---|---|
| | | | WO | WO 2005/108297 A2 | 11/2005 |
| AU | 2007201171 A1 | 10/2007 | WO | WO 2006/009600 A2 | 1/2006 |
| AU | 2007101174 A4 | 1/2008 | WO | WO 2006/032797 | 3/2006 |
| AU | 2008256636 B2 | 12/2008 | WO | WO 2006/034339 A1 | 3/2006 |
| AU | 2008101140 A4 | 1/2009 | WO | WO 2006/036396 A2 | 4/2006 |
| CA | 1303822 C | 6/1988 | WO | WO 2006/094968 A1 | 9/2006 |
| CA | 1335974 A1 | 6/1995 | WO | WO 2006/099599 A2 | 9/2006 |
| CA | 2308224 C | 4/1999 | WO | WO 2006/113997 A1 | 11/2006 |
| CA | 2255287 A1 | 6/2000 | WO | WO 2006/134080 A1 | 12/2006 |
| CA | 2353830 A1 | 6/2000 | WO | WO 2007/003013 A1 | 1/2007 |
| CA | 2440325 A1 | 1/2003 | WO | WO 2007/016271 A2 | 2/2007 |
| CA | 2646462 | 9/2007 | WO | WO 2007/022595 A1 | 3/2007 |

| | | |
|---|---|---|
| WO | WO 2007/060149 A1 | 5/2007 |
| WO | WO 2007/069902 A1 | 6/2007 |
| WO | WO 2007/071633 A1 | 6/2007 |
| WO | WO 2007/082505 A2 | 7/2007 |
| WO | WO 2007/094691 A1 | 8/2007 |
| WO | WO 2007/096671 A1 | 8/2007 |
| WO | WO 2007/106372 A2 | 9/2007 |
| WO | WO 2007/106883 A2 | 9/2007 |
| WO | WO 2007/123917 A2 | 11/2007 |
| WO | WO 2007/139392 A1 | 12/2007 |
| WO | WO 2007/140544 A1 | 12/2007 |
| WO | WO 2007/142945 A2 | 12/2007 |
| WO | WO 2008/018928 A2 | 2/2008 |
| WO | WO 2008/026201 A2 | 3/2008 |
| WO | WO 2008/031834 A1 | 3/2008 |
| WO | WO 2008/061305 A1 | 5/2008 |
| WO | WO 2008/068322 A1 | 6/2008 |
| WO | WO 2008/089523 A1 | 7/2008 |
| WO | WO 2008/095057 A2 | 8/2008 |
| WO | WO 2008/101293 A1 | 8/2008 |
| WO | WO 2008/108657 A1 | 9/2008 |
| WO | WO 2008/115662 A2 | 9/2008 |
| WO | WO 2008/124538 A1 | 10/2008 |
| WO | WO 2008/140821 A2 | 11/2008 |
| WO | WO 2008/142017 A1 | 11/2008 |
| WO | WO 2008/142025 A2 | 11/2008 |
| WO | WO 2008/148055 A1 | 12/2008 |
| WO | WO 2008/151060 A1 | 12/2008 |
| WO | WO 2009/006295 A2 | 1/2009 |
| WO | WO 2009/024826 A1 | 2/2009 |
| WO | WO 2009/032331 A2 | 3/2009 |
| WO | WO 2009/036087 A1 | 3/2009 |
| WO | WO 2009/039655 A1 | 4/2009 |
| WO | WO 2009/049085 A2 | 4/2009 |
| WO | WO 2009/065031 A1 | 5/2009 |
| WO | WO 2009/070273 A1 | 6/2009 |
| WO | WO 2009/086460 A1 | 7/2009 |
| WO | WO 2009/102816 A2 | 8/2009 |
| WO | WO 2009/102817 A2 | 8/2009 |
| WO | WO 2009/146436 A1 | 12/2009 |
| WO | WO 2009/155378 A1 | 12/2009 |
| WO | WO 2010/006242 A1 | 1/2010 |
| WO | WO 2010/008896 A1 | 1/2010 |
| WO | WO 2010/009273 A1 | 1/2010 |
| WO | WO 2010/030826 A1 | 3/2010 |
| WO | WO 2010/039903 A1 | 4/2010 |
| WO | WO 2010/039909 A1 | 4/2010 |
| WO | WO 2010/048457 A1 | 4/2010 |
| WO | WO 2010/051458 A1 | 5/2010 |
| WO | WO 2010/068924 A1 | 6/2010 |
| WO | WO 2010/074686 A1 | 7/2010 |
| WO | WO 2010/074687 A1 | 7/2010 |
| WO | WO 2010/087823 A1 | 8/2010 |
| WO | WO 2010/091029 A1 | 8/2010 |
| WO | WO 2010/093713 A1 | 8/2010 |
| WO | WO 2010/093716 A1 | 8/2010 |
| WO | WO 2010/101953 A1 | 9/2010 |
| WO | WO 2010/104989 A1 | 9/2010 |
| WO | WO 2010/132863 A1 | 9/2010 |
| WO | WO 2010/132863 A1 | 11/2010 |
| WO | WO 2010/136744 A1 | 12/2010 |
| WO | WO 2011/008223 A1 | 1/2011 |
| WO | WO 2011/017609 A1 | 2/2011 |
| WO | WO 2011/038076 A1 | 3/2011 |
| WO | WO 2011/049996 A1 | 4/2011 |
| WO | WO 2011/066293 A1 | 6/2011 |
| WO | WO 2011/075680 A1 | 6/2011 |
| WO | WO 2011/081681 A1 | 7/2011 |
| WO | WO 2011/097468 A2 | 8/2011 |
| WO | WO 2011/102868 A1 | 8/2011 |

OTHER PUBLICATIONS

U.S. Appl. No. 60/921,598, filed Apr. 3, 2007, Little et al.
Avery, G.B. et al. 2006. Carbon isotopic characterization of dissolved organic carbon in rainwater: Terrestrial and marine influences. *Science Direct*. 40(39): 7539-7545. Retrieved from the internet on May 20, 2010.
Bagotsky, V.S. 2006. Conductive Polymers: Polymers with Ionic Functions. *Fundamentals of Electrochemistry*. Second Edition. New Jersey: John Wiley & Sons. pp. 454-455.
Bauer, C.F., et al. 1981. Identification and Quantitation of Carbonate Compounds in Coal Fly Ash. *American Chemical Society*. 15(7): 783-788.
Bommaraju, T.V. et al. 2001. Brine Electrolysis. <http://electrochem.cwru.edu/encycl/art-b01-brine.htm>. Retrieved on Oct. 6, 2010. pp. 1-25.
Bradfield, D.L. 1984. Conventional Uranium Processing: The Yeelirrie Uranium Project. *Practical Hydromet '83—7th Annual Symposium on Uranium and Precious Metals*. pp. 39-47. Lakewood, CO.
Dickens, A. et al. 2004. Reburial of fossil organic carbon in marine sediments. *Nature*. 427: 336-339. Retrieved from the internet on May 20, 2010.
Eldorado Beaverlodge Operation. 1960. *Canadian Mining Journal*. 81(6): 111-138.
Eurodia. Bipolar Membrane Electrodialysis. Available online as of 2001.; visited Oct. 6, 2010 at http://www.eurodia.com/html/eb.html.
Faure, et al. 1963. The Isotopic Composition of Strontium in Oceanic and Continental Basalts: Application to the Origin of Igneous Rocks. *Journal of Petrology*. 4(1): 31-50. (abstract only). Http://petrology.oxfordjournals.org/cgi/content/abstract/4/1/31 (retrieved on Jun. 1, 2010).
Gillery et al. Bipolar membrane electrodialysis: the time has fmally come! Presented 16th Intl. Forum on Appl. Electrochem; Cleaner Tech.—Challenges and Solutions. Nov. 10-14, 2002. Amelia Island Plantation, FL. 4 pages. Retrieved form the Internet on Aug. 14, 2009. http://www.ameridia.com/html.ebc.html.
Golden, D.C., et al. 2001. A Simple Inorganic Process for Formation of Carbonates, Magnetite, and Sulfides in Martian Meteorite ALH84001. *American Mineralogist*. 86: 370-375.
Gregerson, J. 1999. Conquering Corrosion (in concrete). *Building Design & Construction*. 40(8): 50.
Hassan, A.M. et al. 1989. Corrosion Resistant Materials for Seawater RO Plants. *Desalination*. 74: 157-170.
Hein, J.R. et al. 2006. Methanogen c calc te, $^{13}$C-depleted b valve shells, and gas hydrate from a mud volcano offshore southern Cal forn a. *Geological Society of America*. 34(2): 109-112.
Horii, Y. et al. 2007. Novel evidence for natural formation of dioxins in ball clay. *Chemosphere*. 70: 1280-1289.
International Search Report dated Jan. 20, 2009 of PCT/US2007/010032.
International Search Report dated Apr. 13, 2011 of PCT/US10/57821.
International Search Report dated Mar. 21, 2011 of EP10739828.1.
International Search Report dated Mar. 25, 2011 of EP10739829.9.
International Search Report dated Mar. 25, 2011 of EP10737735.0.
International Search Report dated Mar. 4, 2011 of EP10737736.8.
International Search Report dated May 6, 2010 of EP09716193.9.
International Search Report dated Jun. 22, 2010 of EP08772151.0.
International Search Report dated Dec. 14, 2010 of EP09812408.4.
International Search Report dated Jul. 29, 2010 of EP08873036.1.
International Search Report dated Jan. 4, 2011 of EP09818485.6.
International Search Report dated Apr. 6, 2011 of EP10192919.8.
International Search Report dated May 18, 2011 of EP09812407.6.
International Search Report dated Apr. 19, 2011 of PCT/US2010/059835.
International Search Report dated Jul. 7, 2010 of PCT/US10/026880.
International Search Report dated Jul. 9, 2010 of PCT/US10/025970.
International Search Report dated May 21, 2010 of PCT/US09/064117.
International Search Report dated Sep. 13, 2010 of PCT/US10/035041.
"Isotopic Signature", Wikipedia (2010), http://en.wikipedia.org/wiki/Isotopic_signature, Apr. 14, 2009, 3 pp.
Jensen, P. et al. 1992. 'Bubbling reefs' in the Kattegat: submarine landscapes of carbonate-cemented rocks support a diverse ecosystem at methane seeps. *Marine Ecology Progress Series*. 83: 103-112.
Li, et al., "Using Electrolytic Method to Promote $CO_2$ Sequestration in Serpentine by Mineral Carbonation," Journal of China University of Mining and Technology, 36(6), pp. 817-821 (2007) (In Chinese, with English translation).

Lopez-Capel, E. et al. 2005. Application of simultaneous thermal analysis mass spectrometry and stable carbon isotope analysis in a carbon sequestration study. *Rapid Communications in Mass Spectrometry.* 19: 3192-3198.

Merritt, R.C. 1971. Carbonate Leaching. The Extractive Metallurgy of Uranium: pp. 82-97. Colorado School of Mines Research Institute. Prepared Under Contract with the United States Atomic Energy Commission.

Metz. 2005. IPCC Special Report on Carbon Dioxide Capture and Storage. *Cambridge University.* p. 324 <http://books.google.com/books?id=HWgRvPUgyvQC&dq=serpentine+olivine+close+by+ceme nt+plant&source=gbs_navlinks_s> viewed Jul. 15, 2011.

Mottana, A. et al. 1979. Der grosse Mineralienfuhrer, BLV Verlagsgesel lschaft mbH, Munchen, XP002577921, p. 194. (In German with English Translation).

Noda, H., et al. 1990. Electrochemical Reduction of Carbon Dioxide at Various Metal Electrodes in Aqueous Potassium Hydrogen Carbonate Solution. *The Chemical Society of Japan.* 63: 2459-2462.

Perkins, S. 2004. Sea Change: Carbon Dioxide Imperils Marine Ecosystems. *Science News.* 166(3): 35.

Portier et al. 2005. Modeling CO2 solubility in pure water and NaCl-type waters from 0 to 300 °C. and from 1 to 300 bar Application to the Utsira Formation at Sleipner. *Chemical Geology.* 217: 187-199.

Quay, P.D., et al. 1992. Oceanic Uptake of Fossil Fuel Co$_2$$: Carbon- 13 Evidence. *Science.* 256 (5053): 74-79.

Sample, J.C. et al. 1995. Isotope Geochemistry of Syntectonic Carbonate Cements and Veins from the Oregon Margin: Implications for the Hydrogelogic Evolution of the Accretionary Wedge. *Proceedings of the Ocean Drilling Program, Scientific Results.* 146: 137-148.

Sakata, M. 1987. Movement and Neutralization of Alkaline Leachate at Coal Ash Disposal Sites. *Environ. Sci. Technol.* 21(8): 771-777.

Schwab, E. 2004. Calciumhydroxid, XP-002577920. Retrieved from the Internet: <URL:http://www.roempp.com/prod/index1.html> (In German with English Translation).

Shaffer, R. 2008. A Devlish Green Angel. *Fast Company.* N127: 92-97.

Skrzypek, G. et al. 2006. $\delta^{13}C$ analyses of calcium carbonate: comparison between the GasBench and elemental analyzer techniques. *Rapid Communications in Mass Spectrometry.* 20: 2915-2920.

Socolow, R. 1997. Fuels Decarbonization and Carbon Sequestration: Report of a Workshop. Center for Energy and Environmental Studies School of Engineering and Applied Science. Princeton University, Princeton, NJ.

Soong, Y. et al. 2004. Experimental and simulation studies on mineral trapping of CO2 with brine. *Energy Conversion and Management.* 45: 1845-1859.

Technology for Commercialization of Slag. 1995. *New Technology Japan.* ISSN: 0385-6542. p. 35.

Various authors. 2001. "Calcium Carbonate: From the Cretaceous Period Into the 21st Century." *Birkhauser Verlag,* pp. 1-54. <http://books.google.com/books?id=pbkKGa19k5QC&Ipg=PA15&ots=gjUUiWmGIR&dq=vaterite%20limestone&pg=PA54#v=twopage&q&f=true> viewed Jul. 14, 2011.

Zhang, C.L. et al. 2001. Temperature-dependent oxygen and carbon isotope fractionations of biogenic siderite. *Geochimica et Cosmochimica Acta.* 65(14): 2257-2271.

Constantz, B. 2009. The Risk of Implementing New Regulations on Game-Changing Technology: Sequestering CO2 in the Built Environment. AGU, 90(22), Jt. Assem, Suppl., Abstract.

Aker, "Aker Clean Carbon, Carbon Capture Solutions Provider" Aker Clean Carbon Presentation for UN's IPCC; Jan. 24, 2008; 8 pp.

Alexander, G. et al., "Evaluation of reaction variables in the dissolution of serpentine for mineral carbonation"; Elsevier; ScienceDirect Fuel 86 (2007) 273-281.

Allen, L.M. 1992. Boron and Sulfur Isotopic Fractionation in the Coal Combustion System. A Thesis Submitted to the Faculty of the Department of Hydrology and Water Resources. The University of Arizona.

Back, M. et al.,"Reactivity of Alkaline Lignite Fly Ashes Towards CO in Water." Environmental Science & Technology. vol. 42, No. 12 (2008) pp. 4520-4526.

Baer, D.S., et al. 2002. Sensitive absorption measurements in the near-infrared region using off-axis integrated-cavity-output spectroscopy. Appl. Phys. B. 5 pages.

Berg et al., "A 3-Hydroxyproprionate/4-Hydroxybutyrate Autotrophic Carbon Dioxide Assimilation Pathway in Archea"; Science 14, Dec. 2007; vol. 318, No. 5857 DOI 10.1126/science 1149976; pp. 1782-1786.

Biello, D. Cement from CO2: A Concrete Cure for Global Warming? Scientific American Aug. 7, 2008., pp. 1-3 [online] [retrieved on Dec. 29, 2009] <URL: http://www.scientificamerican.com/article.cfm>.

Biennier, L., et al. 2004. Multiplex integrated cavity output spectroscopy of cold PAH cations. Chemical Physics Letters. 387: 287-294.

"Biomass Burning: A Hot Issue in Global Change." National Aeronautics and Space Administration. Langley Research Center, Hampton, Virginia Fact Sheet FS-2001-02-56-LaRC. Feb. 2001. 4 pages.

Bond, G.M., et al. 2001. CO2 Capture from Coal-Fired Utility Generation Plant Exhausts, and Sequestration by a Biomimetic Route Based on Enzymatic Catalysis—Current Status (paper presented at the First National Conference on Carbon Sequestration, May 14-17, in Washington D.C., USA; Paper Sa.5.

Bond, G.M., et al. 2002. Brines as possible cation sources for biomimetic carbon dioxide sequestration. American Geophysical Union Abstract #U22A-07.

Bottomley, D.J. et al. 1999. The origin and evolution of Canadian Shield brines: evaporation or freezing of seawater? New lithium isotope and geochemical evidence from the Slave craton. Chemical Geology. 155: 295-320.

Cannell, M.G.R. 2003. "Carbon sequestration and biomass energy offset: theoretical, potential and achievable capacities globally, in Europe and the UK." Biomass and Bioenergy. 24: 97-116.

Carbon Sequestration. National Energy Technology Laboratory, Jul. 1, 2008 (online) [retrieved on Dec. 21, 2009] <URL: http://web.archive.org/web/20080701213124/http://www.netl.doe.gov/technologies/carbon_seq/index.html>.

Cerling, T.E. 1984. The stable isotopic composition of modern soil carbonate and its relationship to climate. Earth and Planetary Science Letters. 71: 229-240.

Christensen, L.E., et al. Measurement of Sulfur Isotope Compositions by Tunable Laser Spectroscopy of SO2. Analytical Chemistry, Nov. 17, 2007, vol. 79, No. 24, pp. 9261-9268 (abstract) [online] [retrieved on Dec. 30, 2009] <URL: http://pubs.acs.org/doi/abs/10.1021/ac071040p>.

CICCS "Aims and Research"; www.nottingham.ac.uk/carbonmanagement/ccs_aims.php 2 pp. Aug. 3 (2007).

Criss, R.E. 1995. Stable Isotope Distribution: Variations from Temperature, Organic and Water-Rock Interactions. Washington University, St. Louis, Department of Earch and Planetary Sciences. American Geophysical Union. pp. 292-307.

Druckenmiller et al., "Carbon sequestration using brine of adjusted pH to form mineral carbonates"; Elsevier; www.elssevier.com/locate/fuproc; Fuel Processing Technology 86 (2005) 1599-1614.

Ehleringer, J.R., et al. 2002. Stable Isotopes. vol. 2, The Earth System: biological and ecological dimensions of global environmental change. pp. 544-550. Edited by Professor Harold A. Mooney and Dr. Josep G. Canadell in Encyclopedia of Global Environmental Change. John Wiley & Sons, Ltd. Chichester.

"Electrochemical cell", Wikipedia (2009), http:en.wikipedia.org/wiki/Electrochemical_Cell, Nov. 24, 2009, 5 pp.

Elswick, E.R., et al. 2007. Sulfur and carbon isotope geochemistry of coal and derived coal-combustion by-products: An example from an Eastern Kentucky mine and power plant. Applied Geochemistry. 22: 2065-2077.

Fallick, A.E., et al. 1991. A Stable Isotope Study of the Magnesite Deposits Associated with the Alpine-Type Ultramafic Rocks of Yugoslavia. Economic Geology. 86: 847-861.

Faverjon, F. et al. 2005. Electrochemical study of a hydrogen diffusion anode-membrane assembly for membrane electrolysis. Electrochimica Acta 51 (3): 386-394.

Faverjon, F. et al. 2006. Regeneration of hydrochloric acid and sodium hydroxide from purified sodium chloride by membrane electrolysis using a hydrogen diffusion anode-membrane assembly. Journal of Membrane Science 284 (1-2): 323-330.

Filley, T.R. et al. 1997. Application of Isotope-Ratio-Monitoring Gas Chromatography/Mass Spectrometry to Study Carbonization Reactions of FCCU Slurry Oils. Department of Geosciences, Department of Materials Science and Engineering, The Pennsylvania State University, University Park, PA. Abstracts of Papers of the American Chemical Society. 214:65—FUEL Part 1. pp. 938-941.

Fouke, B.W., et al. 2000. Depositional Facies and Aqueous-Solid Geochemistry of Travertine-Depositing Hot Springs (Angel Terrace, Mammoth Hot Springs, Yellowstone National Park, U.S.A.). Journal of Sedimentary Research. 70(3): 565-585.

Gain, E. et al. 2002 Ammonium nitrate wastewater treatment by coupled membrane electrolysis and electrodialysis. Journal of Applied Electrochemistry 32: 969-975.

Genders, D. 1995. Electrochemical Salt Splitting. http://www.electrosynthesis.com/news/mwatts.html (accessed Feb. 5, 2009).

Goldberg et al. Jun. 2009. "CO2 Mineral Sequestration Studies in US"; National Energy Technology Laboratory; goldberg@netl.doe.gov; 10 pp.

Graff "Just Catch—CO2 Capture Technology" Aker Kvaerner; Pareto Clean Energy Tech Seminar Oct. 11, 2007 25 pp.

Green Car Congress "PKU Researchers Carry Out Aqueous Fischer-Tropsch Reaction for First Time"; www.greeencarcongress.com/2007/12/pku-researchers.html; Dec. 12, 2007; 2 pp.

Green Car Congress "Researcher Proposes System for Capture of Mobile Source CO2 Emissions Directly from Atmosphere"; www.greeencarcongress.com/2007/10/researcher-prop.html#more; Oct. 8, 2007; 4 pp.

Green Car Congress "Researchers Develop New Method for Ocean Sequestration of Carbon Dioxide Through Accelerated Weathering f Volcanic Rocks"; www.greeencarcongress.com/2007/11/researchers-dev.html#more; Nov. 7, 2007; 3 pp.

Haywood et al., "Carbon dioxide sequestration as stable carbonate minerals—environmental barriers"; Environmental Geology (2001) 41:11-16; Springer-Verlag 2001.

Hill et al. Mar. 18, 2006. "Preliminary Investigation of Carbon Sequestration Potential in Brine from Pennsylvania's Oriskany Sandstone Formation in Indiana County, PA"; The Energy Institute and the Department of Energy & Geo-Environmental Engineering. College of Engineering Research Symposium, Session 3C. 16 pp.

Holdgate, G.R., et al. 2009. Eocene-Miocene carbon-isotope and floral record from brown coal seams in the Gippsland Basin of southeast Australia. Global and Planetary Change. 65: 89-103.

Holze, S. et al. 1994. Hydrogen Consuming Anodes for Energy Saving in Sodium Sulphate Electrolysis. Chem. Eng. Technol. 17: 382-389.

Horkel, K., et al. 2009. Stable isotopic composition of cryptocrystalline magnesite from deposits in Turkey and Austria. Geophysical Research Abstracts. 11. (abstract only).

Horner, G. et al. 2004. Isotope selective analysis of CO2 with tunable diode laser (TDL) spectroscopy in the NIR. The Analyst. 129: 772-778.

Huijgen, W.J.J., et al. 2003. Carbon dioxide sequestration by mineral carbonation. ECN-C-03-016; Energy Research Centre of the Netherlands: Petten; pp. 1-42.

Huijgen, W.J.J., et al. 2005. Carbon dioxide sequestration by mineral carbonation: Literature review update 2003-2004, ECN-C-05-022; Energy Research Centre of the Netherlands: Petten; pp. 1-37.

Huijgen, W.J.J., et al. 2005. Mineral CO2 Sequestration by Steel Slag Carbonation. Environ. Sci. Technol. 39: 9676-9682.

Huijgen, W.J.J., et al. 2006. Energy Consumption and Net CO2 Sequestration of Aqueous Mineral Carbonation. Ind. Eng. Chem. Res. 45: 9184-9194.

Huntzinger, D.N. et al. 2009. A life-cycle assessment of Portland cement manufacturing: comparing the traditional process with alternative technologies. Journal of Cleaner Production. 17: 668-675.

Huntzinger, D.N. Carbon Dioxide Sequestration in Cement Kiln Dust Through Mineral Carbonation. Michigan Technological University, 2006 [online], [retrieved on Dec. 29, 2009]. <URL: http://www.geo.mtu.edu/~dnhuntzi/DNHuntzingerETD.pdf>.

Huntzinger, D.N. et al.,"Carbon Dioxide Sequestration in Cement Kiln Dust through Mineral Carbonation"; Environmental Science & Technology, vol. 43, No. 6 (2009) pp. 1986-1992.

International Search Report dated Sep. 17, 2008 of PCT/US2008/068564.

International Search Report dated Feb. 19, 2009 of PCT/US08/88242.

International Search Report dated Mar. 3, 2010 of EP08867440.3.

International Search Report dated Mar. 11, 2009 of PCT/US2008/088318.

International Search Report dated Mar. 11, 2009 of PCT/2008/088246.

International Search Report dated Aug. 5, 2009 of PCT/2009/048511.

International Search Report dated Sep. 8, 2009 of PCT/US2009/045722.

International Search Report dated Sep. 17, 2009 of PCT/US2009/050756.

International Search Report dated Sep. 22, 2009 of PCT/US2009/047711.

International Search Report dated Oct. 19, 2009 of PCT/US2009/050223.

International Search Report dated Oct. 30, 2009 of PCT/US09/056573.

International Search Report dated Dec. 14, 2009 of PCT/US09/061748.

International Search Report dated Jan. 4, 2010 of PCT/US09/062795.

International Search Report dated Jan. 13, 2010 of PCT/US09/059135.

International Search Report dated Feb. 2, 2010 of PCT/US09/059141.

International Search Report dated Feb. 24, 2010 of PCT/US09/067764.

International Search Report dated Mar. 10, 2010 of PCT/US10/022935.

Justnes, H. et al. "Pozzolanic, Amorphous Silica Produced from the Mineral Olivine." Proceedings of the Seventh CANMET/ACI International Conference on Fly Ash, Silica Fume, Slag and Natural Pozzolans in Concrete, 2001. SP-199-44. pp. 769-781.

Kohlmann et al., "Carbon Dioxide Emission Control by Mineral Carbonation: The Option for Finland"; INFUB 6th European Conference on Industrial Furnaces and Boilers Estoril Lisbon Portugal, Apr. 2-5, 2002 10 pp.

Lackner, K. "Carbonate Chemistry for Sequestering Fossil Carbon"; Annual Review Energy Environ. 2002 27:193-232.

Lackner, K.S. et al. "Carbon Dioxide Disposal in Carbonate Minerals." Energy. 1995. 20(11): 1153-1170.

Levy, D. "Burnt biomass causes short-term global cooling, long-term warming." http://news-service.stanford.edu/news/2004/august4/biomass-84.html. 3 pages.

Lin, C. et al. Use of Cement Kiln Dust, Fly Ash, and Recycling Technique in Low-Volume Road Rehabilitation. Transportation Research Record, 1992, No. 1345, pp. 19-27 (abstract) [online], [retrieved on Dec. 31, 2009] <URL: http://pubsindex.trb.org/view.aspx?id=370714>.

Mazrou, S., et al. 1997. Sodium hydroxide and hydrochloric acid generation from sodium chloride and rock salt by electro-electrodialysis. Journal of Applied Electrochemistry 27: 558-567.

McCrea, J.M. 1950. On the Isotopic Chemistry of Carbonates and a Paleotemperature Scale. The Journal of Chemical Physics. 18(6): 849-857.

Melezhik, V.A., et al. 2001. Palaeoproterozoic magnesite: lithological and isotopic evidence for playa/sabkha environments. Sedimentology. 48: 379-397.

Mihalcea, R.M., et al. 1998. Diode-laser absorption measurements of CO2 near 2.0 μm at elevated temperatures. Applied Optics. 37(36): 8341-8347.

Miljevic, N., et al. 2007. Potential Use of Environmental Isotopes in Pollutant Migration Studies. Environmental Isotopes in Pollutant Studies. 58: 251-262.

Montes-Hernandez, G. et al.,"Mineral sequestration of CO2 by aqueous carbonation of coal combustion fly-ash." Journal of Hazardous Materials vol. 161 (2009). pp. 1347-1354.

Mook, W.G., et al. 1968. Isotopic Equilibrium between Shells and Their Environment. Science. 159(3817): 874-875.

Mook, W.G., et al. 1974. Carbon Isotope Fractionation Between Dissolved Bicarbonate and Gaseous Carbon Dioxide. 22:169-176.

Nayak, V.S. "Nonelectrolytic Production of Caustic Soda and Hydrochloric Acid from Sodium Chloride"; Ind. Eng. Chem. Res. 1996. 35: 3808-3811.

O'Connor et al., "Carbon Dioxide Sequestration by Direct Mineral Carbonation: Results From Recent Studies and Current Status"; Albany Research Center, Albany Oregon; Office of Fossil Energy, US Dept. of Energy; 1st Annual DOE Carbon Sequestration Conference, Washington DC, May 2001 12 pp.

O'Connor, W.K. et al. "Carbon dioxide sequestration: Aqueous mineral carbonation studies using olivine and serpentine." 2001. Albany Research Center, National Energy Technology Laboratory: Mineral Carbonation Workshop, Pittsburgh, PA.

O'Neil, J.R., et al. 1971. C13 and O18 compositions in some freshwater carbonates associated with ultramafic rocks and serpentines: western United States*. Geochimica et Cosmochimica Acta. 35: 687-697.

Park, A., et al. 2004. CO2 mineral sequestration: physically activated dissolution of serpentine and pH swing process. Chemical Engineering Science 59 (22-23): 5241-5247.

Philp, R.P. 2007. The emergence of stable isotopes in environmental and forensic geochemistry studies: a review. Environ Chem Lett. 5:57-66.

Power, I.M., et al. 2007. Biologically induced mineralization of dypingite by cyanobacteria from an alkaline wetland near Atlin, British Columbia, Canada. Geochemical Transactions. 8: 16 pages.

Rahardianto et al., "High recovery membrane desalting of low-salinity brackish water: Integration of accelerated precipitation softening with membrane RO"; Science Direct; Journal of Membrane Science 289 (2007) 123-137.

Rakib, M. et al. 1999. Behaviour of Nafion® 350 membrane in sodium sulfate electrochemical splitting: continuous process modelling and pilot scale tests. Journal of Applied Electrochemistry. 29: 1439-1448.

Rau, G. 2004. Possible use of Fe/CO2 fuel cells for CO2 mitigation plus H2 and electricity production. Energy Conversion and Management. 45: 2143-2152.

Raz et al., "Formation of High-Magnesium Calcites via an Amorphous Precursor Phase: Possible Biological Implications"; Advanced Materials; Adv. Mater. (2000) vol. 12, No. 1; 5 pp.

Rosenthal, E., "Cement Industry is at Center of Climate Change Debate" New York Times; www.nytimes.com/2007/10/26/business/worldbusiness/26cement.html"ref=todayspaper; 4 pp.

Saad, N. et al. 2009. Measurement of Isotopic CO2 in Dissolved Inorganic Carbons of Water Samples from Various Origins Using Wavelength-Scanned Cavity Ring-Down Spectrophotometer. Geophysical Research Abstracts. 11. (abstract only).

Sadhwani et al., "Case Studies on environmental impact of seawater desalination" Science Direct; http://www.sciencedirect.com/science?_ob=ArticleURL&_udi=B6TFX-4HMX97J-3&_u . . . 3 pp.

Sasakawa, M., et al. Carbonic Isotopic Characterization for the Origin of Excess Methane in Subsurface Seawater. Journal of Geophysical Research, vol. 113 (abstract) [online], Mar. 11, 2008 [retrieved on Jan. 1, 2010] <URL: http://www.agu.org/pubs/crossref/2008/2007JC004217.shtml>.

Schouten, S., et al. 2004. Stable Carbon Isotopic Fractionations Associated with Inorganic Carbon Fixation by Anaerobic Ammonium-Oxidizing Bacteria. Applied and Environmental Microbiology. 70(6): 3785-3788.

Schroll, E. 2002. Genesis of magnesite deposits in the view of isotope geochemistry. Boletim Paranaense de Geociencias. 50: 59-68.

Sheppard, S.M.F., et al. 1970. Fractionation of Carbon and Oxygen Isotopes and Magnesium between Coexisting Metamorphic Calcite and Dolomite. Contr. Mineral. and Petrol. 26. 161-198.

Serizawa et al., "Cell-compatible properties of calcium carbonates and hydroxyapatite deposited on ultrathin poly (vinyl alcohol)-coated polyethylene films"; J. Biomater. Sci. Polymer Edn., vol. 14, No. 7 (2003) pp. 653-663.

Sethi, S. et al. 2006. Existing & Emerging Concentrate Minimization & Disposal Practices for Membrane Systems. Florida Water Resources Journal. pp. 38, 40, 42, 44, 46, 48.

Shell Global Solutions, "ADIP-X and Sulfinol-X—new regenerable acid-gas removal processes"; Shell Global Solutions International; OG 130210370903-En(A); www.shellglobalsoultions.com 2 pp.

Sial, A.N., et al. 2000. Carbon isotope fluctuations in Precambrian carbonate sequences of several localities in Brazil. An. Acad. Bras. Ci. 72(4): 539-558.

Stanley, S.M., et al. 2002. Low-magnesium calcite produced by coralline algae in seawater of Late Cretaceous composition. PNAS. 99(24): 15323-15326.

Tececo Pty Ltd, "Eco-Cement"; www.tececo.com/simple.eco-cement.php; Dec. 29, 2008; 6 pp.

Turner, J.A. 1999. "A Realizable Renewable Energy Future." Science. 285 (5428): 687-689.

Uibu, M. et al. "CO2 mineral sequestration in oil-shale wastes from Estonian power production." Journal of Environmental Management vol. 90 (2009). pp. 1253-1260.

Uibu, M. et al.,"Mineral trapping of CO2 via oil shale ash aqueous carbonation: controlling mechanism of process rate and development of continuous-flow reactor system." Oil Shale. vol. 26, No. 1 (2009) pp. 40-58.

Uliasz-Bochenczyk, A. et al. "Utilization of Carbon Dioxide in Fly Ash and Water Mixtures." Chemical Engineering Research and Design. 2006. 84(A9): 843-846.

U.S. Appl. No. 12/126,776, filed May 23, 2008, Constantz, Brent R., et al, Non-Final Office Action dated Feb. 25, 2010; 21 pp.

U.S. Appl. No. 12/163,205, filed Jun. 27, 2008, Constantz, Brent R., et al, Non-Final Office Action dated Jan. 27, 2010.

U.S. Appl. No. 12/163,205, filed Jun. 27, 2008, Constantz, Brent R., et al, Non-Final Office Action dated Mar. 1, 2010.

U.S. Appl. No. 12/163,205, filed Jun. 27, 2008, Constantz, Brent R., et al, Non-Final Office Action dated Mar. 25, 2010.

U.S. Appl. No. 12/344,019, filed Dec. 24, 2008, Constantz, Brent R., et al, Non-Final Office Action dated Nov. 16, 2009.

U.S. Appl. No. 12/344,019, filed Dec. 24, 2008, Constantz, Brent R., et al, Non-Final Office Action dated Mar. 11, 2010.

U.S. Appl. No. 12/375,632, filed Mar. 5, 2009, Kirk, Donald W. et al, Non-Final Office Action dated Mar. 19, 2010.

U.S. Appl. No. 12/375,632, filed Mar. 5, 2009, Kirk, Donald W. et al, Non-Final Office Action dated Sep. 8, 2009.

U.S. Appl. No. 12/475,378, filed May 29, 2009, Constantz Brent. et al, Non-Final Office Action dated Mar. 17, 2010.

U.S. Appl. No. 12/475,378, filed May 29, 2009, Constantz Brent. et al, Non-Final Office Action dated Mar. 2, 2010.

U.S. Appl. No. 12/486,692, filed Jun. 17, 2009, Constantz Brent. et al, Non-Final Office Action dated Mar. 23, 2010.

U.S. Appl. No. 12/486,692, filed Jun. 17, 2009, Constantz Brent. et al, Non-Final Office Action dated Mar. 1, 2010.

U.S. Appl. No. 12/501,217, filed Jul. 10, 2009, Constantz Brent. et al, Non-Final Office Action dated Mar. 12, 2010.

U.S. Appl. No. 12/604,383, filed Oct. 22, 2009, Constantz Brent R. et al, Non-Final Office Action dated Apr. 5, 2010.

U.S. Appl. No. 12/609,491, filed Oct. 30, 2009, Constantz Brent. et al, Non-Final Office Action dated Mar. 31, 2010.

Vagin, S.P., et al. 1979. Measurement of the Temperature of Gas Media Containing Carbon Dioxide by the Laser-Probing Method. Plenum.

Wang, W., et al. 2005. Effects of biodegradation on the carbon isotopic composition of natural gas—A case study in the bamianhe oil field of the Jiyang Depression, Eastern China. Geochemical Journal. 39(4): 301-309. (abstract) [online] [retrieved on Dec. 29, 2009] <URL: http://www/jstage.jst.go.jp/article/geochemj/39/4/39_301/_article> ab.

Webber, M.E., et al. 2001. In situ combustion measurements of CO2 by use of a distributed-feedback diode-laser sensor near 2.0 μm. Applied Optics. 40(6): 821-828.

Wen-Zhi et al., "Using Electrolytic Method to Promote CO2 Sequestration in Serpentine by Mineral Carbonation"; Journal of China University of Mining and Technology; vol. 36, No. 6; Nov. (2007) (Publication and English Translation).

Wilson, S.A., et al. 2009. Carbon Dioxide Fixation within Mine Wastes of Ultramafic-Hosted Ore Deposits: Examples from the Clinton Creek and Cassiar Chrysotile Deposits, Canada. Society of Economic Geologists, Inc. 104: 95-112.

Winschel, R.A., et al. Stable Carbon Isotope Analysis of Coal/Petroleum Coprocessing Products. Preprints of Papers, American Chemical Society, Division of Fuel Chemistry, Jan. 1, 1988, vol. 33, No. 1, pp. 114-121 [online], [retrieved on Dec. 29, 2009] <URL: http://www.anl.gov/PCS/acsfuel/preprint%20archive/Files/33 1 TORONTO 06-88 0114.PDF>.

Wright, L.L., et al. 1993. "U.S. Carbon Offset Potential Using Biomass Energy Systems." Water, Air, and Soil Pollution. 70: 483-497.

Zedef, V., et al. 2000. Genesis of Vein Stockwork and Sedimentary Magnesite and Hydromagnesite Deposits in the Ultramafic Terranes of Southwestern Turkey: A Stable Isotope Study. 95: 429-446.

Amelingmeier, E., "ARAGONIT", Roempp, Fachgebiet: Chemie Unterthema: Mineralogie, Geochimie May 2005, Retrieved from the internet: URL: http://www.roempp.com/prod/ [retrieved on Jun. 19, 2012]—with machine English translation.

Amelingmeier, E., "Vaterit", Roempp, Fachgebiet: Chemie Unterthema: Mineralogie, Geochimie Nov. 2010, Retrieved from the internet: URL: http://www.roempp.com/prod. [retrieved on Jun. 19, 2012]—with machine English translation.

Eloneva et al., "Fixation of CO2 by carbonating calcium derived from blast furnace slag" Energy May 2008 33, pp. 1461-1467.

Groteklaes, M., "DOLOMIT", Roempp, Fachgebiet: Chemie Unterthema: Mineralogie, Geochimie Feb. 2005, Retrieved from the internet: URL: http://www.roempp.com/prod/ [retrieved on Jun. 19, 2012]—with machine English translation.

KostowskyJ et al. 2008. Silver nanowire catalysts for alkaline fuel cells. *International Journal of Hydrogen Energy*. 33:5773-5778.

* cited by examiner

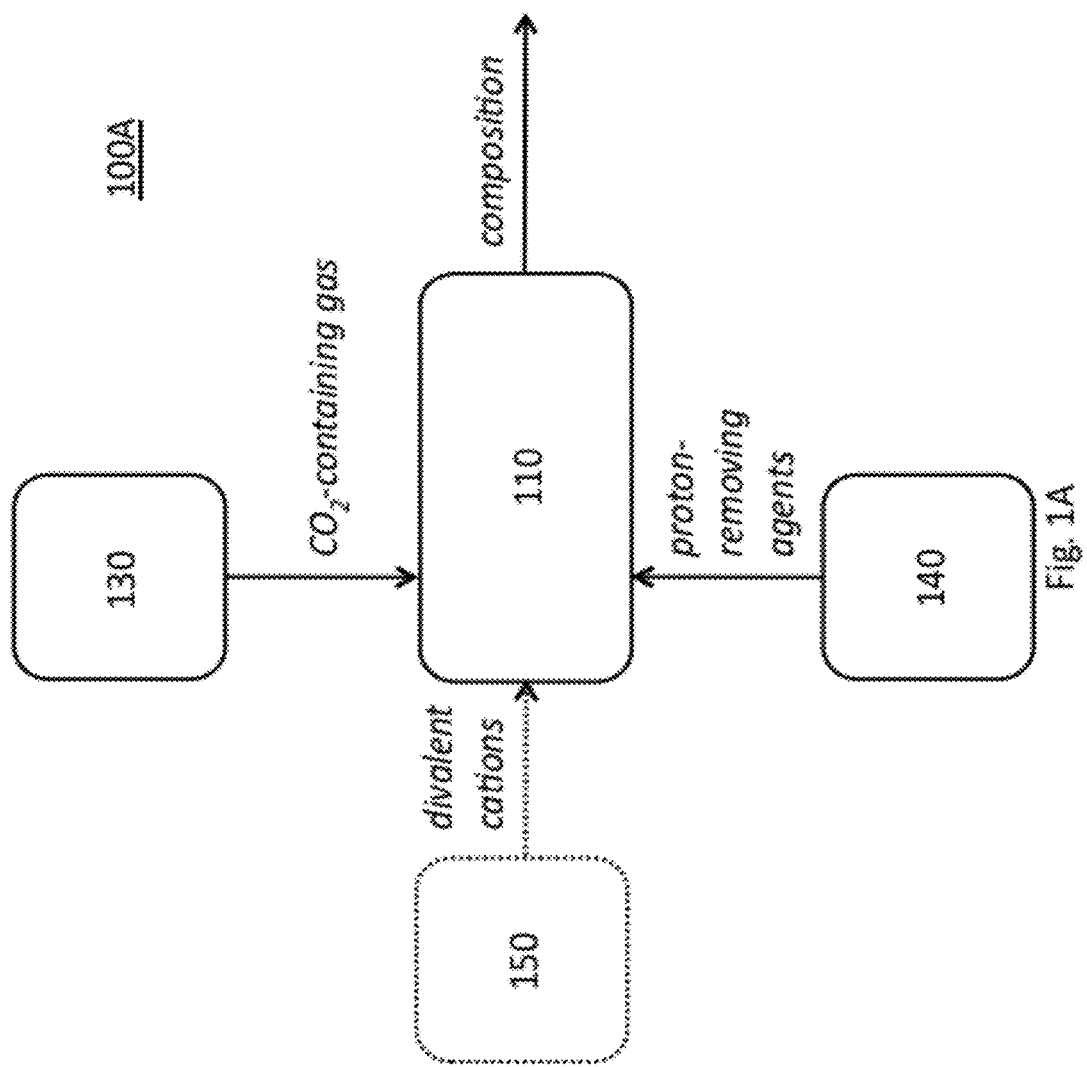

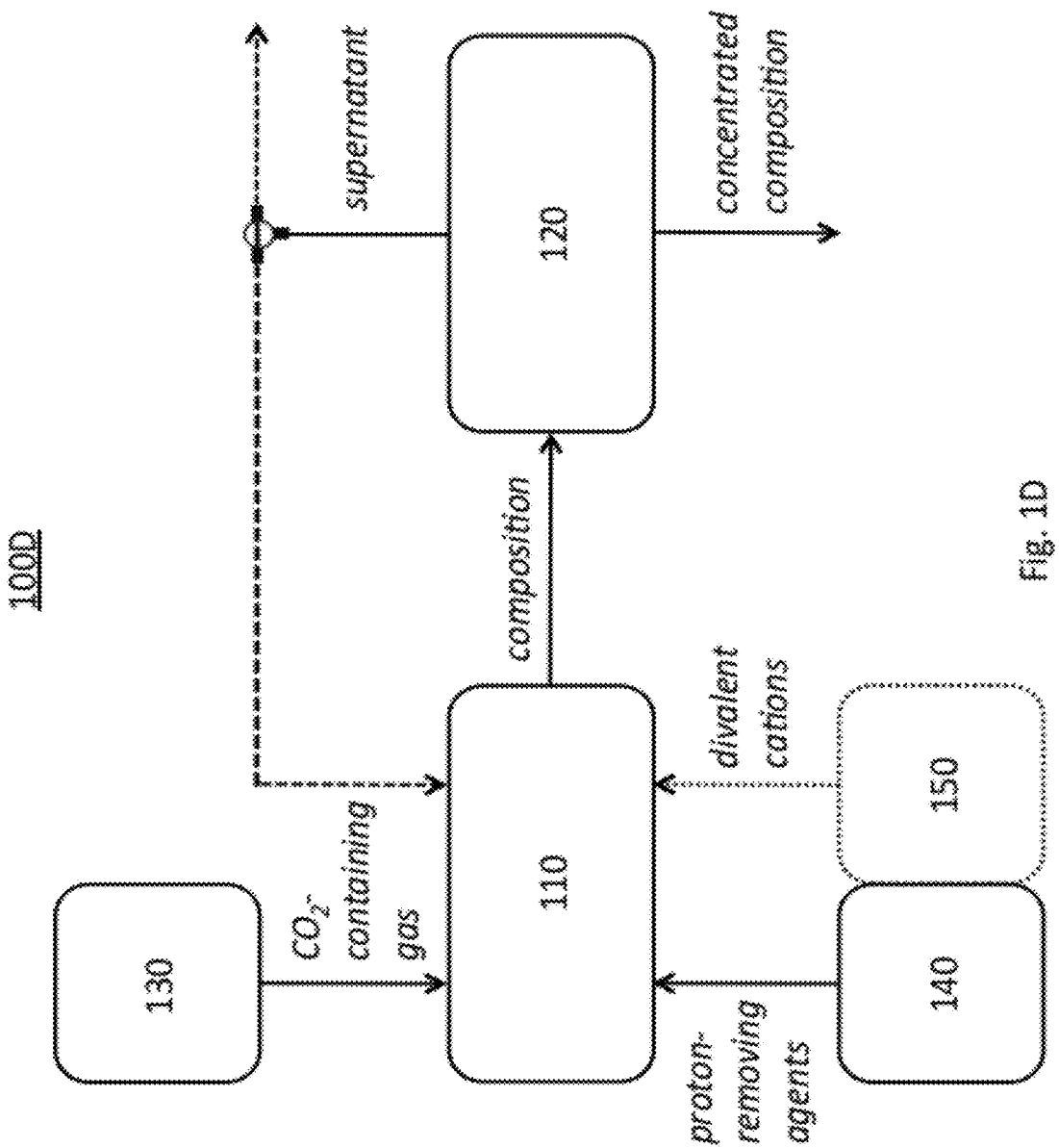

400 contacting a gaseous stream with a divalent cation-containing aqueous solution, whereby at least three of the following components are removed from the gaseous stream and contained in an insoluble stable precipitate:

carbon dioxide; carbon monoxide; nitrogen oxides (NOx); sulfur oxides (SOx); hydrogen sulfide; hydrogen chloride; hydrogen fluoride; fly ash; dusts; metals including arsenic, beryllium, boron, cadmium, chromium, chromium VI, cobalt, lead, manganese, mercury, molybdenum, selenium, strontium, thallium; hydrocarbons; radioactive materials; dioxins; and PHA.

Fig. 4

500 contacting a gaseous stream comprising carbon dioxide, nitrogen oxides, and sulfur oxides with a divalent cation-containing aqueous solution and causing precipitation of a precipitate that comprises carbon dioxide, sulfur oxide and mercury from the gaseous stream

Fig. 5

600 contacting a flue gas from an industrial source with a divalent cation-containing aqueous solution under conditions that cause the precipitation of carbon dioxide and at least two other components of the flue gas into an insoluble stable precipitate

Fig. 6

700 treating the flue gas to remove particulates then treating the flue gas to remove carbon dioxide, mercury, and sulfur oxides therefrom

Fig. 7

800 removing at least 50% of the carbon dioxide and at least 50% of the sulfur oxides from the gaseous stream by precipitating in a single step the carbon dioxide, mercury, and sulfur oxides in an insoluble composition

Fig. 8

900 treating a gas stream, wherein the gas stream comprises carbon dioxide and mercury, and wherein the process comprises removing at least 50% of the carbon dioxide and at least 50% of the mercury in a single process that comprises precipitating the carbon dioxide and mercury

Fig. 9

1000 contacting a first waste stream with a second waste stream in the presence of an aqueous divalent cation solution, whereby constituents in at least one of the waste streams are neutralized

Fig. 10

1100 contacting the waste with a gaseous stream comprising carbon dioxide and a liquid stream comprising an aqueous divalent cation solution, whereby the pH of the waste is neutralized.

Fig. 11

GAS STREAM MULTI-POLLUTANTS CONTROL SYSTEMS AND METHODS

CROSS-REFERENCE

This application is a continuation of U.S. patent application Ser. No. 12/716,235, filed 2 Mar. 2010, which application claims the benefit of U.S. Provisional Patent Application No. 61/156,809, filed 2 Mar. 2009, titled "Gas Stream Multi-Pollutants Control System and Method"; U.S. Provisional Patent Application No. 61/161,369, filed 18 Mar. 2009, titled "Neutralizing Industrial Wastes Utilizing $CO_2$ and a Divalent Cation Solution"; U.S. Provisional Patent Application No. 61/305,473, filed 17 Feb. 2010, titled "Gas Stream Multi-Pollutants Control System and Method"; and U.S. Provisional Patent Application No. 61/309,812, filed 2 Mar. 2010, titled "Gas Stream Multi-Pollutants Control Systems and Methods," each of which is incorporated herein by reference in its entirety.

BACKGROUND

Industrial waste gas streams from coal-fired power plants, cement plants, ore processing operations, and the like are a major source of atmospheric pollution. Of particular concern are components resulting from combustion of fossil fuels, which components include carbon dioxide; carbon monoxide; nitrogen oxides (NOx); sulfur oxides (SOx); sulfides; halides such as hydrogen chloride and hydrogen fluoride; particulate matter such as fly ash; metals including, but not limited to, arsenic, beryllium, boron, cadmium, chromium, cobalt, lead, manganese, mercury, molybdenum, selenium, strontium, thallium, and vanadium; organics such as hydrocarbons, dioxins, and polynuclear aromatic hydrocarbons (PAH); and radioactive materials.

Conventionally, components in such industrial waste gas streams are removed in a series of steps wherein each component is removed in a separate step, often in a separate unit. For example, to remove particulate matter such as fly ash, a dust collector such as an electrostatic precipitator (ESP) or fabric filter is used. To scrub gases such as NOx, a selective catalytic reduction (SCR) system is used. To scrub a gas such as SOx, a flue gas desulfurization (FGD) system is used. And to scrub $CO_2$ from a waste gas stream, amine gas treating (e.g., gas sweetening using monoethanolamine (MEA), diethanolamine (DEA), or methyldiethanolamine (MDEA)) may be used. As such, the conventional multi-step, multi-unit approach to removing components from industrial waste gas streams requires multiple, sometimes costly, technologies and results in multiple product streams, each of which requires specialized handling.

Thus, conventional removal of components of industrial waste gas streams and handling materials derived therefrom is complex and may be expensive.

SUMMARY

In some embodiments, the invention provides a method of treating an industrial waste gas, wherein the gas comprises carbon dioxide and at least one other component selected from the group consisting of SOx; NOx; a metal; a non-carbon dioxide acid gas; an organic; and particulate matter, comprising contacting the gas with a liquid under conditions adapted to cause at least some of the carbon dioxide and the other component or components to exit the gas and enter the liquid, wherein the method is carried out in a single processor. In some embodiments, the gas is not pre-treated prior to entering the processor to remove some or all of the carbon dioxide or any of the other components. In some embodiments, the gas is pre-treated prior to entering the processor to remove particulate matter. In some embodiments, the gas comprises at least two other components, and wherein the two other components exit the gas and enter the liquid. In some embodiments, the two other components are SOx and a metal. In some embodiments, the metal comprises a heavy metal. In some embodiments, the metal is selected from the group consisting of antimony, arsenic, barium, beryllium, boron, cadmium, chromium, cobalt, copper, lead, manganese, mercury, molybdenum, nickel, radium, selenium, silver, strontium, thallium, vanadium, and zinc. In some embodiments, the metal is mercury. In some embodiments, the two other components are SOx and a non-carbon dioxide acid gas. In some embodiments, the two other components are a metal and a non-carbon dioxide acid gas. In some embodiments, the two other components are SOx and particulate matter. In some embodiments, the gas is not pre-treated prior to entering the processor to remove some or all of the carbon dioxide or any of the other components. In some embodiments, the liquid comprises an aqueous solution. In some embodiments, the aqueous solution comprises divalent cations. In some embodiments, the method further comprises processing the aqueous solution to produce a composition comprising carbonates, bicarbonates, or a combination thereof, and the other component or a derivative thereof, or the other components and/or derivatives thereof, wherein the carbonates, bicarbonates, or the combination thereof, is at least partially derived from the carbon dioxide. In some embodiments, the composition comprises a slurry comprising a solid and a supernatant. In some embodiments, the solid comprises carbonates, bicarbonates, or a combination thereof. In some embodiments, the solid further comprises the other component or a derivative thereof, or the other components and/or derivatives thereof. In some embodiments, the method further comprised separating the solid from the supernatant. In some embodiments, the solid, when subjected to a leaching process consisting essentially of preparing 2×1 L of an extraction fluid consisting essentially of an aqueous solution of acetic acid, wherein each 1 L of the extraction fluid consists essentially of 5.7 mL acetic acid in deionized water; grinding the solid such that particles of ground solid are less than 1 cm in the narrowest dimension if the particles are not already less than 1 cm in the narrowest dimension; placing 100 g of the ground solid into an extraction vessel with 2 L of the extraction fluid to produce an extraction composition; rotating the extraction vessel in an end-over-end fashion for 18±2 hours at room temperature; filtering the extraction composition through borosilicate glass fiber with a pore size of 0.6 µm to 0.8 µm to produce a leachate; and adjusting pH of the leachate with 1N nitric acid to a pH of pH 2 or less than pH 2, produces a leachate comprising less than 0.2 mg/L of mercury. In some embodiments, the leaching process produces a leachate comprising less than 5.0 mg/L arsenic. In some embodiments, the leaching process produces a leachate comprising less than 100 mg/L barium. In some embodiments, the leaching process produces a leachate comprising less then 1.0 mg/L cadmium. In some embodiments, the leaching process produces a leachate comprising less than 5.0 mg/L chromium. In some embodiments, the leaching process produces a leachate comprising less than 5.0 mg/L lead. In some embodiments, the leaching process produces a leachate comprising less than 1.0 mg/L selenium. In some embodiments, the leaching process produces a leachate comprising less than 5.0 mg/L silver. In some embodiments, the solid, when subjected to a carbon dioxide release protocol consisting essentially of grinding the solid such that particles of ground solid are less than 1 cm in the narrowest dimension if the particles are not already less than 1 cm in the narrowest dimension and immersing the solid in a solution having a pH between pH 4.8 and pH 5.2 and a temperature between 60 and 80° C. for 48 hours, produces no more than 5 grams carbon dioxide per 100 grams solid. In some embodiments, the solid, when subjected to a carbon dioxide release protocol consisting essentially of grinding the solid such that particles of ground solid are less than 1 cm in the narrowest dimension if the particles are not already less than 1 cm in the narrowest dimension and immersing the solid in a solution having a pH between pH 4.8 and pH 5.2 and a temperature between 60 and 80° C. for 48 hours, produces no more than 5 grams carbon dioxide per 100 grams solid. In some embodiments, the contacting is carried out under conditions adapted to cause at least 50% of the carbon dioxide and at least 50% of the other component or components to exit the gas and enter the liquid.

In some embodiments, the invention provides a method comprising (i) contacting a gas stream with an aqueous solution, wherein the gas stream comprises carbon dioxide and at least one other component selected from the group consisting of SOx; NOx; a metal; a non-carbon dioxide acid gas; an organic; and particulate matter, under conditions adapted to cause at least some of the carbon dioxide and the other component or components to exit the gas stream and enter the aqueous solution; and (ii) processing the aqueous solution to produce a composition comprising carbonates, bicarbonates, or a combination of carbonates and bicarbonates, and the other component or a derivative thereof, or the other components and/or derivatives thereof, wherein the carbonates, bicarbonates, or the combination of carbonates and bicarbonates, is at least partially derived from the carbon dioxide. In some embodiments, the other component is selected from the group consisting of SOx, a metal, a non-carbon dioxide acid gas, and an organic. In some embodiments, the other component is selected from the group consisting of SOx and a metal. In some embodiments, the gas stream comprises at least two other components and the processing produces a composition comprising carbonates, bicarbonates, or a combination of carbonates and bicarbonates, and the two other components and/or derivatives thereof. In some embodiments, the two other components are SOx and a metal. In some embodiments, the metal comprises a heavy metal. In some embodiments, the metal is selected from the group consisting of antimony, arsenic, barium, beryllium, boron, cadmium, chromium, cobalt, copper, lead, manganese, mercury, molybdenum, nickel, radium, selenium, silver, strontium, thallium, vanadium, and zinc. In some embodiments, the metal comprises mercury or mercury derivative. In some embodiments, the gas stream comprises at least three other components and the processing produces a composition comprising carbonates, bicarbonates, or a combination of carbonates and bicarbonates, and the three other components and/or derivatives thereof. In some embodiments, the three other components are SOx, a metal, and a non-carbon dioxide acid gas. In some embodiments, the metal comprises mercury or mercury derivative. In some embodiments, the non-carbon dioxide acid gas is selected from the group consisting of hydrogen chloride, hydrogen fluoride, and $SO_3$. In some embodiments, the three other components are SOx, a metal, and an organic. In some embodiments, the metal comprises mercury or mercury derivative. In some embodiments, the composition comprises a solution. In some embodiments, the composition comprises a slurry comprising a solution and a solid. In some embodiments, the method further comprises separating the solid from the solution. In some embodiments, the solid, when subjected to a leaching process consisting essentially of preparing 2×1 L of an extraction fluid consisting essentially of an aqueous solution of acetic acid, wherein each 1 L of the extraction fluid consists essentially of 5.7 mL acetic acid in deionized water; grinding the solid such that particles of ground solid are less than 1 cm in the narrowest dimension if the particles are not already less than 1 cm in the narrowest dimension; placing 100 g of the ground solid into an extraction vessel with 2 L of the extraction fluid to produce an extraction composition; rotating the extraction vessel in an end-over-end fashion for 18±2 hours at room temperature; filtering the extraction composition through borosilicate glass fiber with a pore size of 0.6 μm to 0.8 μm to produce a leachate; and adjusting pH of the leachate with 1N nitric acid to a pH of pH 2 or less than pH 2, produces a leachate comprising less than 0.2 mg/L of mercury. In some embodiments, the solid, when subjected to a carbon dioxide release protocol consisting essentially of grinding the solid such that particles of ground solid are less than 1 cm in the narrowest dimension if the particles are not already less than 1 cm in the narrowest dimension and immersing the solid in a solution having a pH between pH 4.8 and pH 5.2 and a temperature between 60 and 80° C. for 48 hours, produces no more than 5 grams carbon dioxide per 100 grams solid. In some embodiments, the gas stream comprises gas produced in an industrial process. In some embodiments, the gas stream is a waste gas stream. In some embodiments, the waste gas stream is produced at a power plant, a chemical processing plant, a mechanical processing plant, a refinery, a cement plant, or a steel plant. In some embodiments, the gas stream is not processed to remove carbon dioxide or the other component or components prior to entering the aqueous solution. In some embodiments, the gas stream comprises a metal or metal derivative and wherein the gas stream is processed to convert the metal or metal derivative to a form that is more easily taken up by the aqueous solution. In some embodiments, the non-carbon dioxide acid gas comprises a gas selected from the group consisting of hydrogen chloride, hydrogen fluoride, and $SO_3$. In some embodiments, at least 50% of the carbon dioxide and at least 50% of the other component exit the gas and enter the liquid. In some embodiments, at least 50% of the carbon dioxide and at least 80% of the other component exit the gas and enter the liquid. In some embodiments, at least 70% of the carbon dioxide and at least 70% of the other component exit the gas and enter the liquid. In some embodiments, the contacting and processing are carried out sequentially. In some embodiments, the contacting and processing are carried out simultaneously. In some embodiments, the contacting and processing are carried out in the same unit.

In some embodiments, the invention provides a composition produced by any of the foregoing methods.

In some embodiments, the invention provides a composition comprising carbonates, bicarbonates, or a combination thereof, and a sulfur-containing compound, wherein the carbonates, bicarbonates, or combination thereof have a relative carbon isotope composition ($\delta^{13}C$) value less than −5.00‰, and wherein the composition, when subjected to a leaching process consisting essentially of preparing 2×1 L of an extraction fluid consisting essentially of an aqueous solution of acetic acid, wherein each 1 L of the extraction fluid consists essentially of 5.7 mL acetic acid in deionized water; grinding the solid such that particles of ground solid are less than 1 cm in the narrowest dimension if the particles are not already less than 1 cm in the narrowest dimension; placing 100 g of the ground solid into an extraction vessel with 2 L of the extraction fluid to produce an extraction composition; rotating the extraction vessel in an end-over-end fashion for 18±2 hours at room temperature; filtering the extraction composition through borosilicate glass fiber with a pore size of 0.6 µm to 0.8 µm to produce a leachate; and adjusting pH of the leachate with 1N nitric acid to a pH of pH 2 or less than pH 2, produces a leachate comprising less than 2.0 mg/L of mercury. In some embodiments, the leachate comprises less than 1.5 mg/L of mercury. In some embodiments, the leachate comprises less than 1.0 mg/L of mercury. In some embodiments, the leachate comprises less than 0.5 mg/L of mercury. In some embodiments, the leachate comprises less than 0.2 mg/L of mercury. In some embodiments, the leachate comprises less than 0.05 mg/L of mercury. In some embodiments, the composition comprises mercury, a mercury derivative, or a combination thereof. In some embodiments, the relative carbon isotope composition value is less than 10.00‰. In some embodiments, the composition relative carbon isotope composition ($\delta^{13}C$) value less than −15.00‰. In some embodiments, the composition relative carbon isotope composition ($\delta^{13}C$) value less than −20.00‰. In some embodiments, the composition comprises at least 90% carbonates. In some embodiments, the composition comprises a calcium:magnesium ratio of 5:1. In some embodiments, the solid, when subjected to a carbon dioxide release protocol consisting essentially of grinding the solid such that particles of ground solid are less than 1 cm in the narrowest dimension if the particles are not already less than 1 cm in the narrowest dimension and immersing the solid in a solution having a pH between pH 4.8 and pH 5.2 and a temperature between 60 and 80° C. for 48 hours, produces no more than 5 grams carbon dioxide per 100 grams solid.

In some embodiments, the invention provides a composition comprising carbonates, bicarbonates, or a combination thereof, and mercury, a mercury derivative, or a combination thereof, wherein the carbonates, bicarbonates, or the combination thereof have a relative carbon isotope composition ($\delta^{13}C$) value less than −5.00‰, and wherein the composition, when subjected a leaching process consisting essentially of preparing 2×1 L of an extraction fluid consisting essentially of an aqueous solution of acetic acid, wherein each 1 L of the extraction fluid consists essentially of 5.7 mL acetic acid in deionized water; grinding the solid such that particles of ground solid are less than 1 cm in the narrowest dimension if the particles are not already less than 1 cm in the narrowest dimension; placing 100 g of the ground solid into an extraction vessel with 2 L of the extraction fluid to produce an extraction composition; rotating the extraction vessel in an end-over-end fashion for 18±2 hours at room temperature; filtering the extraction composition through borosilicate glass fiber with a pore size of 0.6 µm to 0.8 µm to produce a leachate; and adjusting pH of the leachate with 1N nitric acid to a pH of pH 2 or less than pH 2, produces a leachate comprising less than 2.0 mg/L of mercury. In some embodiments, the leachate comprises less than 1.5 mg/L of mercury. In some embodiments, the leachate comprises less than 1.0 mg/L of mercury. In some embodiments, the leachate comprises less than 0.5 mg/L of mercury. In some embodiments, the leachate comprises less than 0.2 mg/L of mercury. In some embodiments, the leachate comprises less than 0.05 mg/L of mercury. In some embodiments, the composition, when subjected to a carbon dioxide release protocol consisting essentially of grinding the composition such that particles of ground composition are less than 1 cm in the narrowest dimension if the particles are not already less than 1 cm in the narrowest dimension and immersing the ground composition in a solution having a pH between pH 4.8 and pH 5.2 and a temperature between 60 and 80° C. for 48 hours, produces no more than 5 grams carbon dioxide per 100 grams composition.

In some embodiments, the invention provides a composition comprising carbonates, bicarbonates, or a combination thereof, mercury, a mercury derivative, or a combination thereof, and sulfur-containing compound, wherein the composition, (i) when subjected to a leaching process consisting essentially of preparing 2×1 L of an extraction fluid consisting essentially of an aqueous solution of acetic acid, wherein each 1 L of the extraction fluid consists essentially of 5.7 mL acetic acid in deionized water; grinding the solid such that particles of ground solid are less than 1 cm in the narrowest dimension if the particles are not already less than 1 cm in the narrowest dimension; placing 100 g of the ground solid into an extraction vessel with 2 L of the extraction fluid to produce an extraction composition; rotating the extraction vessel in an end-over-end fashion for 18±2 hours at room temperature; filtering the extraction composition through borosilicate glass fiber with a pore size of 0.6 µm to 0.8 µm to produce a leachate; and adjusting pH of the leachate with 1N nitric acid to a pH of pH 2 or less than pH 2, produces a leachate comprising less than 0.2 mg/L of mercury; and (ii) when subjected to a carbon dioxide release protocol consisting essentially of grinding the composition such that particles of ground composition are less than 1 cm in the narrowest dimension if the particles are not already less than 1 cm in the narrowest dimension and immersing the ground composition in a solution having a pH between pH 4.8 and pH 5.2 and a temperature between 60 and 80° C. for 48 hours, produces no more than 5 grams carbon dioxide per 100 grams composition.

In some embodiments, the invention provides a system comprising (i) a source of an industrial waste gas operably connected to (ii) a processor configured to (a) process the gas to at least partially remove carbon dioxide from the gas and also to at least partially remove at least one other component from the gas, wherein the other component is selected from the group consisting of SOx, NOx, a metal, particulate matter, a non-carbon dioxide acid gas, and an organic and (b) produce a composition comprising a product comprising at least a portion of the carbon dioxide, or one or more derivatives thereof, in combination with at least a portion of the other component or one or more derivatives thereof, wherein the composition is suitable for placement in the environment. In some embodiments, the composition comprises carbonates, bicarbonates, or a combination thereof. In some embodiments, the other component is SOx or a metal selected from the group consisting of antimony, arsenic, barium, beryllium, boron, cadmium, chromium, cobalt, copper, lead, manganese, mercury, molybdenum, nickel, radium, selenium, silver, strontium, thallium, thorium, uranium vanadium, and zinc; particulate matter; or a combination thereof. In some embodiments, the composition is suitable for placement in the environment in compliance with Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, Multiple Extraction Procedure, or a combination thereof. In some embodiments, the composition is suitable for placement in the environment in compliance with Toxicity Characteristic Leaching Procedure. In some embodiments, the system further comprises a composition conveyor for disposal of at least a portion of the composition. In some embodiments, the composition conveyor is configured to dispose of at least a portion of the composition underground. In some embodiments, the processor comprises a gas-liquid contactor, a gas-liquid-solid contactor, a reactor, a settling tank, or a combination thereof. In some embodiments, the processor is further configured to produce a processed waste gas stream. In some embodiments, the processed waste gas stream is suitable for placement in the environment in compliance with Reasonably Available Control Technology; Best Available Control Technology; Maximum Achievable Control Technology; Lowest Achievable Emission Rate, or a combination thereof. In some embodiments, the system further comprises a treatment system. In some embodiments, the treatment system comprises a liquid-solid separator for concentrating at least a portion of the composition and producing a concentrated composition and a supernatant. In some embodiments, the supernatant is suitable for placement in the environment. In some embodiments, the treatment system is configured to recirculate at least a portion of the supernatant back to the processor. In some embodiments, the concentrated composition is suitable for placement in the environment in compliance with Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, Multiple Extraction Procedure, or a combination thereof. In some embodiments, the system further comprises a manufacturing system for manufacturing a building material from at least a portion of the concentrated composition. In some embodiments, the manufacturing system is configured for manufacturing cement, supplementary cementitious material, fine aggregate, mortar, coarse aggregate, concrete, pozzolan, or a combination thereof from the concentrated composition. In some embodiments, the system further comprises a concentrated composition conveyor for disposal of at least a portion of the concentrated composition. In some embodiments, the concentrated composition conveyor is configured to dispose of the concentrated composition underground. In some embodiments, the system further comprises an electrochemical system for producing hydroxide for processing the gas in the processor. In some embodiments, the electrochemical system comprises an anode and a cathode. In some embodiments, the hydroxide is produced at the cathode. In some embodiments, chlorine is not formed at the anode. In some embodiments, oxygen is not formed at the anode. In some embodiments, the processor is operably connected to an industrial plant comprising a power plant, a chemical processing plant, a mechanical processing plant, a refinery, a cement plant, or a steel plant. In some embodiments, a gas conveyor operably connects the processor to the industrial plant. In some embodiments, the system is configured to be powered down during a period of high demand on the industrial plant. In some embodiments, the system, the industrial plant, or a combination of the system and the industrial plant remain in compliance with Reasonably Available Control Technology; Best Available Control Technology; Maximum Achievable Control Technology; Lowest Achievable Emission Rate, or a combination thereof.

In some embodiments, the invention provides a system comprising (i) a source of an industrial waste gas comprising carbon dioxide and one or more other components selected from the group consisting of SOx, NOx, a metal, non-carbon dioxide acid gas, an organic, and particulate matter; (ii) a processor configured to remove at least a portion of the carbon dioxide and the other component or components from the gas in a single processing unit; and (iii) a conduit operably connecting the source of industrial waste gas and the processor, wherein the conduit is configured to direct at least a portion of the industrial waste gas to the processor. In some embodiments, the system does not comprise a pre-processor between the source of the industrial waste gas and the processor wherein the pre-processor is configured to remove one or more of the other components of the gas before the gas is passed to the processor. In some embodiments, the gas comprises at least two of the other components and wherein the processor is configured to remove at least a portion of the carbon dioxide and the other components from the gas in a single processing unit.

In some embodiments the invention provides, a method comprising a) processing an industrial waste gas stream with an aqueous solution; b) removing carbon dioxide from the industrial waste gas stream and at least one other component selected from the group consisting of SOx; NOx; carbon monoxide; a metal; particulate matter; a halide; and an organic; and c) producing a carbonate- and/or bicarbonate-containing composition comprising the at least one other component or a product thereof, wherein the composition sequesters carbon dioxide and the at least one other component, and wherein the composition is suitable for placement in the environment. In some embodiments, the composition sequesters carbon dioxide and at least two other components. In some embodiments, the composition sequesters carbon dioxide and at least three other components. In some embodiments, at least 50% of the carbon dioxide is removed from the industrial waste stream. In some embodiments, at least 75% of at least one other component is removed from the industrial waste stream. In some embodiments, the metal comprises antimony, arsenic, barium, beryllium, boron, cadmium, chromium, cobalt, copper, lead, manganese, mercury, molybdenum, nickel, radium, selenium, silver, strontium, thallium, thorium, uranium vanadium, zinc, or a combination thereof. In some embodiments, particulate matter comprises fly ash, dust from calcining, or a combination thereof. In some embodiments, the halide comprises hydrogen chloride, hydrogen fluoride, or a combination thereof. In some embodiments, processing the industrial waste gas stream produces a processed waste gas stream that is suitable for placement in the environment in compliance with Reasonably Available Control Technology; Best Available Control Technology; Lowest Achievable Emission Rate, or a combination thereof. In some embodiments, the method further comprises disposing at least a portion of the composition above ground, underground, or underwater. In some embodiments, the method further comprises removing water from the composition to produce a supernatant and a concentrated composition. In some embodiments, the supernatant is suitable for placement in the environment. In some embodiments, the method further comprises re-circulating the supernatant to the aqueous solution. In some embodiments, the concentrated composition is concentrated with respect to carbonates, bicarbonates, the at least one other component, products of the at least one other component, or a combination thereof. In some embodiments, the concentrated composition comprises precipitation material. In some embodiments, the concentrated composition comprises greater than 25% precipitation material. In some embodiments, the concentrated composition comprises greater than 50% precipitation material. In some embodiments, the concentrated composition comprises greater than 75% precipitation material. In some embodiments, the precipitation material comprise salts of divalent cations. In some embodiments, the divalent cations comprise calcium, magnesium, or a combination thereof. In some embodiments, the divalent cations further comprise strontium. In some embodiments, the concentrated composition is suitable for placement in the environment in compliance with Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, Multiple Extraction Procedure, or a combination thereof. In some embodiments, the method further comprises disposing at least a portion of the concentrated composition above ground, underground, or underwater. In some embodiments, the method further comprises using the concentrated composition in cement, fine aggregate, mortar, coarse aggregate, concrete, pozzolan, or a combination thereof. In some embodiments, the method further comprises pre-treating the industrial waste gas stream to remove at least a portion of the particulate matter prior to processing the industrial waste gas stream with the aqueous solution. In some embodiments, the method further comprises fortifying cement, fine aggregate, mortar, coarse aggregate, concrete, pozzolan with the removed particulate matter. In some embodiments, the method further comprises pre-treating the industrial waste gas stream with an oxidant to oxidize at least one component of the industrial waste gas stream prior to processing the industrial waste gas stream with the aqueous solution. In some embodiments, the oxidant is hydrogen peroxide or chlorine. In some embodiments, the at least one component is NO, Hg, or a combination thereof. In some embodiments, the method further comprises producing a proton-removing agent in an electrochemical system, wherein the proton-removing agent is added to the aqueous solution for processing the industrial waste gas stream. In some embodiments, the proton-removing agent is hydroxide. In some embodiments, the hydroxide is formed at a cathode of the electrochemical system. In some embodiments, chlorine is not formed at an anode of the electrochemical system. In some embodiments, oxygen is not formed at an anode of the electrochemical system. In some embodiments, the method further comprises halting the processing of the industrial waste gas stream due to high demand on an industrial plant providing the industrial waste gas stream. In some embodiments, the industrial waste gas stream remains in compliance with Reasonably Available Control Technology; Best Available Control Technology; Lowest Achievable Emission Rate, or a combination thereof.

In some embodiments, the invention provides a composition produced by any of the above methods.

In some embodiments, the invention provides a composition comprising carbonates in combination with sulfates, wherein the carbonates have a relative carbon isotope composition ($\delta^{13}C$) value less than −5.00‰, and wherein the composition is suitable for placement in the environment in compliance with Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, Multiple Extraction Procedure, or a combination thereof. In some embodiments, the carbonates have a relative carbon isotope composition ($\delta^{13}C$) value less than −10.00‰. In some embodiments, the composition comprises 70-99.9% carbonates and 0.1-30% comprises sulfates. In some embodiments, the composition further comprises calcium, magnesium, or a combination thereof. In some embodiments, the composition further comprises bicarbonates, sulfites, nitrates, nitrites, silicates, aluminosilicates, chlorides, fluorides, oxides, particulate matter, or a combination thereof. In some embodiments, the composition further comprises antimony, arsenic, barium, beryllium, boron, cadmium, chromium, cobalt, copper, lead, manganese, mercury, molybdenum, nickel, radium, selenium, silver, strontium, thallium, thorium, uranium vanadium, zinc, or a combination thereof. In some embodiments, the composition comprises 0.1-10,000 ppb mercury. In some embodiments, the composition comprises cement, fine aggregate, mortar, coarse aggregate, concrete, pozzolan, or a combination thereof.

In some embodiments, the invention provides a system comprising a processor configured for processing carbon dioxide from an industrial waste gas stream and at least one other component from the waste gas stream selected from the group consisting of SOx, NOx, carbon monoxide, a metal, particulate matter, a halide, and an organic and producing a composition comprising a product resulting from processing carbon dioxide in combination with the at least one other component or a product thereof, wherein the composition is suitable for placement in the environment. In some embodiments, the composition resulting from processing carbon dioxide comprises carbonates, bicarbonates, or carbonates and bicarbonates. In some embodiments, the at least one other component is SOx; a metal selected from the group consisting of antimony, arsenic, barium, beryllium, boron, cadmium, chromium, cobalt, copper, lead, manganese, mercury, molybdenum, nickel, radium, selenium, silver, strontium, thallium, thorium, uranium vanadium, and zinc; particulate matter; or a combination thereof. In some embodiments, the composition is suitable for placement in the environment in compliance with Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, Multiple Extraction Procedure, or a combination thereof. In some embodiments, the system further comprises a composition conveyor for disposal of at least a portion of the composition. In some embodiments, the composition conveyor is configured to dispose of at least a portion of the composition underground. In some embodiments, the processor comprises a gas-liquid contactor, a gas-liquid-solid contactor, a reactor, a settling tank, of a combination thereof. In some embodiments, the processor is further configured to produce a processed waste gas stream. In some embodiments, the processed waste gas stream is suitable for placement in the environment in compliance with Reasonably Available Control Technology; Best Available Control Technology; Lowest Achievable Emission Rate, or a combination thereof. In some embodiments, the system further comprises a treatment system. In some embodiments, the treatment system comprises a liquid-solid separator for concentrating at least a portion of the composition and producing a concentrated composition and a supernatant. In some embodiments, the supernatant is suitable for placement in the environment. In some embodiments, the treatment system is configured to recirculate at least a portion of the supernatant back to the processor. In some embodiments, the concentrated composition is suitable for placement in the environment in compliance with Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, Multiple Extraction Procedure, or a combination thereof. In some embodiments, the system further comprises a manufacturing system for manufacturing a building material from at least a portion of the concentrated composition. In some embodiments, the manufacturing system is configured for manufacturing cement, fine aggregate, mortar, coarse aggregate, concrete, pozzolan, or a combination thereof from the concentrated composition. In some embodiments, the system further comprises a concentrated composition conveyor for disposal of at least a portion of the concentrated composition. In some embodiments, the concentrated composition conveyor is configured to dispose of the concentrated composition underground. In some embodiments, the system further comprises an electrochemical system for producing hydroxide for processing the industrial waste gas stream in the processor. In some embodiments, the electrochemical system comprises an anode and a cathode. In some embodiments, the hydroxide is produced at the cathode. In some embodiments, chlorine is not formed at the anode. In some embodiments, oxygen is not formed at the anode. In some embodiments, the processor is operably connected to an industrial plant comprising a power plant, a chemical processing plant, a mechanical processing plant, a refinery, a cement plant, a steel plant, or any other industrial plant that produces $CO_2$ as a by-product of fuel combustion or some other processing step. In some embodiments, a gas conveyor operably connects the processor to the industrial plant. In some embodiments, the system is configured to be powered down during a period of high demand on the industrial plant. In some embodiments, the system, the industrial plant, or a combination of the system and the industrial plant remain in compliance with Reasonably Available Control Technology; Best Available Control Technology; Lowest Achievable Emission Rate, or a combination thereof.

In some embodiments, the invention provides a method comprising contacting a waste gas stream with a metal ion-containing aqueous solution, whereby at least three of the following components are removed from the waste gas stream and contained in an insoluble stable precipitation material: carbon dioxide; carbon monoxide; nitrogen oxides (NOx); sulfur oxides (SOx); hydrogen sulfide; hydrogen chloride; hydrogen fluoride; fly ash; dusts; metals including arsenic, beryllium, boron, cadmium, chromium, chromium VI, cobalt, lead, manganese, mercury, molybdenum, selenium, strontium, thallium; hydrocarbons; radioactive materials; dioxins; and PHA. In some embodiments, the invention provides a method comprising contacting an industrial waste gas stream with an aqueous solution comprising divalent cations; removing carbon dioxide and at least two components selected from the group consisting of carbon monoxide; nitrogen oxides (NOx); sulfur oxides (SOx); hydrogen sulfide; hydrogen chloride; hydrogen fluoride; fly ash; dusts; metals including arsenic, beryllium, boron, cadmium, chromium, chromium VI, cobalt, lead, manganese, mercury, molybdenum, selenium, strontium, thallium; hydrocarbons; radioactive materials, dioxins, and PAH; and producing a carbonate- and/or bicarbonate-containing composition of the divalent cations comprising the at least two components or products of the at least two components, wherein the carbonate- and/or bicarbonate-containing composition serves to sequester carbon dioxide. In some embodiments, at least 1%, 5%, 10%, 25%, 30%, 40%, 50%, 60%, 70%, 75%, 80%, 85%, 90%, or 95% of one or more of the components are removed, wherein each of the one or more components may be removed at the same or a different percentage level. In some embodiments, substantially all of each one or more of the component are removed. In some embodiments, the aqueous solution comprises calcium or magnesium ions. In some embodiments, the aqueous solution is selected from seawater, brines, inland water and a solution comprising dissolved mafic minerals. In some embodiments, the precipitation material comprises carbonates, bicarbonates, nitrates and/or sulfates or sulfites. In some embodiments, the precipitation material comprises mercury, selenium, and fly ash. In some embodiments, the precipitation material comprises metal complexes, dust, and particulate matter. In some embodiments, the method further comprises pre-treating the waste gas stream to remove particulate matter therein before contact with the aqueous solution. In some embodiments, the method further comprises pre-treating the waste gas stream to oxidize components therein before contact with the aqueous solution. In some embodiments, the method further comprises converting nitrous oxide to nitrogen dioxide; sulfur trioxide to sulfur dioxide; carbon monoxide, hydrocarbons, radioactive materials, dioxins, and/or PAH to carbon dioxide; and/or metals to metal oxides before contacting the waste gas stream with the aqueous solution. In some embodiments, the method further comprises extracting a supernatant liquid and a desalinated water from the aqueous solution. In some embodiments, the method further comprises re-circulating the supernatant liquid to the aqueous solution. In some embodiments, the precipitation material comprises a hydraulic cement. In some embodiments, the precipitation material comprises an aggregate. In some embodiments, the pH of the metal ion-containing solution is 10, 11, 12, or higher. In some embodiments, the metal ion-containing solution is adjusted to a substantially constant pH value using hydroxide ions from an electrochemical process that does not generate a gas at the anode.

In some embodiments, the invention provides a method comprising contacting a waste gas stream comprising carbon dioxide, nitrogen oxides, and sulfur oxides with a metal ion-containing aqueous solution and causing precipitation of a precipitation material that comprises carbon dioxide, sulfur oxide and mercury from the waste gas stream. In some embodiments, the invention provides a method comprising contacting an industrial waste gas stream comprising carbon dioxide, NOx, and SOx with an aqueous solution comprising divalent cations and producing a carbonate- and/or bicarbonate-containing composition of the divalent cations comprising products of NOx, SOx, or a combination thereof, wherein the carbonate- and/or bicarbonate-containing composition serves to sequester carbon dioxide. In some embodiments, the method further comprises processing the waste gas stream before or after said contact to remove one or more of particulate matter and nitrogen oxides. In some embodiments, the processing occurs in one or more steps. In some embodiments, the method further comprises pre-treating the waste gas stream to remove particulate matter before contacting the waste gas stream with the aqueous solution. In some embodiments, the method further comprises pre-treating the waste gas stream to convert nitrous oxide to nitrogen dioxide; sulfur trioxide to sulfur dioxide; carbon monoxide, hydrocarbons, dioxins, and/or PAH to carbon dioxide; and or metals to metal oxides before contacting the waste gas stream with the aqueous solution. In some embodiments, the aqueous solution comprises calcium or magnesium ions. In some embodiments, the metal ion-containing solution is selected from seawater, brines, inland water and an aqueous solution comprising dissolved mafic minerals. In some embodiments, the method further comprises extracting a supernatant liquid and a desalinated water from the aqueous solution. In some embodiments, the method further comprises re-circulating at least a portion of the supernatant liquid to the aqueous solution. In some embodiments, the method further comprises removing substantially all carbon dioxide, mercury and/or sulfur oxides from the waste gas stream. In some embodiments, the method further comprises removing 5%, 10%, 20%, 30%, 40%, 50%, 60%, 70%, 80% or more of carbon dioxide, mercury and/or sulfur oxides from the waste gas stream. In some embodiments, the precipitation material comprises calcium carbonate, magnesium carbonate, calcium magnesium carbonate, and metal complexes. In some embodiments, the precipitation material comprises one or more of the following: fly ash; dusts; metals including arsenic, beryllium, boron, cadmium, chromium, chromium VI, cobalt, lead, manganese, mercury, molybdenum, selenium, strontium, and thallium.

In some embodiments, the invention provides a method comprising contacting a flue gas from an industrial source with a metal ion-containing aqueous solution under conditions that cause the precipitation of carbon dioxide and at least two other component of the flue gas into an insoluble stable precipitation material. In some embodiments, the invention provides a method comprising contacting a flue gas from an industrial source with an aqueous solution comprising divalent cations under conditions that produce a carbonate- and/or bicarbonate-containing composition of the divalent cations comprising the products of at least two components of the flue gas, wherein the carbonate- and/or bicarbonate-containing composition serves to sequester carbon dioxide. In some embodiments, the method further comprises treating the flue gas to enhance the inclusion of the at least one of the two other components of the flue gas or a derivative therefrom into the insoluble stable precipitation material.

In some embodiments, the invention provides a method of treating a flue gas from an industrial source to remove undesirable components of the flue gas comprising treating the flue gas to remove particulate matter then treating the flue gas to remove carbon dioxide, mercury, and sulfur oxides therefrom. In some embodiments, the flue gas is further processed before or after said treatment to remove one or more of particulate matter and nitrogen oxides. In some embodiments, the flue gas is further processed in one or more steps.

In some embodiments, the invention provides a process for treating a waste gas stream comprising carbon dioxide and sulfur oxides, comprising removing at least 50% of the carbon dioxide and at least 50% of the sulfur oxides from the waste gas stream by precipitating in a single step the carbon dioxide, sulfur oxides in an insoluble composition. In some embodiments, the invention provides a process for treating an industrial waste gas stream comprising carbon dioxide and SOx, comprising: removing at least 50% of the carbon dioxide and at least 50% of the SOx from the waste gas stream by producing a composition comprising carbonates, bicarbonates, sulfites, sulfates, or a combination thereof. In some embodiments, the waste gas stream further comprises mercury. In some embodiments, the method further comprises removing at least 50% of the mercury from the waste gas stream. In some embodiments, the waste gas stream further comprises nitrogen oxides and wherein the process further comprises removing at least 50% of the nitrogen oxide in the single process. In some embodiments, the carbon dioxide and sulfur oxides are precipitated from an aqueous solution comprising divalent cations. In some embodiments, the divalent cations comprise calcium and magnesium. In some embodiments, the method further comprises pre-treating the waste gas stream to render one or more of its constituents more amenable to precipitation.

In some embodiments, the invention provides a process for treating a waste gas stream, wherein the waste gas stream comprises carbon dioxide and mercury, and wherein the process comprises removing at least 50% of the carbon dioxide and at least 50% of the mercury in a single process that comprises precipitating the carbon dioxide and mercury. In some embodiments, the invention provides a process for treating an industrial waste gas stream comprising carbon dioxide and mercury, comprising: removing at least 50% of the carbon dioxide and at least 50% of the mercury by producing a composition comprising carbonates, bicarbonates, mercury, mercury compounds, or a combination thereof.

In some embodiments, the invention provides a method of treating a flue gas from an industrial source to remove undesirable components of the flue gas, comprising treating the flue gas to remove particulate matter then treating the flue gas to remove both carbon dioxide and sulfur oxides (SOx). In some embodiments, the invention provides a method of treating a flue gas from an industrial source to remove undesirable components of the flue gas comprising treating the flue gas to remove particulate matter then treating the flue gas to remove carbon dioxide, SOx, and mercury therefrom.

In some embodiments, the invention provides a system comprising a processor adaptable for contacting a waste gas stream with a metal ion-containing aqueous solution, wherein at least three of the following components are removable from the waste gas stream and can be contained in an insoluble stable precipitation material: carbon dioxide; carbon monoxide; nitrogen oxides sulfur oxides; hydrogen sulfide; hydrogen chloride; hydrogen fluoride; fly ash; dusts; metals including arsenic, beryllium, boron, cadmium, chromium, chromium VI, cobalt, lead, manganese, mercury, molybdenum, selenium, strontium, thallium; hydrocarbons; radioactive material; dioxins; and PAH. In some embodiments, the invention provides a system comprising a processor configured for contacting an industrial waste gas stream with an aqueous solution comprising divalent cations; removing carbon dioxide and at least two components selected from the group consisting of carbon monoxide; nitrogen oxides sulfur oxides; hydrogen sulfide; hydrogen chloride; hydrogen fluoride; fly ash; dusts; metals including arsenic, beryllium, boron, cadmium, chromium, chromium VI, cobalt, lead, manganese, mercury, molybdenum, selenium, strontium, thallium; hydrocarbons; radioactive material, dioxins, and PAH; and producing a carbonate- and/or bicarbonate-containing composition of the divalent cations comprising the at least two components or products of the at least two components, wherein the carbonate- and/or bicarbonate-containing composition serves to sequester carbon dioxide. In some embodiments, the system further comprises a hydroxide ions system for supplying hydroxide ions to the processor. In some embodiments, the system further comprises an aqueous solution system for supplying a divalent cation-containing solution to the processor. In some embodiments, the waste gas stream comprises carbon dioxide, nitrogen oxides, and sulfur oxides. In some embodiments, the waste gas stream comprises particulate matter, fly ash, arsenic, beryllium, boron, cadmium, chromium, chromium VI, cobalt, lead, manganese, mercury, molybdenum, selenium, strontium, thallium, vanadium, dust, radio active materials, dioxins, and PAH compounds. In some embodiments, the processor is adapted for receiving combustion gases and particulate matter from a coal-fired power plant, a cement plant, a foundry, a smelter, a refinery or an ore processing operation in the waste gas stream. In some embodiments, the aqueous solution system is adapted for supplying calcium and magnesium ions to the processor. In some embodiments, the aqueous system is adapted for supplying a divalent cation-containing water to the processor, comprising seawater, brines, inland water and an aqueous solution formed by dissolving mafic minerals. In some embodiments, the aqueous system is adapted for supplying a divalent cation-containing solution to the processor from dissolved mafic minerals selected from olivine, pyroxene, amphibole, biotite, basalt and gabbro. In some embodiments, the processor is adapted for causing removal of carbon dioxide, nitrogen oxide, sulfur oxides and mercury from the waste gas stream into the aqueous solution. In some embodiments, the processor is adapted for removing nitrogen oxides, sulfur oxides and carbon dioxide from the waste gas stream.

In some embodiments, the processor is adapted for removing carbon dioxide, nitrogen oxides, sulfur oxides or particulate matter, and combinations thereof from the waste gas stream into the aqueous solution. In some embodiments, the system further comprises a system capable of extracting a supernatant liquid and desalinated water from the precipitation in the aqueous solution. In some embodiments, the system further comprises a system capable of re-circulating at least a portion of the supernatant liquid to the aqueous solution. In some embodiments, the system further comprises a liquid-solid separator for separating a precipitation material and a supernatant solution from the aqueous solution. In some embodiments, the system further comprises a dryer for producing a dried product from the precipitation material.

In some embodiments, the invention provides a synthetic composition comprising calcium carbonate, magnesium carbonate, and calcium sulfate and/or calcium sulfite, wherein the carbonate and the sulfate and/or sulfite are of fossil fuel origin in a combustion waste gas stream. In some embodiments, the invention provides a synthetic composition comprising salts of $Ca^{2+}$, $Mg^{2+}$, or $Ca^{2+}$ and $Mg^{2+}$, wherein the counterions comprise carbonates in combination with sulfates and/or sulfites, and wherein the carbonates have a relative carbon isotope composition ($\delta^{13}C$) value less than −5.00‰.

In some embodiments, the invention provides a synthetic composition comprising two or more of: calcium or magnesium carbonate, calcium sulfate or sulfite, mercury, calcium nitrate, particulate matter, lead, arsenic precipitated from a combustion gas stream. In some embodiments, the invention provides a synthetic composition comprising salts of $Ca^{2+}$, $Mg^{2+}$, or $Ca^{2+}$ and $Mg^{2+}$, wherein the counterions comprise carbonates in combination with sulfates, sulfites, nitrates, nitrites, mercury, mercury compounds, lead, arsenic, particulate matter, or a combination thereof, and wherein the carbonates have a relative carbon isotope composition ($\delta^{13}C$) value less than −5.00‰.

In some embodiments, the invention provides a synthetic composition comprising three or more of: calcium or magnesium carbonate, calcium sulfate or sulfite, mercury, calcium nitrate, particulate matter, lead, cadmium, arsenic precipitated form a combustion gas stream.

In some embodiments, the invention provides a synthetic composition comprising 70-99% calcium and magnesium carbonates, and 1-30% calcium and/or magnesium sulfates and sulfites precipitated from a combustion gas stream. In some embodiments, the composition further comprises 0.00001-0.1% mercury compounds. In some embodiments, the composition further comprises 1-25% nitrate or nitrite compounds. In some embodiments, the composition comprises a building material. In some embodiments, the composition comprises a cement, an aggregate, a pozzolan, a mortar, or a combination thereof. In some embodiments, the invention provides a synthetic composition comprising salts of $Ca^{2+}$, $Mg^{2+}$, or $Ca^{2+}$ and $Mg^{2+}$, wherein 70-99% of the synthetic composition comprises carbonates, and 1-30% comprises sulfates and/or sulfites and further wherein the carbonates have a relative carbon isotope composition ($\delta^{13}C$) value less than −5.00‰.

In some embodiments, the invention provides a method of neutralizing an industrial waste, comprising contacting a first waste stream with a second waste stream in the presence of an aqueous divalent cation solution, whereby constituents in at least one of the waste streams are neutralized. In some embodiments, the first waste stream comprises a base, and the second waste stream comprises carbon dioxide. In some embodiments, the constituents in the first waste stream comprises sodium hydroxide, magnesium hydroxide, calcium hydroxide, or calcium oxide. In some embodiments, the first waste stream comprises red mud and/or fly ash. In some embodiments, the aqueous divalent cation solution comprises alkaline earth metal ions. In some embodiments, the aqueous divalent cation solution comprises calcium and/or magnesium ions. In some embodiments, the aqueous divalent cation solution comprises saltwater. In some embodiments, the aqueous divalent cation solution comprises seawater, brackish water, brine, or an aqueous solution comprising dissolved mafic minerals. In some embodiments, the method further comprises forming a precipitation material in the aqueous divalent cation solution. In some embodiments, the precipitation material comprises a divalent cation carbonate. In some embodiments, the precipitation material comprises neutralized red mud and/or neutralized fly ash. In some embodiments, the precipitation material comprises bicarbonates, nitrates and/or sulfates and/or sulfites. In some embodiments, the precipitation material comprises mercury and/or selenium. In some embodiments, the precipitation material comprises metal complexes, dust, and particulate matter. In some embodiments, at least 1%, 5%, 10%, 25%, 30%, 40%, 50%, 60%, 70%, 80%, or 90% of constituents in the first and second waste streams are neutralized. In some embodiments, substantially all of constituents in the first and second waste streams are neutralized. In some embodiments, the method further comprises pre-treating the second waste stream to remove particulate matter therein before contact with the aqueous solution. In some embodiments, the method further comprises pre-treating the second waste stream to oxidize components therein before contact with the aqueous solution. In some embodiments, the method further comprises extracting a supernatant liquid and a desalinated water from the divalent cation solution. In some embodiments, the method further comprises re-circulating at least a portion of the supernatant liquid to the aqueous divalent cation solution. In some embodiments, the precipitation material comprises a hydraulic cement. In some embodiments, the precipitation material comprises an aggregate. In some embodiments, the pH of the first waste stream is 10, 11, 12 or higher. In some embodiments, the pH of divalent cation solution is adjusted to a substantially constant pH value by contact with the first waste stream. In some embodiments, the pH of divalent cation solution is adjusted to a substantially constant pH value using hydroxide ions from an electrochemical process that does not generate a gas at the anode.

In some embodiments, the invention provides a method of neutralizing an industrial waste, comprising contacting the waste with a waste gas stream comprising carbon dioxide and a liquid stream comprising an aqueous divalent cation solution, whereby the pH of the waste is neutralized. In some embodiments, the waste comprises red mud and/or fly ash. In some embodiments, the aqueous divalent cation solution comprises alkaline earth metal ions. In some embodiments, the aqueous divalent cation solution comprises calcium and/or magnesium ions. In some embodiments, the aqueous divalent cation solution comprises saltwater. In some embodiments, the divalent cation-containing aqueous solution comprises seawater, brackish water, brine, or an aqueous solution comprising dissolved mafic minerals. In some embodiments, the waste gas stream comprises carbon dioxide formed by combusting fossil fuels. In some embodiments, the method further comprises forming a precipitation material in the aqueous divalent cation solution. In some embodiments, the precipitation material comprises a divalent cation carbonate.

In some embodiments, the precipitation material comprises calcium carbonate, magnesium carbonate, calcium magnesium carbonate, and metal complexes. In some embodiments, the precipitation material comprises one or more of the following: red mud, fly ash; dusts; metals including arsenic, beryllium, boron, cadmium, chromium, chromium VI, cobalt, lead, manganese, mercury, molybdenum, selenium, strontium, and thallium. In some embodiments, the method further comprises processing the waste gas stream before or after said contact to remove one or more of particulate matter and nitrogen oxides. In some embodiments, the method further comprises extracting a supernatant liquid and a desalinated water from the aqueous solution. In some embodiments, the method further comprises re-circulating at least a portion of the supernatant liquid to the aqueous solution. In some embodiments, the method further comprises removing substantially all carbon dioxide, mercury, and/or sulfur oxides from the waste gas stream. In some embodiments, the method further comprises removing 5%, 10%, 20%, 30%, 40%, 50%, 60%, 70%, 80% or more of hydroxide ions from the waste.

In some embodiments, the invention provides a waste treatment system comprising a processor adaptable for contacting a gaseous source with a waste source and a cation ion-containing aqueous solution, wherein the processor is operable to neutralize constituents in the waste source by contact with the aqueous solution. In some embodiments, the system further comprises a base system for supplying hydroxide ions to the processor. In some embodiments, the system further comprises an aqueous solution system for supplying a divalent cation-containing solution to the processor. In some embodiments, the waste gas stream source provides carbon dioxide, nitrogen oxides, and sulfur oxides to the processor, and the waste source is adaptable for supplying red mud and/or fly ash to the processor. In some embodiments, the waste gas stream source comprises particulate matter, fly ash, arsenic, beryllium, boron, cadmium, chromium, chromium VI, cobalt, lead, manganese, mercury, molybdenum, selenium, strontium, thallium, vanadium, dust, radio active materials, dioxins, and PAH compounds. In some embodiments, the processor is capable of receiving combustion gases and particulate matter from a coal-fired power plant, a cement plant, a foundry, a smelter, a refinery or an ore processing operation in the waste gas stream. In some embodiments, the aqueous solution system is capable of supplying calcium and magnesium ions to the processor. In some embodiments, the aqueous system is capable of supplying a divalent cation-containing water to the processor, comprising seawater, brines, inland water and an aqueous solution formed by dissolving mafic minerals. In some embodiments, the aqueous system is capable of supplying a divalent cation-containing solution to the processor from dissolved mafic minerals selected from olivine, pyroxene, amphibole, biotite, basalt and gabbro. In some embodiments, the processor is capable of causing removal of carbon dioxide, nitrogen oxide, sulfur oxides and mercury from the waste gas stream into the aqueous solution. In some embodiments, the system further comprises a liquid-solid separator capable of extracting a supernatant liquid and desalinated water from the precipitation in the aqueous solution. In some embodiments, the system further comprises a re-circulating system for circulating at least a portion of the supernatant liquid to the aqueous solution. In some embodiments, the system further comprises a dryer for producing a dried product from the precipitation material.

In some embodiments, the invention provides a synthetic composition comprising red mud and/or fly ash, calcium carbonate and/or magnesium carbonate, calcium sulfate and/or calcium sulfite, wherein the carbonates and the sulfates and/or sulfites are of fossil fuel origin and are provided in a combustion waste gas stream.

In some embodiments, the invention provides a synthetic composition comprising red mud and/or fly ash, 70-99% calcium and/or magnesium carbonates, and 1-30% calcium and/or magnesium sulfates and/or sulfites precipitated from a combustion gas stream. In some embodiments, the composition further comprises 0.00001-0.1% mercury compounds. In some embodiments, the composition further comprises 1-25% nitrate or nitrite compounds. In some embodiments, the composition comprises a building material. In some embodiments, the composition comprises a cement, an aggregate, a pozzolan, a mortar, or a combination thereof.

In some embodiments, the invention provides a method of forming a synthetic hydraulic cement composition, comprising contacting a waste gas stream (e.g., combustion gas stream) with a divalent cation-containing aqueous solution to cause precipitation of the cement composition. In various embodiments, the cement composition comprises particles and precipitation material formed by reacting the components of the waste gas stream with alkaline earth metal ions in the aqueous solution to from mineralized salts and metal complexes. In various embodiments, the precipitation material is recovered and utilized as, for example, hydraulic cement and/or building materials as described in commonly assigned U.S. patent application Ser. No. 12/344,019, filed 24 Dec. 2008, which is incorporated herein by reference in its entirety. By utilizing the precipitation material as a hydraulic cement (e.g., in building materials), the components of the waste gas stream that are removed can be sequestered for an indefinite term. In various embodiments, hydroxide ions are supplied to the aqueous solution to cause removal of particulate matter and reaction of components of the waste gas stream with the aqueous solution to form the precipitation material. In various embodiments, portions of a supernatant solution obtained on removing the precipitation material from the aqueous solution are re-circulated to the aqueous solution. In various embodiments, the system and method are adaptable for batch, semi-batch or continuous flows, including re-circulating a portion of supernatant solution formed by separating the precipitation material from the saltwater.

Accordingly, constituents of various industrial waste streams (e.g., waste gas streams, industrial waste sources of proton-removing agents or divalent cations, etc.) may be neutralized for disposal and/or utilized as building product (e.g., a hydraulic cement compositions). In various embodiments, the system and method are adaptable for batch, semi-batch or continuous flows, including re-circulating a portion of supernatant solution formed upon separating the precipitation material from the divalent cation solution. Since removal of the components from various industrial waste streams, formation of compositions (e.g., precipitation material), and, optionally, recovery of precipitation material are all achievable in one unit operation, the removal of various components (e.g., pollutants) from the various industrial waste streams may be simplified.

DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

FIG. 1A provides a system of the invention comprising a processor, wherein the processor is configured to process a variety of gases comprising carbon dioxide.

FIG. 1B provides a system of the invention comprising a processor and a treatment system, wherein the treatment system is configured to treat compositions from the processor.

Figure 1C:
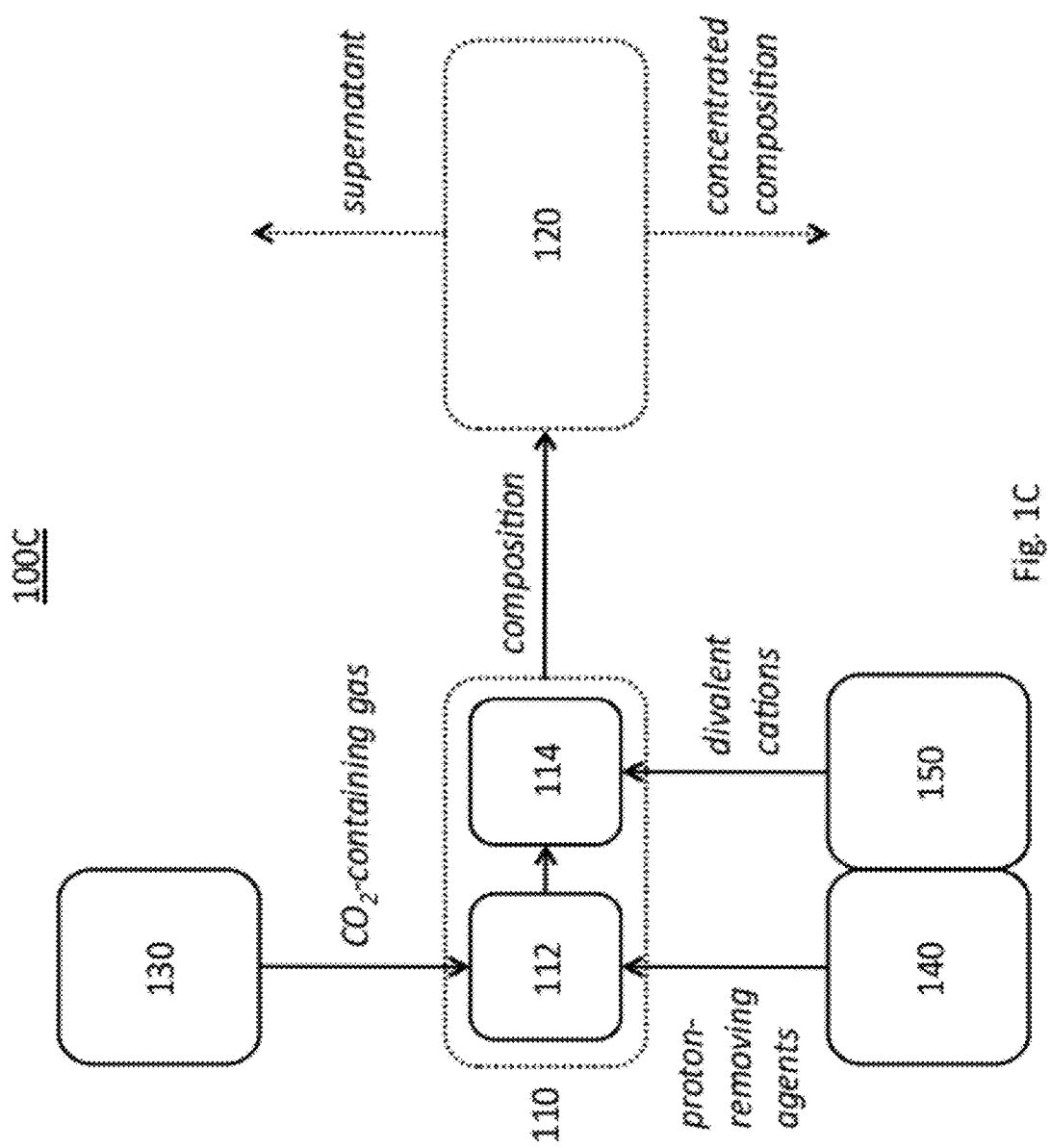

FIG. 1C provides a system of the invention comprising a processor and an optional treatment system, wherein the processor comprises a contactor and a reactor.

FIG. 1D provides a system of the invention comprising a processor and a treatment system, wherein supernatant from the treatment system may optionally be recirculated to the processor.

Figure 1E:
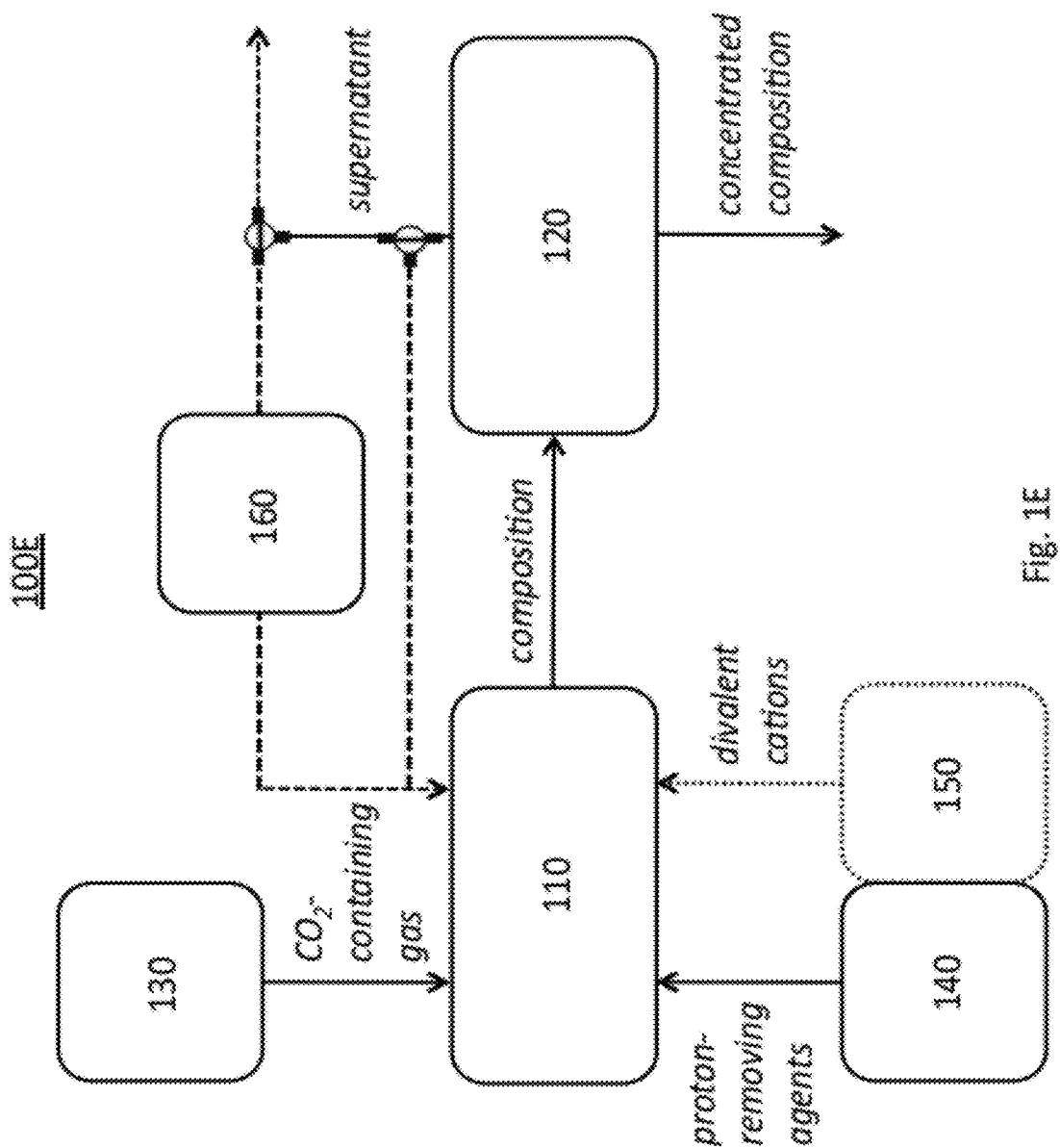

FIG. 1E provides a system of the invention comprising a processor, a treatment system, and an electrochemical system, wherein supernatant from the treatment system may optionally be recirculated to the processor, the electrochemical system, or a combination thereof.

Figure 1F:
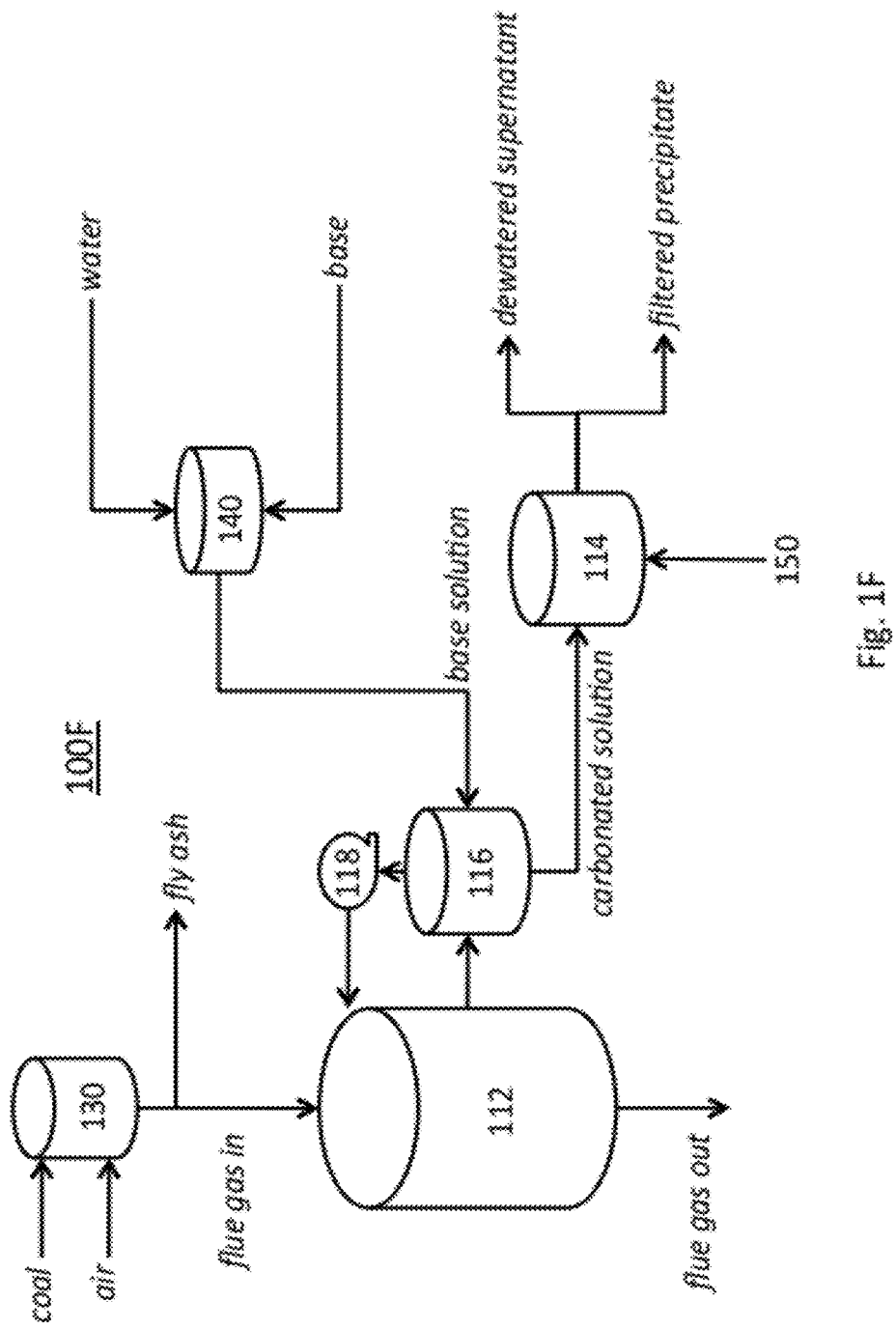

FIG. 1F provides a system of the invention comprising a gas-liquid or gas-liquid-solid contactor, wherein the contactor is configured for recirculation.

Figure 2A:
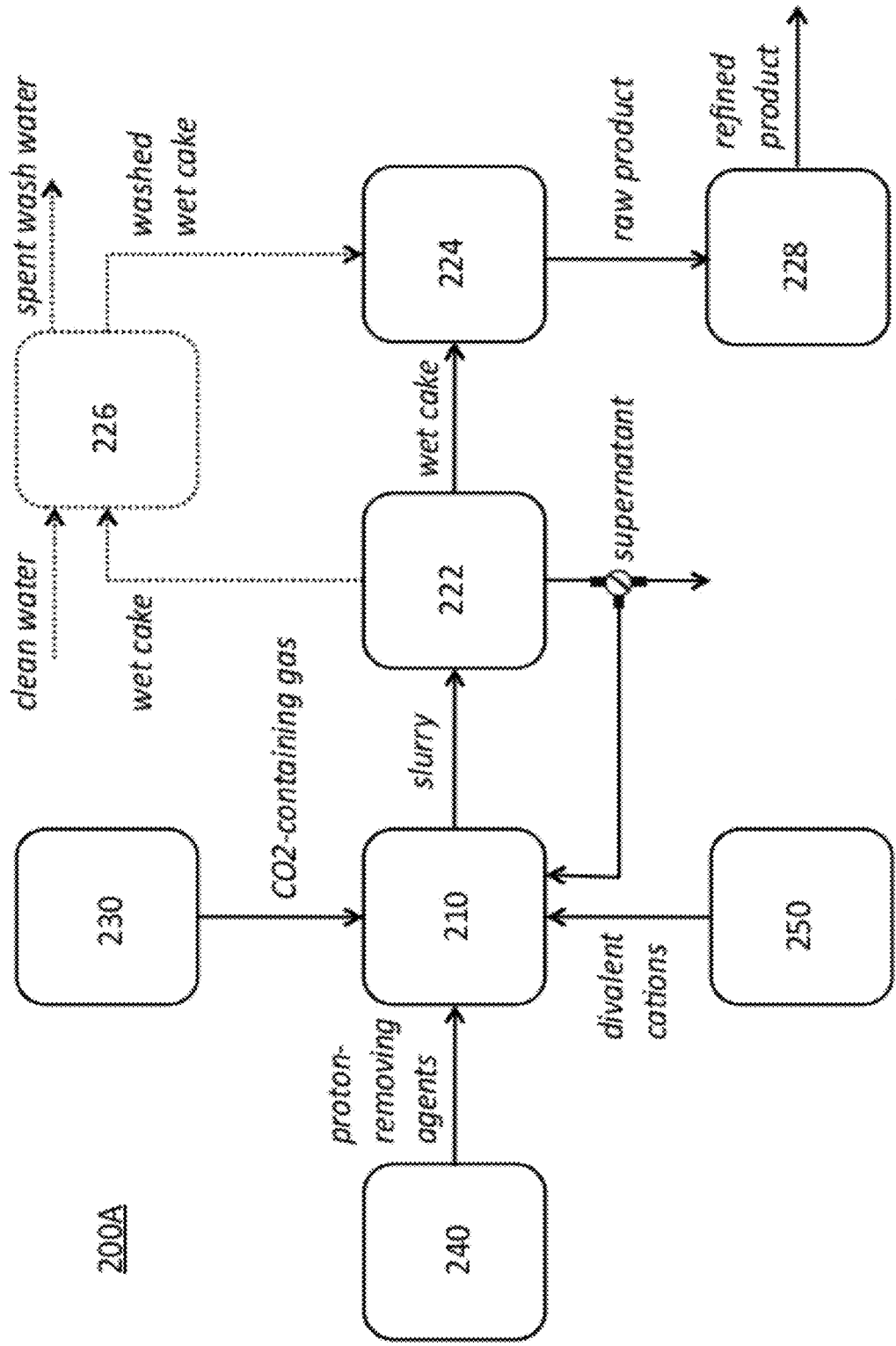

FIG. 2A provides a system of the invention, wherein the system is configured to produce a refined composition of the invention.

Figure 2B:
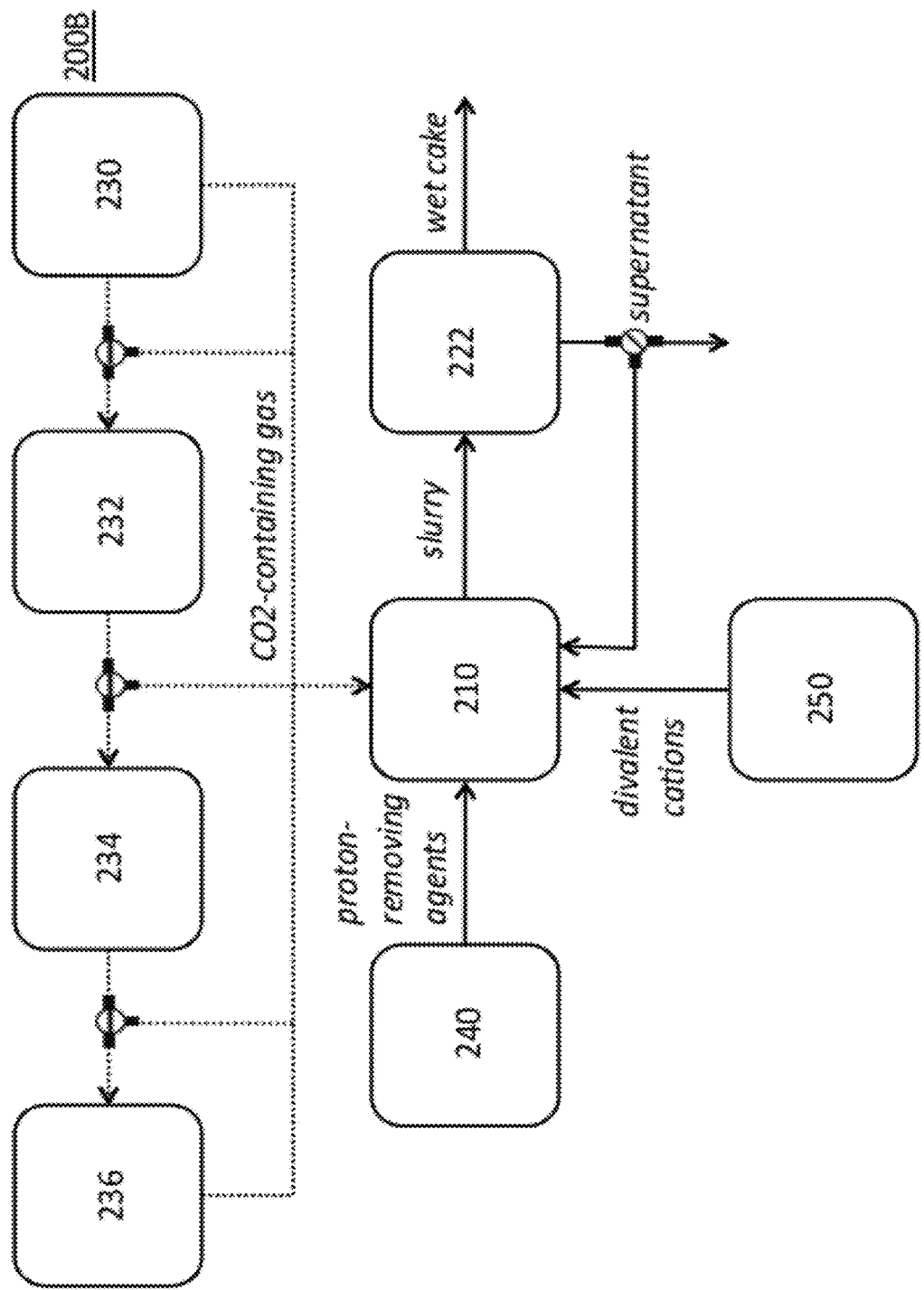

FIG. 2B provides a system of the invention, wherein the system is optionally configured to treat gases comprising carbon dioxide prior to processing the gases.

Figure 2C:
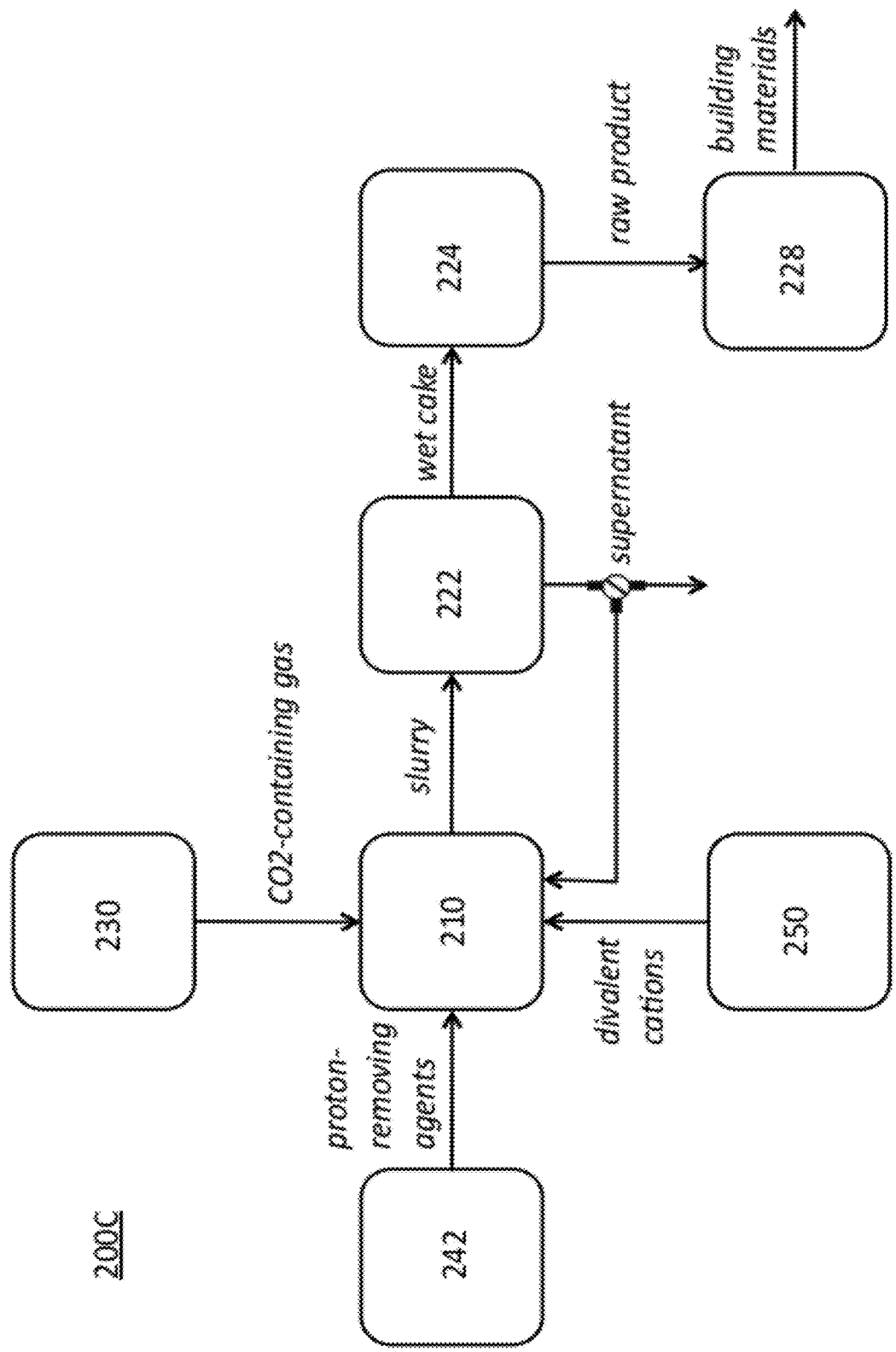

FIG. 2C provides a system of the invention, wherein the system is configured to produce a building material of the invention.

Figure 3:
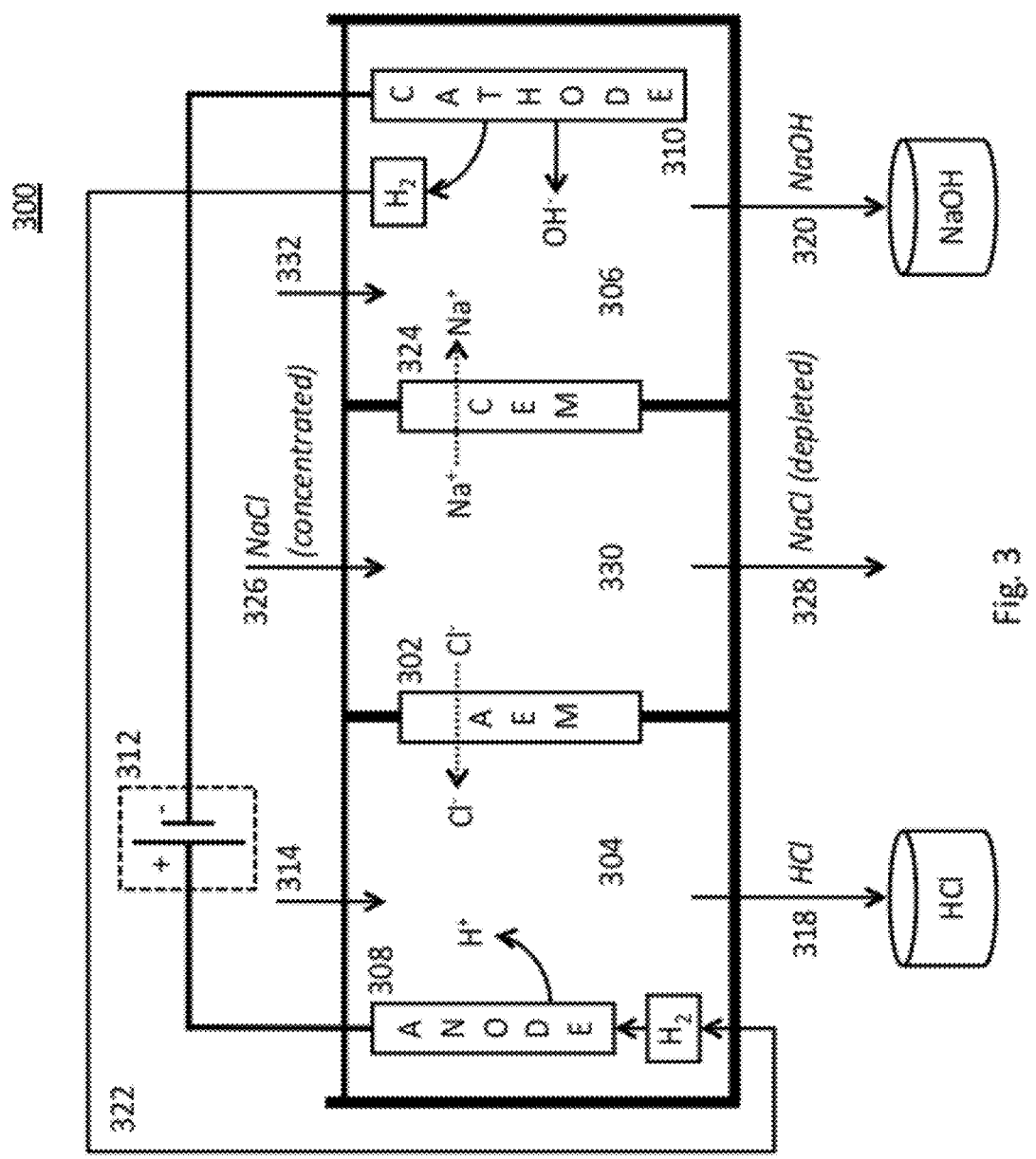

FIG. 3 provides an electrochemical system of the invention.

FIG. 4 provides a method for contacting a gaseous stream with a divalent cation-containing aqueous solution.

FIG. 5 provides a method for contacting a gaseous stream comprising carbon dioxide, nitrogen oxides, and sulfur oxides with a divalent cation-containing aqueous solution.

FIG. 6 provides a method for contacting a flue gas from an industrial source with a divalent cation-containing aqueous solution.

FIG. 7 provides a method for treating a flue gas to remove particulates then treating the flue gas to remove carbon dioxide, mercury, and sulfur oxides therefrom.

FIG. 8 provides a method for removing at least 50% of the carbon dioxide and at least 50% of the sulfur oxides from the gaseous stream.

FIG. 9 provides a method for treating a gas stream, wherein the gas stream comprises carbon dioxide and mercury, and wherein the method comprises removing at least 50% of the carbon dioxide and at least 50% of the mercury in a single process.

FIG. 10 provides a method for contacting a first waste stream with a second waste stream in the presence of an aqueous divalent cation solution, whereby constituents in at least one of the waste streams are neutralized.

FIG. 11 provides a method for contacting waste with a gaseous stream comprising carbon dioxide and a liquid stream comprising an aqueous divalent cation solution, whereby the pH of the waste is neutralized.

Figures 12A, 12B:
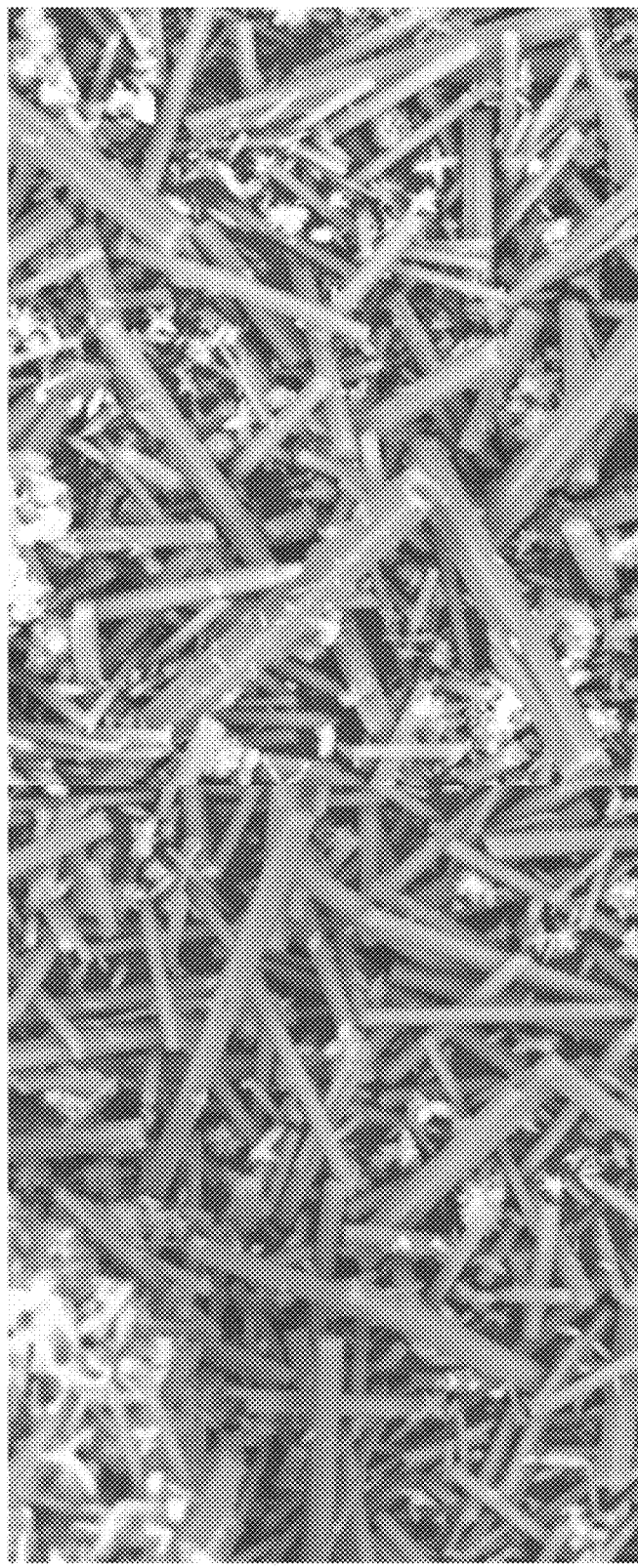

FIG. 12A and FIG. 12B provide a comparison of morphologies between laboratory-synthesized magnesium carbonates with synthetic flue gas (15% $CO_2$, 3.5% $O_2$, balance $N_2$) without $SO_2$ (FIG. 12A) and with $SO_2$ (FIG. 12B).

DESCRIPTION

Before the invention is described in greater detail, it is to be understood that the invention is not limited to particular embodiments described herein as such embodiments may vary. It is also to be understood that the terminology used herein is for the purpose of describing particular embodiments only, and is not intended to be limiting, since the scope of the invention will be limited only by the appended claims. Unless defined otherwise, all technical and scientific terms used herein have the same meaning as commonly understood by one of ordinary skill in the art to which this invention belongs.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number, which, in the context in which it is presented, provides the substantial equivalent of the specifically recited number.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has features that may readily be separated from or combined with the features of any of the other several embodiments without departing from the scope or spirit of the invention. For example, any recited method may be carried out in the order of steps recited or in any other order. Although features similar or equivalent to those described herein may also be used in the practice or testing of the invention, representative components and features are described.

The invention described herein provides systems and methods directed to partially or completely removing from an industrial waste gas stream two or more components of the waste gas stream, and compositions that include two or more components or products of the two or more components of an industrial waste gas. In some cases, one of the components is carbon dioxide, and the other component or components is one or more of SOx, NOx, and a metal. In some of the systems and methods, removing carbon dioxide and/or the other component or components occurs in single processor or process. In some systems and methods of the invention, the industrial waste gas stream may be pretreated. In some systems and methods of the invention, the industrial waste gas stream in not pretreated. The composition may be a solution, a precipitation material comprising carbonates, bicarbonates, or carbonates and bicarbonates, or a slurry comprising a precipitation material. In some embodiments, the composition further comprises carbonate and/or bicarbonate co-products resulting from co-processing SOx, NOx, particulate matter, and/or certain metals. Additional waste streams such as liquid, solid, or multiphasic waste streams may be processed as well.

In the following paragraphs is described a method of treating an industrial waste gas, wherein the gas comprises carbon dioxide and at least one other component selected from the group consisting of SOx; NOx; a metal; a non-carbon dioxide acid gas; an organic; and particulate matter, comprising contacting the gas with a liquid under conditions adapted to cause at least some of the carbon dioxide and the other component or components to exit the gas and enter the liquid, wherein the method is carried out in a single processor.

In the following paragraphs is described a method comprising (i) contacting a gas stream with an aqueous solution, wherein the gas stream comprises carbon dioxide and at least one other component selected from the group consisting of SOx; NOx; a metal; a non-carbon dioxide acid gas; an organic; and particulate matter, under conditions adapted to cause at least some of the carbon dioxide and the other component or components to exit the gas stream and enter the aqueous solution; and (ii) processing the aqueous solution to produce a composition comprising carbonates, bicarbonates, or a combination of carbonates and bicarbonates, and the other component or a derivative thereof, or the other components and/or derivatives thereof, wherein the carbonates, bicarbonates, or the combination of carbonates and bicarbonates, is at least partially derived from the carbon dioxide.

In the following paragraphs is described a composition produced by any of the methods herein.

In the following paragraphs is described a composition comprising carbonates, bicarbonates, or a combination thereof, and a sulfur-containing compound, wherein the carbonates, bicarbonates, or combination thereof have a relative carbon isotope composition ($\delta^{13}C$) value less than −5.00‰, and wherein the composition, when subjected to a leaching process consisting essentially of preparing 2×1 L of an extraction fluid consisting essentially of an aqueous solution of acetic acid, wherein each 1 L of the extraction fluid consists essentially of 5.7 mL acetic acid in deionized water; grinding the solid such that particles of ground solid are less than 1 cm in the narrowest dimension if the particles are not already less than 1 cm in the narrowest dimension; placing 100 g of the ground solid into an extraction vessel with 2 L of the extraction fluid to produce an extraction composition; rotating the extraction vessel in an end-over-end fashion for 18±2 hours at room temperature; filtering the extraction composition through borosilicate glass fiber with a pore size of 0.6 µm to 0.8 µm to produce a leachate; and adjusting pH of the leachate with 1N nitric acid to a pH of pH 2 or less than pH 2, produces a leachate comprising less than 2.0 mg/L of mercury.

In the following paragraphs is described a composition comprising carbonates, bicarbonates, or a combination thereof, and mercury, a mercury derivative, or a combination thereof, wherein the carbonates, bicarbonates, or the combination thereof have a relative carbon isotope composition ($\delta^{13}C$) value less than −5.00‰, and wherein the composition, when subjected a leaching process consisting essentially of preparing 2×1 L of an extraction fluid consisting essentially of an aqueous solution of acetic acid, wherein each 1 L of the extraction fluid consists essentially of 5.7 mL acetic acid in deionized water; grinding the solid such that particles of ground solid are less than 1 cm in the narrowest dimension if the particles are not already less than 1 cm in the narrowest dimension; placing 100 g of the ground solid into an extraction vessel with 2 L of the extraction fluid to produce an extraction composition; rotating the extraction vessel in an end-over-end fashion for 18±2 hours at room temperature; filtering the extraction composition through borosilicate glass fiber with a pore size of 0.6 µm to 0.8 µm to produce a leachate; and adjusting pH of the leachate with 1N nitric acid to a pH of pH 2 or less than pH 2, produces a leachate comprising less than 2.0 mg/L of mercury. In some embodiments, the leachate comprises less than 1.5 mg/L of mercury.

In the following paragraphs is described a composition comprising carbonates, bicarbonates, or a combination thereof, mercury, a mercury derivative, or a combination thereof, and sulfur-containing compound, wherein the composition, (i) when subjected to a leaching process consisting essentially of preparing 2×1 L of an extraction fluid consisting essentially of an aqueous solution of acetic acid, wherein each 1 L of the extraction fluid consists essentially of 5.7 mL acetic acid in deionized water; grinding the solid such that particles of ground solid are less than 1 cm in the narrowest dimension if the particles are not already less than 1 cm in the narrowest dimension; placing 100 g of the ground solid into an extraction vessel with 2 L of the extraction fluid to produce an extraction composition; rotating the extraction vessel in an end-over-end fashion for 18±2 hours at room temperature; filtering the extraction composition through borosilicate glass fiber with a pore size of 0.6 µm to 0.8 µm to produce a leachate; and adjusting pH of the leachate with 1N nitric acid to a pH of pH 2 or less than pH 2, produces a leachate comprising less than 0.2 mg/L of mercury; and (ii) when subjected to a carbon dioxide release protocol consisting essentially of grinding the composition such that particles of ground composition are less than 1 cm in the narrowest dimension if the particles are not already less than 1 cm in the narrowest dimension and immersing the ground composition in a solution having a pH between pH 4.8 and pH 5.2 and a temperature between 60 and 80° C. for 48 hours, produces no more than 5 grams carbon dioxide per 100 grams composition.

In the following paragraphs is described a system comprising (i) a source of an industrial waste gas operably connected to (ii) a processor configured to (a) process the gas to at least partially remove carbon dioxide from the gas and also to at least partially remove at least one other component from the gas, wherein the other component is selected from the group consisting of SOx, NOx, a metal, particulate matter, a non-carbon dioxide acid gas, and an organic and (b) produce a composition comprising a product comprising at least a portion of the carbon dioxide, or one or more derivatives thereof, in combination with at least a portion of the other component or one or more derivatives thereof, wherein the composition is suitable for placement in the environment.

In the following paragraphs is described a system comprising (i) a source of an industrial waste gas comprising carbon dioxide and one or more other components selected from the group consisting of SOx, NOx, a metal, non-carbon dioxide acid gas, an organic, and particulate matter; (ii) a processor configured to remove at least a portion of the carbon dioxide and the other component or components from the gas in a single processing unit; and (iii) a conduit operably connecting the source of industrial waste gas and the processor, wherein the conduit is configured to direct at least a portion of the industrial waste gas to the processor.

As such, in the following paragraphs is described systems and methods for processing waste gas streams comprising $CO_2$ and/or one or more additional components. Different feedstocks (e.g., industrial waste gas streams, sources of proton-removing agents, sources of divalent cations) are also described, followed by compositions produced by systems and methods of the invention.

In some embodiments, the invention provides a system for processing carbon dioxide as shown in FIG. 1A, wherein the system comprises at least one processor (110) configured for a liquid-based (e.g., an aqueous-based) process for processing carbon dioxide from a source of carbon dioxide (130) using a source of proton-removing agents (140), and wherein the source of carbon dioxide comprises one or more additional components in addition to carbon dioxide. As shown in FIG. 1A, the system may further comprise a source of divalent cations (150) operably connected to the processor. The processor may comprise a contactor such as a gas-liquid or a gas-liquid-solid contactor, wherein the contactor is configured for charging an aqueous solution or slurry with carbon dioxide to produce a carbon dioxide-charged composition, which composition may be a solution or slurry. In some embodiments, the contactor is configured to produce compositions from the carbon dioxide, such as from solvated or hydrated forms of carbon dioxide (e.g., carbonic acid, bicarbonates, carbonates), wherein the compositions comprise carbonates, bicarbonates, or carbonates and bicarbonates. In some embodiments, the processor may further comprise a reactor configured to produce compositions comprising carbonates, bicarbonates, or carbonates and bicarbonates from the carbon dioxide. In some embodiments, the processor may further comprise a settling tank configured for settling compositions comprising precipitation material comprising carbonates, bicarbonates, or carbonates and bicarbonates. As shown in FIG. 1B, the system may further comprise a treatment system (e.g., treatment system 120 of FIG. 1B) configured to concentrate compositions comprising carbonates, bicarbonates, or carbonates and bicarbonates and produce a supernatant; however, in some embodiments the compositions are used without further treatment. For example, systems of the invention may be configured to directly use compositions from the processor (optionally with minimal post-processing) in the manufacture of building materials. In another non-limiting example, systems of the invention may be configured to directly inject compositions from the processor (optionally with minimal post-processing) into a subterranean site as described in U.S. Provisional Patent Application No. 61/232,401, filed 7 Aug. 2009, which is incorporated herein by reference in its entirety. The source of carbon dioxide may be any of a variety of industrial sources of carbon dioxide, including, but not limited to coal-fired power plants and cement plants. The source of proton-removing agents may be any of a variety of sources of proton-removing agents, including, but not limited to, natural sources of proton-removing agents and industrial sources of proton-removing agents (including industrial waste sources). The source of divalent cations may be from any of a variety of sources of divalent cations, including, but not limited to, seawater, brines, and freshwater with added minerals. In such embodiments, the source of divalent cations may be operably connected to the source of proton-removing agents or directly to the processor. In some embodiments, the source of divalent cations comprises divalent cations of alkaline earth metals (e.g., $Ca^{2+}$, $Mg^{2+}$).

Systems of the invention such as that shown in FIG. 1A may further comprise a treatment system. As such, in some embodiments, the invention provides a system for processing carbon dioxide as shown in FIG. 1B, wherein the system comprises a processor (110) and a treatment system (120) configured for an aqueous-based process for processing carbon dioxide from a source of carbon dioxide (130) using a source of proton-removing agents (140), and wherein the source of carbon dioxide comprises one or more additional components in addition to carbon dioxide. As with FIG. 1A, the system of FIG. 1B may further comprise a source of divalent cations (150) operably connected to the processor. The processor may comprise a contactor such as a gas-liquid or a gas-liquid-solid contactor, wherein the contactor is configured for charging an aqueous solution or slurry with carbon dioxide to produce a carbon dioxide-charged composition, which composition may be a solution or slurry. In some embodiments, the contactor is configured to produce compositions from the carbon dioxide, such as from solvated or hydrated forms of carbon dioxide (e.g., carbonic acid, bicarbonates, carbonates), wherein the compositions comprise carbonates, bicarbonates, or carbonates and bicarbonates. In some embodiments, the processor may further comprise a reactor configured to produce compositions comprising carbonates, bicarbonates, or carbonates and bicarbonates from the carbon dioxide. In some embodiments, the processor may further comprise a settling tank configured for settling compositions comprising precipitation material comprising carbonates, bicarbonates, or carbonates and bicarbonates. The treatment system may comprise a dewatering system configured to concentrate compositions comprising carbonates, bicarbonates, or carbonates and bicarbonates. The treatment system may further comprise a filtration system, wherein the filtration system comprises at least one filtration unit configured for filtration of supernatant from the dewatering system, filtration of the composition from the processor, or a combination thereof. For example, in some embodiments, the filtration system comprises one or more filtration units selected from a microfiltration unit, an ultrafiltration unit, a nanofiltration unit, and a reverse osmosis unit. In some embodiments, the carbon dioxide processing system comprises a nanofiltration unit configured to increase the concentration of divalent cations in the retentate and reduce the concentration of divalent cations in the retentate. In such embodiments, nanofiltration unit retentate may be recirculated to a processor of the system for producing compositions of the invention. As shown in FIG. 1D, systems of the invention may be further configured to recirculate at least a portion of the supernatant from the treatment system.

Systems such as that shown in FIG. 1C may further comprise a processor (110) comprising a contactor (112) (e.g., gas-liquid contactor, gas-liquid-solid contactor, etc.) and a reactor (114), wherein the processor is operably connected to each of a source of $CO_2$-containing gas (130), a source of proton-removing agents (140), and a source of divalent cations (150). Such systems of the invention are configured for aqueous-based processing of carbon dioxide from the source of carbon dioxide using both the source of proton-removing agents and the source of divalent cations, wherein the source of carbon dioxide comprises one or more additional components in addition to carbon dioxide. The contactor (112) may be operably connected to each of the source of carbon dioxide (130) and the source of proton-removing agents (140), and the contactor may be configured for charging an aqueous solution or slurry with carbon dioxide to produce a carbon dioxide-charged solution or slurry. In some embodiments, the contactor is configured to charge an aqueous solution with carbon dioxide to produce a substantially clear solution (i.e., substantially free of precipitation material, such as at least 95% or more free). As shown in FIG. 1C, the reactor (114) may be operably connected to the contactor (112) and the source of divalent cations (150), and the reactor may be configured to produce a composition of the invention, wherein the composition is a solution or slurry comprising carbonates, bicarbonates, or carbonates and bicarbonates. In some embodiments, the reactor is configured to receive a substantially clear solution of carbonates, bicarbonates, or carbonates and bicarbonates from the processor and produce a composition comprising precipitation material (e.g., a slurry of carbonates, bicarbonates, or carbonates and bicarbonates of divalent cations). Systems such as the one shown in FIG. 1C may optionally be operably connected to a treatment system, which treatment system may comprise a liquid-solid separator (122) or some other dewatering system configured to treat processor-produced compositions to produce supernatant and concentrated compositions (e.g., concentrated with respect to carbonates and/or bicarbonates, and any other co-products resulting from processing an industrial waste gas stream). The treatment system may further comprise a filtration system, wherein the filtration system comprises at least one filtration unit configured for filtration of supernatant from the dewatering system, filtration of the composition from the processor, or a combination thereof.

In some embodiments, the invention provides a system for processing carbon dioxide as shown in FIG. 1D, wherein the system comprises a processor (110) and a treatment system (120) configured for an aqueous-based process for processing carbon dioxide from a source of carbon dioxide (130) using a source of proton-removing agents (140), wherein the source of carbon dioxide comprises one or more additional components in addition to carbon dioxide, and further wherein the processor and the treatment system are operably connected for recirculating at least a portion of treatment system supernatant. The treatment system of such carbon dioxide-processing systems may comprise a dewatering system and a filtration system. As such, the dewatering system, the filtration system, or a combination of the dewatering system and the filtration system may be configured to provide at least a portion of supernatant to the processor for processing carbon dioxide. Although not shown in FIG. 1D, the treatment system may also be configured to provide at least a portion of supernatant to a washing system configured to wash compositions of the invention, wherein the compositions comprise precipitation material (e.g., $CaCO_3$, $MgCO_3$, or combinations thereof). The processor of carbon dioxide-processing systems of the invention may be configured to receive treatment system supernatant in a contactor (e.g., gas-liquid contactor, gas-liquid-solid contactor), a reactor, a combination of the contactor and the reactor, or in any other unit or combination of units in the processor. In some embodiments, the carbon dioxide-processing system is configured to provide at least a portion of the supernatant to a system or process external to the carbon-dioxide processing system. For example, a system of the invention may be operably connected to a desalination plant such that the system provides at least a portion of treatment system supernatant to the desalination plant for desalination.

In some embodiments, the invention provides a system for processing carbon dioxide as shown in FIG. 1E, wherein the system comprises a processor (110) and a treatment system (120) configured for an aqueous-based process for processing carbon dioxide from a source of carbon dioxide (130) using a source of proton-removing agents (140), wherein the source of carbon dioxide comprises one or more additional components in addition to carbon dioxide, wherein the system further comprises an electrochemical system (160), and further wherein the processor, the treatment system, and the electrochemical system are operably connected for recirculating at least a portion of treatment system supernatant. As described above in reference to the treatment system of FIG. 1D, the dewatering system, the filtration system, or a combination of the dewatering system and the filtration system may be configured to provide at least a portion of treatment system supernatant to the processor for processing carbon dioxide. The treatment system may also be configured to provide at least a portion of the treatment system supernatant to the electrochemical system, wherein the electrochemical system may be configured to produce proton-removing agents or effect proton removal. As described in reference to FIG. 1D, the treatment system may also be configured to provide at least a portion of supernatant to a washing system configured to wash compositions of the invention, wherein the compositions comprise precipitation material (e.g., $CaCO_3$, $MgCO_3$, or combinations thereof). The processor of carbon dioxide-processing systems of the invention may be configured to receive treatment system supernatant or an electrochemical system stream in a contactor (e.g., gas-liquid contactor, gas-liquid-solid contactor), a reactor, a combination of the contactor and the reactor, or in any other unit or combination of units in the processor. In some embodiments, the carbon dioxide-processing system may be configured to provide at least a portion of the supernatant to a system (e.g., desalination plant) or process (e.g., desalination) external to the carbon-dioxide processing system.

In some embodiments, the invention provides a system for aqueous-based processing of carbon dioxide as shown in FIG. 1F, wherein the system (100F) comprises a source of $CO_2$ (130), a source of proton-removing agents (140), a source of divalent cations (150), and a processor (110) comprising a gas-liquid or gas-liquid-solid contactor (112), a recirculation tank (116), a recirculation pump (118), and a reactor (114), wherein the contactor, recirculation tank, and recirculation pump are operably connected for recirculating at least a portion of the contactor liquid (e.g., solution or slurry of carbonates, bicarbonates, or carbonates and bicarbonates). As shown in FIG. 1F, the system may further comprise a treatment system (120) comprising a dewatering system and/or a filtration system, wherein the treatment system is configured to provide a supernatant and a concentrated composition of the invention (e.g., dewatered precipitation material comprising carbonates, bicarbonates, or carbonates and bicarbonates). Such systems may also optionally comprise emission control technology such as an electrostatic precipitator or a fabric filter configured for separating particulate matter (e.g., fly ash) from flue gas. While system elements may vary as described herein, in a non-limiting example the source of $CO_2$ (130) for systems such as system 100F may be a coal-fired combustor, the source of proton-removing agents may be a tank or reservoir comprising a mixture of NaOH or $Na_2CO_3$ in freshwater or seawater, and the source of divalent cations may be a tank or reservoir comprising seawater or brine (e.g., synthetic brine). An exemplary method of using the system of FIG. 1F is provided in Example 1; however, one of ordinary skill in the art will recognize that various methods described herein may be used with the system of FIG. 1F.

In reference to FIG. 1A, the invention provides an aqueous-based method for processing a source of carbon dioxide (130)

and producing a composition comprising carbonates, bicarbonates, or carbonates and bicarbonates, wherein the source of carbon dioxide comprises one or more additional components in addition to carbon dioxide. In such embodiments, the industrial source of carbon dioxide may be sourced, a source of proton-removing agents (140) may be sourced, and each may be provided to processor 110 to be processed (i.e., subjected to suitable conditions for production of the composition comprising carbonates, bicarbonates, or carbonates and bicarbonates). In some embodiments, processing the industrial source of carbon dioxide comprises contacting the source of proton-removing agents in a contactor such as, but not limited to, a gas-liquid contactor or a gas-liquid-solid contactor to produce a carbon dioxide-charged composition, which composition may be a solution or slurry, from an initial aqueous solution or slurry. In some embodiments, the composition comprising carbonates, bicarbonates, or carbonates and bicarbonates may be produced from the carbon dioxide-charged solution or slurry in the contactor. In some embodiments, the carbon dioxide-charged solution or slurry may be provided to a reactor, within which the composition comprising carbonates, bicarbonates, or carbonates and bicarbonates may be produced. In some embodiments, the composition is produced in both the contactor and the reactor. For example, in some embodiments, the contactor may produce an initial composition comprising bicarbonates and the reactor may produce the composition comprising carbonates, bicarbonates, or carbonates and bicarbonates from the initial composition. In some embodiments, methods of the invention may further comprise sourcing a source of divalent cations such as those of alkaline earth metals (e.g., $Ca^{2+}$, $Mg^2$). In such embodiments, the source of divalent cations may be provided to the source of proton-removing agents or provided directly to the processor. Provided sufficient divalent cations are provided by the source of proton-removing agents, by the source of divalent cations, or by a combination of the foregoing sources, the composition comprising carbonates, bicarbonates, or carbonates and bicarbonates may comprise an isolable precipitation material (e.g., $CaCO_3$, $MgCO_3$, or a composition thereof). Whether the composition from the processor comprises an isolable precipitation material or not, the composition may be used directly from the processor (optionally with minimal post-processing) in the manufacture of building materials. In some embodiments, compositions comprising carbonates, bicarbonates, or carbonates and bicarbonates directly from the processor (optionally with minimal post-processing) may be injected into a subterranean site as described in U.S. Provisional Patent Application No. 61/232,401, filed 7 Aug. 2009, which application is incorporated herein by reference in its entirety.

In reference to FIGS. 1B-1E, the invention provides an aqueous-based method for processing a source of carbon dioxide (130) and producing a composition comprising carbonates, bicarbonates, or carbonates and bicarbonates, wherein the source of carbon dioxide comprises one or more additional components in addition to carbon dioxide. In addition to producing compositions as described in reference to FIG. 1A, the invention further provides methods for treating compositions comprising carbonates, bicarbonates, or carbonates and bicarbonates. As such, in some embodiments, the invention provides an aqueous-based method for processing a source of carbon dioxide (130) to produce a composition comprising carbonates, bicarbonates, or carbonates and bicarbonates and treating the composition produced. Whether a processor-produced composition of the invention comprises an isolable precipitation material or not, the composition may be directly provided to a treatment system of the invention for treatment (e.g., concentration, filtration, etc.). In some embodiments, the composition may be provided directly to the treatment system from a contactor, a reactor, or a settling tank of the processor. For example, a processor-produced composition that does not contain an isolable precipitation material may be provided directly to a treatment system for concentration of the composition and production of a supernatant. In another non-limiting example, a processor-produced composition comprising an isolable precipitation material may be provided directly to a treatment system for liquid-solid separation. The processor-produced composition may be provided to any of a number of treatment system sub-systems, which sub-systems include, but are not limited to, dewatering systems, filtration systems, or dewatering systems in combination with filtration systems, wherein treatment systems, or a sub-systems thereof, separate supernatant from the composition to produce a concentrated composition (e.g., the concentrated composition is more concentrated with to respect to carbonates, bicarbonates, or carbonates and carbonates).

With reference to FIG. 1C, in some embodiments, the invention provides a method for charging a solution with $CO_2$ from an industrial waste gas stream to produce a composition comprising carbonates, bicarbonates, or carbonates and bicarbonates. In such embodiments, the solution may have a pH ranging from pH 6.5 to pH 14.0 prior to charging the solution with $CO_2$. In some embodiments, the solution may have a pH of at least pH 6.5, pH 7.0, pH 7.5, pH 8.0, pH 8.5, pH 9.0, pH 9.5, pH 10.0, pH 10.5, pH 11.0, pH 11.5, pH 12.0, pH 12.5, pH 13.0, pH 13.5, or pH 14.0 prior to charging the solution with $CO_2$. The pH of the solution may be increased using any convenient approach including, but not limited to, use of proton-removing agents and electrochemical methods for effecting proton removal. In some embodiments, proton-removing agents may be used to increase the pH of the solution prior to charging the solution with $CO_2$. Such proton-removing agents include, but are not limited to, hydroxides (e.g., NaOH, KOH) and carbonates (e.g., $Na_2CO_3$. $K_2CO_3$). In some embodiments, sodium hydroxide is used to increase the pH of the solution. As such, in some embodiments, the invention provides a method for charging an alkaline solution (e.g., pH>pH 7.0) with $CO_2$ from an industrial waste gas stream to produce a composition comprising carbonates, bicarbonates, or carbonates and bicarbonates.

In some embodiments, the composition resulting from charging the alkaline solution with $CO_2$ from an industrial waste source (i.e., the solution comprising carbonates, bicarbonates, or carbonates and bicarbonates) may be a slurry or a substantially clear solution (i.e., substantially free of precipitation material, such as at least 95% or more free) depending upon the cations available in the solution at the time the solution is charged with $CO_2$. As described herein, the solution may, in some embodiments, comprise divalent cations such as $Ca^{2+}$, $Mg^{2+}$, or a combination thereof at the time the solution is charged with $CO_2$. In such embodiments, the resultant composition may comprise carbonates, bicarbonates, or carbonates and bicarbonates of divalent cations (e.g. precipitation material) resulting in a slurry. Such slurries, for example, may comprise $CaCO_3$, $MgCO_3$, or a combination thereof. The solution may, in some embodiments, comprise insufficient divalent cations to form a slurry comprising carbonates, bicarbonates, or carbonates and bicarbonates of divalent cations at the time the solution is charged with $CO_2$. In such embodiments, the resultant composition may comprise carbonates, bicarbonates, or carbonates and bicarbonates in a substantially clear solution (i.e., substantially free of precipitation material, such as at least 95% or more free) at the time the solution is charged with $CO_2$. In some embodiments, for example, monovalent cations such as $Na^+$, $K^+$, or a combination thereof (optionally by addition of NaOH and/or KOH) may be present in the substantially clear solution at the time the solution is charged with $CO_2$. The composition resulting from charging such a solution with $CO_2$ may comprise, for example, carbonates, bicarbonates, or carbonates and bicarbonates of monovalent cations.

As such, in some embodiments, the invention provides a method for charging an alkaline solution (e.g., pH>pH 7.0) with $CO_2$ from an industrial waste gas stream to produce a composition comprising carbonates, bicarbonates, or carbonates and bicarbonates, wherein the composition is substantially clear (i.e., substantially free of precipitation material, such as at least 95% or more free). The substantially clear composition may subsequently be contacted with a source of divalent cations (e.g., $Ca^{2+}$, $Mg^{2+}$, or a combination thereof) to produce a composition comprising carbonates, bicarbonates, or carbonates and bicarbonates of divalent cations resulting in a slurry. As above, such slurries may comprise $CaCO_3$, $MgCO_3$, or a combination thereof that may be treated as described herein. In a non-limiting example, an alkaline solution comprising NaOH (e.g., NaOH dissolved in freshwater lacking significant divalent cations) may be contacted in a gas-liquid contactor with $CO_2$ from an industrial waste gas stream to produce a composition comprising carbonates, bicarbonates, or carbonates and bicarbonates, wherein the composition is substantially clear due to a lack of precipitation material, which, in turn, is due to the lack of significant divalent cations. Depending upon the amount of $CO_2$ added (and makeup NaOH, if any), the substantially clear composition may comprise NaOH, $NaHCO_3$, and/or $Na_2CO_3$. The substantially clear composition may subsequently be contacted in a reactor outside the gas-liquid contactor with a source of divalent cations (e.g., $Ca^{2+}$, $Mg^{2+}$, $Sr^{2+}$, and the like) to produce a composition comprising carbonates, bicarbonates, or carbonates and bicarbonates of divalent cations (e.g., precipitation material) resulting in a slurry. As such, compositions may comprise $CaCO_3$ and/or $MgCO_3$, and the compositions may be treated as described herein. For example, the composition may be subjected to liquid-solid separation and the solids manufactured into cement, supplementary cementitious material, fine aggregate, mortar, coarse aggregate, concrete, pozzolan, or a combination thereof.

With reference to FIGS. 1D and 1E, the invention also provides aqueous-based methods of processing a source of carbon dioxide (130) and producing a composition comprising carbonates, bicarbonates, or carbonates and bicarbonates, wherein the source of carbon dioxide comprises one or more additional components in addition to carbon dioxide, and wherein at least a portion of treatment system supernatant is recirculated. For example, in some embodiments, the invention provides a method of treating a waste gas stream comprising $CO_2$ and SOx, NOx, and/or Hg in a processer to produce a processed waste gas stream (e.g., a clean gas stream suitable for release into the environment in accordance with Reasonably Available Control Technology (RACT); Best Available Control Technology (BACT); Maximum Achievable Control Technology (MACT); Lowest Achievable Emission Rate (LAER); and/or any United States Environmental Protection Agency (EPA) reference methods, as such emission control standards exist on the filing date of this patent application.), a composition comprising carbonates, bicarbonates, or carbonates and bicarbonates, and an effluent, wherein at least a portion of the effluent is recirculated to the processor. As shown in FIGS. 1D and 1E, supernatant from the treatment system, which may comprise a dewatering system and a filtration system, may be recirculated in a variety of ways. As such, in some embodiments, at least a portion of the supernatant from the dewatering system, the filtration system, or a combination of the dewatering system and the filtration system may be used to process carbon dioxide. The supernatant may be provided to a carbon dioxide-processing system processor. In such embodiments, the supernatant may be provided to a contactor (e.g., gas-liquid contactor, gas-liquid-solid contactor), to a reactor, to a combination of the contactor and the reactor, or to any other unit or combination of units for processing carbon dioxide. In addition, in some embodiments, at least a portion of the supernatant from the treatment system may be provided to a washing system. In such embodiments, the supernatant may be used to wash compositions (e.g., precipitation material comprising $CaCO_3$, $MgCO_3$, or a combination thereof) of the invention. For example, the supernatant may be used to wash chloride from carbonate-based precipitation material. With reference to FIG. 1E, at least a portion of the treatment system supernatant may be provided to an electrochemical system. As such, treatment system supernatant may be used to produce proton-removing agents or effect proton removal for processing carbon dioxide. In some embodiments, at least a portion of the supernatant from the treatment system may be provided to a different system or process. For example, at least a portion of the treatment system supernatant may be provided to a desalination plant or desalination process such that the treatment system supernatant, which is generally softer (i.e., lower concentration of $Ca^{2+}$ and/or $Mg^{2+}$) than other available feeds (e.g., seawater, brine, etc.) after being used to process carbon dioxide, may be desalinated for potable water.

Recirculation of treatment system supernatant is advantageous as recirculation provides efficient use of available resources; minimal disturbance of surrounding environments; and reduced energy requirements, which reduced energy requirements provide for lower carbon footprints for systems and methods of the invention. When a carbon dioxide-processing system of the invention is operably connected to an industrial plant (e.g., fossil fuel-fired power plant such as coal-fired power plant) and utilizes power generated at the industrial plant, reduced energy requirements provided by recirculation of treatment system supernatant provide for a reduced parasitic load on the industrial plant. A carbon dioxide-processing system not configured for recirculation (i.e., a carbon-dioxide processing system configured for a once-through process) such as that shown in FIG. 1B, may have a parasitic load on the industrial plant of at least 10% attributable to continuously pumping a fresh source of alkalinity (e.g., seawater, brine) into the system. In such an example, a 100 MW power plant (e.g., a coal-fired power plant) would need to devote 10 MW of power to the carbon dioxide-processing system for continuously pumping a fresh source of alkalinity into the system. In contrast, a system configured for recirculation such as that shown in FIG. 1D or FIG. 1E may have a parasitic load on the industrial plant of less than 10%, such as less than 8%, including less than 6%, for example, less than 4% or less than 2%, which parasitic load may be attributable to pumping make-up water and recirculating supernatant. Carbon dioxide-processing systems configured for recirculation, may, when compared to systems designed for a once-through process, exhibit a reduction in parasitic load of at least 2%, such as at least 5%, including at least 10%, for example, at least 25% or at least 50%. For example, if a carbon dioxide-processing system configured for recirculation consumes 9 MW of power for pumping make-up water and recirculating supernatant and a carbon dioxide-processing system designed for a once-through process consumes 10

MW attributable to pumping, then the carbon dioxide-processing system configured for recirculation exhibits a 10% reduction in parasitic load. For systems such as those shown in FIGS. 1D and 1E (i.e., carbon dioxide-processing systems configured for recirculation), the reduction in the parasitic load attributable to pumping and recirculating may also provide a reduction in total parasitic load, especially when compared to carbon dioxide-processing systems configured for once-through process. In some embodiments, recirculation provides a reduction in total parasitic load of a carbon dioxide-processing system, wherein the reduction is at least 2%, such as at least 4%, including at least 6%, for example at least 8% or at least 10% when compared to total parasitic load of a carbon dioxide-processing system configured for once-through process. For example, if a carbon dioxide-processing system configured for recirculation has a 15% parasitic load and a carbon dioxide-processing system designed for a once-through process has a 20% parasitic load, then the carbon dioxide-processing system configured for recirculation exhibits a 5% reduction in total parasitic load. For example, a carbon dioxide-processing system configured for recirculation, wherein recirculation comprises filtration through a filtration unit such as a nanofiltration unit (e.g., to concentrate divalent cations in the retentate and reduce divalent cations in the permeate), may have a reduction in total parasitic load of at least 2%, such as at least 4%, including at least 6%, for example at least 8% or at least 10% when compared to a carbon dioxide-processing system configured for once-through process.

The parasitic load of carbon dioxide-processing systems of the invention may be further reduced by efficient use of other resources. In some embodiments, the parasitic load of carbon dioxide-processing systems of the invention may be further reduced by efficient use of heat from an industrial source. In some embodiments, for example, heat from the industrial source of carbon dioxide (e.g., flue gas heat from a coal-fired power plant) may be utilized for drying a composition comprising precipitation material comprising carbonates, bicarbonates, or carbonates and bicarbonates. In such embodiments, a spray dryer may be used for spray drying the composition. For example, low-grade (e.g., 150-200° C.) waste heat may be utilized by means of a heat exchanger to evaporatively spray dry the composition comprising the precipitation material. In addition, utilizing heat from the industrial source of carbon dioxide for drying compositions of the invention allows for simultaneous cooling of the industrial source of carbon dioxide (e.g., flue gas from a coal-fired power plant), which enhances dissolution of carbon dioxide, a process which is inversely related to temperature. In some embodiments, the parasitic load of carbon dioxide-processing systems of the invention may be further reduced by efficient use of pressure. For example, in some embodiments, carbon dioxide-processing systems of the invention are configured with an energy recovery system. Such energy recovery systems are known, for example, in the art of desalination and operate by means of pressure exchange. In some embodiments, the overall parasitic load of the carbon dioxide-processing system may be less than 99.9%, 90%, 80%, 70%, 60%, 50%, 40%, 30%, 20%, 15%, 10%, 5%, or 3% when capturing and processing 70-90% of the carbon dioxide emitted from an industrial plant (e.g., coal-fired power plant). For example, in some embodiments, the overall parasitic load of the carbon dioxide-processing system may be less than 30%, such as less than 20%, including less than 15%, for example, less than 10%, less than 5%, or less than 3% when capturing and processing 70-90% of the carbon dioxide emitted from an industrial plant (e.g., coal-fired power plant). As such, carbon dioxide-processing systems of the invention configured for recirculation, heat exchange, and/or pressure exchange may reduce the parasitic load on power-providing industrial plants while maintaining carbon dioxide processing capacity.

Inevitably, recirculation and other methods described herein consume water as water may become part of a composition of the invention (e.g., precipitation material comprising, for example, amorphous calcium carbonate $CaCO_3 \cdot H_2O$; nesquehonite $MgCO_3 \cdot 2H_2O$; etc.), may be vaporized by drying (e.g., spray drying) compositions of the invention, or lost in some other part of the process. As such, make-up water may be provided to account for water lost to processing carbon dioxide to produce compositions of the invention (e.g., spray-dried precipitation material). For example, make-up water amounting to less than 700,000 gallons per day may replace water lost to producing, for example, spray-dried precipitation material from flue gas from a 35 MWe coal-fired power plant. Processes requiring only make-up water may be considered zero process water discharge processes. In processes in which additional water other than make-up water is used, that water may be sourced from any of the water sources (e.g., seawater, brine, etc.) described herein. In some embodiments, for example, water may be sourced from the power plant cooling stream and returned to that stream in a closed loop system. Processes requiring make-up water and additional process water are considered low process water discharge processes because systems and methods of the invention are designed to efficiently use resources.

Source of Carbon Dioxide

In some embodiments, the invention provides for contacting a volume of an aqueous solution with a source of carbon dioxide to produce a composition comprising carbonates, bicarbonates, or carbonates and bicarbonates, wherein the composition is a solution or slurry. In some embodiments, the solution is a slurry comprising a precipitation material comprising carbonates, bicarbonates, or carbonates and bicarbonates. There may be sufficient carbon dioxide in the aqueous solution to produce significant amounts of carbonates, bicarbonates, or carbonates and bicarbonates (e.g., from brine or seawater); however, additional carbon dioxide is generally used. The source of $CO_2$ may be any convenient $CO_2$ source. The source of $CO_2$ may be a gas, a liquid, a solid (e.g., dry ice), a supercritical fluid, or $CO_2$ dissolved in a liquid. In some embodiments, the $CO_2$ source is a gaseous $CO_2$ source such as a waste gas stream. The gaseous $CO_2$ source may be substantially pure $CO_2$ or, as described in more detail below, comprise one or more components in addition to $CO_2$, wherein the one or more components comprise one or more additional gases (e.g., SOx, NOx), non-gaseous components (e.g., particulate matter such as fly ash), or a combination thereof. In some embodiments, the gaseous $CO_2$ source may be a waste gas stream (e.g., exhaust) produced by an active process of an industrial plant. The nature of the industrial plant may vary, the industrial plants including, but not limited to, power plants, chemical processing plants, mechanical processing plants, refineries, cement plants, steel plants, and other industrial plants that produce $CO_2$ as a by-product of fuel combustion or another processing step (e.g., calcination by a cement plant). In some embodiments, for example, the gaseous $CO_2$ source may be flue gas from coal-fired power plant.

The gaseous waste stream may be provided by the industrial plant to the $CO_2$-processing system of the invention in any convenient manner that conveys the gaseous waste stream. In some embodiments, the waste gas stream is provided with a gas conveyor (e.g., a duct, pipe, etc.) that runs from a flue or analogous structure of the industrial plant (e.g., a flue of the industrial plant) to one or more locations of the $CO_2$-processing system. In such embodiments, a line (e.g., a duct, pipe, etc.) may be connected to the flue of the industrial plant such that gas leaving through the flue is conveyed to the appropriate location(s) of the $CO_2$-processing system (e.g., processor or a component thereof, such as a gas-liquid contactor or gas-liquid-solid contactor). Depending upon the particular configuration of the $CO_2$-processing system, the location of the gas conveyor on the industrial plant may vary, for example, to provide a waste gas stream of a desired temperature. As such, in some embodiments, where a gaseous waste stream having a temperature ranging for 0° C. to 2000° C., such as 0° C. to 1800° C., including 60° C. to 700° C., for example, 100° C. to 400° C. is desired, the flue gas may be obtained at the exit point of the boiler, gas turbine, kiln, or at any point of the power plant that provides the desired temperature. The gas conveyor may be configured to maintain flue gas at a temperature above the dew point (e.g., 125° C.) in order to avoid condensation and related complications. Other steps may be taken to reduce the adverse impact of condensation and other deleterious effects, such as employing ducting that is stainless steel or fluorocarbon (such as poly(tetrafluoroethylene)) lined such the duct does not rapidly deteriorate.

Waste gas streams comprising $CO_2$ include both reducing condition streams (e.g., syngas, shifted syngas, natural gas, hydrogen, and the like) and oxidizing condition streams (e.g., flue gas resulting from combustion). Particular waste gas streams that may be convenient for the invention include oxygen-containing flue gas resulting from combustion (e.g., from coal or another carbon-based fuel with little or no pre-treatment of the flue gas), turbo charged boiler product gas, coal gasification product gas, pre-combustion synthesis gas (e.g., such as that formed during coal gasification in power generating plants), shifted coal gasification product gas, anaerobic digester product gas, wellhead natural gas stream, reformed natural gas or methane hydrates, and the like. Combustion gas from any convenient source may be used in methods and systems of the invention. In some embodiments, a combustion gas from a post-combustion effluent stack of an industrial plant such as a power plant, cement plant, and coal processing plant is used.

Thus, waste gas streams may be produced from a variety of different types of industrial plants. Suitable waste gas streams for the invention include waste gas streams produced by industrial plants that combust fossil fuels (e.g., coal, oil, natural gas, propane, diesel) and anthropogenic fuel products of naturally occurring organic fuel deposits (e.g., tar sands, heavy oil, oil shale, etc.). In some embodiments, a waste gas stream suitable for systems and methods of the invention may be sourced from a coal-fired power plant, such as a pulverized coal power plant, a supercritical coal power plant, a mass burn coal power plant, a fluidized bed coal power plant. In some embodiments, the waste gas stream is sourced from gas or oil-fired boiler and steam turbine power plants, gas or oil-fired boiler simple cycle gas turbine power plants, or gas or oil-fired boiler combined cycle gas turbine power plants. In some embodiments, waste gas streams produced by power plants that combust syngas (i.e., gas that is produced by the gasification of organic matter, for example, coal, biomass, etc.) are used. In some embodiments, waste gas streams from integrated gasification combined cycle (IGCC) plants are used. In some embodiments, waste gas streams produced by heat recovery steam generator (HRSG) plants are used in accordance with systems and methods of the invention.

Waste gas streams produced by cement plants are also suitable for systems and methods of the invention. Cement plant waste gas streams include waste gas streams from both wet process and dry process plants, which plants may employ shaft kilns or rotary kilns, and may include pre-calciners. These industrial plants may each burn a single fuel, or may burn two or more fuels sequentially or simultaneously. Other industrial plants such as smelters and refineries are also useful sources of waste gas streams that include carbon dioxide.

Carbon dioxide may be the primary non-air derived component in waste gas streams. In some embodiments, waste gas streams may comprise carbon dioxide in amounts ranging from 200 ppm to 1,000,000 ppm, such as 200,000 ppm to 1000 ppm and including 200,000 ppm to 2000 ppm, for example 130,000 ppm to 2000 ppm, wherein the amounts of carbon dioxide may be considered time-averaged amounts. For example, in some embodiments, waste gas streams may comprise carbon dioxide in an amount ranging from 40,000 ppm (4%) to 100,000 ppm (10%) depending on the waste gas stream (e.g., $CO_2$ from natural gas-fired power plants, furnaces, small boilers, etc.). For example, in some embodiments, waste gas streams may comprise carbon dioxide in an amount ranging from 100,000 ppm (10%) to 150,000 ppm (15%) depending on the waste gas stream (e.g., $CO_2$ from coal-fired power plants, oil generators, diesel generators, etc.). For example, in some embodiments, waste gas streams may comprise carbon dioxide in an amount ranging from 200,000 ppm (20%) to 400,000 ppm (40%) depending on the waste gas stream (e.g., $CO_2$ from cement plant calcination, chemical plants, etc.). For example, in some embodiments, waste gas streams may comprise carbon dioxide in an amount ranging from 900,000 ppm (90%) to 1,000,000 ppm (100%) depending on the waste gas stream (e.g., $CO_2$ from ethanol fermenters, $CO_2$ from steam reforming at refineries, ammonia plants, substitute natural gas (SNG) plants, $CO_2$ separated from sour gases, etc.). The concentration of $CO_2$ in a waste gas stream may be decreased by 10% or more, 20% or more, 30% or more, 40% or more, 50% or more, 60% or more, 70% or more, 80% or more, 90% or more, 95% or more, 99% or more, 99.9% or more, or 99.99%. In other words, at least 10%, 20%, 30%, 40%, 50%, 60%, 70%, 80%, 90%, 95%, 99%, 99.9%, or 99.99% of the carbon dioxide may be removed from the waste gas stream.

A portion of the waste gas stream (i.e., not the entire gaseous waste stream) from an industrial plant may be used to produce compositions comprising carbonates, bicarbonates, or carbonates and bicarbonates. In these embodiments, the portion of the waste gas stream that is employed in producing compositions may be 75% or less, such as 60% or less, and including 50% and less of the waste gas stream. In yet other embodiments, most (e.g., 80% or more) of the entire waste gas stream produced by the industrial plant is employed in producing compositions. In these embodiments, 80% or more, such as 90% or more, including 95% or more, up to 100% of the waste gas stream (e.g., flue gas) generated by the source may be employed for producing compositions of the invention.

Although a waste gas stream from an industrial plant offers a relatively concentrated source of $CO_2$ and/or additional components resulting from combustion of fossil fuels, methods and systems of the invention are also applicable to removing combustion gas components from less concentrated sources (e.g., atmospheric air), which contains a much lower concentration of pollutants than, for example, flue gas. Thus, in some embodiments, methods and systems encompass decreasing the concentration of $CO_2$ and/or additional components in atmospheric air by producing compositions of the invention. As with waste gas streams, the concentration of $CO_2$ in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in $CO_2$ may be accomplished with yields as described herein, or with higher or lower yields, and may be accomplished in one processing step or in a series of processing steps.

Other Components of Waste Gas Streams

Waste gas streams suitable for the invention may further comprise one or more additional components including water; sulfur oxides (SOx); nitrogen oxides (NOx); carbon monoxide (CO); metals such as antimony (Sb), arsenic (As), barium (Ba), beryllium (Be), boron (B), cadmium (Cd), chromium (Cr), cobalt (Co), copper (Cu), lead (Pb), manganese (Mn), mercury (Hg), molybdenum (Mo), nickel (Ni), radium (Ra), selenium (Se), silver (Ag), strontium (Sr), thallium (Tl), vanadium (V), and zinc (Zn), wherein the metals may be in any available form including, but not limited to, an elemental form (e.g., Hg), a salt (e.g., $HgCl_2$), an inorganic compound (e.g., HgO), an organic compound (e.g., an organomercury compound), or particulate form (e.g., Hg(p)); particulate matter (suspended particles of solids or liquids) such as fly ash, dust (e.g., from calcining), and metals; halides such as hydrogen chloride and hydrogen fluoride, which may also be considered acid gases along with, for example, SOx (e.g., $SO_3$, $SO_2$); organics such as volatile organic compounds (VOCs), hydrocarbons, dioxins, and polyaromatic hydrocarbons (PAHs); toxic substances such as hydrogen cyanide and sulfur nitrate ($SNO_3$); and radioactive isotopes such as uranium (U) and thorium (Th), any one or more (e.g., two or more, three or more, four or more, five or more, etc.) of which may be sequestered in a composition of the invention. In some embodiments, the invention provides for at least 1%, 5%, 10%, 25%, 30%, 40%, 50%, 60%, 70%, 75%, 80%, 85%, 90%, 95%, 96%, 97%, 98%, 99%, 99.9%, or 99.99% removal of one or more of the additional waste gas stream components, wherein each of the one or more components may be removed at the same or a different percentage level. For example, in some embodiments, 98% of the SOx and 95% of the mercury may be removed from a waste gas stream using systems and methods of the invention, while, in other embodiments, 98% of the SOx and 98% of the mercury may be removed from the waste gas stream. In another exemplary embodiment, at least 99% $SO_2$, at least 88% $SO_3$, and 81% HCl, each of which may be considered an acid gas, may be removed from a waste gas stream using systems and methods of the invention. In such an embodiment, the invention provides for at least 80% removal of acid gases (e.g., SOx, HCl, etc.). In addition to the foregoing, at least 10%, 20%, 30%, 40%, 50%, 60%, 70%, 80%, 90%, 95%, 96%, 97%, 98%, 99%, 99.9%, or 99.99% of the carbon dioxide may be removed from the waste gas stream.

In a typical untreated flue gas resulting from combustion of a low-sulfur Eastern bituminous coal, the flue gas may comprise $H_2O$ (5-7%); $O_2$ (3-4%); $CO_2$ (15-16%); Hg (1 ppb); CO (20 ppm); hydrocarbons (10 ppm); HCl (100 ppm); SOx (810 ppm, wherein the concentration of $SO_2$ is 800 ppm and the concentration of $SO_3$ is 10 ppm); NOx (500 ppm, wherein the concentration of NO is 475 ppm and the concentration of $NO_2$ is 25 ppm), and $N_2$ (balance). Different coals may give untreated flue gases with different contaminant concentrations (e.g., 10-15% $CO_2$, 10-20 ppm CO, 500-3000 ppm SOx, 150-500 ppm NOx, 1-2 ppb Hg, 5-10% fly ash, etc.), any of which flue gases are suitable for use in the invention. In reference to the medium (e.g., aqueous solution) in which $CO_2$ is processed, many of the additional components of waste gas streams may be conveniently, though not strictly, grouped as soluble (e.g., $HgCl_2$, $NO_2$, etc.), reactive (e.g., HCl, HF, etc.), or not soluble and not reactive (e.g., As, Cd, Pb, Cr, V, Se, etc.). Methods of the invention include treating waste gas streams such that certain additional components may be more soluble or more reactive in the medium in which $CO_2$ is processed. For example, in some embodiments, elemental mercury may be oxidized to mercuric chloride ($HgCl_2$) in the presence of hydrogen chloride (HCl) or chlorine ($Cl_2$), each of which may be generated by electrochemical methods of the invention. This was serendipitously discovered upon practice of the invention when burning various coals having different chlorine contents. Coal having more chlorine content, it was discovered, makes for better capture of various mercury species, particularly divalent mercury ($Hg^{2+}$).

Sulfur oxides (SOx) may refer to any of lower sulfur oxides such as SO, $S_2O_2$, $S_2O$, $S_3O$, $S_xO$ (where x is 5-10), $S_6O_2$, $S_7O_2$, and polymeric sulfuroxides; sulfur monoxide (SO); sulfur dioxide ($SO_2$); sulfur trioxide ($SO_3$); and higher sulfur oxides such as $SO_{3+y}$ (where $0<y\leq1$), or a combination thereof. The combustion of coal, oil, natural gas, or any other sulfur-containing fuels may produce a flue gas in which 98-99% of the sulfur is in the form of sulfur dioxide ($SO_2$) and 1-2% is sulfur trioxide ($SO_3$). For low and high sulfur coals the total concentration of SOx may be in the range of 1,000-4,000 ppm. The invention provides highly efficient desulfurization of waste gas streams, utilizing an aqueous solution (e.g., seawater, brine, etc.) and, optionally, a source of proton-removing agents such as industrial waste (e.g., fly ash, CKD, brucite tailings, etc.). In some embodiments, the invention provides for at least 5%, 10%, 15%, 20%, 25%, 30%, 35%, 40%, 45%, 50%, 55%, 60%, 65%, 70%, 75%, 80%, 85%, 90%, 95%, or 99.9% removal of SOx from a waste gas stream. In such embodiments, SOx removal may directly result from processing the waste gas stream in a processor of the invention without additional SOx control technology. In some embodiments, such SOx removal may result from a combination of processing the waste gas stream in a processor of the invention and using a desulfurization technology. Such desulfurization technologies include, but are not limited to, wet scrubbing, spray-dry scrubbing, wet sulfuric acid process (WSA), and dry sorbent injection systems. Desulfurization of waste gas streams utilizing a processor of the invention may result in incorporation of, for example, calcium sulfate into precipitation material of the invention, which may then be used for various applications in the built environment. In some embodiments, forced oxidation may be used to oxidize sulfur compounds in the waste gas stream or in solution (e.g., sulfites to sulfates) to produce sulfates for incorporation into precipitation material. For example, in some embodiments, $SO_2$ may be absorbed in a solution as sulfite, which, in turn, may be converted to sulfate by oxidation through aeration. In some embodiments, $SO_2$ may be converted to sulfite upon contact with a solution (e.g., solution of proton-removing agents and/or divalent cations), which sulfite may be oxidized under conditions already existing in the solution. In such embodiments, sulfate may present in precipitation material of the invention, supernatant resulting from separation of the precipitation material, or both the precipitation material and the supernatant.

Nitrogen oxides may refer to any of NO and $NO_2$, or a combination thereof, and may be produced during combustion of coal, oil, and other fuels, especially during high-temperature combustion. NOx is mainly produced in the form of nitric oxide (NO). Some nitrogen dioxide ($NO_2$) is also formed, but its concentration may be less than 5% of the total NOx concentration, which is typically 200-1000 ppm. In some embodiments, the invention provides for at least 5%, 10%, 15%, 20%, 25%, 30%, 35%, 40%, 45%, 50%, 55%, 60%, 65%, 70%, 75%, 80%, 85%, 90%, 95%, or 99.9% removal of NOx from a waste gas stream. In such embodiments, NOx removal may directly result from processing the waste gas stream in a processor of the invention without additional NOx control technology. In some embodiments, such NOx removal may result from a combination of processing the waste gas stream in a processor of the invention and using a combustion modification technology. As such, in some embodiments, a pre-combustion modification technology such as combustion staging or flue gas recirculation (FGR) may be used. Alternatively, NOx emissions may be reduced using a post-combustion modification technology in combination with processing the waste gas stream in a processor of the invention. In such embodiments, a post-combustion modification technology such as selective catalytic reduction (SCR) or selective non-catalytic reduction (SNCR) may be used. Combinations of pre-combustion and post-combustion modification technologies may be used in combination with processing the waste gas stream in a processor of the invention as well.

Aqueous absorption of NOx may be enhanced by forced oxidation of NO to $NO_2$, which $NO_2$ is more soluble in solutions of the invention, which include solutions comprising proton-removing agents, divalent cations, or both proton-removing agent and divalent cations. In some embodiments, hydrogen peroxide ($H_2O_2$) (e.g., hydrogen peroxide in methanol) may be injected into the waste gas stream to oxidize NO to $NO_2$ as described in U.S. Pat. No. 5,670,122, which is incorporated herein by reference in its entirety. In some embodiments, the molar ratio of injected $H_2O_2$ (MeOH) to total pollutants is 0.01 to 5.0, such as 0.1 to 4.0, including 0.1 to 3.0, for example, 0.1 to 2.0, 0.1 to 1.0, or 0.1 to 0.5. For example, if 1 mole of $H_2O_2$ (MeOH) is injected for 2 moles of total pollutants, the molar ratio of injected $H_2O_2$ (MeOH) to total pollutants is 0.5. Mechanistically, this technique may induce free-radical-mediated oxidation of NO to $NO_2$, the formation of which allows for wet-scrubbing in, for example, coal-fired power plants lacking post-modification technology for NOx control (e.g., SCR systems). In some embodiments, chelating agents may be used to improve absorption of $NO_2$, particularly increased concentrations resulting from forced oxidation of NO to $NO_2$. In some embodiments, nitrates formed from $NO_2$ absorption may be incorporated into a hydrotalcite (aluminum-magnesium carbonate-hydroxide) matrix. In some embodiments, aqueous-based transition metal-catalyzed reduction of NOx to $N_2$, which may be released to the atmosphere with $N_2$ in the cleaned waste gas stream.

As above, metals in the waste gas stream may be in any available form. Using mercury as a non-limiting metal example, elemental mercury (Hg) and/or different forms of gaseous and particulate mercury compounds such as mercuric oxide (HgO), mercuric chloride ($HgCl_2$), mercurous chloride ($Hg_2Cl_2$), particulate mercury (Hg(p)), and the like may be emitted to the atmosphere from combustion of coal and other mercury-containing fuels. The average concentration of mercury in flue gases resulting from coal combustion in the United States may be about 3 ppb while mercury emissions from waste-to-energy (WtE) or energy-from-waste (EfW) plants may range from 0 ppb to 100 ppb. As such, mercury emissions may vary greatly. In some embodiments, the invention provides for at least 5%, 10%, 15%, 20%, 25%, 30%, 35%, 40%, 45%, 50%, 55%, 60%, 65%, 70%, 75%, 80%, 85%, 90%, 95%, or 99.9% removal of mercury and/or any other trace metals (e.g., Ag, As, Ba, Be, Cd, Co, Cr, Cu, Mo, Ni, Pb, Sb, Se, Tl, V, Zn, etc.) from a waste gas stream. In some embodiments, for example, the invention provides for at least 80% removal of mercury and/or any other trace metals (e.g., Ag, As, Ba, Be, Cd, Co, Cr, Cu, Mo, Ni, Pb, Sb, Se, Tl, V, Zn, etc.) from a waste gas stream. In such embodiments, removal of mercury and/or any other trace metals may directly result from processing the waste gas stream in a processor of the invention without additional control technology (e.g., mercury control technology). In some embodiments, such trace metal (e.g., mercury) removal may result from a combination of processing the waste gas stream in a processor of the invention and using control technology (e.g., mercury control technology). Using mercury as a non-limiting metal example, in some embodiments, one or more non-specific mercury control technologies may be used including the use of electrostatic precipitators, fabric filters, flue gas desulfurization (FGD), and/or selective catalytic reduction (SCR). For example, in some embodiments, electrostatic precipitators may be used to remove particulate mercury; fabric filters may be used to remove oxidized mercury adsorbed onto fly ash, elemental mercury adsorbed onto fly ash, or particulate mercury; FGD, in addition to removing SOx from flue gas, may be used to remove oxidized mercury from flue gas; and SCR may be used to decrease the amount of elemental mercury in the flue gas; or some combination of the foregoing. In some embodiments, one or more specific mercury control technologies may be used in combination with processing the waste gas stream in a processor of the invention. For example, in some embodiments, sorbent injection (e.g., injection of activated carbon or halogenated carbon) or passage of the waste gas stream through an adsorbent may be used. In another non-limiting example, chemical conversion of elemental mercury to non-volatile mercury compounds (e.g., enhanced FGD using dedicated oxidation schemes) or may be used. Indeed, multiple oxidation approaches may be used to convert mercury and/or any other trace metals into a soluble form (e.g., divalent mercury) that can more easily undergo aqueous scrubbing or that can be more easily taken up by an aqueous solution. As discussed above, the injection of hydrogen peroxide (e.g., hydrogen peroxide in methanol) would be one such method of oxidation. In addition, injection of chlorine in various forms (HCl, $Cl_2$), in different concentration, and/or at different temperatures in the combustor or waste gas stream may produce metal species (e.g., divalent mercury such as $HgCl_2$) that are soluble in solutions of the invention, which comprise proton-removing agents and/or divalent cations. In some embodiments, reduction approaches may be used to convert metal species into more soluble or less toxic forms that can undergo aqueous scrubbing. For example, in some embodiments, $Cr^{6+}$ from the waste gas stream, industrial waste source of proton-removing agents (e.g., fly ash), and/or industrial waste source of divalent cations may be reduced to $Cr^{3+}$, which is a non-toxic relative to hexavalent chromium ($Cr^{6+}$). Combinations of non-specific and specific trace metal (e.g., mercury) control technologies may be used in combination with processing the waste gas stream in a processor of the invention as well.

As described above in reference to $CO_2$, although a waste gas stream from an industrial plant offers a relatively concentrated source of waste gas stream components such as SOx, NOx, mercury, and the like from combustion of fossil fuels, methods and systems of the invention are also applicable to removing such waste gas stream components from less concentrated sources (e.g., atmospheric air), which contain a much lower concentration of such components than, for example, flue gas. Thus, in some embodiments, methods and systems encompass decreasing the concentration of waste gas stream components such as SOx, NOx, mercury, and the like in atmospheric air by producing compositions of the invention. As with waste gas streams, the concentration of SOx, NOx, mercury, and the like in a portion of atmospheric air may be decreased by 10% or more, 20% or more, 30% or more, 40% or more, 50% or more, 60% or more, 70% or more, 80% or more, 90% or more, 95% or more, 99% or more, 99.9% or more, or 99.99%. Such decreases in waste gas stream component such as SOx, NOx, mercury, and the like may be accomplished with yields as described herein, or with higher or lower yields, and may be accomplished in one processing step or in a series of processing steps.

Source of Proton-Removing Agents or Methods for Effecting Proton Removal

In some embodiments, the invention provides for contacting a volume of an aqueous solution with a source of carbon dioxide to produce a composition comprising carbonates, bicarbonates, or carbonates and bicarbonates, wherein the composition is a solution or slurry. Contacting the aqueous solution with the source of carbon dioxide facilitates dissolution of $CO_2$ into the aqueous solution producing carbonic acid, a species in equilibrium with both bicarbonate and carbonate. In order to produce compositions of the invention (e.g., precipitation material comprising carbonates, bicarbonates, or carbonates and bicarbonates), protons are removed from various species (e.g. carbonic acid, bicarbonate, hydronium, etc.) in the aqueous solution to shift the equilibrium toward bicarbonate, carbonate, or somewhere in between. As protons are removed, more $CO_2$ goes into solution. In some embodiments, proton-removing agents and/or methods are used while contacting an aqueous solution with $CO_2$ to increase $CO_2$ absorption in one phase of the reaction, wherein the pH may remain constant, increase, or even decrease, followed by a rapid removal of protons (e.g., by addition of a base), which, In some embodiments, may cause rapid precipitation of precipitation material. Protons may be removed from the various species (e.g. carbonic acid, bicarbonate, hydronium, etc.) by any convenient approach, including, but not limited to use of naturally occurring proton-removing agents, use of microorganisms and fungi, use of synthetic chemical proton-removing agents, recovery of waste streams from industrial processes, and using electrochemical means.

Naturally occurring proton-removing agents encompass any proton-removing agents found in the wider environment that may create or have a basic local environment. Some embodiments provide for naturally occurring proton-removing agents including minerals that create basic environments upon addition to solution. Such minerals include, but are not limited to, lime (CaO); periclase (MgO); iron hydroxide minerals (e.g., goethite and limonite); and volcanic ash. Methods for digestion of such minerals and rocks comprising such minerals are described in U.S. patent application Ser. No. 12/501,217, filed 10 Jul. 2009, which is incorporated herein by reference in its entirety. Some embodiments provide for using naturally occurring bodies of water as a source proton-removing agents, which bodies of water comprise carbonate, borate, sulfate, or nitrate alkalinity, or some combination thereof. Any alkaline brine (e.g., surface brine, subsurface brine, a deep brine, etc.) is suitable for use in the invention. In some embodiments, a surface brine comprising carbonate alkalinity provides a source of proton-removing agents. In some embodiments, a surface brine comprising borate alkalinity provides a source of proton-removing agents. In some embodiments, a subsurface brine comprising carbonate alkalinity provides a source of proton-removing agents. In some embodiments, a subsurface brine comprising borate alkalinity provides a source of proton-removing agents. In some embodiments, a deep brine comprising carbonate alkalinity provides a source of proton-removing agents. In some embodiments, a deep brine comprising borate alkalinity provides a source of proton-removing agents. Examples of naturally alkaline bodies of water include, but are not limited to surface water sources (e.g. alkaline lakes such as Mono Lake in California) and ground water sources (e.g. basic aquifers such as the deep geologic alkaline aquifers located at Searles Lake in California). Other embodiments provide for use of deposits from dried alkaline bodies of water such as the crust along Lake Natron in Africa's Great Rift Valley. For additional sources of brines and evaporites, see U.S. Provisional Patent Application No. 61/264,564, filed 25 Nov. 2009, which is incorporated herein by reference in its entirety. In some embodiments, organisms that excrete basic molecules or solutions in their normal metabolism are used as proton-removing agents. Examples of such organisms are fungi that produce alkaline protease (e.g., the deep-sea fungus *Aspergillus ustus* with an optimal pH of 9) and bacteria that create alkaline molecules (e.g., cyanobacteria such as *Lyngbya* sp. from the Atlin wetland in British Columbia, which increases pH from a byproduct of photosynthesis). In some embodiments, organisms are used to produce proton-removing agents, wherein the organisms (e.g., *Bacillus pasteurii*, which hydrolyzes urea to ammonia) metabolize a contaminant (e.g. urea) to produce proton-removing agents or solutions comprising proton-removing agents (e.g., ammonia, ammonium hydroxide). In some embodiments, organisms are cultured separately from the precipitation reaction mixture, wherein proton-removing agents or solution comprising proton-removing agents are used for addition to the precipitation reaction mixture. In some embodiments, naturally occurring or manufactured enzymes are used in combination with proton-removing agents to invoke precipitation of precipitation material. Carbonic anhydrase, which is an enzyme produced by plants and animals, accelerates transformation of carbonic acid to bicarbonate in aqueous solution. As such, carbonic anhydrase may be used to enhance dissolution of $CO_2$ and accelerate precipitation of precipitation material, as described in further detail herein.

Chemical agents for effecting proton removal generally refer to synthetic chemical agents that are produced in large quantities and are commercially available. For example, chemical agents for removing protons include, but are not limited to, hydroxides, organic bases, super bases, oxides, ammonia, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary amines such as diisopropylethylamine, aromatic amines such as aniline, heteroaromatics such as pyridine, imidazole, and benzimidazole, and various forms thereof. In some embodiments, an organic base selected from pyridine, methylamine, imidazole, benzimidazole, histidine, and a phosphazene is used to remove protons from various species (e.g., carbonic acid, bicarbonate, hydronium, etc.) for preparation of compositions of the invention. In some embodiments, ammonia is used to raise pH to a level sufficient for preparation of compositions of the invention. Super bases suitable for use as proton-removing agents include sodium ethoxide, sodium amide($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used. Carbonates for use in the invention include, but are not limited to, sodium carbonate.

In addition to comprising cations (e.g., $Ca^{2+}$, $Mg^{2+}$, etc.) and other suitable metal forms suitable for use in the invention, waste streams from various industrial processes (i.e., industrial waste streams) may provide proton-removing agents. Such waste streams include, but are not limited to, mining wastes; ash (e.g., coal ash such as fly ash, bottom ash, boiler slag); slag (e.g. iron slag, phosphorous slag); cement kiln waste (e.g., cement kiln dust (CKD)); oil refinery/petrochemical refinery waste (e.g. oil field and methane seam brines); coal seam wastes (e.g. gas production brines and coal seam brine); paper processing waste; water softening waste brine (e.g., ion exchange effluent); silicon processing wastes; agricultural waste; metal finishing waste; high pH textile waste; and caustic sludge. Mining wastes include any wastes from the extraction of metal or another precious or useful mineral from the earth. In some embodiments, wastes from mining are used to modify pH, wherein the waste is selected from red mud from the Bayer aluminum extraction process; waste from magnesium extraction from seawater (e.g., $Mg(OH)_2$ such as that found in Moss Landing, Calif.); and wastes from mining processes involving leaching. For example, red mud may be used to modify pH as described in U.S. Provisional Patent Application No. 61/161,369, filed 18 Mar. 2009, which is incorporated herein by reference in its entirety. Red mud, depending on processing conditions and source material (e.g., bauxite) might comprise $Fe_2O_3$, $Al_2O_3$, $SiO_2$, $Na_2O$, $CaO$, $TiO_2$, $K_2O$, $MgO$, $CO_2$, $S_2O$, $MnO_2$, $P_2O_5$, each of which species are loosely listed in order from most abundant to least abundant, and each of which species are expressed as oxides for convenience. Coal ash, cement kiln dust, and slag, collectively waste sources of metal oxides, further described in U.S. patent application Ser. No. 12/486,692, filed 17 Jun. 2009, the disclosure of which is incorporated herein in its entirety, may be used in alone or in combination with other proton-removing agents to provide proton-removing agents for the invention. Agricultural waste, either through animal waste or excessive fertilizer use, may contain potassium hydroxide (KOH) or ammonia ($NH_3$) or both. As such, agricultural waste may be used in some embodiments of the invention as a proton-removing agent. This agricultural waste is often collected in ponds, but it may also percolate down into aquifers, where it can be accessed and used.

Electrochemical methods are another means to remove protons from various species in a solution, either by removing protons from solute (e.g., deprotonation of carbonic acid or bicarbonate) or from solvent (e.g., deprotonation of hydronium or water). Deprotonation of solvent may result, for example, if proton production from $CO_2$ dissolution matches or exceeds electrochemical proton removal from solute molecules. In some embodiments, low-voltage electrochemical methods are used to remove protons, for example, as $CO_2$ is dissolved in the precipitation reaction mixture or a precursor solution to the precipitation reaction mixture (i.e., a solution that may or may not contain divalent cations). In some embodiments, $CO_2$ dissolved in an aqueous solution that does not contain divalent cations is treated by a low-voltage electrochemical method to remove protons from carbonic acid, bicarbonate, hydronium, or any species or combination thereof resulting from the dissolution of $CO_2$. A low-voltage electrochemical method operates at an average voltage of 2, 1.9, 1.8, 1.7, or 1.6 V or less, such as 1.5, 1.4, 1.3, 1.2, 1.1 V or less, such as 1 V or less, such as 0.9 V or less, 0.8 V or less, 0.7 V or less, 0.6 V or less, 0.5 V or less, 0.4 V or less, 0.3 V or less, 0.2 V or less, or 0.1 V or less. Low-voltage electrochemical methods that do not generate chlorine gas are convenient for use in systems and methods of the invention. Low-voltage electrochemical methods to remove protons that do not generate oxygen gas are also convenient for use in systems and methods of the invention. In some embodiments, low-voltage methods do not generate any gas at the anode. In some embodiments, low-voltage electrochemical methods generate hydrogen gas at the cathode and transport it to the anode where the hydrogen gas is converted to protons. Electrochemical methods that do not generate hydrogen gas may also be convenient. In some instances, electrochemical methods to remove protons do not generate any gaseous by-byproduct. Electrochemical methods for effecting proton removal are further described in U.S. patent application Ser. No. 12/344,019, filed 24 Dec. 2008; U.S. patent application Ser. No. 12/375,632, filed 23 Dec. 2008; International Patent Application No. PCT/US08/088,242, filed 23 Dec. 2008; International Patent Application No. PCT/US09/32301, filed 28 Jan. 2009; and International Patent Application No. PCT/US09/48511, filed 24 Jun. 2009, each of which are incorporated herein by reference in their entirety.

Alternatively, electrochemical methods may be used to produce caustic molecules (e.g., hydroxide) through, for example, the chlor-alkali process, or modification thereof (e.g., low-voltage modification). Electrodes (i.e., cathodes and anodes) may be present in the apparatus containing the aqueous solution or waste gas-charged (e.g., $CO_2$-charged) solution, and a selective barrier, such as a membrane, may separate the electrodes. Electrochemical systems and methods for removing protons may produce by-products (e.g., hydrogen) that may be harvested and used for other purposes. Additional electrochemical approaches that may be used in systems and methods of the invention include, but are not limited to, those described in U.S. Provisional Patent Application No. 61/081,299, filed 16 Jul. 2008, and U.S. Provisional Patent Application No. 61/091,729, the disclosures of which are incorporated herein by reference. Combinations of the above mentioned sources of proton-removing agents and methods for effecting proton removal may be employed.

Source of Divalent Cations

In some embodiments, the invention provides for contacting a volume of a liquid (e.g., an aqueous solution) with a source of carbon dioxide to produce a composition comprising carbonates, bicarbonates, or carbonates and bicarbonates, wherein the composition is a solution or slurry. To produce precipitation material comprising carbonates, bicarbonates, or carbonates and bicarbonates, methods of the invention include contacting a volume of a divalent cation-containing aqueous solution with a source of $CO_2$ and subjecting the resultant solution to conditions that facilitate precipitation. Divalent cations may come from any of a number of different sources of divalent cations depending upon availability at a particular location. Such sources include industrial wastes, seawater, brines, hard waters, rocks and minerals (e.g., lime, periclase, material comprising metal silicates such as serpentine and olivine), and any other suitable source.

In some locations, waste streams from various industrial processes (i.e., industrial waste streams) provide for convenient sources of divalent cations (as well as proton-removing agents such as metal hydroxides). Such waste streams include, but are not limited to, mining wastes; ash (e.g., coal ash such as fly ash, bottom ash, boiler slag); slag (e.g. iron slag, phosphorous slag); cement kiln waste (e.g., cement kiln dust); oil refinery/petrochemical refinery waste (e.g. oil field and methane seam brines); coal seam wastes (e.g. gas production brines and coal seam brine); paper processing waste; water softening waste brine (e.g., ion exchange effluent);

silicon processing wastes; agricultural waste; metal finishing waste; high pH textile waste; and caustic sludge. Ash, cement kiln dust, and slag, collectively waste sources of metal oxides, further described in U.S. patent application Ser. No. 12/486,692, filed 17 Jun. 2009, which is incorporated herein by reference in its entirety, may be used in any combination with material comprising metal silicates, further described in U.S. patent application Ser. No. 12/501,217, filed 10 Jul. 2009, which is also incorporated herein by reference in its entirety. Any of the divalent cations sources described herein may be mixed and matched for the purpose of practicing the invention. For example, material comprising metal silicates (e.g., magnesium silicate minerals such as olivine, serpentine, etc.) may be combined with any of the sources of divalent cations described herein for the purpose of practicing the invention.

In some locations, a convenient source of divalent cations for preparation of compositions of the invention (e.g., precipitation material comprising carbonates, bicarbonates, or carbonates and bicarbonates) is water (e.g., an aqueous solution comprising divalent cations such as seawater or brine), which may vary depending upon the particular location at which the invention is practiced. Suitable aqueous solutions of divalent cations that may be used include solutions comprising one or more divalent cations (e.g., alkaline earth metal cations such as $Ca^{2+}$ and $Mg^{2+}$). In some embodiments, the aqueous source of divalent cations comprises alkaline earth metal cations. In some embodiments, the alkaline earth metal cations include calcium, magnesium, or a mixture thereof. In some embodiments, the aqueous solution of divalent cations comprises calcium in amounts ranging from 50 to 50,000 ppm, 50 to 40,000 ppm, 50 to 20,000 ppm, 100 to 10,000 ppm, 200 to 5000 ppm, or 400 to 1000 ppm. In some embodiments, the aqueous solution of divalent cations comprises magnesium in amounts ranging from 50 to 40,000 ppm, 50 to 20,000 ppm, 100 to 10,000 ppm, 200 to 10,000 ppm, 500 to 5000 ppm, or 500 to 2500 ppm. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Ca^{2+}$ to $Mg^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}:Ca^{2+}$) in the aqueous solution of divalent cations is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Mg^{2+}$ to $Ca^{2+}$ in the aqueous solution of divalent cations is between 1:1 and 1:10; 1:5 and 1:25; 1:10 and 1:50; 1:25 and 1:100; 1:50 and 1:500; or 1:100 and 1:1000.

The aqueous solution of divalent cations may comprise divalent cations derived from freshwater, brackish water, seawater, or brine (e.g., naturally occurring brines or anthropogenic brines such as geothermal plant wastewaters, desalination plant waste waters), as well as other aqueous solutions having a salinity that is greater than that of freshwater, any of which may be naturally occurring or anthropogenic. For convenience in describing the invention, freshwater may be considered to have a salinity of less than 0.5 ppt (parts per thousand). Brackish water may comprise more salt than freshwater, but not as much as salt as seawater. Brackish water may be considered to have a salinity ranging from about 0.5 to about 35 ppt. Seawater may be water from a sea, an ocean, or any other body of water that has a salinity ranging from about 35 to about 50 ppt. Brine may have a salinity that is about 50 ppt or greater. As such, brine may be water saturated or nearly saturated with salt. In some embodiments, the water source from which divalent cations are derived is a mineral rich (e.g., calcium-rich and/or magnesium-rich) freshwater source. In some embodiments, the water source from which divalent cations are derived is a naturally occurring saltwater source selected from a sea, an ocean, a lake, a swamp, an estuary, a lagoon, a surface brine, a deep brine, an alkaline lake, an inland sea, or the like. In some embodiments, the water source from which divalent cations are derived is a surface brine. In some embodiments, the water source from which divalent cations are derived is a subsurface brine. In some embodiments, the water source from which divalent cations are derived is a deep brine. In some embodiments, the water source from which divalent cations are derived is a Ca—Mg—Na—(K)—Cl; Na—(Ca)—$SO_4$—Cl; Mg—Na—(Ca)—$SO_4$—Cl; Na—$CO_3$—Cl; or Na—$CO_3$—$SO_4$—Cl brine. In some embodiments, the water source from which divalent cation are derived is an anthropogenic brine selected from a geothermal plant wastewater or a desalination wastewater.

Freshwater is often a convenient source of divalent cations (e.g., cations of alkaline earth metals such as $Ca^{2+}$ and $Mg^{2+}$). Any of a number of suitable freshwater sources may be used, including freshwater sources ranging from sources relatively free of minerals to sources relatively rich in minerals. Mineral-rich freshwater sources may be naturally occurring, including any of a number of hard water sources, lakes, or inland seas. Some mineral-rich freshwater sources such as alkaline lakes or inland seas (e.g., Lake Van in Turkey) also provide a source of pH-modifying agents. Mineral-rich freshwater sources may also be anthropogenic. For example, a mineral-poor (soft) water may be contacted with a source of divalent cations such as alkaline earth metal cations (e.g., $Ca^{2+}$, $Mg^{2+}$, etc.) to produce a mineral-rich water that is suitable for methods and systems described herein. Divalent cations or precursors thereof (e.g. salts, minerals) may be added to freshwater (or any other type of water described herein) using any convenient protocol (e.g., addition of solids, suspensions, or solutions). In some embodiments, divalent cations selected from $Ca^{2+}$ and $Mg^{2+}$ are added to freshwater. In some embodiments, monovalent cations selected from $Na^+$ and $K^+$ are added to freshwater. In some embodiments, freshwater comprising $Ca^{2+}$ is combined with material comprising metal silicates, ash (e.g., fly ash, bottom ash, boiler slag), or products or processed forms thereof, including combinations of the foregoing, yielding a solution comprising calcium and magnesium cations.

In some embodiments, an aqueous solution of divalent cations may be obtained from an industrial plant that is also providing a waste gas stream (e.g., combustion gas stream). For example, in water-cooled industrial plants, such as seawater-cooled industrial plants, water that has been used by an industrial plant for cooling may then be used as water for producing precipitation material. If desired, the water may be cooled prior to entering a precipitation system of the invention. Such approaches may be employed, for example, with once-through cooling systems. For example, a city or agricultural water supply may be employed as a once-through cooling system for an industrial plant. Water from the industrial plant may then be employed for producing precipitation material, wherein output water has a reduced hardness and greater purity.

The aqueous solution of divalent cations may further provide proton-removing agents, which may be expressed as alkalinity or the ability of the divalent cation-containing solution to neutralize acids to the equivalence point of carbonate or bicarbonate. Alkalinity ($A_T$) may be expressed by the following equation $$A_T = [HCO_3^-]_T + 2[CO_3^{2-}]_T + [B(OH)_4^-]_T + [OH^-]_T + 2[PO_4^{3-}]_T + [HPO_4^{2-}]_T + [SiO(OH)_3^-]_T - [H^+]_{sws} - [HSO_4^-],$$

wherein "T" indicates the total concentration of the species in the solution as measured. Other species, depending on the source, may contribute to alkalinity as well. The total concentration of the species in solution is in opposition to the free concentration, which takes into account the significant amount of ion pair interactions that occur, for example, in seawater. In accordance with the equation, the aqueous source of divalent cations may have various concentrations of bicarbonate, carbonate, borate, hydroxide, phosphate, biphosphate, and/or silicate, which may contribute to the alkalinity of the aqueous source of divalent cations. Any type of alkalinity is suitable for the invention. For example, in some embodiments, a source of divalent cations high in borate alkalinity is suitable for the invention. In such embodiments, the concentration borate may exceed the concentration of any other species in solution including, for example, carbonate and/or bicarbonate In some embodiments, the source of divalent cations has at least 10, 100, 500, 1000, 1500, 3000, 5000, or more than 5000 mEq of alkalinity. For example, in some embodiments, the source of divalent cations has between 500 to 1000 mEq of alkalinity.

Like waste gas streams (e.g., various sources of $CO_2$ described herein), liquid and solid wastes (including multiphasic forms such as slurries of waste) such as industrial waste sources of proton-removing agents or divalent cations are also of concern because of their potential polluting effects. Many liquid and solid wastes from industrial sources comprise acids, bases, or other constituents that are not suitable for discharge into the environment due to their polluting effects. In some instances, the industrial waste may be too acidic. In some instances, the industrial waste may be too alkaline. In yet other instances, the industrial waste may contain an unacceptable level of heavy metals (e.g., lead, mercury, chromium, etc.) For example, in the Bayer process, an industrial process in which sodium hydroxide is used to selectively dissolve $Al_2O_3$, a waste comprising iron, titanium, sodium, silica, and other impurities is generated. This waste, known as red mud, is highly caustic (pH often in excess of pH 13.2) from residual sodium hydroxide, and its disposal is an on-going environmental concern. Similarly, in coal-fired power plants, ash such as fly ash or bottom ash is generated in combusting coal. Depending upon the source and makeup of the coal being burned, the constituents of the ash may vary considerably and may include substantial amounts of silicon dioxide; calcium oxide; metals including arsenic, beryllium, boron, cadmium, chromium, cobalt, lead, manganese, mercury, molybdenum, selenium, strontium, thallium, and vanadium; and organics such as hydrocarbons, dioxins, and polyaromatic hydrocarbons (PAHs). Although ash (e.g., fly ash) can be contained in tailings ponds or in landfills, its disposal is also an on-going environmental concern. Similar problems and concerns are encountered with other industrial wastes (e.g. wood pulp and paper making wastes, metallurgical wastes, and the like).

In some embodiments, the invention provides a method of neutralizing an industrial waste stream comprising contacting a first waste stream with a second waste stream to neutralize at least one of the waste streams, which neutralized stream is effectively safe to release into the environment (i.e., the neutralized waste stream comprises acceptable levels of environmental contaminants). In some embodiments, the first waste stream is a waste gas stream comprising carbon dioxide. In some embodiments, the first waste stream is a waste gas stream comprising carbon dioxide and one or more additional components (e.g., SOx, NOx, Hg and/or other trace metals) in addition to carbon dioxide. In some embodiments, the second waste stream is a liquid, solid, or a multiphasic form thereof. In some embodiments, the first waste stream is a waste gas stream comprising carbon dioxide and the second waste stream is a liquid, solid, or multiphasic form thereof. In some embodiments, the first waste stream is a waste gas stream comprising carbon dioxide and one or more additional components (e.g., SOx, NOx, Hg and/or other trace metals) in addition to carbon dioxide and the second waste stream is a liquid, solid, or a multiphasic form thereof. In some embodiments, the invention provides a method of neutralizing multiple industrial waste streams such as two, three, four, five, or more than five industrial waste streams, wherein at least one waste stream comprises a waste gas stream comprising carbon dioxide, and wherein at least one waste stream is neutralized. In some embodiments of the invention, two, three, four, five, or more than five waste streams are neutralized. Indeed, the invention provides for neutralization of any of the sources (e.g., industrial sources) of proton-removing agents, divalent cations, or combinations thereof that are described herein such that the neutralized source may safely be release into the environment. For example, in some embodiments, neutralization methods of the invention comprise contacting a first waste stream with a second waste stream, wherein the first waste stream is a waste gas stream comprising carbon dioxide and one or more additional components (e.g., SOx, NOx, Hg and/or other trace metals) in addition to carbon dioxide and the second waste stream is red mud, fly ash, or a combination thereof. Each of the systems described herein may be adapted for neutralization of two or more waste streams, wherein at least one waste stream comprises a waste gas stream comprising carbon dioxide.

Systems of the invention such as system (200A) of FIG. 2A, which is illustrative and in no way limits the following description to FIG. 2A, may comprise a processor (210) (e.g., reactor) adapted for contacting a waste gas stream (230) comprising $CO_2$ with an aqueous solution comprising divalent cations (250) to cause removal of combustion gases and particulate matter from the waste gas stream and to form precipitation material with the divalent cations in the solution. Causing removal of combustion gases (e.g., CO2, SOx, NOx, etc.) and particulate matter (e.g., metals, fly ash, etc.) from the waste gas stream, as with other embodiments of the invention described herein, is effected by carbon dioxide and the one or more other components exiting the waste gas stream and entering the liquid (e.g., the aqueous solution). As above, waste streams of interest include industrial plant exhaust gas (e.g., a flue gas), which may be obtained from the products of combustion from burning a fossil or biomass fuel that are then directed to the smokestack, also known as the flue of an industrial plant. In addition to $CO_2$ generated by the burning of fuels, $CO_2$ can also be released as a result of other industrial processing (e.g., calcination of minerals in a cement plant). The composition of the flue gas may vary. In certain embodiments, the amount of $CO_2$ in the flue gas may range from 350 ppm to 400,000 ppm, such as 2000 ppm to 200,000 ppm and including 2000 ppm to 180,000 ppm. Other components as disclosed herein may also be present in the flue gas, e.g., water, NOx, SOx, mercury and particulate matter. The temperature of the flue gas may vary, e.g., from 0° C. to 2000° C., such as from 60° C. to 7000° C. and including 100° C. to 400° C.

The waste gas stream employed in methods of the invention may be provided from the industrial plant to the site of precipitation in any convenient manner that conveys the waste gas stream from the industrial plant to the precipitation plant. In certain embodiments, the waste stream is provided with a gas conveyor, e.g., a duct, which runs from a site of the industrial plant, e.g., a flue of the industrial plant, to one or more locations of the precipitation site. The source of the waste gas stream may be a distal location relative to the site of precipitation, such that the source of the waste gas stream is a location that is 1 mile or more, such as 10 miles or more, including 100 miles or more, from the precipitation location. For example, the waste gas stream may have been transported to the site of precipitation from a remote industrial plant via a $CO_2$ gas conveyance system, e.g., a pipeline. The industrial plant generated $CO_2$ containing gas may or may not be processed, e.g., remove other components, etc., before it reaches the precipitation site (i.e., a carbonate compound precipitation plant). In yet other instances, source of the waste gas stream is proximal to the precipitation site, where such instances may include instances where the precipitation site is integrated with the source of the waste gas stream, such as a power plant that integrates a carbonate compound precipitation system.

As indicated above, the waste gas stream may be one that is obtained from a flue or analogous structure of an industrial plant. In these embodiments, a line, e.g., duct, is connected to the flue so that gas leaves the flue through the line and is conveyed to the appropriate location(s) of a precipitation system (described in greater detail below). Depending on the particular configuration of the portion of the precipitation system at which the waste gas stream is employed, the location of the source from which the waste gas stream is obtained may vary, e.g., to provide a waste stream that has the appropriate or desired temperature. As such, in certain embodiments where a waste gas stream having a temperature ranging for 0° C. to 1800° C., such as 60° C. to 700° C. is desired, the flue gas may be obtained at the exit point of the boiler or gas turbine, the kiln, or at any point through the power plant or stack, that provides the desired temperature. Where desired, the flue gas is maintained at a temperature above the dew point, e.g., 125° C., in order to avoid condensation and related complications. Where such is not possible, steps may be taken to reduce the adverse impact of condensation, e.g., employing ducting that is stainless steel, fluorocarbon (such as poly (tetrafluoroethylene)) lined, diluted with water and pH controlled, etc., so the duct does not rapidly deteriorate.

As is in FIG. 2A, which is illustrative and in no way limits the following description to FIG. 2A, system 200A includes a source of proton-removing agents (240) (e.g., hydroxide ions) for adjusting the pH of the solution to promote the absorption of the combustion gases in the solution and reaction of the components in the waste gas stream with the divalent cations in the solution. In various embodiments, the processor (210) (e.g., reactor) is configured for interaction of the waste gas stream (230) with the solution to form a slurry comprising particulate matter from the waste gas stream and precipitation material formed from the gases interacting with divalent cations in the solution. In various embodiments, the processor (210) is operably connected to a treatment system (220) comprising a liquid-solid separator (222) configured to separate slurry from the processor into a wet cake of precipitation material and a supernatant. In various embodiments, the supernatant, depleted of divalent cations, hydroxide ions, and precipitation material, may be used as feed water for desalination as described in U.S. patent application Ser. No. 12/163,205, filed 27 Jun. 2008, which is incorporated herein by reference in it entirety. In other embodiments, the carbon-dioxide processing system may be configured such that a portion of the supernatant may be replenished with divalent cations (e.g., alkaline earth metal ions) and proton-removing agents (e.g., hydroxide ions) and re-circulated to the processor (210) (e.g., reactor). Optionally, as illustrated in FIG. 2A, systems of the invention may comprise a washer (226) configured to wash wet cake from the liquid-solid separator (222) with clean water to remove soluble salts from the wet cake and to produce a washed wet cake (e.g., desalinated wet cake) of precipitation material (along with spent wash water). System 200A may further comprise a dryer (224) configured to dry wet cake to form a raw, dried product, which, in turn, may be refined in a refinery (228) to produce a refined product. Raw, dried product or refined product may be used to prepare building materials of the invention depending upon the specification of the building material.

As shown in FIG. 2A, which is illustrative and in no way limits the following description to FIG. 2A, equipment that may be used to remove the gas components (e.g., $CO_2$, SOx, NOx, etc.) and produce a dried product from the precipitation material are commercially available but may need customization for the system. The processor (210) (e.g., reactor) may include any of a number of different components, such as temperature control components (e.g., configured to heat the aqueous solution to a desired temperature), chemical additive components (e.g., for introducing chemical pH-modifying agents such as KOH, NaOH, etc.), electrolysis components (e.g., cathodes/anodes, etc.), gas-charging components, pressurization components (e.g., for operating under pressurized conditions such as from 50-800 psi, 100-800 psi, 400-800 psi, or any other suitable pressure range), mechanical agitation and physical stirring components, and components to re-circulate industrial plant flue gas through the precipitation system. The processor 210 (e.g., reactor) may contain components that allow for the monitoring of one or more parameters such as internal reactor pressure, pH, precipitation material particle size, metal-ion concentration, conductivity and alkalinity of the aqueous solution, and partial pressure of the gases. Monitoring conditions during the precipitation process can allow for corrective adjustments to be made during processing, or if desired, to increase or decrease production of precipitation material.

Also as shown in FIG. 2A, which is illustrative and in no way limits the following description to FIG. 2A, systems of the invention, in various embodiments, comprise a system for supplying proton-removing agents 240 (e.g., hydroxide ions) to cause formation of precipitation material in the processor (210) (e.g., reactor). Although any convenient source of proton-removing agents (e.g., hydroxide from commercially available sodium hydroxide) may be used, in one embodiment, the system includes an electrochemical system for supplying proton-removing agents (e.g., hydroxide) to the aqueous cation solution or effecting proton removal from the aqueous solution as is illustrated in FIG. 3, and as described in commonly assigned International Patent Application No. PCT/US08/088,242, filed 23 Dec. 2008, which is incorporated herein by reference in its entirety.

With reference to FIG. 3, the electrochemical system (300) in one embodiment comprises anode 308 contacting first electrolyte 304; anion exchange membrane 302 separating the first electrolyte from a third electrolyte (330); second electrolyte contacting cathode 310, and cation exchange membrane 324 separating the second electrolyte from the third electrolyte. The ion exchange membranes are positioned in the system to prevent mixing of the first and second electrolytes. A current/voltage regulator (312) may be adapted to increase or decrease the current or voltage across the cathode and anode in the system as desired. On applying a voltage across the anode and cathode, proton-removing agents (e.g., hydroxide) form in the solution in contact with the cathode without a gas (e.g., oxygen or chlorine) forming at the anode. As with the system illustrated in FIG. 2A, which is illustrative and in no way limits the following description to FIG. 2A, the system of FIG. 3 may be adapted for batch, semi-batch, or continuous operation for supplying proton-removing agents (e.g., hydroxide) to systems of the invention such as that of FIG. 2A.

To provide for efficiencies, the industrial plant that generates the waste gas stream may be co-located with the precipitation system. By "co-located" is meant that the distances between the industrial plant and precipitation system range from 10 to 500 yards, such as 25 to 400 yards, including 30 to 350 yards. Where desired, the precipitation and industrial plants may be configured relative to each other to minimize temperature loss and avoid condensation, as well as minimize ducting costs, e.g., where the precipitation plant is located within 40 yards of the industrial plant.

Also of interest in certain embodiments is a fully integrated plant that includes an industrial function (such as power generation, cement production, etc.) and a precipitation system of the invention. In such integrated plants, conventional industrial plants and precipitation system, such as described below, are modified to provide for the desired integrated plant. Modifications include, but are not limited to: coordination of stacks, pumping, controls, instrumentation, monitoring, use of plant energy, e.g., steam turbine energy to run portions of the precipitation component, e.g., mechanical press, pumps, compressors, use of heat from cement and/or power plant obtained from steam or heat from air to air heat exchanger and the like.

With reference to FIG. 2A, which is illustrative and in no way limits the following description to FIG. 2A, the waste gas stream (230) comprising combustion gas (e.g., $CO_2$) is contacted with the divalent cation aqueous solution (250), which may be delivered to processor 210 (e.g., reactor) via a pipeline or in some other convenient manner. Such contact may produce a combustion gas-charged aqueous solution, wherein combustion gas molecules (e.g., $CO_2$, HCl, NOx, SOx, etc.) have combined with water molecules to produce new chemical species (e.g., carbonic acid, bicarbonate, carbonate, hydrochloric acid, nitric acid, sulfuric acid, etc.), or where the combustion gas molecules have merely dissolved in the water. A combustion gas-charged aqueous solution may also comprise particulate matter from the combustion gas suspended in the aqueous solution. In various embodiments, as described above, combustion gas may comprise carbon dioxide; carbon monoxide; nitrogen oxides (NOx); sulfur oxides (SOx); sulfides; halides such as hydrogen chloride and hydrogen fluoride, which may also be considered acid gases along with, for example, SOx (e.g., $SO_3$, $SO_2$); particulate matter such as fly ash; metals including, but not limited to, arsenic, beryllium, boron, cadmium, chromium, cobalt, lead, manganese, mercury, molybdenum, selenium, strontium, thallium, and vanadium; organics such as hydrocarbons, dioxins, and polynuclear aromatic hydrocarbons (PAH); and radioactive materials. In various embodiments, the system (200A) may be adapted for processing a waste gas stream 230 comprising $CO_2$ (e.g., combustion gas) comprising all, or one, or more than one of these components simultaneously.

Charging the divalent cation-containing aqueous solution with combustion gas in the processor (210) (e.g., reactor) results in an increase in the combustion gas content in the aqueous solution (e.g., in the form of carbonic acid, bicarbonate and carbonate ion) and a decrease in concentration of combustion gas content in the gas that exits the processor (e.g., reactor). In various embodiments, the combustion gas-charged aqueous solution may be acidic, having a pH of 6 or less, such as 5 or less, and including 4 or less. In certain embodiments, the concentration of $CO_2$, NOx, SOx, or a combination thereof of the gas that is used to charge the water is 0.1%, 1%, 5%, 10% or higher, 25% or higher, including 50% or higher, such as 75%, or even higher. Contact protocols of interest include, but are not limited to, direct contacting protocols (e.g., bubbling the gas through the volume of the aqueous solution), concurrent contacting and mixing (e.g., contact between unidirectional flowing gaseous and liquid phase streams), countercurrent means (e.g., contact between oppositely flowing gaseous and liquid phase streams), and the like. Thus, contact may be accomplished through use of infusers, bubblers, fluidic Venturi reactors, spargers, gas filters, sprays, trays, flat streams, or packed column reactors, and the like, as may be convenient and as described in U.S. Pat. No. 7,379,487; U.S. Provisional Patent Application No. 61/158, 992, filed 10 Mar. 2009; U.S. Provisional Patent Application No. 61/228,210, filed 24 Jul. 2009; U.S. Provisional Patent Application No. 61/178,360, filed 14 May 2009; U.S. Provisional Patent Application No. 61/221,457, filed 29 Jun. 2009; U.S. Provisional Patent Application No. 61/221,631, filed 30 Jun. 2009; U.S. Provisional Patent Application No. 61/223, 657, filed 7 Jul. 2009; U.S. Provisional Patent Application No. 61/289,657, filed 23 Dec. 2009, each of which is incorporated herein by reference in its entirety. In various embodiments, the waste gas stream (e.g. combustion gas) may be processed before being used to charge the aqueous solution. For example, as, desired, the waste gas stream may be subjected to oxidation conditions (e.g., to convert CO to $CO_2$, NO to $NO_2$, and $SO_2$ to $SO_3$), as described for example in U.S. Pat. No. 5,670,122, which is incorporated herein by reference in its entirety.

Amorphous or crystalline precipitation material comprising carbonates, bicarbonates, or carbonates and bicarbonates, which may further comprise sulfates, sulfites, and/or the like, may be precipitated in processor (210) (e.g., reactor). Precipitation conditions include those that change the chemical and/or physical environment of the aqueous solution to produce the desired precipitation material. For example, the temperature of the water may be raised to an amount suitable for precipitation of a desired carbonate or sulfate compound to occur. In such embodiments, the temperature of the water may be raised to a temperature from 5 to 70° C., such as from 20 to 50° C., and including from 25 to 45° C. As such, while a given set of precipitation conditions may have a temperature ranging from 0 to 100° C., the temperature may be raised in certain embodiments to produce the desired precipitation material. In certain embodiments, the temperature may be raised using energy generated from low or zero carbon dioxide emission sources (e.g., solar energy, wind energy, hydroelectric energy, etc.).

While the pH of the aqueous solution may range from pH 5 to pH 14 (e.g., pH 7 to pH 14) during a given precipitation process, in certain embodiments the pH may be raised to alkaline levels in order to drive the precipitation of carbonate and/or sulfur-based (e.g., $SO_4$, $SO_3$, etc.) compounds as well as other compounds (e.g., hydroxide compounds and metal complexes) and particulate matter as desired. In certain of these embodiments, the pH is raised to a level that minimizes if not eliminates NOx, SOx, and/or $CO_2$ gas generation from the processor (e.g., reactor) during precipitation. Such pH levels cause dissolved gases, in the form of, for example, carbonates, bicarbonates, sulfates, sulfites, and the like, to be trapped in the precipitation material. In these embodiments, the pH may be raised to pH 9 or higher, such as pH 10 or higher, including pH 11 or higher. Where desired, the pH of the water is raised using any convenient approach including the use of the electrochemical system of FIG. 3 as described herein. In certain embodiments, a proton-removing agent (e.g., pH-modifying agent) may be employed, where examples of such proton-removing agents include oxides, hydroxides (e.g., sodium hydroxide, potassium hydroxide, $Mg(OH)_2$), carbonates (e.g. sodium carbonate), and the like. The amount of proton-removing agent (e.g., pH-modifying agent) that is added to the divalent cation-cation containing aqueous solution may depend on the particular nature of the proton-removing agent and the volume of the aqueous solution being modified, and may be sufficient to raise the pH of the divalent cation-cation containing aqueous solution to the desired value.

Charging the aqueous solution with combustion gas and precipitation of precipitation material (e.g., carbonates, sulfates, sulfites, and/or the like) may occur in a continuous process or in separate process steps. As such, charging and precipitation may occur in the same processor (e.g., reactor) as shown in FIG. 2A, which is illustrative and in no way limits the invention to FIG. 2A. In other embodiments, these two (or more) steps may occur in separate processors or separate units within a processor (e.g., gas-liquid contactor, gas-liquid-solid contactor, reactor, etc.). In such embodiments, for example, the aqueous solution may first be charged in a gas-liquid or gas-liquid-solid contactor and the resultant combustion gas-charged aqueous solution may then subjected to precipitation conditions in a separate reactor. Similarly, it will be appreciated that one or more components of the waste gas stream may be removed from the waste gas stream through physical trapping in the precipitation material, or through a combination of physical trapping and precipitation. Thus, for example, mercury or other heavy metals, particulate matter, organics, and/or other components may be trapped in the precipitation material that renders them stable under desired conditions.

With reference to FIG. 2A, which is illustrative and in no way limits the following description to FIG. 2A, a storage stable product may be precipitated in processor 210, which may occur in a sub-system thereof, including, but not limited to a gas-liquid contactor, a gas-liquid-solid contactor, a reactor, or in any combination of the foregoing. As above, precipitation conditions of interest include those that modulate the chemical and/or physical environment of the aqueous solution to produce the desired precipitation material. For example, the temperature of the aqueous solution may be raised to an amount suitable for precipitation of a desired carbonate or sulfate compound to occur. In certain embodiments, excess and/or process heat from the industrial plant carried in the waste gas stream may be employed to raise the temperature of the aqueous solution during precipitation either as hot gases or steam. In certain embodiments, contact of the water with the waste gas stream may have raised the aqueous solution to the desired temperature, where in other embodiments, the aqueous solution may need to be cooled to the desired temperature.

In various embodiments, ash is employed as a pH-modifying agent, e.g., to increase the pH of the combustion gas-charged aqueous solution. Ash may be used as the sole pH modifier or in conjunction with one or more additional pH modifiers. Of interest in certain embodiments is use of a coal ash as the ash, which coal ash may be the residue produced in power plant boilers or coal burning furnaces, for example, chain grate boilers, cyclone boilers, and fluidized bed boilers, from burning pulverized anthracite, lignite, bituminous, or sub-bituminous coal. Such coal ash includes fly ash, which is the finely divided coal ash carried from the furnace by exhaust or flue gases, and bottom ash which collects at the base of the furnace as agglomerates.

Fly ashes are generally highly heterogeneous, and include of a mixture of glassy particles with various identifiable crystalline phases such as quartz, mullite, and various iron oxides. Fly ashes of interest include Type F and Type C fly ash. The Type F and Type C fly ashes referred to above are defined by CSA Standard A23.5 and ASTM C618. The chief difference between these classes is the amount of calcium, silica, alumina, and iron content in the coal ash. The chemical properties of the fly ash are largely influenced by the chemical content of the coal burned (i.e., anthracite, bituminous, and lignite). Fly ashes of interest include substantial amounts of silica (silicon dioxide, $SiO_2$) (both amorphous and crystalline) and lime (calcium oxide, CaO, magnesium oxide, MgO).

Table 1 below provides the chemical makeup of various types of fly ash that find use in embodiments of the invention.

TABLE 1

Chemical makeup of various types of fly ash.

| Component | Bituminous | Sub-bituminous | Lignite |
|---|---|---|---|
| $SiO_2$ (%) | 20-60 | 40-60 | 15-45 |
| $Al_2O_3$ (%) | 5-35 | 20-30 | 20-25 |
| $Fe_2O_3$ (%) | 10-40 | 4-10 | 4-15 |
| CaO (%) | 1-12 | 5-30 | 15-40 |

The burning of harder, older anthracite and bituminous coal typically produces Class F fly ash. Class F fly ash is pozzolanic in nature, and contains less than 10% lime (CaO). Fly ash produced from the burning of younger lignite or sub bituminous coal, in addition to having pozzolanic properties, also has some self-cementing properties. In the presence of water, Class C fly ash will harden and gain strength over time. Class C fly ash generally contains more than 20% lime (CaO). Alkali and sulfate ($SO_4$) contents are generally higher in Class C fly ashes.

Fly ash material solidifies while suspended in exhaust gases and is collected using various approaches, for example, by electrostatic precipitators or filter bags. Since the particles solidify while suspended in the exhaust gases, fly ash particles are generally spherical in shape and range in size from 0.5 μm to 100 μm. Fly ashes of interest include those in which at least about 80%, by weight comprises particles of less than 45 microns. Also of interest in certain embodiments of the invention is the use of highly alkaline fluidized bed combustor (FBC) fly ash.

Also of interest in various embodiments is the use of bottom ash. Bottom ash is formed as agglomerates in coal combustion boilers from the combustion of coal. Such combustion boilers may be wet bottom boilers or dry bottom boilers. When produced in a wet or dry bottom boiler, the bottom ash is quenched in water. The quenching results in agglomerates having a size in which 90% fall within the particle size range of 0.1 mm to 20 mm, where the bottom ash agglomerates have a wide distribution of agglomerate size within this range. The main chemical components of a bottom ash are silica and alumina with lesser amounts of oxides of Fe, Ca, Mg, Mn, Na, and K, as well as sulfur and carbon.

Also of interest in certain embodiments is the use of volcanic ash as the ash. Volcanic ash is made up of small tephra (i.e., bits of pulverized rock and glass created by volcanic eruptions) less than 2 millimeters (0.079 in) in diameter.

In various embodiments, cement kiln dust (CKD) may be added to the composition-producing reaction mixture as a means of modifying pH. The nature of the fuel and the means of combusting the fuel for calcining may influence the chemical composition of the CKD, which may contain ash from the fuel. Thus, ash and/or CKD may be used as a portion of the means for modifying pH, or the sole means, and a variety of other components may be utilized with specific ashes and/or CKDs, based on chemical composition of the ash and/or CKD.

In some embodiments, ash is added to the aqueous solution (e.g., precipitation reaction mixture) as one source of these additional reactants, to produce precipitation material, which may contain one or more components such as amorphous silica, crystalline silica, calcium silicates, calcium alumina silicates, or any other moiety which may result from the reaction of ash in the process for producing compositions of the invention.

The ash employed in various embodiments may be contacted with the aqueous solution to achieve a desired pH using any convenient protocol, including, for example, placing an amount of ash into the processor (e.g., reactor) holding the aqueous solution, where the amount of ash added is sufficient to raise the pH to the desired level; flowing the aqueous solution through an amount of the ash, in the form of a column or bed; etc.

In certain embodiments where the pH is not raised to a level of pH 12 or higher, the fly ash employed may not dissolve but instead may remain as a particulate composition. Undissolved fly ash may be separated (e.g., filtered) from the remainder of the reaction product (e.g., precipitation material) for a subsequent use. Alternatively, the aqueous solution may be flowed through an amount of fly ash that is provided in an immobilized configuration (e.g., in a column or analogous structure), which provides for flow through of an aqueous solution through the fly ash but does not allow fly ash to flow out of the structure with the aqueous solution. This embodiment does not require separation of undissolved fly ash from the product solution. In yet other embodiments where the pH exceeds 12, the fly ash may dissolve and provide for pozzolanic products as described in greater detail below.

In embodiments where fly ash is utilized in the producing compositions of the invention, the fly ash may first be removed from the flue gas by means such as electrostatic precipitation, or may be utilized directly via the flue gas. The use of fly ash in some embodiments of the invention may provide reactants such as alumina or silica in addition to raising the pH.

In certain embodiments, slag is employed as a pH-modifying agent, for example, to increase the pH of the combustion gas-charged water. The slag may be used as a as the sole pH modifier or in conjunction with one or more additional pH modifiers (e.g., ashes, etc.). Slag, which is generated from the processing of metals, may contain calcium and magnesium oxides as well as iron, silicon and aluminum compounds. In certain embodiments, the use of slag as a pH-modifying material may provide additional benefits via the introduction of reactive silica and alumina to the precipitation material. Slags of interest include, but are not limited to, blast furnace slag from iron smelting, slag from electric-arc or blast furnace processing of steel, copper slag, nickel slag, and phosphorus slag.

As indicated above, ash (or slag in certain embodiments) may be employed in certain embodiments as the sole way to modify the pH of the aqueous solution to the desired level. In yet other embodiments, one or more additional pH-modifying agents or methods may be employed in conjunction with the use of ash.

Where desired, additives other than pH-modifying agents may also be introduced into the aqueous solution in order to influence the nature of the precipitation material that is produced. As such, certain embodiments of the methods include providing an additive in the aqueous solution before or during the time when the aqueous solution is subjected to the precipitation conditions. Certain calcium carbonate polymorphs may be favored by trace amounts of certain additives. For example, vaterite, a highly unstable polymorph of $CaCO_3$ that precipitates in a variety of different morphologies and converts rapidly to calcite, may be obtained at very high yields by including trace amounts of lanthanum as lanthanum chloride in a supersaturated solution of calcium carbonate. Other additives besides lanthanum that are of interest include, but are not limited to, transition metals and the like. For instance, the addition of ferrous or ferric iron is known to favor the formation of disordered dolomite (protodolomite) where it would not form otherwise.

Accordingly, a set of precipitation conditions to produce a desired precipitation material from a divalent cation-containing aqueous solution includes, in certain embodiments, reaction temperature and pH, and, in some instances, the concentrations of additives and ionic species in the aqueous solution. Precipitation conditions may also include factors such as mixing rate, forms of agitation such as ultrasonics, and the presence of seed crystals, catalysts, membranes, or substrates. In some embodiments, precipitation conditions include supersaturated conditions, temperature, pH, and/or concentration gradients, or cycling or changing any of these parameters. The protocols employed to prepare precipitation material according to the invention may be batch or continuous protocols. It will be appreciated that precipitation conditions may be different to produce a given precipitation material in a continuous flow system compared to a batch system.

In certain embodiments, contact between the divalent cation-containing aqueous solution and the combustion gas may be accomplished using any convenient protocol (e.g., spray gun, segmented flow-tube reactor) to control the range of sizes of precipitation material particles. One or more additives may be added to the source of divalent cations to control the range of sizes of precipitation material, including, but not limited to, flocculants, dispersants, surfactants, anti-scalants, crystal growth retarders, sequestration agents, etc.

Contact of the divalent cation-containing aqueous solution with the waste gas stream (e.g., combustion gas) may occur before, during, and/or after the time when the aqueous solution is subjected to precipitation conditions. Accordingly, embodiments of the invention include methods in which the aqueous solution is contacted with the waste gas stream prior to subjecting the solution to mineral precipitation conditions. Embodiments of the invention also include methods in which the aqueous solution is contacted with the waste gas stream while the aqueous solution is being subjected to precipitation conditions. Embodiments of the invention include methods in which the aqueous solution is contacted with the waste gas stream both prior to subjecting the aqueous solution to precipitation conditions and while the aqueous solution is being subjected to precipitation conditions. In some embodiments, the same aqueous solution may be cycled more than once, wherein a first cycle of precipitation removes, for example, carbonates (e.g., calcium carbonate, magnesium carbonate) and sulfates, and leaves remaining an aqueous solution to which other sources of divalent cations may be added for further precipitation (i.e., more waste gas may be cycled through it to cause more precipitation material).

In various embodiments, adjustments of the parameters described herein for precipitation may be used to optimize the amount of a particular component that is trapped, or precipitated, or both precipitated and trapped in precipitation material. It will be appreciated that in some embodiments it is desired not to precipitate or trap a component of the waste gas stream or to minimize such trappings. Thus, in some embodiments, conditions may be adjusted to decrease, minimize, or substantially eliminate the inclusion of one or more components of the waste gas stream in the precipitation material. Such components may include one or more of the components described herein (e.g., mercury, other heavy metals, radioactive substances, and the like).

Regardless of when the waste gas stream is contacted with the aqueous solution, in some instances when the waste gas stream is contacted with the aqueous solution, the aqueous solution is not exceedingly alkaline, such that the solution may have a pH of pH 10 or lower, or pH 9.5 or lower, or pH 9 or lower, or even pH 8 or lower. In some embodiments, the aqueous solution contacted with the waste gas stream is not a aqueous solution that has first been made basic (e.g., from the addition of proton-removing agents or from an electrochemical protocol). In some embodiments, the aqueous solution that is contacted with the waste gas stream is not an aqueous solution that has been made basic by addition of proton-removing agents such as hydroxides (e.g., sodium hydroxide). In some embodiments, the aqueous solution is one that has been made only slightly alkaline, such as by addition of an amount of proton-removing agent such as an oxide (e.g., calcium oxide, magnesium oxide, etc.).

Following precipitation of precipitation material (e.g., carbonates, sulfates, sulfites, and/or the like) from the aqueous solution, the resultant precipitation material may be separated. Separation of the precipitation material may be achieved using any of a number of convenient approaches, including draining (e.g., gravitational sedimentation of the precipitation material followed by draining), decanting, filtering (e.g., gravity filtration, vacuum filtration, filtration using forced air), centrifuging, pressing, or any combination thereof. For example, separation of the precipitation material may be achieved as described in U.S. Provisional Patent Application No. 61/168,166, filed 9 Apr. 2009, which is incorporated herein by reference. Separation of bulk water from the precipitation material produces a concentrated composition of precipitation material, wherein the concentrated composition is concentrated with respect to carbonates and/or bicarbonates, and any other co-products resulting from processing an industrial waste gas stream. The concentrated composition may also be considered dewatered precipitation material or a wet cake of precipitation material depending upon the degree of water removed. In some embodiments, the concentrated composition comprises at least 10%, 15%, 20%, 25%, 30%, 35%, 40%, 45%, 50%, 55%, 60%, 65%, 70%, 75%, 80%, 85%, 90%, 95%, 99% precipitation material (i.e., solids) with the balance being water or a solution thereof.

The precipitation material may also be isolated with a liquid-solid separator (222) of treatment system 220 to produce a wet cake of precipitation material and a supernatant as shown in FIG. 2A, which is illustrative and in no way limits the following description to FIG. 2A. (See also U.S. Provisional Patent Application No. 61/168,166, filed 9 Apr. 2009, which is incorporated herein by reference in its entirety.) In some embodiments the precipitation material is not separated, or is only partially separated. In such embodiments, the supernatant, optionally including some or all of the precipitation material, may be disposed of by any suitable means. In some embodiments, a composition comprising the supernatant and, optionally, some or all of the precipitation material, may be transported (e.g., by a) to a land- or water-based location and placed at that location. For example, in such embodiments, the composition, including supernatant relatively fee of precipitation material, may be disposed above ground, underground, in water (e.g., ocean), underwater, or the like, as such compositions are suitable (e.g., meet permitted discharge limits of United States Environmental Protection Agency and/or state environmental agencies, such as National Pollutant Discharge Elimination System (NPDES) limits, as such discharge limits exist on the filing date of this patent application) for release into the environment. This is especially useful in embodiments where the source of divalent cations is seawater, as the concentration of sulfates in seawater may be far greater than the concentration of sulfates in compositions of the invention. As such, the added sulfates would negligibly increase the concentration of sulfates in the seawater. It will be appreciated that the carbon footprint, amount of energy used, and/or amount of combustion gases produced for sequestering a given amount of combustion gases from an industrial exhaust gas may be minimized in a process where no further processing beyond disposal occurs with the precipitation material.

The precipitation material resulting from separation (e.g., resultant dewatered precipitation material) may then be dried to produce a raw, dried product using a dryer (224) as shown in FIG. 2A, which is illustrative and in no way limits the following description to FIG. 2A. For example, drying may be achieved by air-drying the precipitation material. In embodiments in which the precipitation material is air dried, air-drying may be done at room or elevated temperature. In certain embodiments, the elevated temperature is provided by the waste gas stream of the industrial plant. In these embodiments, the waste gas stream (e.g., flue gas) from the power plant may be first used in the drying step, where the waste gas stream may have a temperature ranging from 30 to 700° C., such as 75 to 300° C. The waste gas stream may be contacted directly with wet precipitation material in the drying stage, or used to indirectly heat gases (such as air) in the drying stage. The desired temperature may be provided in the waste gas stream by having the gas conveyor, e.g., duct, from the industrial plant originate at a suitable location, e.g., at a location a certain distance in the HRSG or up the flue, as determined based on the specifics of the exhaust gas and configuration of the industrial plant. In some embodiments, the precipitation material may be spray dried to dry the precipitation material, wherein a slurry comprising the precipitation material may be dried by feeding it through a hot gas (e.g., waste gas stream from the power plant). For example, the slurry comprising the precipitation material may be pumped through an atomizer into a main drying chamber and a hot gas may be passed as a co-current or counter-current to the atomizer direction. In certain embodiments, drying is achieved by freeze-drying (i.e., lyophilization), where the precipitation material is frozen, the surrounding pressure is reduced and enough heat is added to allow the frozen water in the material to sublime directly from the frozen precipitation material to gas. Depending on the particular drying protocol of the system, the dryer may include a filtration element, freeze-drying structure, spray-drying structure, etc.

In some embodiments, the dewatered precipitation material or wet cake may be washed before drying, as shown at optional washer (226) of FIG. 2A, which is illustrative and in no way limits the following description to FIG. 2A. The dewatered precipitation material or wet cake may be washed with freshwater to remove salts (such as NaCl) from the material. Spent wash water may be disposed of as convenient, for example, by disposal in a tailings pond, etc. Thereafter, as illustrated, the washed precipitation material or washed wet cake may be dried in a dryer 224 to provide for desired physical characteristics in the raw, dried product such as particle size, surface area, etc. During drying, or sometime thereafter, one or more components may be added to the precipitation material such as admixtures, aggregate, supplementary cementitious materials, etc., to produce additional products.

The dried product (e.g., dried precipitation material) may be disposed of in a number of different ways. In certain embodiments, the dried product is transported to a location for long-term storage, effectively sequestering combustion gases (e.g., $CO_2$, SOx, NOx, etc.) and particulate matter in a storage-stable form (e.g., a combustion gas-sequestering material that may be stored above ground). For example, the precipitation material may be stored at a long-term storage site adjacent to the industrial plant and precipitation system. In yet other embodiments, the precipitation material may be transported and placed at long term storage sites, e.g., above ground, below ground, etc. as desired, where the long term storage site is distal to the power plant (which may be desirable in embodiments where real estate is scarce in the vicinity of the power plant). In these embodiments, where the precipitation material is transported to a long-term storage site, it may be transported in empty conveyance vehicles (e.g., barges, train cars, trucks, etc.) that were employed to transport the fuel or other materials to the industrial plant and/or precipitation plant. In this manner, conveyance vehicles used to bring fuel to the industrial plant, materials to the precipitation plant (e.g., alkali sources), and the like may be employed to transport precipitation material, and therefore sequester combustion gases from the industrial plant.

In some embodiments, compositions of the invention (e.g., solution, slurry, precipitation material, etc.) may be disposed of in an underwater or underground location, the choice of which may vary depending upon location and available resources. Compositions may be untreated (e.g., no water removed), treated to remove a portion of supernatant to produce a concentrated composition, dried (e.g., spray-dried precipitation material), or any such form described herein, including compositions comprising primarily supernatant. Underwater locations include, but are not limited to, inland underwater locations (e.g., under a freshwater lake) or ocean (or sea) underwater locations. The underwater location may be shallow including locations that are 1000 feet or less, such as 200 feet or less, including 150 feet or less, or deep, including locations that are 200 feet or more, such as 500 feet or more, 1000 feet or more, 2000 feet or more, including 5000 feet or more. Underground locations include any subterranean site (e.g., geological formation) of suitable impermeability and stability for long-term storage of compositions of the invention. A composition of the invention may be injected into an underground location that is 50 meters or more, 100 meters or more, 200 meters or more, 500 meters of more, or 1000 meters or more below the surface of the Earth. In some embodiments, the composition is injected into an underground location that is less than 3000 feet, less than 2500 feet, less than 2000 feet, less than 1500 feet, less than 1000 feet, less than 500 feet, less than 250 feet, or less than 100 feet below the surface of the Earth. In some embodiments, the composition is injected into a geological formation from which an aqueous brine was removed. A composition conveyor (e.g., pipe, duct, etc. configured with suitable pumps, etc.) configured to transport compositions of the invention (e.g., solution, slurry, precipitation material, etc.) may be used to effect disposal of compositions of the invention underwater or underground.

Where desired, the compositions made up of the precipitation material and the mother liquor may be stored for a period of time following precipitation and prior to disposal. For example, the composition may be stored for a period of time ranging from 1 to 1000 days or longer, such as 1 to 10 days or longer, at a temperature ranging from 1 to 40° C., such as 20 to 25° C.

In some embodiments of the invention nearly 100% of the NOx, SOx, and/or $CO_2$ contained in a flue gas from a power plant is sequestered in a stable mineral; this may be done in a single precipitation step (e.g., in a single processor) or in multiple precipitation steps (e.g., in multiple processors configured in series, parallel, or a combination thereof), and may further involve other processes for sequestering $CO_2$, e.g., as the concentration of $CO_2$ is decreased in the flue gas, more energy-intensive processes that be prohibitive in energy consumption for removing all of the original $CO_2$ in the gas may become practical in removing the final $CO_2$ in the gas. Thus, in some embodiments, the gas entering the power plant (ordinary atmospheric air) may contain a concentration of $CO_2$ that is greater than the concentration of $CO_2$ in the flue gas exiting the plant that has been treated by the processes and systems of the invention. Hence, in some embodiments, the methods and systems of the invention encompass a method comprising supplying a gas, e.g., atmospheric air, to a power plant, where the gas comprises $CO_2$; treating the gas in the power plant, e.g., by combustion of fossil fuel to consume $O_2$ and to produce $CO_2$ then treating exhaust gas to remove $CO_2$; and releasing gas from the power plant, where the gas released from the power plant has a lower $CO_2$ content than the gas supplied to the power plant. In some embodiments, the gas released from the power plant contains at least 10% less $CO_2$, or at least 20% less $CO_2$, or at least 30% less $CO_2$, or at least 40% less $CO_2$, or at least 50% less $CO_2$, or at least 60% less $CO_2$, or at least 70% less $CO_2$, or at least 80% less $CO_2$, or at least 90% less $CO_2$, or at least 95% less $CO_2$, or at least 99% less $CO_2$, or at least 99.5% less $CO_2$, or at least 99.9% less $CO_2$, than the gas entering the power plant; in some embodiments the gas entering the power plant is atmospheric air and the gas exiting the power plant is treated flue gas.

FIG. 2B, which is illustrative and in no way limits the following description to FIG. 2B, shows an embodiment of the system 200B configured such that a waste gas stream (e.g., combustion gas stream) may be selectively treated with one or more emission control technologies to remove one of more of the components (e.g., SOx, NOx, particulate matter, etc.) of the flue gas before the flue gas is introduced into the processor 210. Thus, as illustrated in FIG. 2B, at 232, in one embodiment, nitrogen oxide gases (NOx) may be removed from the waste gas stream before the waste gas stream is sent to the processor (210) (e.g., reactor); alternatively, by utilizing 232 and 234, both NOx and fly ash may be removed from the waste gas stream; similarly, by 232, 234, and 236, three components of the waste gas stream (NOx, fly ash, and SOx) may be removed before the gas is introduced into the processor.

As will be appreciated, the system as illustrated in FIG. 2B, as with any system of the invention, may accommodate optional NOx control technology (232) (e.g., selective catalytic reduction (SCR), non-selective catalytic reduction, etc.), optional particulate matter control technology (234) (e.g., electrostatic precipitator (ESP), fabric filter, etc.), and optional SOx control technology (236) (e.g., flue gas desulfurization (FGD), etc.), and, when present, emission control technology may be configured in any order to remove any desired components of the waste gas stream. Systems of the invention may be further configured to accommodate specific mercury control technologies (e.g., activated carbon injection (ACI)) as well. Systems may be built from the ground up to comprise such optional emission control technology, or existing industrial plants with emission control technology may be retrofitted with $CO_2$-processing systems. Whether or not an industrial plant coupled with a $CO_2$-processing system is built from the ground up or retrofitted, emissions from the industrial plant, the $CO_2$-processing system, or a combination of the industrial plant and the $CO_2$-processing system are designed to meet or improve upon emission control standards selected from the group consisting of Reasonably Available Control Technology (RACT); Best Available Control Technology (BACT); Maximum Achievable Control Technology (MACT); Lowest Achievable Emission Rate (LAER); and/or any United States Environmental Protection Agency (EPA) reference methods, as such emission control standards exist on the filing date of this patent application.

In some embodiments, systems of the invention comprise no NOx, SOx, or particulate matter control technology. For example, in such embodiments, a waste gas stream may be directly passed to a processor, optionally after cooling the waste gas stream with a heat exchanger. In some embodiments, systems of the invention comprise one emission control technology selected from the group consisting of NOx, SOx, or particulate matter control technology. For example, in such embodiments, the system may comprise NOx control technology. For example, in other embodiments, the system may comprise particulate matter control technology. In some embodiments, systems of the invention comprise two emission control technologies selected from the group consisting of NOx, SOx, or particulate matter control technology. For example, in such embodiments, the system may comprise NOx and particulate matter control technology, wherein the NOx control technology is placed before the particulate matter control technology. For example, in other embodiments, the system may comprise NOx and particulate matter control technology, wherein the particulate matter control technology is placed before the NOx control technology. In some embodiments, systems of the invention comprise NOx, SOx, and particulate matter control technologies. For example, in such embodiments, the system may comprise NOx, SOx, and particulate matter control technologies, wherein the NOx control technology is placed before the particulate matter control technology. For example, in other embodiments, the system may comprise NOx, SOx, and particulate matter control technologies, wherein the particulate matter control technology is placed before the NOx control technology. Heat exchangers may be used as appropriate in the system to bring the temperature of the flue gas down to an appropriate temperature for the emission control technology. For example, heat exchangers may be used to bring the temperature down to the appropriate temperature range for efficient scrubbing of NOx in a NOx control technology or SOx in a SOx control technology. Furthermore, any of the emission control technologies may be configured to provide material for the purpose of processing $CO_2$. For example, in some embodiments, a particulate matter control technology (e.g., electrostatic precipitator, fabric filter, etc.) may be configured to provide collected particulate matter such as fly ash (e.g., an industrial waste source of proton-removing agents and/or divalent cations) to a processor of the invention (a front-end addition of fly ash). In some embodiments, a particulate matter control technology (e.g., electrostatic precipitator, fabric filter, etc.) may be configured to provide collected particulate matter such as fly ash to a composition (e.g., supplementary cementitious material, a blend of Portland cement with a supplementary cementitious material, etc.) of the invention (a back-end addition of fly ash). Such uses of fly ash (e.g., replacement of a portion of cement or cementitious material) are known in the art.

Systems of the invention and systems in combination with various industrial plants may meet or improve upon pollution control standards such as Reasonably Available Control Technology (RACT); Best Available Control Technology (BACT); Maximum Achievable Control Technology (MACT); Lowest Achievable Emission Rate (LAER); and/or any United States Environmental Protection Agency (EPA) reference methods, as such pollution control standards exist on the filing date of this patent application. Meeting or improving upon such pollution control standards are possible when a $CO_2$-processing system of the invention captures at least 10%, 20%, 30%, 40%, 50%, 60%, 70%, 80%, 90%, 95%, 99%, or 99.9% of the $CO_2$ being emitted by the industrial plant (e.g., coal-fired power plant). As systems of the invention are effective at meeting or improving upon pollution control standards, $CO_2$-processing systems of the invention may even be shut down for a short period of time (e.g., hours, days, etc.) for maintenance or during periods of high demand (e.g., high energy demand) and still meet or improve upon pollution control standards such as RACT, BACT, MACT, LAER; and/or any United States Environmental Protection Agency (EPA) reference methods, as such pollution control standards exist on the filing date of this patent application. For example, high energy demand at a coal-fired power plant may require the power plant to utilize reserve capacity (e.g., 10% reserve capacity) and/or the energy reserved for operation of a $CO_2$-processing system of the invention. In such a scenario, the $CO_2$-processing system may be powered down and emissions (e.g., $CO_2$, SOx, Hg, etc.) that would otherwise be processed by the system would be released to the atmosphere, optionally through other emission control technologies (e.g., NOx, particulate matter, and/or SOx control technologies), if such emission control technologies are present. Since the coal-fired power plant might only be run for a few hours a year without a $CO_2$-processing system of the invention controlling emissions, the power plant may still meet or improve upon pollution control standards. Additional money would not need to be spent for spare capacity and increases in pollution during such spare capacity operation.

Systems of the invention, including systems such as that shown in FIG. 2, may be configured to effect oxidation of components in the waste gas stream. Oxidation of components in the waste gas stream comprises subjecting the waste gas stream to hydrogen peroxide ($H_2O_2$) or a $H_2O_2/CH_3OH$ mixture as described above. An exemplary description of systems and methods for oxidizing a $CO_2$-containing gaseous stream using hydrogen peroxide may be found in U.S. Pat. No. 5,670,122, which is incorporated herein by reference in its entirety. A gaseous stream may be treated with hydrogen peroxide for a sufficient time to oxidize components therein, for example, to convert one or more of nitric oxide (NO), sulfur trioxide ($SO_3$), light hydrocarbons ($C_1$-$C_4$), carbon monoxide (CO) and mercury to $NO_2$, $SO_2$, $CO_2$ and HgO, respectively. The gaseous stream may be treated with a hydrogen peroxide or a $H_2O_2/CH_3OH$ mixture prior to contacting the gaseous stream with an aqueous solution (e.g., an aqueous solution comprising divalent cations, proton-removing agents, or a combination thereof). In some embodiments, a processed waste gas stream, recovered after contacting a gaseous stream with an aqueous solution, may be treated with a $H_2O_2/CH_3OH$ mixture and reprocessed in a processor of the invention to capture any remaining components of the waste gas stream.

The reaction time of the hydrogen peroxide or $H_2O_2/CH_3OH$ mixture may be in the range from about 0.01 to about 5 seconds, for example, from about 0.1 to about 2 seconds. The $NO_2$, $SO_2$, $CO_2$, and HgO (and other components of the waste gas stream) may then be removed by absorption into an aqueous solution (e.g., an aqueous solution comprising divalent cations, proton-removing agents, or a combination thereof). In some embodiments, $CO_2$-charged solution may then subjected to the precipitation conditions to form precipitation material comprising one or more of the components from the gaseous stream (e.g., $NO_2$, $SO_2$, $CO_2$, HgO, etc.). As such, the invention provides a quick and efficient method for removing a wide variety of components from a waste gas stream (e.g., $CO_2$, criteria pollutants, and/or other toxic or environmentally harmful components) such that the components are not emitted to the atmosphere in dangerously high concentrations. For example, the invention may be used to remove these components from waste gas streams (e.g., flue gases) emanating from boilers, furnaces, incinerators, stationary engines, and other systems for combustion of various types of fuels.

As described above the molar ratio of injected $H_2O_2$ (MeOH) to total pollutants may be 0.01 to 5.0, such as 0.1 to 4.0, including 0.1 to 3.0, for example, 0.1 to 2.0, 0.1 to 1.0, or 0.1 to 0.5. Such ratios may also be effective when aqueous $H_2O_2$ or aqueous $H_2O_2$ in methanol is used. In some embodiments, for example, the molar ratio of injected $H_2O_2$ (MeOH or $H_2O$) to total pollutants may be 0.5 to 2.0. In some embodiments, for example, the molar ratio of injected $H_2O_2$ (MeOH or $H_2O$) to total pollutants may be 0.9 to 1.5. Hydrogen peroxide may be injected (e.g., in the form of a methanolic or aqueous solution) at a concentration of 1% to 50%, for example, from 10% to about 30%.

The use of hydrogen peroxide in systems and methods of the invention has many advantages. If properly stored, hydrogen peroxide solutions are very stable. The use of hydrogen peroxide does not pose any environmental problems since hydrogen peroxide is not itself a source of pollution, and the only reaction by-products are water and oxygen. Therefore, hydrogen peroxide can be used safely in the invention.

Referring to FIG. 2C, which is illustrative and in no way limits the following description to FIG. 2C, in one embodiment, a system 200C comprises a processor (210) comprising a gas-liquid or gas-liquid-solid contactor adapted for contacting a carbon dioxide-rich waste gas stream 230 with an aqueous cation solution comprising divalent cations 250 to cause neutralization of constituents in a waste stream 240, and to form a carbonate-containing precipitation material with the cations in the aqueous solution. As illustrated, the system includes a source of proton-removing agents 240 (e.g., OH$^-$) contained in the waste source. In various embodiments the OH$^-$ in the waste source is utilized to adjust the pH of the aqueous solution to promote the absorption of the combustion gases (e.g., carbon dioxide, NOx and SOx) in the solution, and to cause components in the waste gas stream to react with the cations in the solution to form a carbonate-containing precipitation material in the solution. Examples of suitable waste streams include red mud containing sodium hydroxide and fly ash containing calcium oxide.

In various embodiments, the interaction of the waste gas stream 230 with the solution 250 in the processor 210 results in formation of a slurry comprising particulate matter from the waste gas stream and precipitation material formed from the gases interacting with cations in the solution. In various embodiments, the slurry is directed to a liquid-solid separator 222 where, as in shown in FIGS. 2A and 2C, which are merely illustrative of the invention described herein, it is separated into a concentrated composition (e.g., wet cake) and a supernatant. In various embodiments, as illustrated in FIG. 2C, for example, the supernatant, depleted of divalent cations, hydroxide ions and precipitation material, is forwarded to desalination. In other embodiments, optionally at least a portion of the supernatant is replenished with alkaline earth metal cations and proton-removing agents and re-circulated to the processor 210. Optionally, as shown in FIG. 2A, which is illustrative and in no way limits the following description to FIG. 2A, the wet cake from the liquid-solid separator 222 is washed in a washing station 226 with clean water to remove soluble salts from the wet cake to produce a desalinated wet cake and wash water. From the washing station, the wet cake may be dried in a dryer 224 to form a raw, dried product. As above, the raw, dried product, in turn, may be refined in a refinery to produce a refined product. Raw, dried product or refined product may be used to prepare building materials of the invention in a manufacturing system (228) depending upon the specification of the building material. Building materials may include cement, fine aggregate, mortar, coarse aggregate, concrete, pozzolan, or a combination thereof, further described in U.S. patent application Ser. No. 12/126,776, filed 23 May 2008; U.S. patent application Ser. No. 12/344, 019, filed 24 Dec. 2008; U.S. patent application Ser. No. 12/475,378, filed 29 May 2009; and U.S. patent application Ser. No. 12/604,383, filed 22 Oct. 2008, each of which is incorporated herein by reference.

Systems of the invention, as shown in FIG. 2C, which is illustrative and in no way limits the following description to FIG. 2C, equipment that can be used to neutralize the waste components and produce a building product from the resulting precipitation material are commercially available but may need customization. Also, as shown, the system 200C in various embodiments comprises a waste source 240 of proton-removing agents (e.g., OH$^-$) for supplying hydroxide ions to cause formation of precipitation material in the processor 210. Although in the embodiment of FIG. 2C source of proton-removing agents (e.g., OH$^-$) is available in the waste stream 240, red mud, fly ash, or any convenient source of proton-removing agents may be used (e.g., commercially available sodium hydroxide). Thus, in one embodiment, the system includes an electrochemical system for supplying hydroxide ions to the aqueous cation solution as described above with reference to FIG. 2A, and as is illustrated in FIG. 3, and as is described in commonly assigned International Patent Application No. PCT/US08/088,242, filed 23 Dec. 2008, which is incorporated herein by reference in its entirety.

With reference to FIG. 2C, which is illustrative and in no way limits the following description to FIG. 2C, the waste gas stream 230 comprising combustion gas is contacted with the divalent cation aqueous solution to produce a gas-charged aqueous solution. By gas-charged aqueous solution is meant an aqueous cation solution comprising combustion gases, wherein combustion gas molecules have combined with water molecules to produce a new chemical species, e.g., carbonic acid, hydrochloric acid, nitric acid, sulfuric acid, bicarbonate, carbonate, or where the combustion gas molecules have merely dissolved in the water. A gas-charged water also includes an aqueous solution comprising particulate matter entrained in the aqueous solution from the combustion gases. In various embodiments the combustion gases include carbon dioxide and carbon monoxide (COx); nitrogen oxides (NOx); sulfur oxides (SOx) and sulfides; halides such as hydrogen chloride and hydrogen fluoride, which may also be considered acid gases along with, for example, SOx (e.g., $SO_3$, $SO_2$); particulate matter such as fly ash, dusts and metals including arsenic, beryllium, boron, cadmium, chromium, chromium VI, cobalt, lead, manganese, mercury, molybdenum, selenium, strontium, thallium, and vanadium; and organics such as hydrocarbons, radioactive materials, dioxins, and PAH compounds. In various embodiments, the invention provides a system adaptable for treating an input combustion gas stream comprising all, or one, or more than one of these components simultaneously.

Charging the aqueous cation solution in a processor (e.g., processor 210 of FIG. 2C) results in an increase in the combustion gas content in the aqueous solution, e.g., in the form of carbonic acid, bicarbonate, and/or carbonate ion, and a decrease in concentration of outlet gases that exits the processor. In various embodiments, the combustion gas-charged aqueous solution is acidic, having a pH of 6 or less, such as 5 or less and including 4 or less. In certain embodiments, the concentration of $CO_2$, NOx and/or SOx of the gas that is used to charge the water is 0.1%, 1%,5%,10% or higher, 25% or higher, including 50% or higher, such as 75% or even higher. Contact protocols of interest include, but are not limited to: direct contacting protocols, e.g., bubbling the gas through the volume of the aqueous solution, concurrent contacting and mixing, e.g., contact between unidirectional flowing gaseous and liquid phase streams, countercurrent means, e.g., contact between oppositely flowing gaseous and liquid phase streams, and the like. Thus, contact may be accomplished through use of infusers, bubblers, fluidic Venturi reactor, sparger, gas filter, spray, tray, flat stream or packed column reactors, and the like, as may be convenient and as described in U.S. Pat. No. 7,379,487, which is incorporated herein by reference in its entirety. In various embodiments the gas may be processed before being used to charge the aqueous solution. For example, the gas may be subjected to oxidation conditions, e.g., to convert CO to $CO_2$, NO to $NO_2$, and $SO_2$ to $SO_3$, as desired as described for example in U.S. Pat. No. 5,670,122, which is incorporated herein by reference in its entirety.

With reference to FIG. 2C, which is illustrative and in no way limits the following description to FIG. 2C, at processor 210, carbonate compounds, sulfate and sulfite compounds that may be amorphous or crystalline, are precipitated. Where the waste source 240 comprises a solid waste that does not dissolve in the aqueous solution (e.g. red mud or fly ash), the base in the waste may be neutralized and precipitation material may thus contain neutralized solids, e.g., neutralized red mud or fly ash as appropriate. Precipitation conditions include those that change the physical environment of the aqueous solution to produce the desired precipitation material. For example, the temperature of the water may be raised to an amount suitable for precipitation of the desired carbonate or sulfate compound(s) to occur. In such embodiments, the temperature of the water may be raised to a value from 5 to 70° C., such as from 20 to 50° C. and including from 25 to 45° C. As such, while a given set of precipitation conditions may have a temperature ranging from 0 to 100° C., the temperature may be raised in certain embodiments to produce the desired precipitation material. In certain embodiments, the temperature is raised using energy generated from low or zero carbon dioxide emission sources, e.g., solar energy source, wind energy source, hydroelectric energy source, and the like.

FIGS. 4-11 illustrate various embodiments of methods of the invention whereby a waste gas stream may be treated to remove combustion components and form a composition (e.g., precipitation material). In some embodiments, the method provides for trapping at least two components of an industrial waste gas, e.g., a flue gas, in a solid form, e.g. precipitating the component or a derivative of the component from an aqueous solution, or physically trapping the component or a derivative of the component in a precipitation material or other solid form, or a combination of precipitation and trapping. Components may include $CO_2$, CO, SOx, NOx, mercury, arsenic, lead, selenium, fluorine, chlorine, hydrogen chloride, hydrogen fluoride, particulate matter (e.g., fly ash), and hydrocarbons. In some embodiments, at least 10, 20, 30, 40, 50, 60, 70, 80, 90, 95, or 99% of the $CO_2$, if present, is removed from the industrial waste gas. In some embodiments, at least 10, 20, 30, 40, 50, 60, 70, 80, 90, 95, or 99% of the CO, if present, is removed from the industrial waste gas. In some embodiments, at least 10, 20, 30, 40, 50, 60, 70, 80, 90, 95, or 99% of the SOx, if present, is removed from the industrial waste gas. In some embodiments, at least 10, 20, 30, 40, 50, 60, 70, 80, 90, 95, or 99% of the NOx, if present, is removed from the industrial waste gas. In some embodiments, at least 10, 20, 30, 40, 50, 60, 70, 80, 90, 95, or 99% of the mercury, if present, is removed from the industrial waste gas. In some embodiments, at least 10, 20, 30, 40, 50, 60, 70, 80, 90, 95, or 99% of the arsenic, if present, is removed from the industrial waste gas. In some embodiments, at least 10, 20, 30, 40, 50, 60, 70, 80, 90, 95, or 99% of the lead, if present, is removed from the industrial waste gas. In various embodiments, at least 10, 20, 30, 40, 50, 60, 70, 80, 90, 95, or 99% of the components of the combustion gas is removed from the waste gas stream.

Thus, in some embodiments the invention provides a process for treating an industrial waste gas that contains $CO_2$ and SOx, wherein the process removes at least 10, 20, 30, 40, 50, 60, 70, 80, 90, 95, or 99% of the $CO_2$, and at least 10, 20, 30, 40, 50, 60, 70, 80, 90, 95, or 99% of the SOx, e.g., by trapping the $CO_2$ and SOx, or derivatives of one or both, in a solid form, such as a precipitation material from an aqueous solution. In some embodiments the invention provides a method for treating an industrial waste gas that contains $CO_2$ and SOx, wherein the process removes at least 10% of the $CO_2$, and at least 10, 20, 30, 40, 50, 60, 70, 80, 90, 95, or 99% of the SOx. In some embodiments the invention provides a process for treating an industrial waste gas that contains $CO_2$ and SOx, wherein the process removes at least 30% of the $CO_2$, and at least 10, 20, 30, 40, 50, 60, 70, 80, 90, 95, or 99% of the SOx. In some embodiments the invention provides a process for treating an industrial waste gas that contains $CO_2$ and SOx, wherein the process removes at least 50% of the $CO_2$, and at least 10, 20, 30, 40, 50, 60, 70, 80, 90, 95, or 99% of the SOx. In some embodiments the invention provides a process for treating an industrial waste gas that contains $CO_2$ and SOx, wherein the process removes at least 70% of the $CO_2$, and at least 10, 20, 30, 40, 50, 60, 70, 80, 90, 95, or 99% of the SOx.

In some embodiments, a waste gas stream may be pre-treated (e.g., as described in reference to FIG. 2B) to increase the solubility, oxidation state, or other properties of one or more of the waste gas components in order to make one or more of the components more amenable to the processes of the invention (e.g., precipitation or otherwise entrapping the component in a stable solid form). In such embodiments, pre-treatment may occur in one step or more than one step, for example, in 2, 3, 4, 5, 6, 7, 8, 9, 10, or more than 10 pre-treatment steps. In some embodiments of the invention, the waste gas stream is not pre-treated. In some embodiments, the waste gas stream is pre-treated with a particulate matter control technology (e.g., electrostatic precipitator, fabric filter, etc.) to remove particulate matter such as fly ash.

Particulate matter, e.g. fly ash, may be removed at the stage of precipitation, or may be removed separately from the industrial gas before the precipitation reaction, or a combination of the two, e.g., some particulate matter is removed and the remaining particulate matter is precipitated. In some embodiments, particulate matter may be added back to the precipitation material. For example, in some embodiments, the precipitation material is processed to become a building material, such as cement, and particulate matter (e.g., fly ash) may be added to the precipitation material, as is sometimes practiced in the industry.

With reference to FIG. 4, in one embodiment the method in step 400 comprises: contacting the waste gas stream with a metal ion-containing aqueous solution, whereby at least three of the following components are removed from the waste gas stream and contained in an insoluble stable precipitation material: carbon dioxide; carbon monoxide; nitrogen oxides (NOx); sulfur oxides (SOx); hydrogen sulfide; hydrogen chloride; hydrogen fluoride; fly ash; dusts; metals including arsenic, beryllium, boron, cadmium, chromium, chromium VI, cobalt, lead, manganese, mercury, molybdenum, selenium, strontium, thallium; hydrocarbons; radioactive materials, dioxins, and PAH.

In another embodiment as illustrated in FIG. 5, the method in step 500 comprises: contacting a waste gas stream comprising carbon dioxide, nitrogen oxides, and sulfur oxides with a metal ion-containing aqueous solution and causing precipitation of a precipitation material that comprises carbon dioxide, sulfur oxide and mercury from the waste gas stream.

In another embodiment as illustrated in FIG. 6, the method in step 600 comprises contacting a flue gas from an industrial source with a metal ion-containing aqueous solution under conditions that cause the precipitation of carbon dioxide and at least two other components of the flue gas into an insoluble stable precipitation material.

In another embodiment as illustrated in FIG. 7, the method in step 700 comprises treating a flue gas from an industrial source to remove undesirable components of the flue gas, by: treating the flue gas to remove particulate matter then treating the flue gas to remove carbon dioxide, mercury oxides and sulfur oxides therefrom.

In another embodiment as illustrated in FIG. 8, the method in step 800 comprise treating a waste gas stream comprising carbon dioxide, mercury and sulfur oxides, to remove at least 50% of the carbon dioxide and at least 50% of the sulfur oxides from the waste gas stream by precipitating in a single step the carbon dioxide and sulfur oxides in an insoluble composition.

In another embodiment as illustrated in FIG. 9, the method in step 900 comprises treating a waste gas stream comprising carbon dioxide and mercury, to remove at least 50% of the carbon dioxide and at least 50% of the mercury in a single process that comprises precipitating the carbon dioxide and mercury.

In another embodiment, the method comprises treating a flue gas from an industrial source to remove undesirable components of the flue gas, comprising treating the flue gas to remove particulate matter then treating the flue gas to remove both carbon dioxide and sulfur oxides (SOx).

With reference to FIG. 10, the method in one embodiment at step 1000 comprises: comprising contacting a first waste stream with a second waste stream in the presence of a divalent cation-containing aqueous solution whereby pollutants in at least one of the waste streams are neutralized. In various embodiments, at least one of the waste streams comprises carbon dioxide and other combustion gases, and the aqueous divalent cation solution comprises calcium and/or magnesium ions. In various embodiments, the non-gaseous waste stream comprises an available base, e.g., hydroxide ions as in red mud, or calcium oxide in coal ash. In various embodiments, a precipitation material comprising calcium and/or magnesium carbonate and neutralized constituents of the waste is obtained in the divalent cation solution as described herein. In various embodiments, the precipitation material with the neutralized waste may be disposed and/or can be utilized with the carbonate-containing precipitation material as a building product as described herein.

With reference to FIG. 11, in another embodiment, the method in step 1100 comprises a step of neutralizing an industrial waste, comprising: contacting the waste with a waste gas stream comprising carbon dioxide, and a liquid stream comprising an aqueous divalent cation solution, whereby the pH of the waste is neutralized. As with the method of FIG. 10, the method FIG. 11 includes treating a waste stream comprising red mud and/or fly ash, by reacting it with an aqueous divalent cation solution comprises alkaline earth metal ions, e.g., divalent cation solution comprising calcium and/or magnesium ions available in a saltwater such as seawater, brackish water, brine or an aqueous solution comprising dissolved mafic minerals. In another embodiment, the method includes utilizing a waste gas stream comprising carbon dioxide formed by combusting fossil fuels, to precipitate a carbonate in the aqueous divalent cation solution.

In various embodiments, the carbonate-containing precipitation material may include divalent cation carbonates such as calcium carbonate, magnesium carbonate, calcium magnesium carbonate. In various embodiments, the precipitation material may are precipitated with one or more of the following constituents: red mud, fly ash, dusts, metals including arsenic, beryllium, boron, cadmium, chromium, chromium VI, cobalt, lead, manganese, mercury, molybdenum, selenium, strontium, and thallium. In one embodiment, the waste gas stream is processed before or after contact with the solution to remove one or more of particulate matter and nitrogen oxides. In another optional step, the method includes extracting a supernatant liquid and a desalinated water from the aqueous solution, and circulating at least a portion of the supernatant liquid to the aqueous solution. In various embodiments, substantially all the waste from a particular waste stream e.g., carbon dioxide, mercury and/or sulfur oxides are removed e.g., removing 5%, 10%, 20%, 30%, 40%, 50%, 60%, 70%, 80% or more of hydroxide ions from the waste.

Compositions

Compositions of the invention may be solutions, solids, or multiphasic materials (e.g., slurries) comprising carbonates, bicarbonates, or carbonates and bicarbonates, optionally of divalent cations such as $Ca^{2+}$, $Mg^{2+}$, or combination thereof. The amount of carbon in such compositions (e.g., precipitation material) produced by methods of the invention may vary. In some embodiments, compositions comprise an amount of carbon (as determined by using protocols described in greater detail below) ranging from 1% to 15% (w/w), such as 5 to 15% (w/w), including 5 to 14% (w/w), 5 to 13% (w/w), 6 to 14% (w/w), 6 to 12% (w/w), and 7 to 12% (w/w), wherein a substantial amount of the carbon may be carbon that originated (as determined by using protocols described in greater detail below) from the source of $CO_2$. In such embodiments, 10 to 100%, such as 50 to 100%, including 90 to 100% of the carbon present in the composition (e.g., precipitation material) is from the source of $CO_2$ (e.g., industrial waste gas stream comprising carbon dioxide). In some instances, the amount of carbon present in the composition that is traceable to the carbon dioxide source is 50% or more, 60% or more, 70% or more, 80% or more, 90% or more, 95% or more, 99% or more, including 100%.

Compositions of the invention (e.g., precipitation material comprising carbonates, bicarbonates, or carbonates and bicarbonates) may store 50 tons or more of $CO_2$, such as 100 tons or more of $CO_2$, including 150 tons or more of $CO_2$, for instance 200 tons or more of $CO_2$, such as 250 tons or more of $CO_2$, including 300 tons or more of $CO_2$, such as 350 tons or more of $CO_2$, including 400 tons or more of $CO_2$, for instance 450 tons or more of $CO_2$, such as 500 tons or more of $CO_2$, including 550 tons or more of $CO_2$, such as 600 tons or more of $CO_2$, including 650 tons or more of $CO_2$, for instance 700 tons or more of $CO_2$, for every 1000 tons of the composition. Thus, in some embodiments, the compositions of the invention (e.g., precipitation material comprising carbonates, bicarbonates, or carbonates and bicarbonates) comprise 5% or more of $CO_2$, such as 10% or more of $CO_2$, including 25% or more of $CO_2$, for instance 50% or more of $CO_2$, such as 75% or more of $CO_2$, including 90% or more of $CO_2$. Such compositions, particularly precipitation material of the invention may be used in the built environment. In some embodiments, the composition may be employed as a component of a manufactured item, such as a building material (e.g., component of a cement, aggregate, concrete, or a combination thereof). The composition remains a storage-stable $CO_2$-sequestering product, as use of the composition in a manufactured item (such as building material) does not result in re-release of sequestered $CO_2$. In some embodiments, compositions of the invention (e.g., precipitation material comprising carbonates, bicarbonates, or carbonates and bicarbonates), when combined with Portland cement, may dissolve and combine with compounds of the Portland cement without releasing $CO_2$.

Conditions employed to convert $CO_2$ into carbonates, bicarbonates, or carbonates and bicarbonates may convert one or more additional waste gas stream components into co-products (i.e., products produced from the one or more additional components under $CO_2$-processing conditions), wherein such additional components include sulfur oxides (SOx); nitrogen oxides (NOx); carbon monoxide (CO); metals such as antimony (Sb), arsenic (As), barium (Ba), beryllium (Be), boron (B), cadmium (Cd), chromium (Cr), cobalt (Co), copper (Cu), lead (Pb), manganese (Mn), mercury (Hg), molybdenum (Mo), nickel (Ni), radium (Ra), selenium (Se), silver (Ag), strontium (Sr), thallium (Tl), vanadium (V), and zinc (Zn); particulate matter; halides or acid gases; organics; toxic substances; radioactive isotopes, and the like. Co-products of such one or more additional waste gas stream components may, for the purpose of the invention, be considered derivatives of the one or more additional waste gas stream components. Compositions of the invention may comprise carbonates, bicarbonates, or carbonates and bicarbonates in combination with one or more additional waste gas stream components and/or co-products of one or more additional waste gas stream components. In some embodiments, such one or more additional components and/or co-products may be part of a solution comprising carbonates, bicarbonates, or carbonates and bicarbonates. In some embodiments, such one or more additional components and/or co-products may be part of precipitation material of the invention by precipitating the one or more additional components and/or co-products along with carbonates, bicarbonates, or carbonates and bicarbonates, by trapping the one or more additional components and/or co-products in precipitation material comprising carbonates, bicarbonates, or carbonates and bicarbonates, or by some combination thereof. In some embodiments, such one or more additional components and/or co-products may be part of a slurry comprising any combination of the foregoing solutions with precipitation material.

Compositions of the invention may comprise sulfates, sulfites, or the like in addition to carbonate and/or bicarbonates. In some embodiments, compositions comprise 70-99.9% carbonates and/or bicarbonates along with 0.05-30% sulfates and/or sulfites. For example, compositions may comprise at least 50%, 55%, 60%, 65%, 70%, 75%, 80%, 85%, 90%, 95%, or 99.9% carbonates and/or bicarbonates. Such compositions may further comprise at least 0.05%, 0.1%, 0.5%, 1.0%, 5.0%, 10%, 15%, 20%, 25%, or 30% sulfates and/or sulfites. In some embodiments, compositions of the invention comprise sulfur-based compounds of calcium, magnesium, or combinations thereof, optionally precipitated or trapped in precipitation material produced from waste gas streams comprising SOx (e.g., $SO_2$, $SO_3$, etc.). For example, magnesium and calcium may react to form $MgSO_4$ and $CaSO_4$, respectively, as well as other magnesium- and calcium-containing compounds (e.g., sulfites), effectively removing sulfur from the waste gas stream (e.g., flue gas stream) without a desulfurization step such as flue gas desulfurization ("FGD"). In addition, compositions comprising $CaSO_4$, $MgSO_4$, and related compounds may be formed without additional release of $CO_2$. In instances where high levels of sulfur-based compounds (e.g., sulfate) are present, the aqueous solution may be enriched with calcium and/or magnesium so that calcium and/or magnesium are available to form carbonate compounds before, during, or after formation of $CaSO_4$, $MgSO_4$, and/or related compounds. In some embodiments, multiple reaction products (e.g., $MgCO_3$, $CaCO_3$, $CaSO_4$, mixtures of the foregoing, and the like) are collected at different stages, while in other embodiments a single reaction product (e.g., precipitation material comprising carbonates, sulfates, etc.) is collected. FIG. 12A and FIG. 12B, for example, provide a comparison of morphologies between laboratory-synthesized magnesium carbonates with brucite tailings (e.g., $Mg(OH)_2$) and synthetic flue gas (15% $CO_2$, 3.5% $O_2$, balance $N_2$) without $SO_2$ (FIG. 12A) and with 400 ppm $SO_2$ (FIG. 12B). The compositions of FIG. 12A and FIG. 12B represent a degree of carbonation of 30.9% and 31.1%, respectively.

Compositions of the invention may comprise nitrates, nitrites, and/or the like. In some embodiments, compositions of the invention comprise such nitrogen-based compounds of calcium, magnesium, or combinations thereof, optionally precipitated or trapped in precipitation material produced from waste gas streams comprising NOx (e.g., $NO_2$, $NO_3$, etc.). For example, magnesium and calcium may react to form $Mg(NO_3)_2$ and $Ca(NO_3)_2$, respectively, as well as other magnesium- and calcium-containing compounds (e.g., nitrates), effectively removing nitrogen from the waste gas stream (e.g., flue gas stream) without a selective catalytic reduction ("SCR") step or non-selective catalytic reduction ("NSCR") step. In addition, compositions comprising $Ca(NO_3)_2$, $Mg(NO_3)_2$, and related compounds may be formed without additional release of $CO_2$. Compositions of the invention may further comprise other components, such as trace metals (e.g., mercury). Using mercury as a non-limiting example of a trace metal, compositions of the invention may comprise elemental mercury (Hg), mercury salts comprising $Hg^{2+}$ (e.g., $HgCl_2$, $HgCO_3$, etc.), mercury salts comprising $Hg^+$ (e.g., $Hg_2Cl_2$, $Hg_2CO_3$, etc.), mercury compounds comprising $Hg^{2+}$ (e.g., HgO, organomercury compounds, etc.), mercury compounds comprising $Hg^+$ (e.g., $Hg_2O$, organomercury compounds, etc.), particulate mercury (Hg(p)), and the like. Mercury salts comprising $Hg^{2+}$, mercury salts comprising $Hg^+$, mercury compounds comprising $Hg^{2+}$, mercury compounds comprising $Hg^+$, may be considered mercury derivatives for the purpose of the invention. In some embodiments, compositions of the invention comprise such mercury-based compounds, optionally precipitated or trapped in precipitation material produced from waste gas streams comprising trace metals such as mercury. In some embodiments, compositions comprise mercury (or another metal) in a concentration of at least 0.1, 0.5, 1, 5, 10, 50, 100, 500, 1,000, 5,000, 10,000 ppb. Mercury may react to form $HgCO_3$ or $Hg_2CO_3$ as well as other mercury-containing compounds (e.g., chlorides, oxides), effectively removing mercury from the waste gas stream (e.g., flue gas stream) without a specific or non-specific mercury removal technology. In addition, compositions comprising mercury and/or other trace metals may be formed without additional release of $CO_2$.

Precipitation material of the invention may comprise several carbonates and/or several carbonate mineral phases resulting from co-precipitation, wherein the precipitation material may comprise, for example, calcium carbonate (e.g., calcite) together with magnesium carbonate (e.g., nesquehonite). Precipitation material may also comprise a single carbonate in a single mineral phase including, but not limited to, calcium carbonate (e.g., calcite), magnesium carbonate (e.g., nesquehonite), calcium magnesium carbonate (e.g., dolomite), or a ferro-carbo-aluminosilicate. As different carbonates may be precipitated in sequence, the precipitation material may be, depending upon the conditions under which it was obtained, relatively rich (e.g., 90% to 95%) or substantially rich (e.g., 95%-99.9%) in one carbonate and/or one mineral phase, or the precipitation material may comprise an amount of other carbonates and/or other mineral phase (or phases), wherein the desired mineral phase is 50-90% of the precipitation material. It will be appreciated that, in some embodiments, the precipitation material may comprise one or more hydroxides (e.g., $Ca(OH)_2$, $Mg(OH)_2$) in addition to the carbonates. It will also be appreciated that any of the carbonates or hydroxides present in the precipitation material may be wholly or partially amorphous. In some embodiments, the carbonates and/or hydroxides are wholly amorphous. It will also be appreciated that any of the carbonates or hydroxides present in the precipitation material may be wholly or partially crystalline. In some embodiments, the carbonates and/or hydroxides are wholly crystalline.

While many different carbonate-containing salts and compounds are possible due to variability of starting materials, precipitation material comprising magnesium carbonate, calcium carbonate, or combinations thereof is particularly useful. Precipitation material may comprise two or more different carbonate compounds, three or more different carbonate compounds, four or more different carbonate compounds, five or more different carbonate compounds, etc., including non-distinct, amorphous carbonate compounds. Precipitation material of the invention may comprise compounds having a molecular formulation $X_m(CO_3)_n$, wherein X is any element or combination of elements that can chemically bond with a carbonate group or its multiple and m and n are stoichiometric positive integers. In some embodiments, X may be an alkaline earth metal (elements found in column IIA of the periodic table of elements), an alkali metal (elements found in column IA of the periodic table of elements), or some combination thereof. In some embodiments, the precipitation material comprises dolomite ($CaMg(CO_3)_2$), protodolomite, huntite ($CaMg_3(CO_3)_4$), and/or sergeevite ($Ca_2Mg_{11}(CO_3)13.H_2O$), which are carbonate minerals comprising both calcium and magnesium. In some embodiments, the precipitation material comprises calcium carbonate in one or more phases selected from calcite, aragonite, vaterite, or a combination thereof. In some embodiments, the precipitation material comprises hydrated forms of calcium carbonate (e.g., $Ca(CO_3).nH2O$, wherein there are one or more structural waters in the molecular formula) selected from ikaite ($CaCO_3.6H_2O$), amorphous calcium carbonate ($CaCO_3.nH_2O$), monohydrocalcite ($CaCO_3.H_2O$), or combinations thereof. In some embodiments, the precipitation material comprises magnesium carbonate, wherein the magnesium carbonate does not have any waters of hydration. In some embodiments, the precipitation material comprises magnesium carbonate, wherein the magnesium carbonate may have any of a number of different waters of hydration (e.g., $Mg(CO_3).nH_2O$) selected from 1, 2, 3, 4, or more than 4 waters of hydration. In some embodiments, the precipitation material comprises 1, 2, 3, 4, or more than 4 different magnesium carbonate phases, wherein the magnesium carbonate phases differ in the number of waters of hydration. For example, precipitation material may comprise magnesite ($MgCO_3$), barringtonite ($MgCO_3.2H_2O$), nesquehonite ($MgCO_3.3H_2O$), lansfordite ($MgCO_3.5H_2O$), and amorphous magnesium carbonate. In some embodiments, precipitation material comprises magnesium carbonates that include hydroxide and waters of hydration such as artinite ($MgCO_3.Mg(OH)_2.3H_2O$), hydromagnesite ($Mg_5(CO_3)_4(OH)_2.3H_2O$), or combinations thereof. As such, precipitation material may comprise carbonates of calcium, magnesium, or combinations thereof in all or some of the various states of hydration listed herein. Precipitation rate may also influence the nature of the precipitation material with the most rapid precipitation rate achieved by seeding the solution with a desired phase. Without seeding, rapid precipitation may be achieved by, for example, rapidly increasing the pH of the precipitation reaction mixture, which results in more amorphous constituents. Furthermore, the higher the pH, the more rapid the precipitation, which precipitation results in a more amorphous precipitation material.

In some embodiments, the amount by weight of calcium carbonate compounds in the precipitation material may exceed the amount by weight of magnesium carbonate compounds in the precipitation material. In some embodiments, for example, the amount by weight of calcium carbonate compounds in the precipitation material may exceed the amount by weight magnesium carbonate compounds in the precipitation material by 5% or more, such as 10% or more, 15% or more, 20% or more, 25% or more, 30% or more. In some embodiments, the weight ratio of calcium carbonate compounds to magnesium carbonate compounds in the precipitation material ranges from 1.5-5 to 1, such as 2-4 to 1, including 2-3 to 1. In some embodiments, the amount by weight of magnesium carbonate compounds in the precipitation material may exceed the amount by weight of calcium carbonate compounds in the precipitation material. For example, the amount by weight of magnesium carbonate compounds in the precipitation material may exceed the amount by weight calcium carbonate compounds in the precipitation material by 5% or more, such as 10% or more, 15% or more, 20% or more, 25% or more, 30% or more. In some embodiments, the weight ratio of magnesium carbonate compounds to calcium carbonate compounds in the precipitation material ranges from 1.5-5 to 1, such as 2-4 to 1, including 2-3 to 1.

Precipitation material produced in certain divalent cation-containing aqueous solutions (e.g., seawater, brine, etc.) of the invention may comprise carbonate compounds that, upon combination with fresh water, dissolve to produce a fresh water precipitation material comprising carbonate compounds that is more thermodynamically stable (in fresh water). As such, carbonate compounds of the initial precipitation material may dissolve upon combination with fresh water to produce new carbonate compounds and a new composition (e.g., precipitation material). ($CO_2$ gas is not liberated in significant amounts, or in some cases, at all, in any such reaction.) The carbonate compounds of the initial precipitation material may be compounds that are more stable in salt water than they are in fresh water, such that the carbonate compounds of the initial precipitation material may be viewed as metastable. The amount of carbonate compounds in precipitation material, as determined by coulometric titration, may be 40% or higher, such as 70% or higher, including 80% or higher.

Adjusting major ion ratios during precipitation may influence the nature of the precipitation material. Major ion ratios have considerable influence on polymorph formation. For example, as the magnesium:calcium ratio in the water increases, aragonite becomes the major polymorph of calcium carbonate in the precipitation material over low-magnesium calcite. At low magnesium:calcium ratios, low-magnesium calcite becomes the major polymorph. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the precipitation material is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Ca^{2+}$ to $Mg^{2+}$ in the precipitation material is between 1:1 and 1:10; 1:5 and 1:25; 1:10 and 1:50; 1:25 and 1:100; 1:50 and 1:500; or 1:100 and 1:1000. In some embodiments, the ratio of $Mg^{2+}$ to $Ca^{2+}$ (i.e., $Mg^{2+}:Ca^{2+}$) in the precipitation material is between 1:1 and 1:2.5; 1:2.5 and 1:5; 1:5 and 1:10; 1:10 and 1:25; 1:25 and 1:50; 1:50 and 1:100; 1:100 and 1:150; 1:150 and 1:200; 1:200 and 1:250; 1:250 and 1:500; 1:500 and 1:1000, or a range thereof. For example, in some embodiments, the ratio of $Mg^{2+}$ to $Ca^{2+}$ in the precipitation material is between 1:1 and 1:10; 1:5 and 1:25; 1:10 and 1:50; 1:25 and 1:100; 1:50 and 1:500; or 1:100 and 1:1000.

Due to variability of starting materials, carbonate-containing salts and compounds comprising counterions other than calcium or magnesium are possible. Such other counterions (e.g., As, Ag, Ba, Be, Cd, Co, Cr, Cu, Hg, Mo, Ni, Pb, Sb, Se, Sr, Tl, V, Zn etc.) may substitute for calcium and/or magnesium in carbonate-containing salts and compounds or occupy interstitial spaces. In some embodiments, such other counterions, optionally as part of a salt or some other compound, may be encapsulated by carbonate-containing salts and compounds. For example, in some embodiments, compositions of the invention (e.g., precipitation material) comprise calcium carbonate in the form of aragonite. In such embodiments, calcium may be replaced by a number of different metals including, but not limited to strontium, lead, and zinc, each of which, in one form or another, may be found in one or more starting materials (e.g., waste gas stream, source of proton-removing agents, source of divalent cations, etc.) of the invention. Compositions may comprise, for example, mossottite, which is aragonite rich in strontium, or compositions may comprise a mixture of aragonite and strontianite (e.g., (Ca, Sr)$CO_3$). Compositions may comprise, for example, tarnowitzite, which is aragonite rich in lead, or compositions may comprise a mixture of aragonite and cerussite (e.g., (Ca, Pb)$CO_3$). Compositions may comprise, for example, nicholsonite, which is aragonite rich in Zn, or compositions may comprise a mixture of aragonite and smithsonite (e.g., (Ca, Zn)$CO_3$). In view of the foregoing exemplary embodiments, compositions (e.g., precipitation material) may comprise carbonates, bicarbonates, or carbonates and bicarbonates of As, Ag, Ba, Be, Cd, Co, Cr, Cu, Hg, Mo, Ni, Pb, Sb, Se, Sr, Tl, V, or Zn. By way of example, compositions of the invention may comprise carbonates of Ag, Ba, Be, Cd, Co, Cu, Ni, Pb, Sr, Tl, Zn, or combinations thereof. Carbonates, bicarbonates, or carbonates and bicarbonates of the foregoing metals may be independently formed (e.g., strontianite) or exist in a magnesium and/or calcium matrix (e.g., mossottite). Metals such as As, Ag, Ba, Be, Cd, Co, Cr, Cu, Hg, Mo, Ni, Pb, Sb, Se, Sr, Tl, V, and Zn may be provided by a waste gas stream, a source of proton-removing agents, a source of divalent cations, or a combination thereof. Metals and other components found in such source (e.g., waste gas streams, sources of proton-removing agents, sources of divalent cations) that do not form carbonates, bicarbonates, or carbonates and bicarbonates may be trapped in or adsorbed on precipitation material. In some embodiments, metals and/or other components form or become part of carbonates, bicarbonates, or carbonates and bicarbonates and become trapped in or adsorbed on precipitation material after a metastable transition. For example, precipitation material of the invention may comprise aragonite rich in strontium. Such a composition, when produced from salt water, may dissolve in fresh water to produce precipitation material comprising calcite in which the strontium no longer substitutes for calcium. Instead, the strontium may become trapped in the precipitation material or my be adsorbed onto the precipitation material. In some embodiments, the metals and/or other components form new compounds that become encapsulated in the precipitation material.

A composition of the invention (e.g., precipitation material or products derived therefrom including supplementary cementitious materials, cement, fine aggregate, coarse aggregate, and combinations thereof such as concrete) might contain, in one form or another, metals such as As, Ag, Ba, Be, Cd, Co, Cr, Cu, Hg, Mo, Ni, Pb, Se, Sb, Tl, V, or Zn, or combinations thereof, as well as other chemical species that might be considered contaminants if released into the environment. Potential for release of such contaminants into the environment may be tested by mixing the composition with an extraction solution, agitating the resultant mixture, and filtering the agitated mixture to produce a testable leachate. Compositions of the invention may be tested using any of a variety of tests as different tests have been developed to simulate different environmental conditions. Such tests include, but are not limited to, Toxicity Characteristic Leaching Procedure (TCLP; US EPA Method 1311), Extraction Procedure Toxicity Test (EP-Tox; US EPA Method 1310), Synthetic Precipitation Leaching Procedure (SPLP; US EPA Method 1312), California Waste Extraction Test (WET; California Code of Regulations), Soluble Threshold Limit Concentration (STLC; California Code of Regulations), American Society for Testing and Materials Extraction Test (ASTM D 3987-85), and Multiple Extraction Procedure (MEP; US EPA Method 1320), as such tests and limits defined is such tests exist on the filing date of this patent application. Regulatory water extraction test conditions as defined by waste control regulations in, for example, the United Kingdom, Thailand, Japan, Switzerland, Germany, Sweden, the Netherlands may also be used. Such tests may differ in, for example, extraction solutions, liquid to solid (L/S) ratios, and/or number and duration of extractions. Regarding extract solutions, such tests commonly use aqueous acetic acid, aqueous citric acid, distilled water, synthetic rainwater, or carbonated water.

Tests for potential release of contaminants into the environment by a composition of the invention may comprise modifying the chemical and/or physical environment of the composition, such as modifying pH, temperature, pressure, time, and the like, in a repeatable manner to effect a measurable release (e.g., in an extract or leachate) of contaminants the composition. In some embodiments, a composition may be subjected to a solution (e.g., aqueous solution) having a pH less than pH 8.5, pH 8.0, pH 7.5, pH 7.0, pH 6.5, pH 6.0, pH 5.5, pH 5.2, pH 5.0, pH 4.8, pH 4.6, pH 4.4, pH 4.2, pH 4.0, pH 3.8, pH 3.6, pH 3.4, pH 3.2, pH 3.0, pH 2.8, pH 2.6, pH 2.4, pH 2.2, pH 2.0, pH 1.8, pH 1.6, pH 1.4, pH 1.2, pH 1.0, pH 0.8, pH 0.6, pH 0.4, or pH 0.2. Such pH levels may be obtained by adding acid (e.g., HCl) to water, or by preparing a buffered solution at a particular pH. As certain reagents commonly used to prepare acidic solutions or buffers may react with a composition of the invention, proper selection of reagents is important to isolate the effect of pH on the composition. For example, while phosphoric acid may be used to prepare a buffered solution at a particular pH, phosphate may react with a composition comprising calcium carbonate such that calcium phosphate is formed. Tests for potential release of contaminants into the environment may make use of a depressed or an elevated temperature. For example, in some embodiments, a temperature greater than 0° C., 10° C., 20° C., 25° C., 30° C., 40° C., 50° C., 60° C., 70° C., 80° C., 90° C., or 100° C. may be used. Temperatures in such tests may range between any of the foregoing (e.g., 60-80° C.; 20-25° C. (room temperature)) temperature. The time during which a composition is subjected to a particular pH and/or temperature may be any suitable time to effect a measureable release of contaminants (if present). For example, in some embodiments, a composition may be subjected to a particular pH and/or temperature for 0.5, 1, 2, 4, 6, 8, 16, 24, 32, 40, 48, 72, 96 hours. Time periods spanning from days (e.g., 5, 6, 7, etc), weeks (e.g., 1, 2, 3, 4, etc.), or months (e.g., 2, 3, 4, 5, 6, etc.) are also within the scope of tests for potential release of contaminants into the environment. In some embodiments, for example, a test for potential release of contaminants into the environment by a composition (e.g., precipitation material or compositions comprising precipitation material such as cement or concrete) of the invention consists essentially of preparing 2×1 L of an extraction fluid consisting essentially of an aqueous solution of acetic acid, wherein each 1 L of the extraction fluid consists essentially of 5.7 mL acetic acid in deionized water; grinding the composition such that particles of ground composition are less than 1 cm in the narrowest dimension if the particles are not already less than 1 cm in the narrowest dimension; placing 100g of the ground composition into an extraction vessel with 2 L of the extraction fluid to produce an extraction composition; rotating the extraction vessel in an end-over-end fashion for 18±2 hours at room temperature; filtering the extraction composition through borosilicate glass fiber with a pore size of 0.6 µm to 0.8 µm to produce a leachate; and adjusting pH of the leachate with 1N nitric acid to a pH of pH 2 or less than pH 2. Any suitable test or tests for detecting and quantifying contaminants, or lack thereof, in the leachate may be used. The foregoing test is exemplary and those of skill in the art can design similar tests that may be used to effect detectable and quantifiable contaminants, if such contaminants exist, from a composition of the invention. It is to be understood that, in any of the tests for potential release of contaminants into the environment, the addition of additional steps could affect potential release of contaminants into the environment and would necessitate comparison to the protocols set out herein to determine if adjusted levels of contaminants released due to the additional steps is warranted.

Compositions of the invention (e.g., precipitation material or products derived therefrom including supplementary cementitious materials, cement, fine aggregate, coarse aggregate, and combinations thereof such as concrete) meet or improve upon limits for metals and/or other chemical species defined in one or more of the foregoing tests (e.g., TCLP) (as of the filing date of this application) such that compositions of the invention are suitable for placement into the environment. Should a composition of the invention not meet or improve upon limits for metals and/or other chemical species as defined in one or more of the foregoing tests (e.g., TCLP), the composition may be effectively diluted to produce a diluted composition that meets or exceed such limits. In some embodiments, for example, precipitation material of the invention may, upon not meeting or improving upon a certain limit (e.g., 0.2 mg/L in TCLP), be used for a supplementary cementitious material in cement. In such embodiments, the cement comprising the precipitation material may meet or improve upon the certain limit (e.g., 0.2 mg/L in TCLP) that the precipitation material alone did not meet or improve upon. As such, precipitation material of the invention may be used for supplementary cementitious materials, cement, fine aggregate, coarse aggregate, concrete, or combinations thereof, wherein one or more of the precipitation material, supplementary cementitious materials, cement, fine aggregate, coarse aggregate, concrete, or combinations thereof meet or improve upon limits for metals and/or other chemical species defined in one or more of the foregoing tests (e.g., TCLP) (as of the filing date of this application), and wherein such materials are suitable for placement into the environment.

The Code of Federal Regulations (see 40 C.F.R. §261.24) contains a list of contaminants and their associated maximum allowable concentrations (as of the filing date of this application) in a TCLP extract from a solid or multiphasic material (e.g., slurry) such as a composition of the invention. If a contaminant (e.g., mercury) exceeds its maximum allowable concentration in a TCLP (Method 1311 in "Test Methods for Evaluating Solid Waste, Physical/Chemical Methods," EPA Publication SW-846, which is incorporated herein by reference in its entirety) extract of a material, then the material may be considered hazardous due to the characteristic of toxicity. For instance, material containing certain leachable heavy metals may be classified as hazardous material if TCLP extracts have concentrations above threshold values for those heavy metals, which threshold values range from 0.2 mg/L (or ppm) for Hg and 100 mg/L for Ba. For example, if a TCLP analysis provides more than 0.2 mg/L mercury in an extract, then the material may be classified as hazardous material with respect to mercury. Likewise, if a TCLP analysis provides more than 100 mg/L barium in an extract, then the material may be classified as hazardous material with respect to barium. The 40 C.F.R. §261.24 includes, but is not limited to, As, Cd, Cr, Hg, and Pb, each of which might be found in waste gas streams resulting from combustion of fossil fuels (e.g., coal), and each of which, in one form or another, might be incorporated in compositions of the invention. The list also includes a number of contaminants that might be present in industrial waste sources of divalent cations and/or proton-removing agents, which contaminants, in one form or another, might be incorporated in compositions of the invention. For example, fly ash, which may be a source of divalent cations and/or proton-removing agents, might contain As, Ba, Cd, Cr, Se, and/or Hg, each of which is found on the list, and each of which, in one form or another, might be incorporated in compositions of the invention. In another non-limiting example, red mud, which may be a source of divalent cations and/or proton-removing agents, might contain Cr, Ba, Pb, and/or Zn, each of which is found on the list in 40 C.F.R. §261.24, and each of which, in one form or another, might be incorporated in compositions of the invention.

As such, in some embodiments, a composition of the invention comprises contaminants predicted not to leach into the environment by one or more tests selected from the group consisting of Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, and Multiple Extraction Procedure. Tests and combinations of tests may be chosen depending upon likely contaminants and storage conditions of the composition. For example, in some embodiments, the composition may comprise As, Cd, Cr, Hg, and Pb (or products thereof), each of which might be found in a waste gas stream of a coal-fired power plant. Since TCLP tests for As, Ba, Cd, Cr, Pb, Hg, Se, and Ag, TCLP may be an appropriate test for solid and multiphasic compositions stored in the environment (e.g., built environment). In some embodiments, a composition of the invention comprises As, wherein the composition is predicted not to leach As into the environment. For example, a TCLP extract of the composition may provide less than 5.0 mg/L As indicating that the composition is not hazardous with respect to As. In some embodiments, a composition of the invention comprises Cd, wherein the composition is predicted not to leach Cd into the environment. For example, a TCLP extract of the composition may provide less than 1.0 mg/L Cd indicating that the composition is not hazardous with respect to Cd. In some embodiments, a composition of the invention comprises Cr, wherein the composition is predicted not to leach Cr into the environment. For example, a TCLP extract of the composition may provide less than 5.0 mg/L Cr indicating that the composition is not hazardous with respect to Cr. In some embodiments, a composition of the invention comprises Hg, wherein the composition is predicted not to leach Hg into the environment. For example, a TCLP extract of the composition may provide less than 0.2 mg/L Hg indicating that the composition is not hazardous with respect to Hg. In some embodiments, a composition of the invention comprises Pb, wherein the composition is predicted not to leach Pb into the environment. For example, a TCLP extract of the composition may provide less than 5.0 mg/L Pb indicating that the composition is not hazardous with respect to Pb. In some embodiments, a composition of the invention may be non-hazardous with respect to a combination of different contaminants in a given test. For example, the composition may be non-hazardous with respect to all metal contaminants in a given test. A TCLP extract of a composition, for instance, may be less than 5.0 mg/L in As, 100.0 mg/L in Ba, 1.0 mg/L in Cd, 5.0 mg/mL in Cr, 5.0 mg/L in Pb, 0.2 mg/L in Hg, 1.0 mg/L in Se, and 5.0 mg/L in Ag. Indeed, a majority if not all of the metals tested in a TCLP analysis on a composition of the invention may be below detection limits. In some embodiments, a composition of the invention may be non-hazardous with respect to all (e.g., inorganic, organic, etc.) contaminants in a given test. In some embodiments, a composition of the invention may be non-hazardous with respect to all contaminants in any combination of tests selected from the group consisting of Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, and Multiple Extraction Procedure. As such, compositions of the invention may effectively sequester $CO_2$ (e.g., as carbonates, bicarbonates, or a combinations thereof) along with various chemical species (or co-products thereof) from waste gas streams, industrial waste sources of divalent cations, industrial waste sources of proton-removing agents, or combinations thereof that might be considered contaminants if released into the environment. Compositions of the invention incorporate environmental contaminants (e.g., metals and co-products of metals such as Hg, Ag, As, Ba, Be, Cd, Co, Cr, Cu, Mn, Mo, Ni, Pb, Sb, Se, Tl, V, Zn, or combinations thereof) in a non-leachable form.

In some embodiments, the invention provides a method of treating a waste gas stream comprising carbon dioxide and, optionally, any of a number of solid, liquid, or multiphasic waste streams, to produce a composition that provides a leachate in compliance with the TCLP protocol. Such compositions of the invention may include precipitation material, supplementary cementitious materials, cement, fine aggregate, coarse aggregate, concrete, or combinations thereof, each of which may be tested in accordance with Example 2 or Example 3 below. In some embodiments, for example, precipitation material, supplementary cementitious materials, cement, fine aggregate, coarse aggregate, concrete, or combinations thereof may be tested in a TCLP procedure consisting of preparing 2×1 L of an extraction fluid consisting essentially of an aqueous solution of acetic acid, wherein each 1 L of the extraction fluid consists essentially of 5.7 mL acetic acid in deionized water; grinding the solid such that particles of ground solid are less than 1 cm in the narrowest dimension if the particles are not already less than 1 cm in the narrowest dimension; placing 100g of the ground solid into an extraction vessel with 2 L of the extraction fluid to produce an extraction composition; rotating the extraction vessel in an end-over-end fashion for 18±2 hours at room temperature; filtering the extraction composition through borosilicate glass fiber with a pore size of 0.6 μm to 0.8 μm to produce a leachate; adjusting pH of the leachate with 1N nitric acid to a pH of pH 2 or less than pH 2, and analyzing the leachate for metals and/or other chemical species. In some embodiments, a composition of the invention provides less than 0.05 mg/L, 0.50 mg/L, 5.0 mg/L, 50 mg/L, or 500 mg/L As in the leachate provided by the TCLP procedure. Alternatively, or in combination with the foregoing embodiment, the composition provides less than 1.00 mg/L, 10.0 mg/L, 100 mg/L, 1,000 mg/L, or 10,000 mg/L Ba in the leachate provided by the TCLP procedure. Alternatively, or in combination with any of the foregoing embodiments, the composition provides less than 0.01 mg/L, 0.10 mg/L, 1.0 mg/L, 10 mg/L, or 100 mg/L Cd in the leachate provided by the TCLP procedure. Alternatively, or in combination with any of the foregoing embodiments, the composition provides less than 0.05 mg/L, 0.50 mg/L, 5.0 mg/L, 50 mg/L, or 500 mg/L Pb in the leachate provided by the TCLP procedure. Alternatively, or in combination with any of the foregoing embodiments, the composition provides less than 0.002 mg/L, 0.02 mg/L, 0.20 mg/L, 2.0 mg/L, or 20 mg/L Hg in the leachate provided by the TCLP procedure. Alternatively, or in combination with any of the foregoing embodiments, the composition provides less than 0.01 mg/L, 0.10 mg/L, 1.0 mg/L, 10 mg/L, or 100 mg/L Se in the leachate provided by the TCLP procedure. Alternatively, or in combination with any of the foregoing embodiments, the composition provides less than 0.05 mg/L, 0.50 mg/L, 5.0 mg/L, 50 mg/L, or 500 mg/L Ag in the leachate provided by the TCLP procedure. In view of the forgoing, and by way of example only, the composition provides less than 0.2 mg/L Hg and less than 1.0 mg/L cadmium in the leachate provided by the TCLP procedure. It should be understood that the foregoing are exemplary and that any combination of metals and levels of metals in the leachate as described herein is within the scope of the invention. Such compositions of the invention, as described herein, are suitable for building products and the like.

Precipitation material, which comprises one or more synthetic carbonates derived from industrial $CO_2$, reflects the relative carbon isotope composition ($\delta^{13}C$) of the fossil fuel (e.g., coal, oil, natural gas, or flue gas) from which the industrial $CO_2$ (from combustion of the fossil fuel) was derived. The relative carbon isotope composition ($\delta^{13}C$) value with units of ‰ (per mille) is a measure of the ratio of the concentration of two stable isotopes of carbon, namely $^{12}C$ and $^{13}C$, relative to a standard of fossilized belemnite (the PDB standard).

$$\delta^{13}C‰=[(^{13}C/^{12}C\ sample-^{13}C/^{12}C\ PDB\ standard)/(^{13}C/^{12}C\ PDB\ standard)]\times 1000$$

As such, the $\delta^{13}C$ value of the synthetic carbonate-containing precipitation material serves as a fingerprint for a $CO_2$ gas source. The $\delta^{13}C$ value may vary from source to source (i.e., fossil fuel source), but the $\delta^{13}C$ value for composition of the invention generally, but not necessarily, ranges between –9‰ to –35‰. In some embodiments, the $\delta^{13}C$ value for the synthetic carbonate-containing precipitation material is between –1‰ and –50‰, between –5‰ and –40‰, between –5‰ and –35‰, between –7‰ and –40‰, between –7‰ and –35‰, between –9‰ and –40‰, or between –9‰ and –35‰. In some embodiments, the $\delta^{13}C$ value for the synthetic carbonate-containing precipitation material is less than (i.e., more negative than) –3‰, –5‰, –6‰, –7‰, –8‰, –9‰, –10‰, –11‰, –12‰, –13‰, –14‰, –15‰, –16‰, –17‰, –18‰, –19‰, –20‰, –21‰, –22‰, –23‰, –24‰, –25‰, –26‰, –27‰, –28‰, –29‰, –30‰, –31‰, –32‰, –33 , –34‰, –35‰, –36‰, –37‰, –38‰, –39‰, –40‰, –41‰, –42‰, –43‰, –44‰, or –45‰, wherein the more negative the $\delta^{13}C$ value, the more rich the synthetic carbonate-containing composition is in 12C. Any suitable method may be used for measuring the $\delta^{13}C$ value, methods including, but no limited to, mass spectrometry or off-axis integrated-cavity output spectroscopy (off-axis ICOS).

In addition to magnesium- and calcium-containing products of the precipitation reaction, compounds and materials comprising silicon, aluminum, iron, and others may also be prepared and incorporated within precipitation material with methods and systems of the invention. Incorporation of such compounds in precipitation material may be desired to alter the reactivity of cements comprising the precipitation material resulting from the process, or to change the properties of cured cements and concretes made from them. Incorporation of one or more components such as amorphous silica, amorphous aluminosilicates, crystalline silica, calcium silicates, calcium alumina silicates, etc. may enhance the ability of precipitation material of the invention to retain $CO_2$-processing co-products (e.g., sulfates; sulfites; metals described herein and their salts and other compounds, etc.). Retaining the $CO_2$-processing co-products may comprise encapsulation or integration (e.g., chemical bonding of the $CO_2$-processing co-products to various species in the precipitation material). Material comprising metal silicates may be added to the precipitation reaction mixture as one source of these components, to produce carbonate-containing precipitation material which contains one or more components, such as amorphous silica, amorphous aluminosilicates, crystalline silica, calcium silicates, calcium alumina silicates, etc. In some embodiments, the precipitation material comprises carbonates (e.g., calcium carbonate, magnesium carbonate) and silica in a carbonate:silica ratio between 1:1 and 1:1.5; 1:1.5 and 1:2; 1:2 and 1:2.5; 1:2.5 and 1:3; 1:3 and 1:3.5; 1:3.5 and 1:4; 1:4 and 1:4.5; 1:4.5 and 1:5; 1:5 and 1:7.5; 1:7.5 and 1:10; 1:10 and 1:15; 1:15 and 1:20, or a range thereof. For example, in some embodiments, the precipitation material comprises carbonates and silica in a carbonate:silica ratio between 1:1 and 1:5, 1:5 and 1:10, or 1:5 and 1:20. In some embodiments, the precipitation material comprises silica and carbonates (e.g., calcium carbonate, magnesium carbonate) in a silica:carbonate ratio between 1:1 and 1:1.5; 1:1.5 and 1:2; 1:2 and 1:2.5; 1:2.5 and 1:3; 1:3 and 1:3.5; 1:3.5 and 1:4; 1:4 and 1:4.5; 1:4.5 and 1:5; 1:5 and 1:7.5; 1:7.5 and 1:10; 1:10 and 1:15; 1:15 and 1:20, or a range thereof. For example, in some embodiments, the precipitation material comprises silica and carbonates in a silica:carbonate ratio between 1:1 and 1:5, 1:5 and 1:10, or 1:5 and 1:20. In general, precipitation material produced by methods of the invention comprises mixtures of silicon-based material and at least one carbonate phase. In general, the more rapid the reaction rate, the more silica is incorporated with the carbonate-containing precipitation material, provided silica is present in the precipitation reaction mixture (i.e., provided silica was not removed after digestion of material comprising metal silicates).

Precipitation material may be in a storage-stable form (which may simply be air-dried precipitation material), and may be stored above ground under exposed conditions (i.e., open to the atmosphere) without significant, if any, degradation (e.g., loss of $CO_2$) for extended durations. In some embodiments, the precipitation material may be stable under exposed conditions for 1 year or longer, 5 years or longer, 10 years or longer, 25 years or longer, 50 years or longer, 100 years or longer, 250 years or longer, 1000 years or longer, 10,000 years or longer, 1,000,000 years or longer, or even 100,000,000 years or longer. A storage-stable form of the precipitation material may be stable under a variety of different environment conditions, for example, from temperatures ranging from –100° C. to 600° C. and humidity ranging from 0 to 100%, where the conditions may be calm, windy, or stormy. As the storage-stable form of the precipitation material undergoes little if any degradation while stored above ground under normal rainwater pH, the amount of degradation, if any, as measured in terms of $CO_2$ gas release from the product, does not exceed 5% per year, and in certain embodiments will not exceed 1% per year or 0.001% per year. Indeed, precipitation material provided by the invention does not release more than 1%, 5%, or 10% of its total $CO_2$ when exposed to normal conditions of temperature and moisture, including rainfall of normal pH for at least 1, 2, 5, 10, or 20 years, or for more than 20 years, for example, for more than 100 years. In some embodiments, the precipitation material does not release more than 1% of its total $CO_2$ when exposed to normal conditions of temperature and moisture, including rainfall of normal pH for at least 1 year. In some embodiments, the precipitation material does not release more than 5% of its total $CO_2$ when exposed to normal conditions of temperature and moisture, including rainfall of normal pH for at least 1 year. In some embodiments, the precipitation material does not release more than 10% of its total $CO_2$ when exposed to normal conditions of temperature and moisture, including rainfall of normal pH for at least 1 year. In some embodiments, the precipitation material does not release more than 1% of its total $CO_2$ when exposed to normal conditions of temperature and moisture, including rainfall of normal pH for at least 10 years. In some embodiments, the precipitation material does not release more than 1% of its total $CO_2$ when exposed to normal conditions of temperature and moisture including rainfall of normal pH for at least 100 years. In some embodiments, the precipitation material does not release more than 1% of its total $CO_2$ when exposed to normal conditions of temperature and moisture, including rainfall of normal pH for at least 1000 years.

Any suitable surrogate marker or test that is reasonably able to predict such stability may be used. For example, an accelerated test comprising conditions of elevated temperature and/or moderate to more extreme pH conditions is reasonably able to indicate stability over extended periods of time. For example, depending on the intended use and environment of the precipitation material, a sample of the precipitation material may be exposed to 50, 75, 90, 100, 120, or 150° C. for 1, 2, 5, 25, 50, 100, 200, or 500 days at between 10% and 50% relative humidity, and a loss less than 1%, 2%, 3%, 4%, 5%, 10%, 20%, 30%, or 50% of its carbon may be considered sufficient evidence of stability of precipitation material of the invention for a given period (e.g., 1, 10, 100, 1000, or more than 1000 years).

Any of a number of suitable methods may be used to test the stability of the precipitation material including physical test methods and chemical test methods, wherein the methods are suitable for determining that the compounds in the precipitation material are similar to or the same as naturally occurring compounds known to have the above specified stability (e.g., limestone). $CO_2$ content of the precipitation material may be monitored by any suitable method, one such non-limiting example being coulometry. Other conditions may be adjusted as appropriate, including pH, pressure, UV radiation, and the like, again depending on the intended or likely environment. It will be appreciated that any suitable conditions may be used that one of skill in the art would reasonably conclude indicate the requisite stability over the indicated time period. In addition, if accepted chemical knowledge indicates that the precipitation material would have the requisite stability for the indicated period this may be used as well, in addition to or in place of actual measurements. For example, some carbonate compounds that may be part of a precipitation material of the invention (e.g., in a given polymorphic form) may be well-known geologically and known to have withstood normal weather for decades, centuries, or even millennia, without appreciable breakdown, and so have the requisite stability.

Exemplary carbon dioxide release protocols for a composition of the invention may comprise modifying the chemical and/or physical environment of the composition, such as modifying pH, temperature, pressure, time, and the like, in a repeatable manner to effect a measurable release of carbon dioxide from the composition. In some embodiments, a composition may be subjected to a solution (e.g., aqueous solution) having a pH less than pH 8.5, pH 8.0, pH 7.5, pH 7.0, pH 6.5, pH 6.0, pH 5.5, pH 5.2, pH 5.0, pH 4.8, pH 4.6, pH 4.4, pH 4.2, pH 4.0, pH 3.8, pH 3.6, pH 3.4, pH 3.2, pH 3.0, pH 2.8, pH 2.6, pH 2.4, pH 2.2, pH 2.0, pH 1.8, pH 1.6, pH 1.4, pH 1.2, pH 1.0, pH 0.8, pH 0.6, pH 0.4, or pH 0.2. Such pH levels may be obtained by adding acid (e.g., HCl) to water, or by preparing a buffered solution at a particular pH. As certain reagents commonly used to prepare acidic solutions or buffers may react with a composition of the invention, proper selection of reagents is important to isolate the effect of pH on the composition. For example, while phosphoric acid may be used to prepare a buffered solution at a particular pH, phosphate may react with a composition comprising calcium carbonate such that calcium phosphate is formed. With this in mind, additional chemical agents should not be added that may either promote release of carbon dioxide by a reaction other than an acid-base reaction or react with the composition to form a different composition. A carbon dioxide release protocol for a composition of the invention may make use of a depressed or an elevated temperature. For example, in some embodiments, a temperature greater than 0° C., 10° C., 20° C., 25° C., 30° C., 40° C., 50° C., 60° C., 70° C., 80° C., 90° C., or 100° C. may be used. Temperatures in such tests may range between any of the foregoing (e.g., 60-80° C., 20-25° C. (room temperature)). The time during which the composition is subjected to a particular pH and/or temperature may be for any suitable time to effect release of carbon dioxide. For example, in some embodiments, a composition may be subjected to a particular pH and/or temperature for 0.5, 1, 2, 4, 6, 8, 16, 24, 32, 40, 48, 72, 96 hours. Time periods spanning from days (e.g., 5, 6, 7, etc), weeks (e.g., 1, 2, 3, 4, etc.), or months (e.g., 2, 3, 4, 5, 6, etc.) are also within the scope of carbon dioxide release protocols of the invention. In some embodiments, for example, a composition may be tested in a carbon dioxide release protocol consisting essentially of grinding the composition of the invention (e.g., precipitation material or compositions comprising precipitation material such as cement or concrete) such that particles of ground composition are less than 1 cm in the narrowest dimension if the particles are not already less than 1 cm in the narrowest dimension and immersing the ground composition in a solution having a pH between pH 4.8 and pH 5.2 and a temperature between 60 and 80° C. for 48 hours. In some embodiments, the composition produces no more than 0.25, 0.5, 1.0, 2.0, 4.0, 6.0, 8.0, 10, 20, 30, 40, or 50 grams of carbon dioxide per 100g of the composition. Any suitable test or tests for detecting and quantifying the release of carbon dioxide, or lack thereof may be used. This test is exemplary and those of skill in the art can design similar tests which may be used to effect a measureable release of carbon dioxide from a composition. It is to be understood that in any of the carbon dioxide release protocols, the addition of additional steps could affect $CO_2$ release and would necessitate comparison to the protocols set out herein to determine if adjusted levels of $CO_2$ release due to the additional steps is warranted.

The carbonate-containing precipitation material, which serves to sequester $CO_2$ in a form that is stable over extended periods of time (e.g., geologic time scales), may be stored for extended durations, as described above. The precipitation material, if needed to achieve a certain ratio of carbonates to silica, may also be mixed with silicon-based material (e.g., from separated silicon-based material after material comprising metal silicates digestion; commercially available $SiO_2$; etc.) to form pozzolanic material. Pozzolanic materials of the invention are siliceous or aluminosiliceous materials which, when combined with an alkali such as calcium hydroxide ($Ca(OH)_2$), exhibit cementitious properties by forming calcium silicates and other cementitious materials. $SiO_2$-containing materials such as volcanic ash, fly ash, silica fume, high reactivity metakaolin, and ground granulated blast furnace slag, and the like may be used to fortify compositions of the invention producing pozzolanic materials. In some embodiments, pozzolanic materials of the invention are fortified with 0.5% to 1.0%, 1.0% to 2.0%; 2.0% to 4.0%, 4.0% to 6.0%, 6.0% to 8.0%, 8.0% to 10.0%, 10.0% to 15.0%, 15.0% to 20.0%, 20.0% to 30.0%, 30.0% to 40.0%, 40.0% to 50.0%, or an overlapping range thereof, an $SiO_2$-containing material. Such SiO2-containing material may be obtained from, for example, an electrostatic precipitator or fabric filter of the invention.

As indicated above, in some embodiments, precipitation material comprises metastable carbonate compounds characterized in that such carbonates are more stable in salt water than in fresh water, such that upon contact with fresh water of any pH the carbonates dissolve and re-precipitate into other fresh water-stable minerals. In some embodiments, the carbonate compounds may be present as small particles, for example, with particle sizes ranging from 0.1 µm to 100 µm, 1 to 100 µm, 10 to 100 µm, 50 to 100 µm as determined by scanning electron microscopy (SEM). In some embodiments, particle sizes of the carbonate compounds range from 0.5 to 10 µm as determined by SEM. In some embodiments, the particle sizes exhibit a single modal distribution. In some embodiments, the particle sizes exhibit a bimodal or multimodal distribution. In certain embodiments, the particles have a high surface are ranging from, for example, 0.5 to 100 $m^2/gm$, 0.5 to 50 $m^2/gm$, or 0.5 to 2.0 $m^2/gm$ as determined by Brauner, Emmit, & Teller (BET) Surface Area Analysis. In some embodiments, precipitation material may comprise rod-shaped crystals and/or amorphous solids. The rod-shaped crystals may vary in structure, and in certain embodiments have a length to diameter ratio ranging from 500 to 1, 250 to 1, or 10 to 1. In certain embodiments, the length of the crystals ranges from 0.5 µm to 500 µm, 1 µm to 250 µm, or 5 µm to 100 µm. In yet other embodiments, substantially completely amorphous solids are produced.

Spray-dried material (e.g., precipitation material, silicon-based material, pozzolanic material, etc.), by virtue of being spray dried, may have a consistent particle size (i.e., the spray-dried material may have a relatively narrow particle size distribution). As such, in some embodiments, at least 50%, 60%, 70%, 80%, 90%, 95%, 97%, or 99% of the spray-dried material falls within ±10 microns, ±20 microns, ±30 microns, ±40 microns, ±50 microns, ±75 microns, ±100 microns, or ±250 microns of a given mean particle diameter. In some embodiments, the given mean particle diameter is between 5 and 500 microns. In some embodiments, the given mean particle is between 5 and 250 microns. In some embodiments, the given mean particle diameter is between 5 and 100 microns. In some embodiments, the given mean particle diameter is between 5 and 50 microns. In some embodiments, the given mean particle diameter is between 5 and 25 microns. For example, in some embodiments, at least 70% of the spray-dried material falls within ±50 microns of a given mean particle diameter, wherein the given mean particle diameter is between 5 and 500 microns, such as between 50 and 250 microns, or between 100 and 200 microns. Such spray-dried material may be used to manufacture cement, fine aggregate, mortar, coarse aggregate, concrete, and/or pozzolans of the invention; however, one of skill in the art will recognize that manufacture of cement, fine aggregate, mortar, coarse aggregate, concrete, and/or pozzolans does not require spray-dried precipitation material. Air-dried precipitation material, for example, may also be used to manufacture cement, fine aggregate, mortar, coarse aggregate, concrete, and/or pozzolans of the invention.

Generally, pozzolanic material has lower cementitious properties than ordinary Portland cement, but in the presence of a lime-rich media like calcium hydroxide, it shows better cementitious properties towards later day strength (>28 days). The pozzolanic reaction may be slower than the rest of the reactions which occur during cement hydration, and thus the short-term strength of concretes that include pozzolanic material of the invention may not be as high as concrete made with purely cementitious materials. The mechanism for this display of strength is the reaction of silicates with lime to form secondary cementitious phases (calcium silicate hydrates with a lower C/S ratio), which display gradual strengthening properties usually after 7 days. The extent of the strength development ultimately depends upon the chemical composition of the pozzolanic material. Increasing the composition of silicon-based material (optionally with added silica and/or alumina), especially amorphous silicon-based material, generally produces better pozzolanic reactions and strengths. Highly reactive pozzolans, such as silica fume and high reactivity metakaolin may produce "high early strength" concrete that increases the rate at which concrete comprising precipitation material of the invention gains strength.

Precipitation material comprising silicates and alumino-silicates may be readily employed in the cement and concrete industry as pozzolanic material by virtue of the presence of the finely divided siliceous and/or alumino-siliceous material (e.g., silicon-based material). The siliceous and/or alumino-siliceous precipitation material may be blended with Portland cement, or added as a direct mineral admixture in a concrete mixture. In some embodiments, pozzolanic material comprises calcium and magnesium in a ratio (as above) that perfects setting time, stiffening, and long-term stability of resultant hydration products (e.g., concrete). Crystallinity of carbonates, concentration of chlorides, sulfates, alkalis, etc. in the precipitation material may be controlled to better interact with Portland cement. In some embodiments, precipitation material comprises silica in which 10-20%, 20-30%, 30-40%, 40-50%, 50-60%, 60-70%, 70-80%, 80-90%, 90-95%, 95-98%, 98-99%, 99-99.9% of the silica has a particle size less than 45 microns (e.g., in the longest dimension). In some embodiments, siliceous precipitation material comprises aluminosilica in which 10-20%, 20-30%, 30-40%, 40-50%, 50-60%, 60-70%, 70-80%, 80-90%, 90-95%, 95-98%, 98-99%, 99-99.9% of the aluminosilica has a particle size less than 45 microns. In some embodiments, siliceous precipitation material comprises a mixture of silica and aluminosilica in which 10-20%, 20-30%, 30-40%, 40-50%, 50-60%, 60-70%, 70-80%, 80-90%, 90-95%, 95-98%, 98-99%, 99-99.9% of the mixture has a particle size less than 45 microns (e.g., in the biggest dimension).

Pozzolanic material produced by the methods disclosed herein may be employed as a construction material, which material may be processed for use as a construction material or processed for use in an existing construction material for buildings (e.g., commercial, residential, etc.) and/or infrastructure (e.g., pavements, roads, bridges, overpasses, walls, levees, dams, etc.). The construction material may be incorporated into any structure, the structures further including foundations, parking structures, houses, office buildings, commercial offices, governmental buildings, and support structures (e.g., footings for gates, fences and poles) is considered a part of the built environment. The construction material may be a constituent of a structural or nonstructural component of such structure. An additional benefit of using pozzolanic material as a construction material or in a construction material is that $CO_2$ employed in the process (e.g., $CO_2$ obtained from a waste gas stream) is effectively sequestered in the built environment.

In some embodiments, pozzolanic material of the invention may be employed as a component of a hydraulic cement (e.g., ordinary Portland cement), which sets and hardens after combining with water. Setting and hardening of the product produced by combining the precipitation material with cement and water results from the production of hydrates that are formed from the cement upon reaction with water, wherein the hydrates are essentially insoluble in water. Such hydraulic cements, methods for their manufacture and use are described in co-pending U.S. patent application Ser. No. 12/126,776, filed on 23 May 2008, the disclosure of which application is incorporated herein by reference. In some embodiments, pozzolanic material blended with cement is between 0.5% and 1.0%, 1.0% and 2.0%, 2.0% and 4.0%, 4.0% and 6.0%, 6.0% and 8.0%, 8.0% and 10.0%, 10.0% and 15.0%, 15.0% and 20.0%, 20.0% and 30.0%, 30.0% and 40.0%, 40.0% and 50.0%, 50% and 60%, or a range thereof, pozzolanic material by weight. For example, in some embodiments, pozzolanic material blended with cement is between 0.5% and 2.0%, 1.0% and 4.0%, 2.0% and 8.0%, 4.0% and 15.0%, 8.0% and 30.0%, or 15.0% and 60.0% pozzolanic material by weight.

In some embodiments, pozzolanic material is blended with other cementitious materials or mixed into cements as an admixture or aggregate. Mortars of the invention find use in binding construction blocks (e.g., bricks) together and filling gaps between construction blocks. Mortars of the invention may also be used to fix existing structure (e.g., to replace sections where the original mortar has become compromised or eroded), among other uses.

In some embodiments, the pozzolanic material may be utilized to produce aggregates. In some embodiments, aggregate is produced from the precipitation material by pressing and subsequent crushing. In some embodiments, aggregate is produced from the precipitation material by extrusion and breaking resultant extruded material. Such aggregates, methods for their manufacture and use are described in co-pending U.S. patent application Ser. No. 12/475,378, filed on 29 May 2009, the disclosure of which is incorporated herein by reference in it entirety.

The following examples are put forth so as to provide those of ordinary skill in the art with a complete disclosure and description of how to make and use the invention, and are not intended to limit the scope of the invention. Efforts have been made to ensure accuracy with respect to numbers used (e.g. amounts, temperature, etc.), but some experimental errors and deviations should be accounted for. Unless indicated otherwise, parts are parts by weight, molecular weight is weight average molecular weight, temperature is in degrees Centigrade (° C.), and pressure is at or near atmospheric.

EXAMPLES

The following analytical instrumentation and methods of use thereof may be used to characterize materials produced in accordance with the invention.

Coulometry: Liquid and solid carbon containing samples are acidified with 2.0 N perchloric acid ($HClO_4$) to evolve carbon dioxide gas into a carrier gas stream, and subsequently scrubbed with 3% w/v silver nitrate at pH 3.0 to remove any evolved sulfur gasses prior to analysis by an inorganic carbon coulometer (UIC Inc, model CM5015). Samples of cement, fly ash, and seawater are heated after addition of perchloric acid with a heated block to aid digestion of the sample.

Brunauer-Emmett-Teller ("BET") Specific Surface Area: Specific surface area (SSA) measurement is by surface absorption with dinitrogen (BET method). SSA of dry samples is measured with a Micromeritics Tristar™ II 3020 Specific Surface Area and Porosity Analyzer after preparing the sample with a Flowprep™ 060 sample degas system. Briefly, sample preparation involves degassing approximately 1.0 g of dry sample at an elevated temperature while exposing to a stream of dinitrogen gas to remove residual water vapor and other adsorbants from the sample surfaces. The purge gas in the sample holder is subsequently evacuated and the sample cooled before being exposed to dinitrogen gas at a series of increasing pressures (related to adsorption film thickness). After the surface is blanketed, the dinitrogen is released from the surface of the particles by systematic reduction of the pressure in the sample holder. The desorbed gas is measured and translated to a total surface area measurement.

Particle Size Analysis ("PSA"): Particle size analysis and distribution is measured using static light scattering. Dry particles are suspended in isopropyl alcohol and analyzed using a Horiba Particle Size Distribution Analyzer (Model LA-950V2) in dual wavelength/laser configuration. Mie scattering theory is used to calculate the population of particles as a function of size fraction, from 0.1 mm to 1000 mm.

Powder X-ray Diffraction ("XRD"): Powder X-ray diffraction is undertaken with a Rigaku Miniflex™ (Rigaku) to identify crystalline phases and estimate mass fraction of different identifiable sample phases. Dry, solid samples are hand-ground to a fine powder and loaded on sample holders. The X-ray source is a copper anode (Cu k$\alpha$), powered at 30 kV and 15 mA. The X-ray scan is run over 5-90 °2θ, at a scan rate of 2° 2θ per min, and a step size of 0.01° 2θ per step. The X-ray diffraction profile is analyzed by Rietveld refinement using the X-ray diffraction pattern analysis software Jade™ (version 9, Materials Data Inc. (MDI)).

Fourier Transform Infrared ("FT-IR") spectroscopy: FT-IR analyses is performed on a Nicolet 380 equipped with the Smart Diffuse Reflectance module. All samples are weighed to 3.5±0.5 mg and hand ground with 0.5 g KBr and subsequently pressed and leveled before being inserted into the FT-IR for a 5-minute nitrogen purge. Spectra are recorded in the range 400-4000 $cm^{-1}$.

Scanning Electron Microscopy ("SEM")

SEM are performed using an Hitachi TM-1000 tungsten filament tabletop microscope using a fixed acceleration voltage of 15 kV at a working pressure of 30-65 Pa, and a single BSE semiconductor detector. Solid samples are fixed to the stage using a carbon-based adhesive; wet samples are vacuum dried to a graphite stage prior to analysis. EDS analysis is performed using an Oxford Instruments SwiftED-TM system, the sensor for which has a detection range of 11Na-92U with an energy resolution of 165 eV.

Chloride: Chloride concentrations are determined with Chloride QuanTab® Test Strips (Product No. 2751340), having a testing range between 300-6000 mg chloride per liter solution measured in 100-200 ppm increments.

X-ray Fluorescence ("XRF"): XRF analyses of solid powder samples are performed using a Thermo Scientific ARL QUANT'X Energy-Dispersive XRF spectrometer, equipped with a silver anode X-ray source and a Peltier cooled Si(Li) X-ray detector. The samples are pressed into 31 mm pellets using an aluminum sample cup. For each sample, three different spectra are gathered, each tailored for analysis of specific elements: the first using no X-ray filter at 4 kV, the second using a thin silver filter at 18 kV, and the third using a thick silver filter at 30 kV, all under vacuum conditions. Spectra are analyzed using WinTrace software, using a Fundamental Parameters analysis method attained from calibration with certified standard materials.

Thermogravimetric Analysis ("TGA"): TGA analyses of solid powder samples are performed with a TA Instruments SDT Q600 with simultaneous TGA/DSC (Differential Scanning calorimetry). Samples, in an alumina crucible, are placed into a furnace heated from room temperature to 1000° C. at a constant ramp rate of 20° C. per minute. The weight loss profile over temperature is analyzed using Universal Analysis software.

Inductively Coupled Plasma Optical Emission Spectrometry ("ICP-OES"): ICP-OES analyses of typical acidified, liquid samples are performed using a Thermo ICAP 6500 equipped with a CETAC autosampler. iTEVA control software is used for data acquisition and analysis. Typical detection limits for ICP-OES are in the ppm range. Samples that contain high concentrations of dissolved salts (Na, Ca, Mg) may be analyzed using the ICAP 6500 equipped with an Elemental Scientific Inc. (ESI)— seaFAST autosampler equipped with a chelation column for matrix elimination analyte pre-concentration.

Example 1

Waste Gas Stream Processing

A. Equipment
System of FIG. 1F
   Coal-fired boiler (130)
   Gas-liquid/gas-liquid-solid contactor (112)
   Recirculation tank (116)
   Recirculation pump (118)
   Reactor (114)
   Base tank (140)
B. Materials
Coal
   Bituminous coal (2×500 lbs)
   Sub-bituminous coal (500 lbs)
50% NaOH (90 gallons)
$CaCl_2$ (50 kg)
Seawater
Freshwater
C. Procedure The primary feedstocks for the process were 1) coal-derived flue gas to provide $CO_2$, SOx, NOx, trace metals, etc., 2) a source of alkalinity to convert $CO_2$ to aqueous carbonates and/or bicarbonates, and 3) a source of calcium cations to precipitate calcium carbonates.

The $CO_2$-processing system was operated under conditions simulating a target commercial process including about 70% $CO_2$ absorption from flue gas derived from a coal-fired boiler. A two-step process was used with gas-liquid contact and absorption occurring in one unit process to produce a $CO_2$-charged solution and precipitation occurring in another unit process, wherein the $CO_2$-charged solution was mixed with a stream of divalent cations to form a slurry comprising carbonate-containing precipitation material.

The coal-fired boiler simulator (0.3 $MW_{th}$) provided an approximately 50 SCFM slip-stream of flue gas to the $CO_2$-processing system. The $CO_2$ concentration was controlled to roughly 12-14% by volume. Three different coal types were burned in three successive runs: two bituminous coals from the Raleigh and Dodge Hill mines, and a sub-bituminous coal from the Powder River Basin Rawhide mine. The coals and associated ashes were assayed for trace metals in order to do a complete accounting of their pathways and fates in the $CO_2$-processing system.

The gas-liquid contactor/absorber was operated under conditions that modeled commercial-scale targets of 70% $CO_2$ absorption and high utilization of alkalinity. The source of alkalinity was about one part in fifty of 50% sodium hydroxide diluted into fresh water.

Precipitation involved mixing a slipstream of $CO_2$-charged solution with simulated hard brine as a source of divalent calcium cations. In this case, the divalent cation source was calcium chloride dihydrate dissolved into fresh water to yield a solution of approximately 0.2 M $Ca^{2+}$.

Dewatering was performed using a vacuum filtration method to collect both the carbonate-containing precipitation material and the supernatant. The precipitation material was then oven-dried to removed residual moisture prior to further testing.

Table 2 below shows the various process streams that were sampled, the quantities that were measured, and the testing methods used.

TABLE 2

Process streams sampled, quantities measured, and testing methods used.

| Stream measured | Measured quantity | Testing method |
|---|---|---|
| Flue gas in/out of absorber | Trace metals (CAM17) | EPA method 29 |
| | HF/HCl | EPA method 26 |
| | SOx | EPA method 8 |
| | Stable C & O isotopes | |
| Liquids in/out of absorber | Trace metals (CAM17) | EPA methods 200.8/200.7 |
| | Stable C & O isotopes | |
| Solids in/out | Trace metals (CAM17) | EPA method 6020 |
| | Stable C & O isotopes | |
| Mortar paste leaching | Trace metals | TCLP |

D. Results

Table 3 gives results for HF digestion and subsequent ICP-MS assays of the coals used and fly ash samples produced. Molar concentration factors were calculated using trace metal concentrations and ash percentages for each coal and ash type. A value of "1" indicates that the same number of moles of a metal are in the fly ash as are in the parent coal. A value of "2" indicates that twice the number of moles of a metal exist in the fly ash relative to the parent coal. A value >1 is contrary to conservation of mass, which may indicate that the ash samples were taken from a non-representative portion of the overall particle size distribution for all of the ash produced. In addition, the amount of metals concentrated in the fly ash might be different depending upon the temperature history and residence times of the individual ash particles, which is also an unknown. More work may need to be done to fully characterize how the trace metals are partitioning into the fly ash stream.

TABLE 3

Results of trace metals assays for coal and fly ash samples.

| | Cemex - Raleigh[1] | | | Duke Energy - Dodge Hill[1] | | | PRB - Rawhide[2] | | |
|---|---|---|---|---|---|---|---|---|---|
| Species (mg species/kg dry coal/ash "as is") | Coal | Ash | Ash Conc. Factor | Coal | Ash | Ash Conc. Factor | Coal | Ash | Ash Conc. Factor |
| Ash at 750° C. (%) | 12.06 | — | — | 10.09 | — | — | 6.46 | — | — |
| Cl | 0.0337 | 0.0370 | — | 0.3151 | 0.0391 | — | 0.0030 | 0.0110 | — |
| Hg | 0.064 | 0.069 | 0.13 | 0.058 | 0.039 | 0.067 | 0.071 | 0.094 | 0.086 |
| Ag | 0.342 | 4.39 | 1.55 | 0.286 | 4.07 | 1.44 | 0.208 | 3.49 | 1.08 |
| As | 1.92 | 36.8 | 2.31 | 3.01 | 58.4 | 1.96 | 1.68 | 43.8 | 1.68 |
| Ba | 118 | 1060 | 1.08 | 41.5 | 591 | 1.44 | 399 | 6610 | 1.07 |
| Be | 0.855 | 10.4 | 1.47 | 2.70 | 31.7 | 1.18 | 0.410 | 8.43 | 1.33 |
| Cd | 0.120 | 1.43 | 1.44 | 0.451 | 6.16 | 1.38 | 0.080 | 1.04 | 0.83 |
| Co | 1.99 | 28.0 | 1.70 | 3.00 | 35.9 | 1.21 | 2.85 | 51.2 | 1.16 |

TABLE 3-continued

Results of trace metals assays for coal and fly ash samples.

| Species (mg species/kg dry coal/ash "as is") | Cemex - Raleigh[1] | | | Duke Energy - Dodge Hill[1] | | | PRB - Rawhide[2] | | |
|---|---|---|---|---|---|---|---|---|---|
| | Coal | Ash | Ash Conc. Factor | Coal | Ash | Ash Conc. Factor | Coal | Ash | Ash Conc. Factor |
| Cr | 35.8 | 395 | 1.33 | 25.0 | 345 | 1.39 | 5.18 | 124 | 1.55 |
| Cu | 13.4 | 137 | 1.24 | 18.9 | 186 | 0.99 | 11.6 | 187 | 1.04 |
| Mn | 178 | 1160 | 0.79 | 91.1 | 686 | 0.76 | 18.2 | 285 | 1.01 |
| Mo | 1.50 | 29.2 | 2.36 | 6.36 | 122 | 1.94 | 0.615 | 21.5 | 2.25 |
| Ni | 8.10 | 103 | 1.53 | 13.8 | 169 | 1.23 | 7.98 | 130 | 1.05 |
| Pb | 4.78 | 72.7 | 1.83 | 15.8 | 213 | 1.35 | 2.61 | 53.0 | 1.31 |
| Sb | 0.307 | 4.82 | 1.89 | 0.554 | 8.59 | 1.56 | 0.146 | 4.02 | 1.78 |
| Se | <1 | 6.85 | — | 1.36 | 6.27 | 0.47 | <1 | 16.0 | — |
| Tl | 0.208 | 2.30 | 1.34 | 0.713 | 7.85 | 1.11 | 0.038 | 0.904 | 1.54 |
| V | 12.6 | 189 | 1.81 | 39.0 | 516 | 1.34 | 17.1 | 317 | 1.20 |
| Zn | 16.3 | 167 | 1.24 | 37.4 | 516 | 1.39 | 28.8 | 479 | 1.08 |

The fly ash samples were obtained from the baghouse at the end of a 12-hour shift on coal. The concentration factors are in units of moles in ash/moles in coal.
[1]Bituminous coal
[2]Sub-bituminous coal Table 4 shows results of flue gas assays using EPA method 29. Combustion calculations were used to illustrate the concentrations expected if 100% of the trace metals content of the coal went into the flue gas stream. What these data show is that most trace metals (mercury and selenium excepted) are refractory enough that only a minor fraction remains in the flue gas downstream of the baghouse.

soluble mercury(II) chloride that would be produced during the combustion of the coal with higher chloride content.

The overall removal efficiencies in the table show estimates of the proportion of trace metals in the coal feedstock that never make it through the absorber and out the stack. This is greater than 99% for most elements, with the exception of

TABLE 4

Comparison of theoretical maximum and measured values of flue gas trace metals concentrations.

| Species | Cemex - Raleigh[1] | | | Duke Energy - Dodge Hill[1] | | | PRB - Rawhide[2] | | |
|---|---|---|---|---|---|---|---|---|---|
| | Theor. 100% in flue gas (ppb) | Abs. inlet conc. (ppb) | Abs. outlet conc. (ppb) | Theor. 100% in flue gas (ppb) | Abs. inlet conc. (ppb) | Abs. outlet conc. (ppb) | Theor. 100% in flue gas (ppb) | Abs. inlet conc. (ppb) | Abs. outlet conc. (ppb) |
| Hg | 0.83 | 0.25 ± 0.05 | ND < 0.17 | 0.73 | 0.18 ± 0.04 | ND < 0.10 | 1.05 | 0.27 ± 0.03 | ND < 0.21 |
| Ag | 8.29 | 0.05 ± 0.01 | ND < 0.02 | 6.68 | ND < 0.02 | ND < 0.02 | 5.70 | ND < 0.02 | ND < 0.02 |
| As | 66.98 | 0.34 ± 0.15 | ND < 0.03 | 101.12 | 0.33 ± 0.07 | ND < 0.03 | 66.23 | ND < 0.03 | ND < 0.03 |
| Ba | 2245.87 | 0.56 ± 0.7 | 1.35 ± 0.79 | 760.62 | 0.44 ± 0.31 | 0.57 ± 0.39 | 8581.65 | 1.89 ± 0.52 | 0.39 ± 0.1 |
| Be | 248.03 | 0.57 ± 0.4 | ND < 0.09 | 754.27 | 0.34 ± 0.23 | ND < 0.09 | 134.41 | 0.21 ± 0.04 | ND < 0.09 |
| Cd | 2.79 | 0.09 ± 0.06 | 0.03 ± 0.01 | 10.10 | ND < 0.02 | ND < 0.02 | 2.10 | 0.03 ± 0.01 | ND < 0.02 |
| Co | 88.26 | ND < 0.04 | ND < 0.04 | 128.14 | ND < 0.04 | ND < 0.04 | 142.85 | ND < 0.04 | ND < 0.04 |
| Cr | 1799.62 | 3.11 ± 1.58 | 0.75 ± 0.43 | 1210.20 | 2.39 ± 1.06 | 0.81 ± 0.2 | 294.25 | 1.18 ± 0.19 | 0.45 ± 0.07 |
| Cu | 551.13 | 1.32 ± 0.77 | 0.31 ± 0.14 | 748.57 | 0.87 ± 0.36 | 0.34 ± 0.09 | 539.15 | 0.86 ± 0.13 | 0.65 ± 0.59 |
| Mo | 40.87 | 0.73 ± 0.62 | 0.59 ± 0.67 | 166.86 | 1.00 ± 0.53 | 0.93 ± 0.48 | 18.93 | 1.21 ± 0.62 | 0.89 ± 0.61 |
| Ni | 360.61 | 1.00 ± 0.44 | 0.50 ± 0.23 | 591.63 | 1.38 ± 0.48 | 1.15 ± 0.78 | 401.47 | 0.79 ± 0.11 | 0.57 ± 0.21 |
| Pb | 60.30 | 0.05 ± 0.6 | ND < 0.01 | 191.93 | ND < 0.006 | ND < 0.006 | 37.21 | ND < 0.006 | ND < 0.006 |
| Sb | 6.53 | ND < 0.03 | ND < 0.03 | 11.45 | ND < 0.03 | ND < 0.03 | 3.54 | ND < 0.03 | ND < 0.03 |
| Se | 0 | 0.56 ± 0.17 | ND < 0.05 | 43.35 | 0.96 ± 0.53 | ND < 0.05 | 0 | ND < 0.05 | ND < 0.05 |
| Tl | 2.66 | ND < 0.02 | ND < 0.02 | 8.78 | ND < 0.02 | ND < 0.02 | 0.55 | ND < 0.02 | ND < 0.02 |
| V | 646.52 | 0.54 ± 0.54 | ND < 0.01 | 1927.05 | 0.27 ± 0.3 | ND < 0.01 | 991.52 | 0.15 ± 0.01 | ND < 0.01 |
| Zn | 651.64 | 3.07 | 1.6 ± 1.44 | 1439.84 | 4.65 ± 4.33 | 1.49 ± 0.69 | 1301.10 | 2.09 ± 2.03 | 0.37 ± 0.44 |

Theoretical values were calculated using chemical assays of the raw coal. All ppb values are in terms of volume. The theoretical maximum concentrations were determined on a combustion basis of 3.5% excess oxygen. "ND" indicates that the measured value was below the detection limit. The symbol "±" indicates one standard deviation from the mean value.
[1]Bituminous coal
[2]Sub-bituminous coal Table 5 shows removal efficiencies calculated from the flue gas concentrations for each coal type. Removal efficiencies across the absorber inlet and outlet gas streams were significant for most of the metal species. An interesting feature to note is the dependence of mercury removal on coal type. Referring to Table 7, the concentration of chlorine in the coals were ~0.3 mg/kg for Dodge Hill, ~0.03 mg/kg for Raleigh, and ~0.003 mg/kg for Rawhide. The removal efficiency for Dodge Hill is roughly twice that of the other, lower chlorine, coals. This observation is likely due to higher levels of water-mercury, which is of special importance because it is the trace element with the most regulatory interest. Due to its high volatility, much of the mercury remains in the gas phase and passes through the baghouse. And since a fraction of elemental mercury is unlikely to be processed, additional control technology such as activated carbon injection or supplemental chlorination of the combustion flame to enhance production of oxidized mercury may be beneficial for complete removal.

TABLE 5

Trace metal removal efficiencies.

| | Cemex - Raleigh[1] | | Duke Energy - Dodge Hill[1] | | PRB - Rawhide[2] | |
|---|---|---|---|---|---|---|
| Species | Abs. removal eff. (%) | Overall removal eff. (%) | Abs. removal eff. (%) | Overall removal eff. (%) | Abs. removal eff. (%) | Overall removal eff. (%) |
| Hg | 28 ± 4 | 79.62 | 45 ± 26 | 86.26 | 22 ± 12 | 79.91 |
| Ag | 54 ± 11 | 99.76 | — | 99.70 | — | 99.65 |
| As | 90-100 | 99.96 | 91-100 | 99.97 | — | 99.95 |
| Ba | — | 99.94 | 41 ± 16 | 99.93 | 72 ± 9 | 100.00 |
| Be | 70-100 | 99.96 | 62 ± 27 | 99.99 | 44-100 | 99.93 |
| Cd | 47 ± 23 | 98.92 | — | 99.80 | 14-100 | 99.05 |
| Co | — | 99.95 | — | 99.97 | — | 99.97 |
| Cr | 69 ± 12 | 99.96 | 63 ± 7 | 99.93 | 49 ± 13 | 99.85 |
| Cu | 68 ± 11 | 99.94 | 57 ± 14 | 99.95 | 51 ± 19 | 99.88 |
| Mo | 23 ± 45 | 98.56 | 3 ± 4 | 99.44 | 18 ± 24 | 95.30 |
| Ni | 40 ± 7 | 99.86 | 22 ± 24 | 99.81 | 11 ± 20 | 99.86 |
| Pb | 80.00 | 99.98 | — | 100.00 | — | 99.98 |
| Sb | — | 99.54 | — | 99.74 | — | 99.15 |
| Se | 89-100 | — | 92-100 | 99.88 | — | — |
| Tl | — | 99.25 | — | 99.77 | — | 96.36 |
| V | 93-100 | 100.00 | 90-100 | 100.00 | 88-100 | 100.00 |
| Zn | 38 | 99.75 | 51 ± 26 | 99.90 | 79-90 | 99.97 |

The first column for each coal type is the percentage of flue gas trace metals removed from the absorber flue gas inlet stream. The second column was calculated from the initial coal assay and the fraction of trace metals leaving the absorber in the flue gas. The symbol "—" indicates that the measured values necessary for calculation were below the detection limit. The symbol "±" indicates one standard deviation from the mean value.
[1]Bituminous coal
[2]Sub-bituminous coal Table 6 gives the absorber inlet/outlet results for various acid gases. Due to the high aqueous solubility and alkaline conditions of the scrubbing technology used in the absorber, very high levels of acid gas capture were achieved. Most notable is the 99.9% removal of $SO_2$ across the absorber. HF removal was relatively difficult to quantify because of its concentration relative to detection limits: its removal can only be constrained across a large range.

Table 7 gives results for trace metals assays for 1) process water (fresh water), 2) synthetic brine, and 3) supernatant liquid streams. Also given are calculated theoretical maximum levels if 100% of the coal's metals were to go into the liquid stream, which calculation assumes combustion with 3.5% excess $O_2$. $Ca^{2+}$ interferes with the readings of other metals in solution. The result is that the samples needed to be significantly diluted to eliminate the $Ca^{2+}$ interference, which, in turn, caused an increase in the detection limit.

TABLE 6

Comparison of acid gas removal efficiencies for the three coal types tested.

| | Cemex - Raleigh[1] | | | Duke Energy - Dodge Hill[1] | | | PRB - Rawhide[2] | | |
|---|---|---|---|---|---|---|---|---|---|
| Species | Abs. inlet conc. (ppm) | Abs. outlet conc. (ppm) | Removal eff. (%) | Abs. inlet conc. (ppm) | Abs. outlet conc. (ppm) | Removal eff. (%) | Abs. inlet conc. (ppm) | Abs. outlet conc. (ppm) | Removal eff. (%) |
| $H_2SO_4$/$SO_3$ | 1.84 ± 0.36 | 0.24 ± 0.39 | 87.6 ± 19.7 | 2.92 ± 1.8 | 0.17 ± 0.27 | 92.4 ± 11.9 | 2.26 ± 0.6 | 0.02 ± 0 | 99.2 ± 0.2 |
| $SO_2$ | 829.7 ± 39.9 (937.00)[3] | 0.45 ± 0.15 | 99.9 ± 0 | 1872.1 ± 15.2 (1978.00)[3] | 2.05 ± 3.43 | 99.9 ± 0.2 | 263.3 ± 88 (433.00)[3] | 0.07 ± 0 | 99.97 ± 0.01 |
| HCl | 5.36 ± 1.94 | 0.53 ± 0.22 | 88.5 ± 8.4 | 27.6 ± 27.1 | 0.31 ± 0.23 | 98.7 ± 1.1 | 3.04 ± 1.02 | 0.6 ± 0.38 | 81.4 ± 5.3 |
| HF | 0.83 ± 0.42 | — | 28-100 | 1.00 ± 0.51 | — | 26-100 | 0.5 ± 0.18 | — | 24-100 |

The symbol "±" indicates one standard deviation from the mean value.
[1]Bituminous coal
[2]Sub-bituminous coal
[3]Parenthetical value is theoretical maximum concentration of $SO_2$.

TABLE 7

Liquid assay results for the different liquid streams involved in the absorption and precipitation process.

| Species | Fresh process water (µg/L) | Synthetic brine (µg/L) | Cemex - Raleigh[1] | | Duke Energy - Dodge Hill[1] | | PRB - Rawhide[2] | |
|---|---|---|---|---|---|---|---|---|
| | | | Coal-derived theor. max (µg/L) | Supernatant (µg/L) | Coal-derived theor. max (µg/L) | Supernatant (µg/L) | Coal-derived theor. max (µg/L) | Supernatant (µg/L) |
| Hg | ND < 0.012 | ND < 0.24 | 0.26 | ND < 0.24 | 0.22 | ND < 0.24 | 0.32 | ND < 0.24 |
| Ag | ND < 0.19 | ND < 3.8 | 1.37 | ND < 3.8 | 1.11 | ND < 3.8 | 0.94 | ND < 3.8 |
| As | 1.6 ± 0.1 | ND < 10 | 7.71 | ND < 10 | 11.64 | ND < 10 | 7.63 | ND < 10 |
| Ba | 45 ± 4.6 | ND < 100 | 473.99 | ND < 100 | 160.53 | ND < 100 | 1811.17 | ND < 100 |
| Be | ND < 0.5 | ND < 10 | 3.43 | ND < 10 | 10.44 | ND < 10 | 1.86 | ND < 10 |
| Cd | ND < 0.25 | ND < 5.0 | 0.48 | ND < 5.0 | 1.74 | ND < 5.0 | 0.36 | ND < 5.0 |
| Co | ND < 0.5 | 12.3 ± 1.4 | 7.99 | ND < 10 | 11.60 | ND < 10 | 12.94 | ND < 10 |
| Cr | 4.3 ± 0.0 | ND < 10 | 143.80 | ND < 10 | 96.71 | ND < 10 | 23.1 | ND < 10 |
| Cu | 15.3 ± 16.9 | 15-43 | 53.83 | ND < 10 | 73.11 | ND < 10 | 52.66 | ND < 10 |
| Mo | ND < 0.5 | ND < 10 | 6.03 | ND < 10 | 24.60 | ND < 10 | 2.79 | ND < 10 |
| Ni | ND < 0.5 | ND < 10 | 32.54 | ND < 10 | 53.38 | ND < 10 | 36.22 | ND < 10 |
| Pb | 3 ± 0.0 | ND < 10 | 19.20 | ND < 10 | 61.12 | ND < 10 | 11.85 | ND < 10 |
| Sb | ND < 0.5 | ND < 10 | 1.22 | ND < 10 | 2.14 | ND < 10 | 0.66 | ND < 10 |
| Se | ND < 0.5 | ND < 10 | 0.00 | ND < 10 | 5.26 | ND < 10 | 0.00 | ND < 10 |
| Tl | ND < 0.5 | ND < 10 | 0.84 | ND < 10 | 2.76 | ND < 10 | 0.17 | ND < 10 |
| V | 11.5 ± 0.6 | ND < 10 | 50.61 | ND < 10 | 150.86 | ND < 10 | 77.62 | ND < 10 |
| Zn | 16.5 ± 5.2 | 198 ± 27 | 65.48 | ND < 100 | 144.67 | ND < 100 | 130.73 | ND < 100 |

Theoretical values were calculated using chemical assays of the raw coal assuming combustion with 3.5% $O_2$, 100% metal capture, 50 SCFM gas flow, and 10 gpm liquid flow. "ND" indicates that the measured value was below the detection limit. The symbol "±" indicates one standard deviation from the mean value.
[1]Bituminous coal
[2]Sub-bituminous coal Table 8 gives trace metals assays results for the precipitate formed. Detection limits for some metals are comparable to theoretical maximum values making quantitation difficult when the sole source of such trace metals is from coal-derived flue gas; however, trace metals are also likely to result from other sources such as the fresh water source, base source (e.g., natural or industrial waste), and corrosion/leaching from the ducts, pipes, and absorber.

Example 2

Mortar Preparation and Leaching

A. Equipment
Analytical balance (with capability to measure to 0.1 mg)
Hobart mixer
2"×2"×2" cube brass mold
23° C./98% relative humidity room

TABLE 8

Precipitate assay results for the different coal types.

| Species | Cemex - Raleigh[1] | | Duke Energy - Dodge Hill[1] | | PRB - Rawhide[2] | |
|---|---|---|---|---|---|---|
| | Theor. max (mg/kg) | Precipitate (mg/kg) | Theor. max (mg/kg) | Precipitate (mg/kg) | Theor. max (mg/kg) | Precipitate (mg/kg) |
| Hg | 0.02 | ND < 0.05 | 0.01 | ND < 0.05 | 0.02 | ND < 0.05 |
| Ag | 0.08 | ND < 0.5 | 0.07 | ND < 0.5 | 0.05 | ND < 0.5 |
| As | 0.46 | ND < 0.5 | 0.71 | ND < 0.5 | 0.43 | ND < 0.5 |
| Ba | 28.46 | ND < 5.0 | 9.79 | 6.2 ± 1.4 | 102.61 | ND < 5.0 |
| Be | 0.21 | ND < 0.5 | 0.64 | ND < 0.5 | 0.11 | ND < 0.5 |
| Cd | 0.03 | ND < 0.25 | 0.11 | ND < 0.25 | 0.02 | ND < 0.25 |
| Co | 0.48 | 0.52 ± 0.01 | 0.71 | 0.54 ± 0.02 | 0.73 | 0.54 ± 0.01 |
| Cr | 8.64 | 0.67 ± 0.18 | 5.90 | 1.6 ± 0.28 | 1.33 | ND < 0.5 |
| Cu | 3.23 | 1.63 ± 0.40 | 4.46 | 0.75 ± 0.04 | 2.98 | 1.09 ± 0.21 |
| Mo | 0.36 | ND < 0.5 | 1.50 | ND < 0.5 | 0.16 | ND < 0.5 |
| Ni | 1.95 | 0.68 ± 0.27 | 3.26 | ND < 0.5 | 2.05 | 0.62 ± 0.16 |
| Pb | 1.15 | ND < 0.5 | 3.73 | ND < 0.5 | 0.67 | ND < 0.5 |
| Sb | 0.07 | ND < 0.5 | 0.13 | ND < 0.5 | 0.04 | ND < 0.5 |
| Se | 0.00 | ND < 0.5 | 0.32 | ND < 0.5 | 0.00 | ND < 0.5 |
| Tl | 0.05 | ND < 0.5 | 0.17 | ND < 0.5 | 0.01 | ND < 0.5 |
| V | 3.04 | 1.13 ± 0.06 | 9.20 | 1.13 ± 0.15 | 4.40 | 1.2 ± 0.1 |
| Zn | 3.93 | 12.67 ± 0.58 | 8.82 | 11.33 ± 1.52 | 7.41 | 13.3 ± 1.53 |

Theoretical values were calculated using chemical assays of the raw coal and assuming combustion with 3.5% $O_2$, 100% metal capture, and 70% $CO_2$ capture. "ND" indicates that the measured value was below the detection limit. The symbol "±" indicates one standard deviation from the mean value.
[1]Bituminous coal
[2]Sub-bituminous coal Compression tester
Shatterbox and tungsten carbide grinding container
Pipettor (5 mL and 1 mL)
pH-meter and calibration solutions for pH-=1.68, 4.0 and 7.0
pH paper strips (pH 0-14)
1000 mL To-Contain (TC) graduated cylinder
2000 mL flask
Magnetic stirrer and stir-plate
Bottles (Wide-Mouth EP Tox Bottle, Teflon® Resin FEP, NALGENE VWR #16124-970)
Millipore 4-position rotator/agitator
Filter holder (polypropylene, 15 cm, VWR #30305-120)
Erlenmeyer flask (borosilicate glass, 500 mL, VWR #89000-388)
Glass fiber filter paper (Borosilicate 0.7 μm, Whatman GF/F 15 cm Ø, VWR #28497-909)
50 mL liquid sample containers for leachate samples
B. Materials
Portland cement (OPC4-3)
Precipitation material (in dry powder form)
Reagent grade acetic acid ($CH_3COOH$, VWR #JT9508-6)
Alconox
Deionized water
18% Nitric acid (for ICP-OES sample acidification)
C. Total Analysis of the Solid Components The Portland cement lot used for the study as well as the precipitation material was sent out for full digestion and analysis (CAM/CCR 17 Metals-Extraction method SW3050B-McCampbell Analytical Lab-1534 Willow Pass Rd, Pittsburgh, Calif. 94565).

D. Preparation of Extracting Liquid

Extraction fluid #2 (per §5.7.2 of EPA Test Method 1311) was prepared by diluting 5.7 mL glacial acetic acid with deionized water to a volume of 1 L using a "To Contain" (TC) graduated cylinder. A pH meter was calibrated using pH 1.68, pH 4.0, and pH 7.0 calibration solutions, and the pH of extraction fluid was measured at pH 2.88+0.05. Two 1 L batches were prepared to match the 80-100 g of ground solid required by the method. Note that it is necessary to prepare fresh extraction fluid for each leaching test.

E. Preparation of Paste Samples

Mixing: The paste samples were prepared following the ASTM procedure C305 using a total of 650 g of cementitious materials and a deionized water to cementitious material ratio of 0.50. Three 2"×2"×2" cubes were subsequently cast in pre-greased brass molds.

Curing: The cube molds were kept in a 98% relative humidity chamber for 24 hrs, after which the paste cubes were removed from their molds. The individual cubes were then placed on shelves of the 98% relative humidity room at a 45° angle (such as to not collect water on any one of the cube surfaces) for a period of 28 days.

Grinding: At the end of the curing period, each of the three samples was patted dry and placed in an individual Ziploc® bag. Each cube was quickly crushed (using a compression tester) inside of its Ziploc® bag before grinding in a shatterbox. For each sample, the shatterbox was run for 10 seconds on about 100 mL of crushed solid to get a fine powder with some coarse/sand size grains. The particle size distribution is much finer than the required particle size distribution by EPA, purposefully chosen in order to test for a worst case scenario.

F. Extraction

The extraction of each sample was carried out following the Bottle Extraction method described in §4.2.2 of EPA Test Method 1311. The bottle was filled with 2 L of extraction liquid #2 to which 100 g of ground solid was added. The lid was tightly closed and taped with duct tape, and the bottle was placed in the rotator-agitator and agitated for 18±2 hours. An additional bottle filled with 2 L deionized water was placed in one of the holders and agitated for the same amount of time, to provide an aliquot for analysis alongside the other extracted samples.

G. Filtration

Filtration of each sample was performed using a new borosilicate filter paper. The pH of filtrate was also measured. A 30 mL aliquot of the filtrate was subsequently prepared and acidified with 18% nitric acid to a pH of less than or equal to pH 2. A blank filtration sample was also prepared using a clean filter and deionized water such that an aliquot could be submitted for analysis along with the other blank sample and the leachate.

H. Analysis

The three samples (leachate, bottle blank, and filter blank) were analyzed by ICP-OES (Thermo Scientific iCAP 6500 ICP), using QC26 and Hg methods.

I. Results

Table 9 gives the results of mortar paste leaching studies conducted with the materials produced. The samples were prepared using a 20% Ordinary Portland Cement (OPC) replacement.

TABLE 9

Precipitate assay results from mortar leaching using the TCLP leaching protocol on 20% OPC replacement mortar paste samples.

| | | | Cemex - Raleigh[1] | | Duke Energy - Dodge Hill[1] | | PRB - Rawhide[2] | |
|---|---|---|---|---|---|---|---|---|
| Species | MCL Drinking Water Limit (mg/L) | TCLP Reg. Limit (mg/L) | Theor. TCLP Max. (mg/L) | Measured TCLP (mg/L) | Theor. TCLP Max. (mg/L) | Measured TCLP (mg/L) | Theor. TCLP Max. (mg/L) | Measured TCLP (mg/L) |
| Hg | 0.002 | 0.2 | 0.000 | 0.000 | 0.000 | 0.000 | 0.000 | |
| Ag | — | 5 | 0.000 | 0.001 | 0.000 | 0.000 | 0.000 | |
| As | 0.01 | 5 | 0.462 | 0.005 | 0.449 | 0.009 | 0.457 | |
| Ba | 2.0 | 100 | 9.645 | 1.344 | 9.679 | 1.403 | 9.637 | |
| Cd | 0.005 | 1 | 0.032 | 0.000 | 0.032 | 0.000 | 0.032 | |
| Cr | 0.1 | 5 | 2.092 | 0.016 | 2.106 | 0.025 | 2.091 | |
| Pb | 0.015 | 5 | 0.228 | 0.000 | 0.228 | 0.000 | 0.228 | |
| Se | 0.05 | 1 | 0.502 | 0.019 | 0.352 | 0.018 | 0.455 | |

The samples were ground, leached, and the leachate was analyzed at 20-days. The theoretical maximum values for TCLP measurements are based upon the previously estimated theoretical maximum values for trace metals concentrations in the precipitate with a 100-fold dilution and the contribution of the 80% of cement.
[1]Bituminous coal
[2]Sub-bituminous coal

Example 3

Alternative Mortar Leaching Analysis

In accordance with the procedure outlined in Example 2, mortar cubes are prepared, paste samples of the mortar cubes are prepared, and the paste samples are extracted with freshly prepared extraction liquid #2. Due to potentially high salt concentrations, filtered extract samples are either diluted 1:100 prior to analysis by ICP-OES, or filtered extract samples are processed in an ICP-OES sample introduction system (e.g., Elemental Scientific Inc. (ESI)— seaFAST) configured with a chelation column for salt matrix elimination and analyte pre-concentration. In this example, the ICP-OES sample introduction system is preferred as dilution of the filtered extract samples may result in non-detection of many of the analytes of interest.

Example 4

Measurement of $\delta^{13}C$ Value for Precipitation Material and Starting Materials This experiment was performed using flue gas resulting from burning propane and a magnesium-rich industrial waste material. The procedure was conducted in a container open to the atmosphere.

The starting materials were flue gas from a propane burner, seawater (from around Santa Cruz, Calif.), and brucite (Mg(OH)$_2$) tailings as the magnesium-rich industrial waste. The brucite tailings were approximately 85% Mg(OH)$_2$, 12% CaCO$_3$ and 3% SiO$_2$ as determined by a Rietveld analysis of the X-ray diffraction pattern of a dry aliquot of the tailings.

A container was filled with locally available seawater. Brucite tailings were added to the seawater, providing an alkaline pH and divalent cation concentration suitable for precipitation of carbonate-containing precipitation material without releasing CO$_2$ into the atmosphere. Flue gas was sparged at a rate and time suitable for precipitation of the carbonate-containing precipitation material from the alkaline seawater solution. Sufficient time was allowed for interaction of the components of the reaction, after which time the precipitation material was separated from the remaining seawater solution, also known as the supernatant solution, and spray-dried. The resultant powder was suitable, with further processing, for use as a building material such as aggregate for use in a roadbed, concrete, or the like. As described herein, the resultant powder was also suitable for simple storage stored. Alternatively, the precipitation material may have been left in the seawater solution and stored, optionally after equilibration with atmospheric air.

$\delta^{13}C$ values for the process starting materials, resulting carbonate-containing precipitation material and supernatant solution were measured. The analysis system used was manufactured by Los Gatos Research and uses direct absorption spectroscopy to provide $\delta^{13}C$ and concentration data for gases ranging from 2% to 20% CO$_2$. The instrument was calibrated using standard 5% CO$_2$ gases with known isotopic composition, and measurements of CO$_2$ evolved from samples of travertine and IAEA marble #20 digested in 2M perchloric acid yielded values that were within acceptable measurement error of the values found in literature. The CO$_2$ source gas was sampled using a syringe. The CO$_2$ gas was passed through a gas dryer (Perma Pure MD Gas Dryer, Model MD-110-48F-4 made of Nafion® polymer), then into the bench-top commercially available carbon isotope analysis system. Solid samples, such as the brucite tailings and precipitation material, were first digested with heated perchloric acid (2M HClO$_4$). CO$_2$ gas was evolved from the closed digestion system, and then passed into the gas dryer. From there, the gas was collected and injected into the analysis system, resulting in $\delta^{13}C$ data. Similarly, the supernatant solution was digested to evolve CO$_2$ gas that was then dried and passed to the analysis instrument resulting in $\delta^{13}C$ data.

Measurements from the analysis of the flue gas, industrial waste (brucite tailings), carbonate-containing precipitation material, and supernatant solution are as follows. The $\delta^{13}C$ values for the precipitation material and supernatant solution were −19.92‰ and −24.8‰, respectively. The $\delta^{13}C$ values of both products of the reaction reflect the incorporation of the flue gas, CO$_2$ source, ($\delta^{13}C$=−25.00‰) and the influence of the brucite tailings that included some calcium carbonate ($\delta^{13}C$=−6.73‰). For reference, the $\delta^{13}C$ value for air is accepted to be −8‰. This example illustrates that $\delta^{13}C$ values may be used to confirm the primary source of carbon in a carbonate composition when the CO$_2$ source for the carbonate is combustion, as well as in a solution produced from the carbon dioxide.

Example 5

Measurement of $\delta^{13}C$ Value for Precipitation Material and Starting Materials This experiment was performed using a bottled mixture of SO$_2$ and CO$_2$ gases and fly ash as an industrial waste material. The procedure was conducted in a closed container.

The starting materials were a commercially available bottled mixture of SO$_2$ and CO$_2$ gas, de-ionized water, and fly ash as the industrial waste material.

A container was filled with de-ionized water. Fly ash was slaked and added to the de-ionized water, providing an alkaline pH and divalent cation concentration suitable for precipitation of carbonate-containing precipitation material without releasing CO$_2$ into the atmosphere. SO$_2$/CO$_2$ gas was sparged at a rate and time suitable for precipitation of the carbonate-containing precipitation material from the alkaline solution. Sufficient time was allowed for interaction of the components of the reaction, after which time the precipitation material was separated from the remaining solution, also known as the supernatant solution, and spray-dried. The resultant powder was suitable, with further processing, for use, e.g., as a material in the built environment, e.g., as aggregate for use in a road bed, concrete, or the like. The resultant powder was suitable, with further processing, for use as a building material such as aggregate for use in a roadbed, concrete, or the like. As described herein, the resultant powder was also suitable for simple storage stored. Alternatively, the precipitation material may have been left in the seawater solution and stored, optionally after equilibration with atmospheric air.

$\delta^{13}$ values for the process starting materials, carbonate-containing precipitation material and supernatant solution were measured as detailed in Example 4.

Measurements from the analysis of the SO$_2$/CO$_2$ gas, industrial waste (fly ash), carbonate-containing precipitation material, and supernatant solution are as follows. The $\delta^{13}C$ values for the precipitation material and supernatant solution were −15.88‰ and −11.70‰, respectively. The $\delta^{13}C$ values of both products of the reaction reflect the incorporation of the SO$_2$/CO$_2$ gas ($\delta^{13}C$=−12.45‰) and the fly ash that included some carbon that was not fully combusted to a gas ($\delta^{13}C$=−17.46‰). Because the fly ash, itself a product of fossil fuel combustion, had a more negative $\delta^{13}C$ than the CO$_2$ used, the overall $\delta^{13}C$ value of the precipitation material reflects that by being more negative than that of the $CO_2$ itself. For reference, the $\delta^{13}C$ value for air is accepted to be −8‰. This example illustrates that $\delta^{13}C$ values may be used to confirm the primary source of carbon in a carbonate composition, when a gas mixture that includes a SOx ($SO_2$) as well as $CO_2$ is used.

While preferred embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A non-hazardous composition comprising carbonates, bicarbonates, or a combination thereof, and mercury, a mercury derivative, or a combination thereof, wherein the carbonates, bicarbonates, or the combination thereof have a relative carbon isotope composition ($\delta^{13}C$) value less than −5.00‰ wherein the mercury is in a non-leachable form in the composition, and wherein the composition, when subjected to a leaching process comprising preparing 2×1 L of an extraction fluid comprising an aqueous solution of acetic acid, wherein each 1 L of the extraction fluid comprises 5.7 mL acetic acid in deionized water;

grinding the solid such that particles of ground solid are less than 1 cm in the narrowest dimension if the particles are not already less than 1 cm in the narrowest dimension;

placing 100 g of the ground solid into an extraction vessel with 2 L of the extraction fluid to produce an extraction composition;

rotating the extraction vessel in an end-over-end fashion for 18±2 hours at room temperature;

filtering the extraction composition through borosilicate glass fiber with a pore size of 0.6 μm to 0.8 μm to produce a leachate; and adjusting pH of the leachate with 1 N nitric acid to a pH of pH 2 or less than pH 2;

produces a leachate comprising less than 2.0 mg/L of mercury.

2. The composition of claim 1, wherein the relative carbon isotope composition value is less than −10.00‰.

3. The composition of claim 1, wherein the relative carbon isotope composition value is less than −20.00‰.

4. The composition of claim 1, wherein the composition comprises at least 90% carbonates.

5. The composition of claim 1, wherein the leachate comprises less than 1.0 mg/L of mercury.

6. The composition of claim 5, wherein the leachate comprises less than 0.5 mg/L of mercury.

7. The composition of claim 1, wherein the composition further comprises a sulfur-containing compound.

8. The composition of claim 7, wherein the sulfur-containing compound is a sulfate or a sulfite.

9. The composition of claim 1, wherein the carbonate or the bicarbonate is a calcium carbonate or calcium bicarbonate, respectively.

10. The composition of claim 9, wherein the calcium carbonate comprises a metastable form selected from the group consisting of vaterite, amorphous calcium carbonate, and combination thereof.

11. The composition of claim 1, wherein the composition further comprises metals selected from the group consisting of Ag, As, Ba, Be, Cd, Co, Cr, Cu, Mn, Mo, Ni, Pb, Sb, Se, Tl, V, Zn, and combination thereof.

12. The composition of claim 1, wherein the composition has a particle size of between 0.1-100 μm.

* * * * *